(12) United States Patent
Hirata et al.

(10) Patent No.: US 12,486,457 B2
(45) Date of Patent: Dec. 2, 2025

(54) COMPOUND, LIQUID CRYSTAL COMPOSITION, AS WELL AS LIQUID CRYSTAL DISPLAY ELEMENT, SENSOR, LIQUID CRYSTAL LENS, OPTICAL COMMUNICATION EQUIPMENT, AND ANTENNA EACH USING THE SAME

(71) Applicant: DIC Corporation, Tokyo (JP)

(72) Inventors: Shinichi Hirata, Kitaadachi-gun (JP); Mika Takasaki, Kitaadachi-gun (JP); Masanao Hayashi, Kitaadachi-gun (JP); Noriyuki Sugiyama, Kitaadachi-gun (JP); Yasuo Umezu, Kitaadachi-gun (JP)

(73) Assignee: DIC CORPORATION, Tokyo (JP)

( * ) Notice: Subject to any disclaimer, the term of this patent is extended or adjusted under 35 U.S.C. 154(b) by 0 days.

(21) Appl. No.: 18/286,845

(22) PCT Filed: Feb. 17, 2022

(86) PCT No.: PCT/JP2022/006299
§ 371 (c)(1),
(2) Date: Oct. 13, 2023

(87) PCT Pub. No.: WO2022/234709
PCT Pub. Date: Nov. 10, 2022

(65) Prior Publication Data
US 2024/0228878 A1 Jul. 11, 2024

(30) Foreign Application Priority Data
May 6, 2021 (JP) .................................. 2021-078465

(51) Int. Cl.
G02F 1/1333 (2006.01)
C07C 331/28 (2006.01)
C09K 19/30 (2006.01)
C09K 19/32 (2006.01)
H01Q 1/36 (2006.01)
H01Q 3/46 (2006.01)
C09K 19/04 (2006.01)
G02F 1/29 (2006.01)

(52) U.S. Cl.
CPC .......... C09K 19/321 (2013.01); C07C 331/28 (2013.01); C09K 19/3001 (2013.01); H01Q 1/36 (2013.01); H01Q 3/46 (2013.01); *C07C 2601/14* (2017.05); *C09K 2019/0448* (2013.01); *C09K 2019/325* (2013.01); *G02F 1/29* (2013.01)

(58) Field of Classification Search
CPC ........ C09K 19/12; C09K 19/14; C09K 19/16; C09K 19/18; C09K 19/20; C09K 19/22; C09K 19/24; C09K 19/30; C09K 19/32; C09K 19/34; C09K 19/321; C09K 19/3001; C09K 2019/0448; C09K 2019/325; C09K 2019/122; C09K 2019/123; C09K 2019/3004; C09K 2019/3009; C09K 2019/301; C09K 2019/3016; C09K 2019/3027; G02F 1/1333; C07C 331/28; C07C 2601/14
See application file for complete search history.

(56) References Cited

U.S. PATENT DOCUMENTS

| | | |
|---|---|---|
| 2017/0130129 A1 | 5/2017 | Wittek et al. |
| 2018/0171229 A1 | 6/2018 | Ohishi et al. |
| 2018/0371317 A1 | 12/2018 | Kula et al. |
| 2019/0352564 A1 | 11/2019 | Klass et al. |
| 2020/0299580 A1 | 9/2020 | Brocke et al. |
| 2021/0103190 A1 | 4/2021 | Miyake |
| 2021/0122977 A1 | 4/2021 | Ushakov et al. |
| 2022/0306938 A1 | 9/2022 | Brocke et al. |
| 2023/0025385 A1 | 1/2023 | Brocke et al. |
| 2023/0112953 A1 | 4/2023 | Yamamoto et al. |

(Continued)

FOREIGN PATENT DOCUMENTS

| | | |
|---|---|---|
| CN | 102660296 A | 9/2012 |
| CN | 102786456 A | 11/2012 |
| CN | 103254910 A | 8/2013 |

(Continued)

OTHER PUBLICATIONS

International Search Report dated Apr. 5, 2022, issued in counterpart International Application No. PCT/JP2022/006299 (3 pages).
Dolfi et al., "Liquid Crystal Microwave Phase Shifter", Electronics Letters, 1993, vol. 29, No. 10, pp. 926-928, cited in Specification (3 pages).

*Primary Examiner* — Geraldina Visconti
(74) *Attorney, Agent, or Firm* — WHDA, LLP

(57) ABSTRACT

It is an object of the present invention to provide a compound that can provide a liquid crystal composition with a high $T_{ni}$, a high $\Delta n$, a low $V_{th}$, a high $\Delta\varepsilon_r$, a low $\tan \delta_{iso}$, and high storage stability at low temperatures, a liquid crystal composition, as well as a liquid crystal display element, a sensor, a liquid crystal lens, optical communication equipment, and an antenna each using this. Specifically disclosed are a compound represented by the general formula (i) having an ethynylene group (—C≡C—) and an isothiocyanate group (—NCS) and a liquid crystal composition containing one or two or more of the compounds.

20 Claims, 10 Drawing Sheets

(56) References Cited

U.S. PATENT DOCUMENTS

2024/0228878 A1* 7/2024 Hirata ..................... H01Q 3/46
2024/0336843 A1* 10/2024 Takasaki ................. H01Q 3/34

FOREIGN PATENT DOCUMENTS

| | | | | |
|---|---|---|---|---|
| CN | 103725295 A | | 4/2014 | |
| CN | 104263380 A | * | 1/2015 | ............ C09K 19/44 |
| CN | 105985786 A | | 10/2016 | |
| CN | 107338057 A | * | 11/2017 | ........... G02F 1/1333 |
| CN | 108865180 A | * | 10/2018 | ............ C09K 19/44 |
| CN | 109852400 A | | 6/2019 | |
| CN | 109943350 A | | 6/2019 | |
| CN | 110760311 A | | 2/2020 | |
| CN | 110938438 A | | 3/2020 | |
| CN | 116286020 A | * | 6/2023 | ............ C09K 19/44 |
| JP | H05-507725 A | | 11/1993 | |
| JP | 2015-110532 A | | 6/2015 | |
| JP | 2016-37607 A | | 3/2016 | |
| JP | 2018-48341 A | | 3/2018 | |
| JP | 2019-509356 A | | 4/2019 | |
| JP | 2019-206694 A | | 12/2019 | |
| JP | 2020-169161 A | | 10/2020 | |
| JP | 2021-091630 A | | 6/2021 | |
| WO | 92/16519 A2 | | 10/1992 | |
| WO | 2018/016398 A1 | | 1/2018 | |
| WO | 2021/037962 A1 | | 3/2021 | |
| WO | 2021/069535 A1 | | 4/2021 | |
| WO | 2021/157188 A1 | | 8/2021 | |

* cited by examiner

COMPOUND, LIQUID CRYSTAL COMPOSITION, AS WELL AS LIQUID CRYSTAL DISPLAY ELEMENT, SENSOR, LIQUID CRYSTAL LENS, OPTICAL COMMUNICATION EQUIPMENT, AND ANTENNA EACH USING THE SAME

TECHNICAL FIELD

The present invention relates to a compound, a liquid crystal composition, as well as a liquid crystal display element, a sensor, a liquid crystal lens, optical communication equipment, and an antenna each using this.

BACKGROUND ART

As a new application of a liquid crystal often used for a display application, an antenna using a liquid crystal for transmitting and receiving a radio wave between a moving body, such as an automobile, and a communication satellite has attracted attention. Although a satellite communication has used a parabolic antenna, when the satellite communication is used in a moving body, such as an automobile, the parabolic antenna must be directed toward the satellite at any time and therefore requires a large movable portion. However, an antenna using a liquid crystal can change the transmission and reception direction of a radio wave by the operation of the liquid crystal within a panel, eliminate the need to move the antenna itself, and have a flat shape. Furthermore, to realize global large-capacity and high-speed communications, a low-earth-orbit satellite constellation using a large number of low-earth-orbit satellites is being studied. A liquid crystal antenna that can easily change the direction of transmission and reception of a radio wave is useful for tracking low-earth-orbit satellites that appear from the ground to be continually moving.

In general, autonomous driving of automobiles and the like requires massive data download of high-precision 3D map information. However, an antenna using a liquid crystal can be installed in an automobile to download a large amount of data from a communication satellite without a mechanical movable portion. A frequency band used in satellite communications is an approximately 13 GHz band, which is significantly different from the frequencies used in liquid crystal display applications. Thus, the physical properties required for a liquid crystal are also greatly different, and Δn required for a liquid crystal for an antenna is approximately 0.4, and the operating temperature ranges from −20° C. to 120° C.

Furthermore, an infrared laser image recognition and range finder using a liquid crystal has also attracted attention as a sensor for autonomous driving of a moving body, such as an automobile. An required for the liquid crystal for this application ranges from 0.3 to 0.6, and the operating temperature ranges from 10° C. to 100° C. Furthermore, it is known that many liquid crystal compounds constituting liquid crystal compositions with a high Δn of 0.2 or more have low compatibility. Thus, it is also important to select a liquid crystal compound with high compatibility.

On the other hand, a technique of a liquid crystal for an antenna is described in, for example, Patent Literature 1.

The use of a liquid crystal material as a constituent of a high-frequency device is proposed in Non-Patent Literature 1.

CITATION LIST

Patent Literature

PTL 1: Japanese Unexamined Patent Application Publication No. 2016-37607

Non Patent Literature

NPL 1: D. Dolfi, "Electronics Letters", (United Kingdom), 1993, vol. 29, No. 10, pp. 926-927

SUMMARY OF INVENTION

Technical Problem

It is an object of the present invention to provide a compound that can provide a liquid crystal composition with a high $T_{ni}$, a high Δn, a low $V_{th}$, a high $Δε_r$, a low tan $δ_{iso}$, and high storage stability at low temperatures, a liquid crystal composition, as well as a liquid crystal display element, a sensor, a liquid crystal lens, optical communication equipment, and an antenna each using this.

Solution to Problem

As a result of extensive studies, the present inventors have completed the present invention by finding that a liquid crystal composition containing one or two or more compounds represented by the general formula (i) having an ethynylene group (—C≡C—) and an isothiocyanate group (—NCS) can solve the above problems.

The constitution of the present invention to solve the problems is as follows:

A compound according to the present invention is a compound represented by the general formula (i):

[Chem. 1]

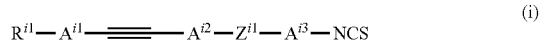

(i)

(In the general formula (i), $R^{i1}$ denotes a hydrogen atom, a halogen atom, or an alkyl group with 1 to 20 carbon atoms, one or two or more —CH$_2$— groups in the alkyl group are each independently optionally substituted with —O—, —S—, —CO—, and/or —CS—, one or two or more —CH$_2$—CH$_2$— groups in the alkyl group are each independently optionally substituted with —CO—O—, —O—CO—, —CO—S—, —S—CO—, —CO—NH—, —NH—CO—, —CH═CH—, —CF═CF—, and/or —C≡C—, one or two or more —CH$_2$—CH$_2$—CH$_2$— groups in the alkyl group are each independently optionally substituted with —O—CO—O—, and one or two or more hydrogen atoms in the alkyl group are each independently optionally substituted with a halogen atom, provided that oxygen atoms are not directly bonded to each other, $A^{i1}$, $A^{i2}$, and $A^{i3}$ each independently denote a group selected from the group consisting of the groups (a), (b), (c), and (d):

(a) a 1,4-cyclohexylene group (one —CH$_2$— or two or more nonadjacent —CH$_2$— groups in this group are optionally substituted with —O— and/or —S—),
(b) a 1,4-phenylene group (one —CH═ or two or more nonadjacent —CH═ groups in this group are optionally substituted with —N═),
(c) a 1,4-cyclohexenylene group, a bicyclo[2.2.2]octane-1,4-diyl group, a naphthalene-2,6-diyl group, a naphthalene-1,4-diyl group, a 1,2,3,4-tetrahydronaphthalene-2,6-diyl group, a 5,6,7,8-tetrahydronaphthalene-1,4-diyl group, a decahydronaphthalene-2,6-diyl group, an anthracene-2,6-diyl group, an anthracene-1,4-diyl group, an anthracene-9,10-diyl group, a phenanthrene-2,7-diyl group (one —CH═ or two or more nonadjacent —CH═ groups in the naphthalene-2,6-diyl group, the naphthalene-1,4-diyl group, the 1,2,3,4-tetrahydronaphthalene-2,6-diyl group, the 5,6,7,8-tetrahydronaphthalene-1,4-diyl group, the anthracene-2,6-diyl group, the anthracene-1,4-diyl group, the anthracene-9,10-diyl group, or the phenanthrene-2,7-diyl group are optionally substituted with —N═), and
(d) a thiophene-2,5-diyl group, a benzothiophene-2,5-diyl group, a benzothiophene-2,6-diyl group, a dibenzothiophene-3,7-diyl group, a dibenzothiophene-2,6-diyl group, a thieno[3,2-b]thiophene-2,5-diyl group (one —CH═ or two or more nonadjacent —CH═ groups in this group are optionally substituted with —N═), $A^{i1}$ does not denote a 1,2,3,4-tetrahydronaphthalene-2,6-diyl group, one or two or more hydrogen atoms in $A^{i1}$, $A^{i2}$, and $A^{i3}$ are each independently optionally substituted with a substituent $S^{i1}$, the substituent $S^{i1}$ denotes any one of a fluorine atom, a chlorine atom, a bromine atom, an iodine atom, a pentafluorosulfanyl group, a nitro group, a cyano group, an isocyano group, an amino group, a hydroxy group, a mercapto group, a methylamino group, a dimethylamino group, a diethylamino group, a diisopropylamino group, a trimethylsilyl group, a dimethylsilyl group, a thioisocyano group, and an alkyl group with 1 to 20 carbon atoms, one or two or more —CH$_2$— groups in the alkyl group are each independently optionally substituted with —O—, —S—, and/or —CO—, one or two or more —CH$_2$—CH$_2$— groups in the alkyl group are each independently optionally substituted with —CH═CH—, —CF═CF—, —C≡C—, —CO—O—, —O—CO—, —CO—S—, —S—CO—, —CO—NH—, and/or —NH—CO—, one or two or more —CH$_2$—CH$_2$—CH$_2$— groups in the alkyl group are each independently optionally substituted with —O—CO—O—, and one or two or more hydrogen atoms in the alkyl group are each independently optionally substituted with a halogen atom, provided that oxygen atoms are not directly bonded to each other, a plurality of substituents $S^{i1}$, if present, may be the same or different, $Z^{i1}$ denotes any one of a single bond and an alkylene group with 1 to 20 carbon atoms, one or two or more —CH$_2$— groups in the alkylene group are each independently optionally substituted with —O—, —CF$_2$—, and/or —CO—, and one or two or more —CH$_2$—CH$_2$— groups in the alkylene group are each independently optionally substituted with —CH$_2$—CH(CH$_3$)—, —CH(CH$_3$)—CH$_2$—, —CH═CH—, —CF═CF—, —CH═C(CH$_3$)—, —C(CH$_3$)═CH—, —CH═N—, —N═CH—, —N═N—, —C≡C—, —CO—O—, and/or —O—CO—, provided that oxygen atoms are not directly bonded to each other.)

A liquid crystal composition according to the present invention is characterized by containing one or two or more of the compounds.

A liquid crystal display element according to the present invention is characterized by using the liquid crystal composition.

A sensor according to the present invention is characterized by using the liquid crystal composition.

A liquid crystal lens according to the present invention is characterized by using the liquid crystal composition.

Optical communication equipment according to the present invention is characterized by using the liquid crystal composition.

An antenna according to the present invention is characterized by using the liquid crystal composition.

Advantageous Effects of Invention

The present invention can provide a liquid crystal composition containing one or two or more compounds represented by the general formula (i) having an ethynylene group (—C≡C—) and an isothiocyanate group (—NCS) and thereby provide a liquid crystal composition with a high $T_{ni}$, a high Δn, a low $V^{th}$, a high Δε$_r$, a low tan δ$_{iso}$, and high storage stability at low temperatures. The liquid crystal composition is useful for a liquid crystal display element, a sensor, a liquid crystal lens, optical communication equipment, and an antenna.

Figure 1:
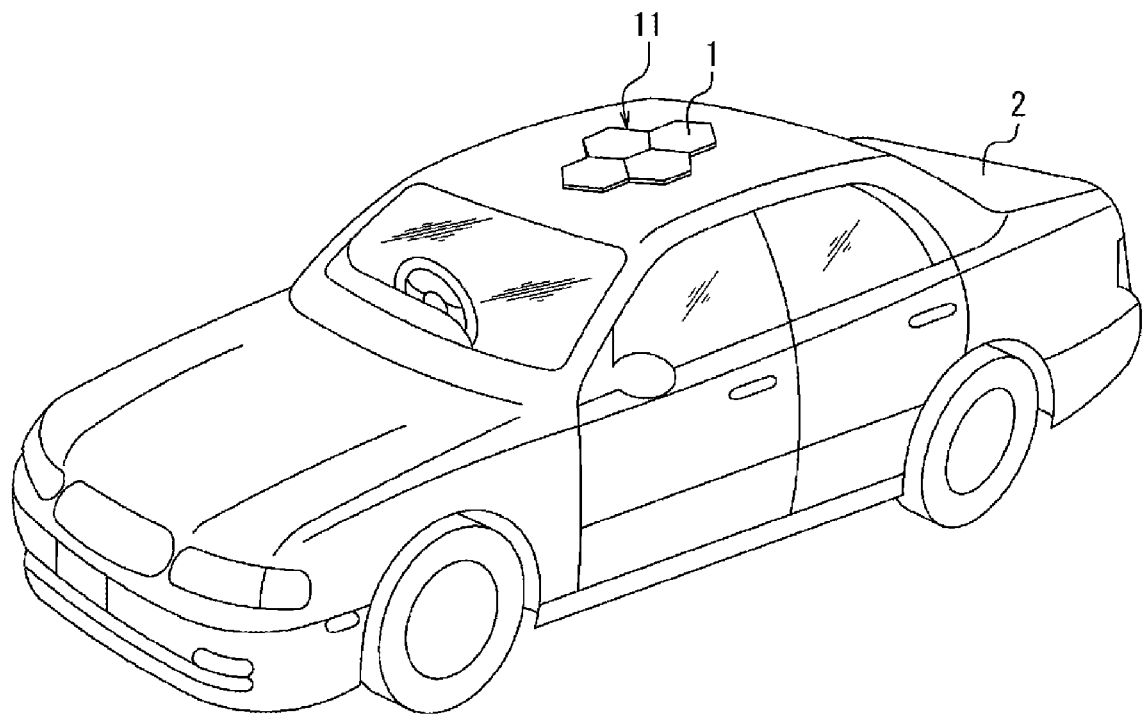
FIG. 1 is an example of a schematic view of a vehicle equipped with an antenna according to the present invention.

DESCRIPTION OF EMBODIMENTS (Compound Represented by General Formula (i))

A compound according to the present invention is a compound represented by the general formula (i) having an ethynylene group (—C≡C—) and an isothiocyanate group (—NCS).

A liquid crystal composition according to the present invention contains one or two or more compounds represented by the general formula (i) having an ethynylene group (—C≡C—) and an isothiocyanate group (—NCS).

[Chem. 2]

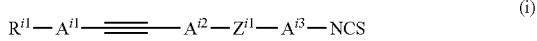

$$R^{i1}-A^{i1}-\!\!\!=\!\!\!-A^{i2}-Z^{i1}-A^{i3}-NCS \quad (i)$$

In the general formula (i), $R^{i1}$ denotes a hydrogen atom, a halogen atom, or an alkyl group with 1 to 20 carbon atoms.

The halogen atom may be a fluorine atom, a chlorine atom, a bromine atom, an iodine atom, or the like.

The alkyl group with 1 to 20 carbon atoms is a linear, branched, or cyclic alkyl group, preferably a linear alkyl group.

The number of carbon atoms in the alkyl group with 1 to 20 carbon atoms preferably ranges from 2 to 10, preferably 2 to 6.

One or two or more —CH$_2$— groups in the alkyl group are each independently optionally substituted with —O—, —S—, —CO—, and/or —CS—.

One or two or more —CH$_2$—CH$_2$— groups in the alkyl group are each independently optionally substituted with —CO—O—, —O—CO—, —CO—S—, —S—CO—, —CO—NH—, —NH—CO—, —CH=CH—, —CF=CF—, and/or —C≡C—.

One or two or more —CH$_2$—CH$_2$—CH$_2$— groups in the alkyl group are each independently optionally substituted with —O—CO—O—.

One or two or more hydrogen atoms in the alkyl group are each independently optionally substituted with a halogen atom.

The halogen atom may be a fluorine atom, a chlorine atom, a bromine atom, or an iodine atom.

When the alkyl group is substituted with a predetermined group, however, oxygen atoms are not directly bonded to each other.

From the perspective of the stability of the compound, sulfur atoms are preferably not directly bonded to each other, and/or an oxygen atom and a sulfur atom are preferably not directly bonded to each other.

For example, $R^{i1}$ can denote an alkoxy group with 1 to 19 carbon atoms by substituting one —CH$_2$— in the alkyl group with —O—.

The alkoxy group is a linear, branched, or cyclic alkoxy group, preferably a linear alkoxy group.

The number of carbon atoms in the alkoxy group preferably ranges from 2 to 10, preferably 2 to 6.

$R^{i1}$ can denote a thioalkoxy group (alkylsulfanyl group, alkylthio group) with 1 to 19 carbon atoms by substituting one —CH$_2$— in the alkyl group with —S—.

The thioalkoxy group is a linear, branched, or cyclic thioalkoxy group, preferably a linear thioalkoxy group.

The number of carbon atoms in the thioalkoxy group preferably ranges from 1 to 10, preferably 1 to 6.

$R^{i1}$ can denote an alkenyl group with 2 to 20 carbon atoms by substituting one or two or more —CH$_2$—CH$_2$— groups in the alkyl group with —CH=CH—.

Te alkenyl group is a linear, branched, or cyclic alkenyl group, preferably a linear alkenyl group.

The number of carbon atoms in the alkenyl group preferably ranges from 2 to 10, preferably 2 to 6.

$R^{i1}$ can denote an alkynyl group with 2 to 20 carbon atoms by substituting one or two or more —CH$_2$—CH$_2$— groups in the alkyl group with —C≡C—.

The alkynyl group is a linear, branched, or cyclic alkynyl group, preferably a linear alkynyl group.

The number of carbon atoms in the alkynyl group preferably ranges from 2 to 10, preferably 2 to 6.

$R^{i1}$ can denote an alkenyloxy group with 2 to 19 carbon atoms by substituting one —CH$_2$— in the alkyl group with —O— and substituting one or two or more —CH$_2$—CH$_2$— groups with —CH=CH—.

The alkenyloxy group is a linear, branched, or cyclic alkenyloxy group, preferably a linear alkenyloxy group.

The number of carbon atoms in the alkenyloxy group preferably ranges from 2 to 10, preferably 2 to 6.

$R^{i1}$ can denote a halogenated alkyl group with 1 to 20 carbon atoms by substituting one or two or more hydrogen atoms in the alkyl group with a halogen atom.

The halogenated alkyl group is a linear, branched, or cyclic halogenated alkyl group, preferably a linear halogenated alkyl group.

The number of carbon atoms in the halogenated alkyl group preferably ranges from 2 to 10, preferably 2 to 6.

$R^{i1}$ can denote a halogenated alkoxy group with 1 to 19 carbon atoms by substituting one —CH$_2$— in the alkyl group with —O— and substituting one or two or more hydrogen atoms in the alkyl group with a halogen atom.

The halogenated alkoxy group is a linear, branched, or cyclic halogenated alkoxy group, preferably a linear halogenated alkoxy group.

The number of carbon atoms in the halogenated alkoxy group preferably ranges from 2 to 10, preferably 2 to 6.

Specific examples of the alkyl group with 1 to 20 carbon atoms (including substituted ones) in $R^{i1}$ include the groups represented by the formulae ($R^{i1}$-1) to ($R^{i1}$-36):

[Chem. 3]

($R^{i1}$-1)

($R^{i1}$-2)

($R^{i1}$-3)

($R^{i1}$-4)

($R^{i1}$-5)

($R^{i1}$-6)

($R^{i1}$-7)

($R^{i1}$-8)

($R^{i1}$-9)

($R^{i1}$-10)

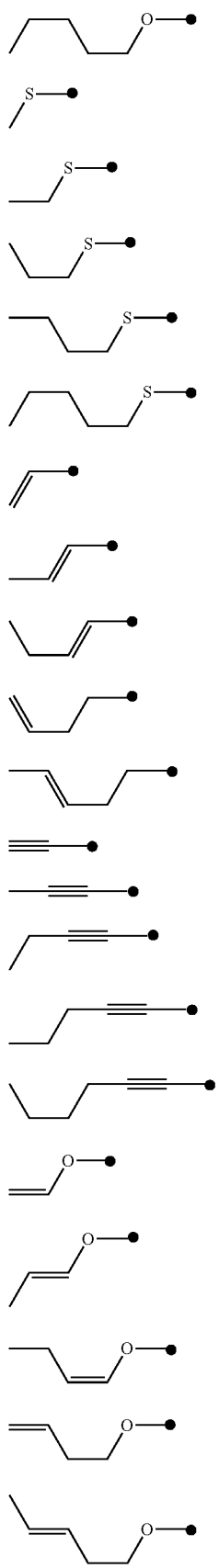

(R$^{i1}$-11)
(R$^{i1}$-12)
(R$^{i1}$-13)
(R$^{i}$-14)
(R$^{i1}$-15)
(R$^{i1}$-16)
(R$^{i1}$-17)
(R$^{i1}$-18)
(R$^{i1}$-19)
(R$^{i1}$-20)
(R$^{i1}$-21)
(R$^{i1}$-22)
(R$^{i1}$-23)
(R$^{i1}$-24)
(R$^{i1}$-25)
(R$^{i1}$-26)
(R$^{i1}$-27)
(R$^{i1}$-28)
(R$^{i1}$-29)
(R$^{i1}$-30)
(R$^{i1}$-31)

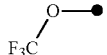 (R$^{i1}$-32)

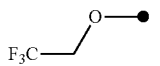 (R$^{i1}$-33)

 (R$^{i1}$-34)

 (R$^{i1}$-35)

 (R$^{i1}$-36)

In the formulae (R$^{i1}$-1) to (R$^{i1}$-36), a black dot represents a bonding arm to A$^{i1}$.

From the perspective of solubility, R$^{i1}$ preferably denotes a linear alkyl group with 2 to 6 carbon atoms or a linear thioalkoxy group with 27 to 6 carbon atoms.

In the general formula (i), A$^{i1}$, A$^{i2}$, and A$^{i3}$ each independently denote a group selected from the group consisting of the groups (a), (b), (c), and (d):

(a) a 1,4-cyclohexylene group (one —CH$_2$— or two or more nonadjacent —CH$_2$— groups in this group are optionally substituted with —O— and/or —S—), (b) a 1,4-phenylene group (one —CH= or two or more nonadjacent —CH= groups in this group are optionally substituted with —N=), (c) a 1,4-cyclohexenylene group, a bicyclo[2.2.2]octane-1,4-diyl group, a naphthalene-2,6-diyl group, a naphthalene-1,4-diyl group, a 1,2,3,4-tetrahydronaphthalene-2,6-diyl group, a 5,6,7,8-tetrahydronaphthalene-1,4-diyl group, a decahydronaphthalene-2,6-diyl group, an anthracene-2,6-diyl group, an anthracene-1,4-diyl group, an anthracene-9,10-diyl group, a phenanthrene-2,7-diyl group (one —CH= or two or more nonadjacent —CH= groups in the naphthalene-2,6-diyl group, the naphthalene-1,4-diyl group, the 1,2,3,4-tetrahydronaphthalene-2,6-diyl group, the 5,6,7,8-tetrahydronaphthalene-1,4-diyl group, the anthracene-2,6-diyl group, the anthracene-1,4-diyl group, the anthracene-9,10-diyl group, or the phenanthrene-2,7-diyl group are optionally substituted with —N=), and (d) a thiophene-2,5-diyl group, a benzothiophene-2,5-diyl group, a benzothiophene-2,6-diyl group, a dibenzothiophene-3,7-diyl group, a dibenzothiophene-2,6-diyl group, a thieno[3,2-b]thiophene-2,5-diyl group (one —CH= or two or more nonadjacent —CH= groups in this group are optionally substituted with —N=).

A$^{i1}$ does not denote a 1,2,3,4-tetrahydronaphthalene-2,6-diyl group.

One or two or more hydrogen atoms in A$^{i1}$, A$^{i2}$, and A$^{i3}$ are each independently optionally substituted with a substituent S$^{i1}$.

The substituent S$^{i1}$ denotes any one of a fluorine atom, a chlorine atom, a bromine atom, an iodine atom, a pentafluorosulfanyl group, a nitro group, a cyano group, an isocyano group, an amino group, a hydroxy group, a mercapto group, a methylamino group, a dimethylamino group, a diethylamino group, a diisopropylamino group, a trimethylsilyl group, a dimethylsilyl group, a thioisocyanate group, and an alkyl group with 1 to 20 carbon atoms.

The alkyl group is a linear, branched, or cyclic alkyl group, preferably a linear alkyl group.

The number of carbon atoms in the alkyl group preferably ranges from 2 to 10, preferably 3 to 6.

One or two or more —CH$_2$— groups in the alkyl group are each independently optionally substituted with —O—, —S—, and/or —CO—.

One or two or more —CH$_2$—CH$_2$— groups in the alkyl group are each independently optionally substituted with —CH=CH—, —CF=CF—, —C≡C—, —CO—O—, —O—CO—, —CO—S—, —S—CO—, —CO—NH—, and/or —NH—CO—.

One or two or more —CH$_2$—CH$_2$—CH$_2$— groups in the alkyl group are optionally substituted with —O—CO—O—.

One or two or more hydrogen atoms in the alkyl group are each independently optionally substituted with a halogen atom.

The halogen atom may be a fluorine atom, a chlorine atom, a bromine atom, or an iodine atom.

When the alkyl group is substituted with a predetermined group, however, oxygen atoms are not directly bonded to each other.

From the perspective of the stability of the compound, sulfur atoms are preferably not directly bonded to each other, and/or an oxygen atom and a sulfur atom are preferably not directly bonded to each other.

The substituent $S^{i1}$ is preferably a halogen atom, preferably a fluorine atom.

At least one of $A^{i1}$ and $A^{i2}$ is preferably substituted with at least one substituent $S^{i1}$, preferably with a halogen atom, preferably with a fluorine atom.

A plurality of substituents $S^{i1}$, if present, may be the same or different.

The substitution position of the substituent $S^{i1}$ in $A^{i1}$ is preferably any one of the formulae ($A^{i1}$-SP-1) and ($A^{i1}$-SP-2):

[Chem. 4]

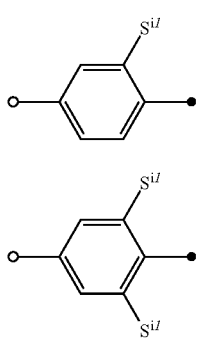

($A^{i1}$-SP-1)

($A^{i1}$-SP-2)

In the formulae ($A^{i1}$-SP-1) and ($A^{i1}$-SP-2), a white dot represents a bonding arm to $R^{i1}$, and a black dot represents a bonding arm to an ethynylene group (—C≡C—).

The substitution position of the substituent $S^{i1}$ in $A^{i2}$ is preferably any one of the formulae ($A^{i2}$-SP-1) to ($A^{i2}$-SP-3):

[Chem. 5]

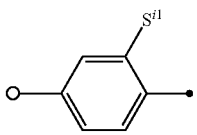

($A^{i2}$-SP-1)

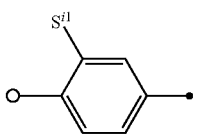

($A^{i2}$-SP-2)

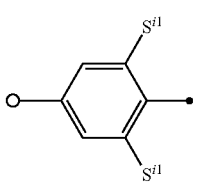

($A^{i2}$-SP-3)

In the formulae ($A^{i2}$-SP-1) to ($A^{i2}$-SP-3), a white dot represents a bonding arm to an ethynylene group (—C≡C—), and a black dot represents a bonding arm to $Z^{i1}$.

The substitution position of the substituent $S^{i1}$ in $A^{i3}$ is preferably any one of the formulae ($A^{i3}$-SP-1) to ($A^{i3}$-SP-3):

[Chem. 6]

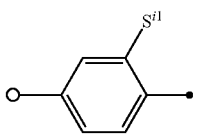

($A^{i3}$-SP-1)

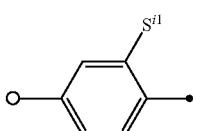

($A^{i3}$-SP-2)

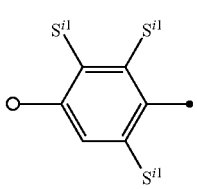

($A^{i3}$-SP-3)

In the formulae ($A^{i3}$-SP-1) to ($A^{i3}$-SP-3), a white dot represents a bonding arm to $Z^{i1}$, and a black dot represents a bonding arm to an isothiocyanate group (—NCS).

More specifically, $A^{i1}$ preferably denotes any one of the formulae ($A^{i1}$-1) to ($A^{i1}$-6):

[Chem. 7]

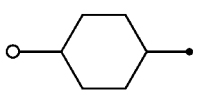

($A^{i1}$-1)

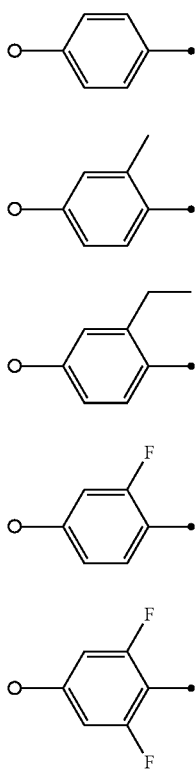
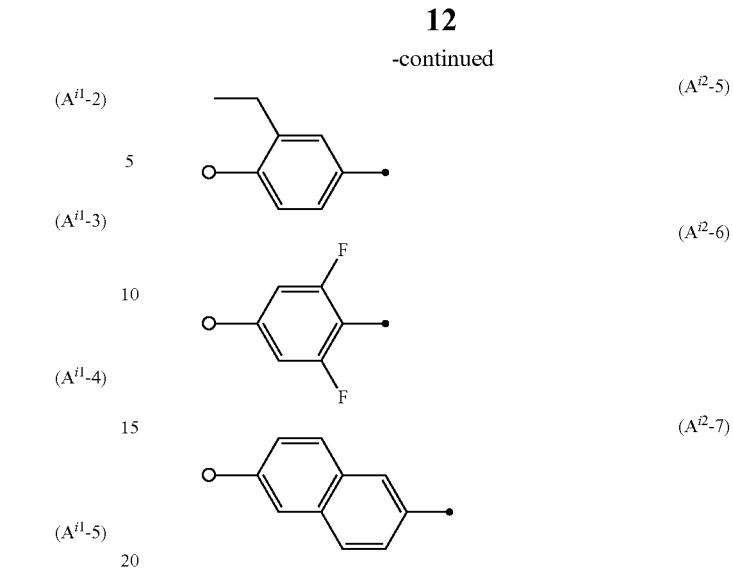

In the formulae ($A^{i1}$-1) to ($A^{i1}$-6), a white dot represents a bonding arm to $R^{i1}$, and a black dot represents a bonding arm to an ethynylene group (—C≡C—).

From the perspective of solubility, $A^{i1}$ particularly preferably denotes the formula ($A^{i1}$-1) or ($A^{i1}$-6). More specifically, $A^{i2}$ preferably denotes any one of the formulae ($A^{i2}$-1) to ($A^{i2}$-7):

[Chem. 8]

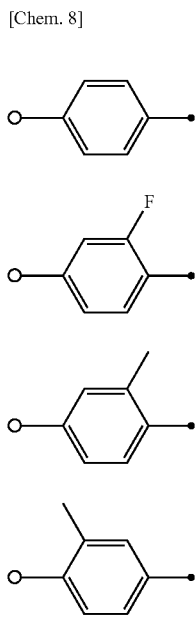

In the formulae ($A^{i2}$-1) to ($A^{i2}$-7), a white dot represents a bonding arm to an ethynylene group (—C≡C—), and a black dot represents a bonding arm to $Z^{i1}$.

From the perspective of an and/or $\Delta\varepsilon_r$, $A^{i2}$ more preferably denotes the formula ($A^{i2}$-1), ($A^{i2}$-2), or ($A^{i2}$-6), particularly preferably ($A^{i2}$-1).

More specifically, $A^{i3}$ preferably denotes any one of the formulae ($A^{i3}$-1) to ($A^{i3}$-4):

[Chem. 9]

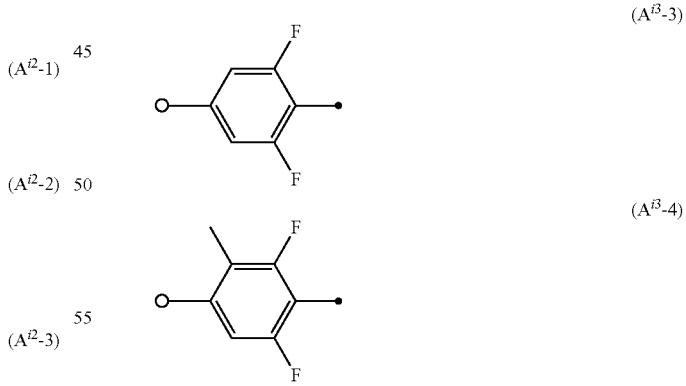

In the formulae ($A^{i3}$-1) to ($A^{i3}$-4), a white dot represents a bonding arm to $Z^{i1}$, and a black dot represents a bonding arm to an isothiocyanate group (—NCS).

From the perspective of $\Delta n$ and/or $\Delta\varepsilon_r$, $A^{i3}$ more preferably denotes the formula ($A^{i3}$-1), ($A^{i3}$-2), or ($A^{i3}$-3), particularly preferably ($A^{i3}$-3).

In the general formula (i), $Z^{i1}$ denotes any one of a single bond and an alkylene group with 1 to 20 carbon atoms.

The alkylene group is a linear, branched, or cyclic alkylene group, preferably a linear alkylene group.

The number of carbon atoms in the alkylene group preferably ranges from 2 to 10, preferably 2 to 6.

One or two or more —$CH_2$— groups in the alkylene group are each independently optionally substituted with —O—, —$CF_2$—, and/or —CO—.

One or two or more —$CH_2$—$CH_2$— groups in the alkylene group are each independently optionally substituted with —$CH_2$—$CH(CH_3)$—, —$CH(CH_3)$—$CH_2$—, —CH=CH—, —CF=CF—, —CH=$C(CH_3)$—, —$C(CH_3)$=CH—, —CH=N—, —N=CH—, —N=N—, —C≡C—, —CO—O—, and/or —O—CO—.

However, when the alkylene group is substituted with a predetermined group, oxygen atoms are not directly bonded to each other.

Specific examples of the alkylene group with 2 to 20 carbon atoms (including substituted ones) include the groups represented by the formulae ($Z^{i1}$-1) to ($Z^{i1}$-24):

[Chem. 10]

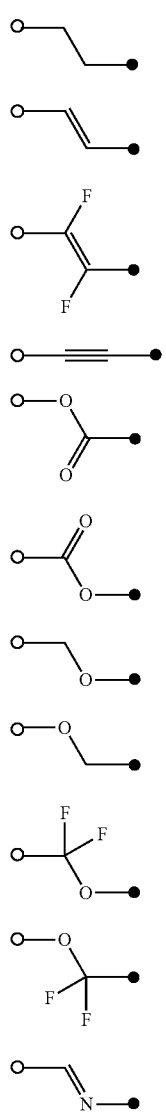

($Z^{i1}$-1)
($Z^{i1}$-2)
($Z^{i1}$-3)
($Z^{i1}$-4)
($Z^{i1}$-5)
($Z^{i1}$-6)
($Z^{i1}$-7)
($Z^{i1}$-8)
($Z^{i1}$-9)
($Z^{i1}$-10)
($Z^{i1}$-11)

-continued

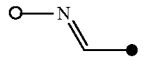

($Z^{i1}$-12)

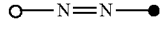

($Z^{i1}$-13)

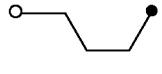

($Z^{i1}$-14)

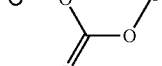

($Z^{i1}$-15)

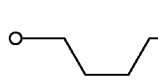

($Z^{i1}$-16)

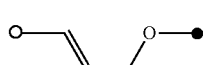

($Z^{i1}$-17)

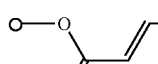

($Z^{i1}$-18)

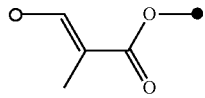

($Z^{i1}$-19)

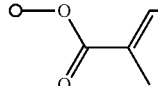

($Z^{i1}$-20)

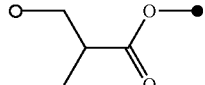

($Z^{i1}$-21)

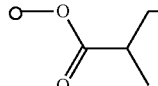

($Z^{i1}$-22)

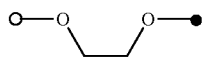

($Z^{i1}$-23)

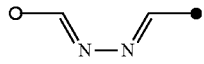

($Z^{i1}$-24)

In the formulae ($Z^{i1}$-1) to ($Z^{i1}$-24), a white dot represents a bonding arm to $A^{i2}$, and a black dot represents a bonding arm to $A^{i3}$.

From the perspective of Δn and/or $Δε_r$, $Z^{i1}$ preferably denotes a single bond or —C≡C—.

Compounds represented by the general formula (i) are preferably compounds represented by the general formulae (i-1) and (i-2):

[Chem. 11]

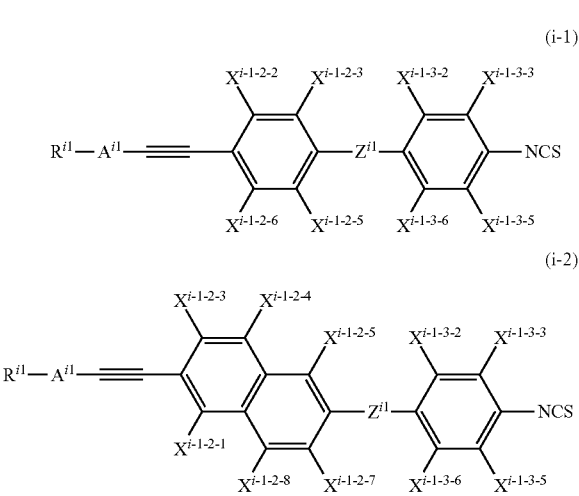

(i-1)

(i-2)

In the general formulae (i-1) and (i-2), $R^{i1}$, $A^{i1}$, and $Z^{i1}$ have the same meaning as $R^{i1}$, $A^{i1}$, and $Z^{i1}$, respectively, in the general formula (i), and preferred groups thereof are also the same. More specifically, from the perspective of solubility, $R^{i1}$ preferably denotes a linear alkyl group with 2 to 6 carbon atoms or a linear thioalkoxy group with 2 to 6 carbon atoms.

More specifically, $A^{i1}$ preferably denotes any one of the formulae ($A^{i1}$-1) to ($A^{i1}$-6), preferably the formula ($A^{i1}$-1) or ($A^{i1}$-6):

[Chem. 12]

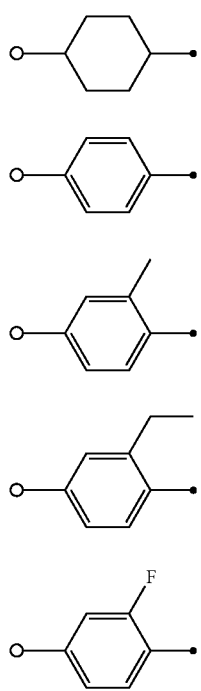

($A^{i1}$-1)

($A^{i1}$-2)

($A^{i1}$-3)

($A^{i1}$-4)

($A^{i1}$-5)

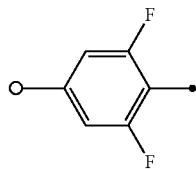

($A^{i1}$-6)

In the formulae ($A^{i1}$-1) to ($A^{i1}$-6), a white dot represents a bonding arm to $R^{i1}$, and a black dot represents a bonding arm to an ethynylene group (—C≡C—).

More specifically, $Z^{i1}$ preferably denotes a single bond, —C≡C—, or —CH=CH—.

In the general formulae (i-1) and (i-2), $X^{i-1-2-1}$, $X^{i-1-2-2}$, $X^{i-1-2-3}$, $X^{i-1-2-4}$, $X^{i-1-2-5}$, $X^{i-1-2-6}$, $X^{i-1-2-7}$, $X^{i-1-3-2}$, $X^{i-1-3-3}$, $X^{i-1-3-5}$, and $X^{i-1-3-6}$ each independently denote a hydrogen atom or a substituent $S^{i1}$.

The substituent $S^{i1}$ has the same meaning as the substituent $S^{i1}$ in the general formula (i), and a preferred group thereof is also the same.

Compounds represented by the general formula (i-1) are preferably compounds represented by the general formulae (i-1-1) to (i-1-43):

[Chem. 13]

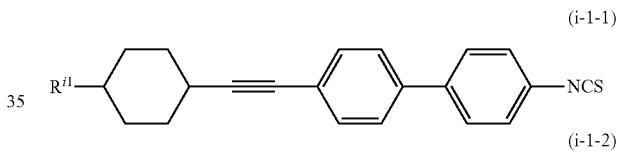

(i-1-1)

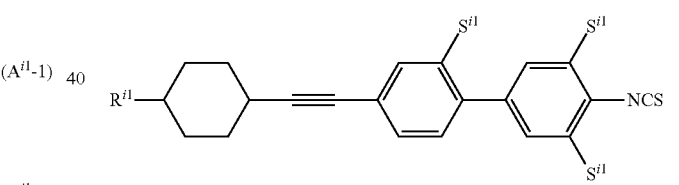

(i-1-2)

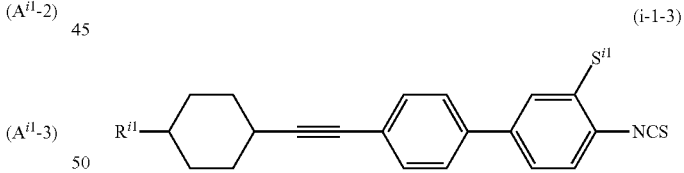

(i-1-3)

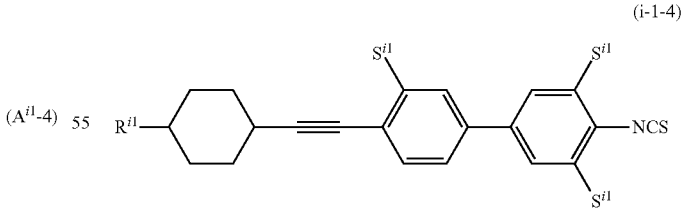

(i-1-4)

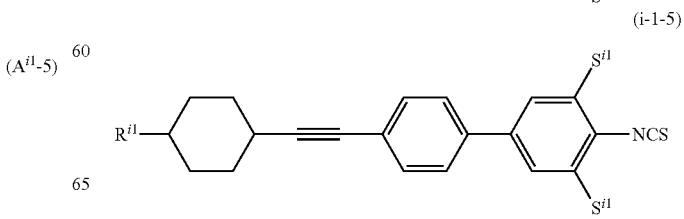

(i-1-5)

-continued
(i-1-6)
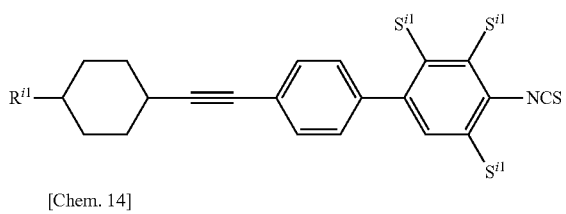
[Chem. 14]
(i-1-7)
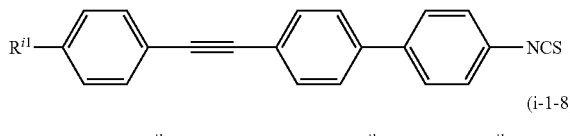
(i-1-8)
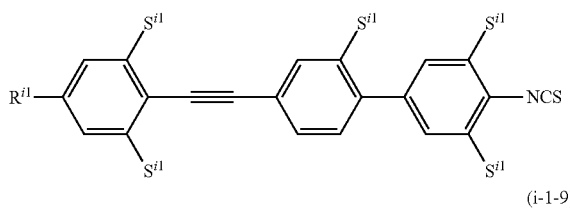
(i-1-9)
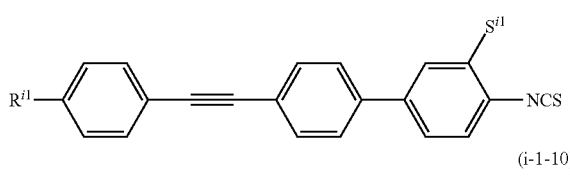
(i-1-10)
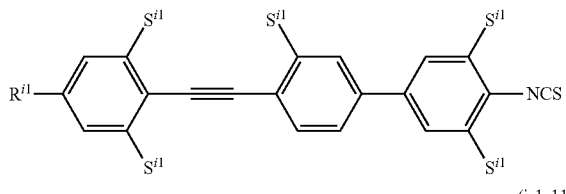
(i-1-11)
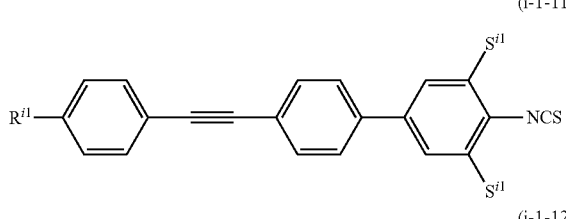
(i-1-12)
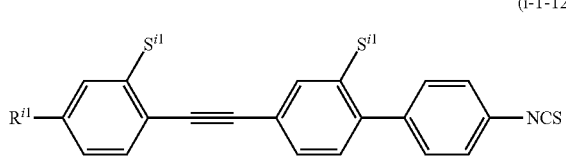
(i-1-13)
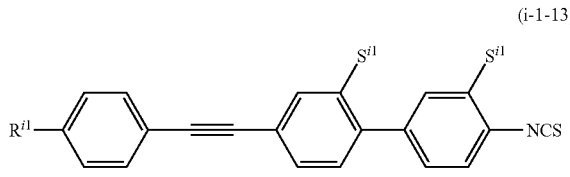
(i-1-14)
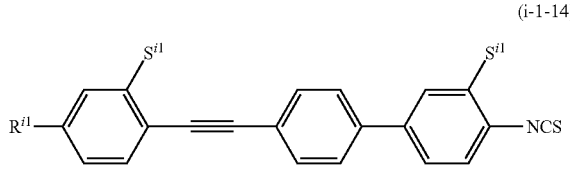
-continued
[Chem. 15]
(i-1-15)
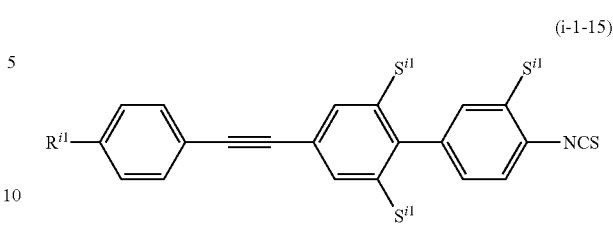
(i-1-16)
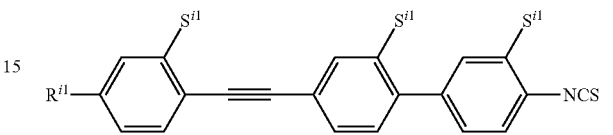
(i-1-17)
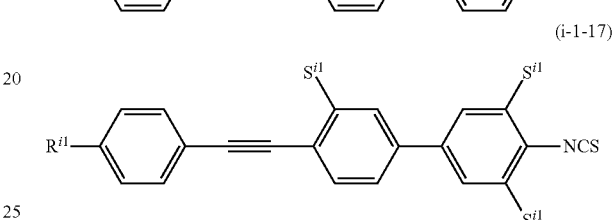
(i-1-18)
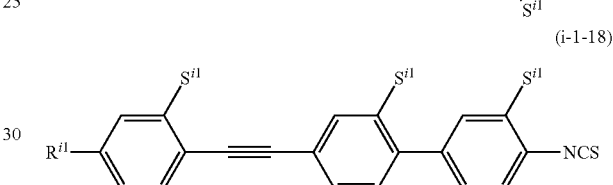
(i-1-19)
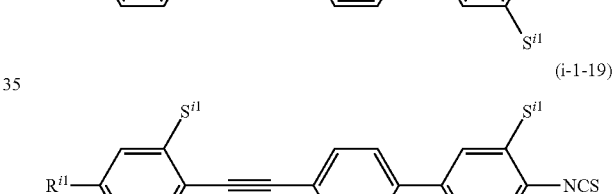
(i-1-20)
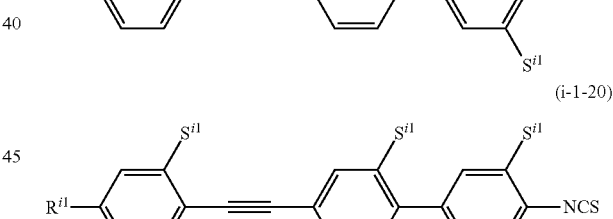
(i-1-21)
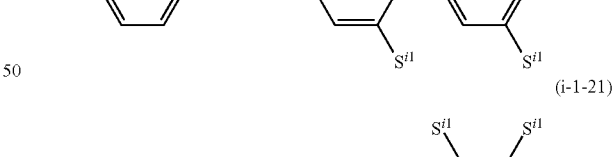
(i-1-22)
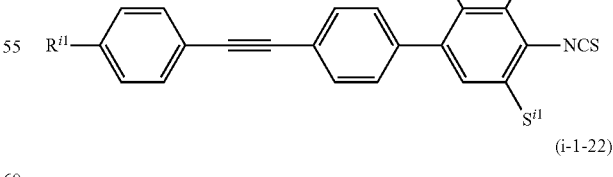
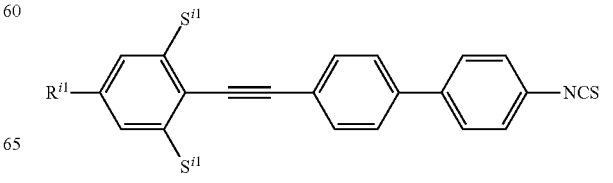

[Chem. 16]
(i-1-23) 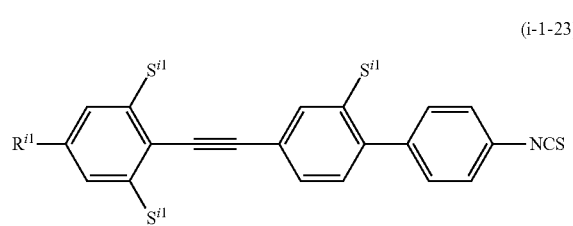
(i-1-24) 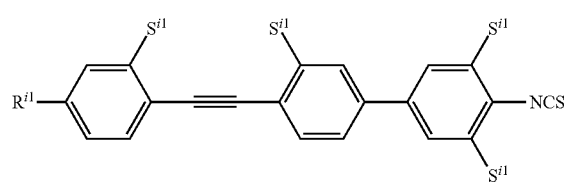
(i-1-25) 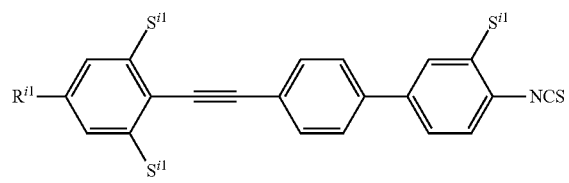
(i-1-26) 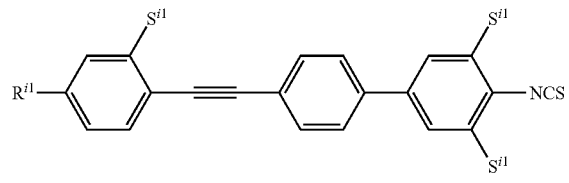
(i-1-27) 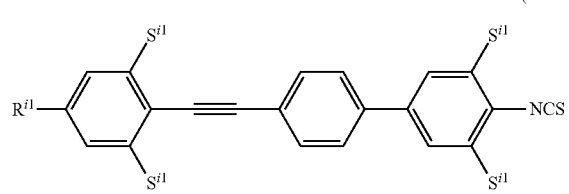
(i-1-28) 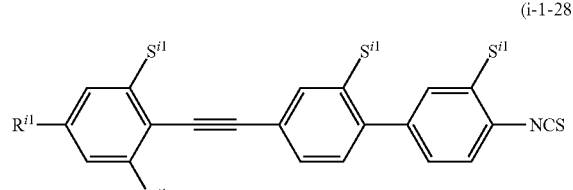
(i-1-29) 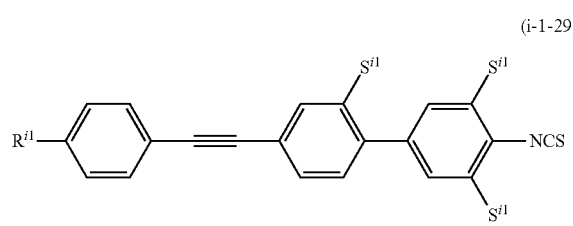
(i-1-30) 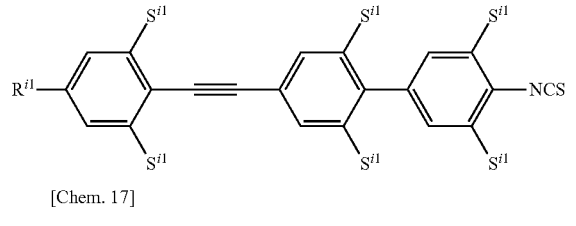
[Chem. 17]
(i-1-31) 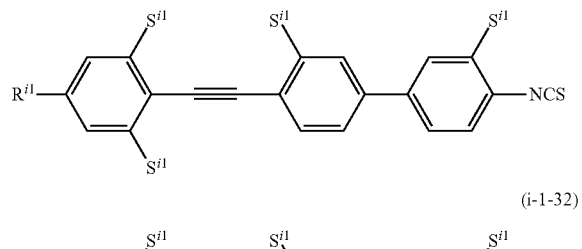
(i-1-32)
(i-1-33) 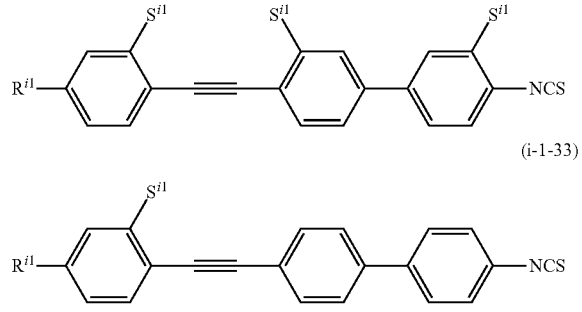
[Chem. 18]
(i-1-34) 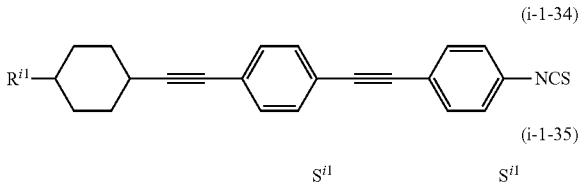
(i-1-35) 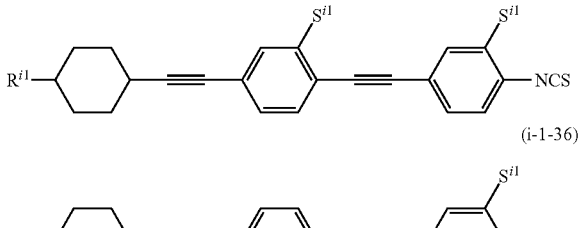
(i-1-36)
(i-1-37) 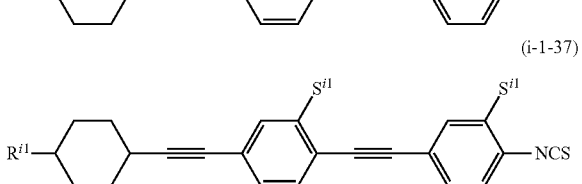
(i-1-38) 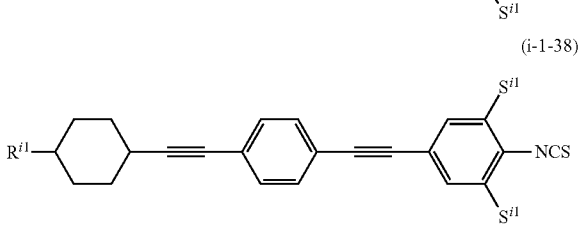

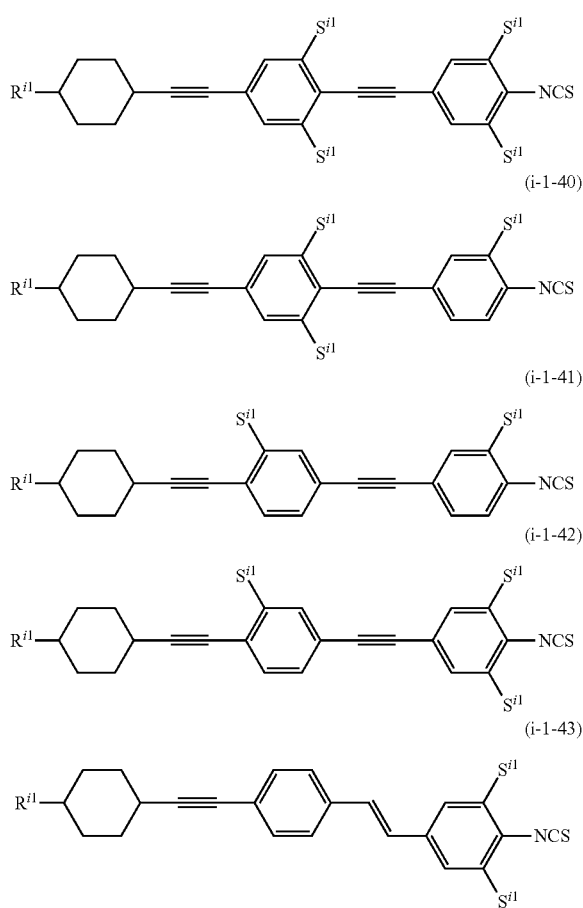

In the general formulae (i-1-1) to (i-1-43), $R^{i1}$ and $S^{i1}$ each independently have the same meaning as $R^{i1}$ and $S^{i1}$, respectively, in the general formula (i).

Specific examples of compounds represented by the general formula (i-1-1) include the compounds represented by the structural formulae (i-1-1.1) to (i-1-1.4):

[Chem. 19]

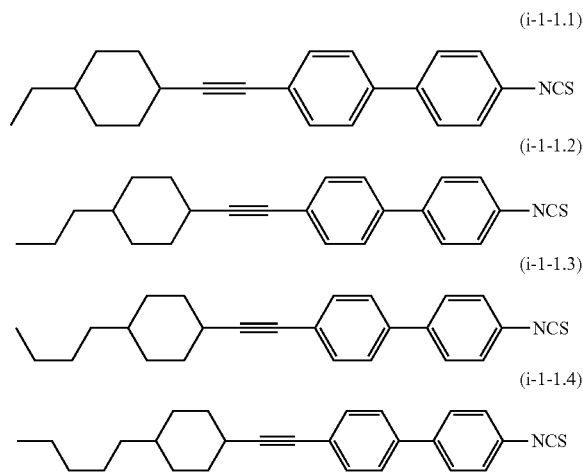

Specific examples of compounds represented by the general formula (i-1-2) include the compounds represented by the structural formulae (i-1-2.1) to (i-1-2.4):

[Chem. 20]

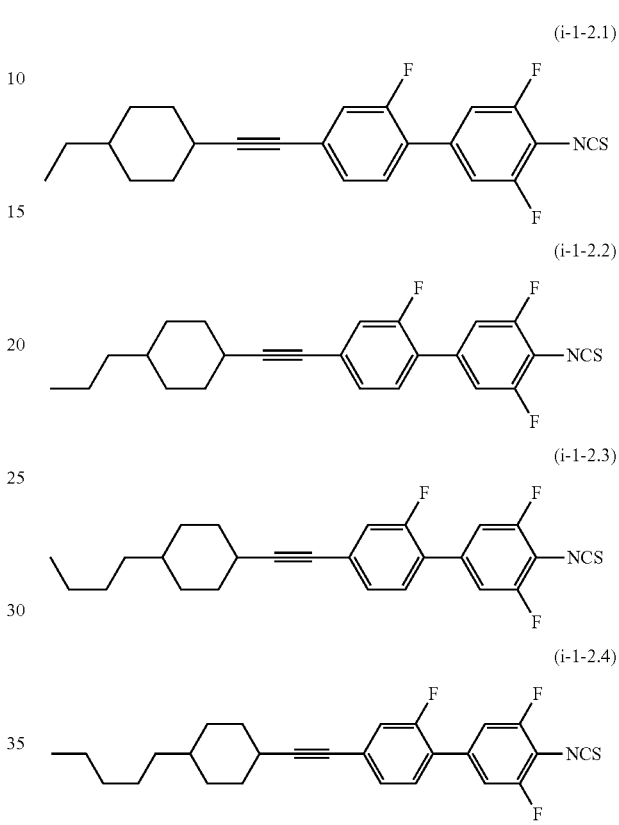

Specific examples of compounds represented by the general formula (i-1-3) include the compounds represented by the structural formulae (i-1-3.1) to (i-1-3.4):

[Chem. 21]

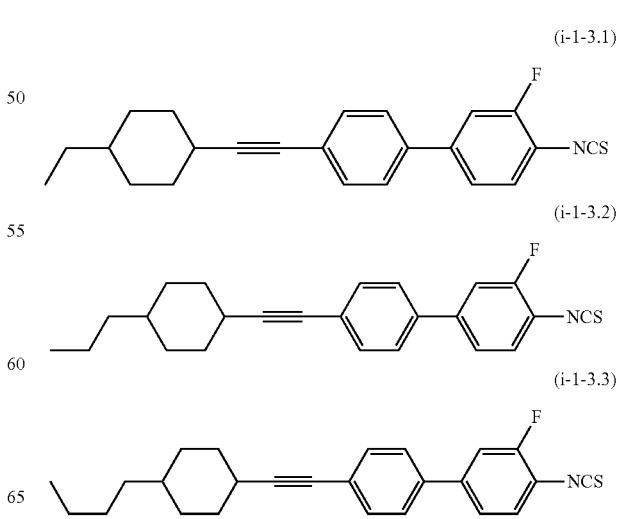

(i-1-3.4)
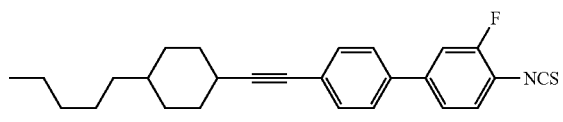
Specific examples of compounds represented by the general formula (i-1-4) include the compounds represented by the structural formulae (i-1-4.1) to (i-1-4.4):
[Chem. 22]
(i-1-4.1)
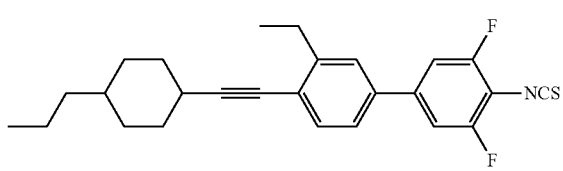
(i-1-4.2)
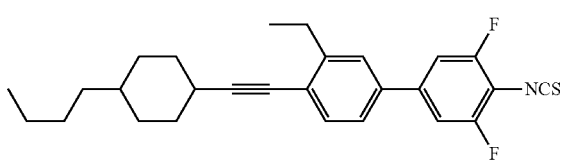
(i-1-4.3)
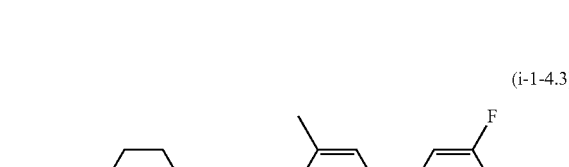
(i-1-4.4)
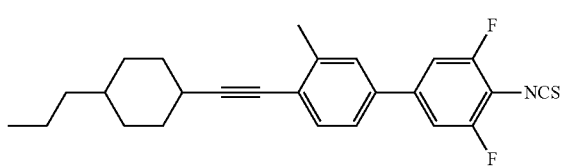
Specific examples of compounds represented by the general formula (i-1-5) include the compounds represented by the structural formulae (i-1-5.1) to (i-1-5.8):
[Chem. 23]
(i-1-5.1)
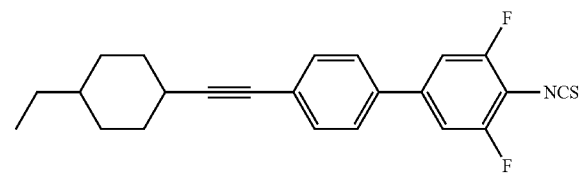
(i-1-5.2)
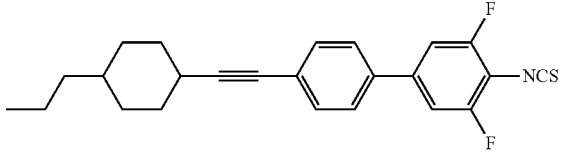
(i-1-5.3)
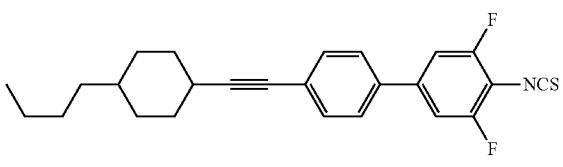
(i-1-5.4)
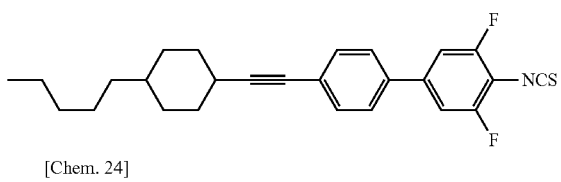
[Chem. 24]
(i-1-5.5)
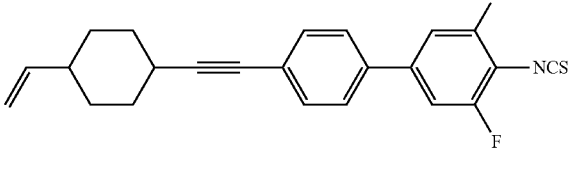
(i-1-5.6)
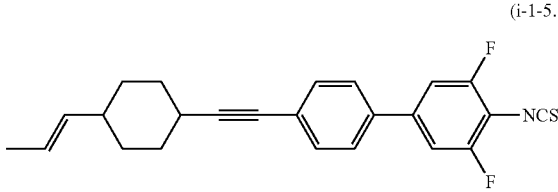
(i-1-5.7)
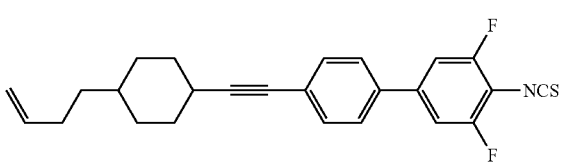
(i-1-5.8)
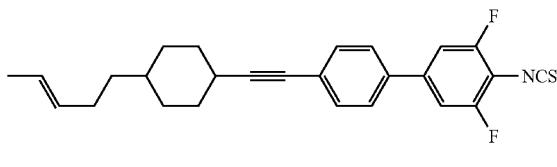

Specific examples of compounds represented by the general formula (i-1-6) include the compounds represented by the structural formulae (i-1-6.1) and (i-1-6.2):

[Chem. 25]

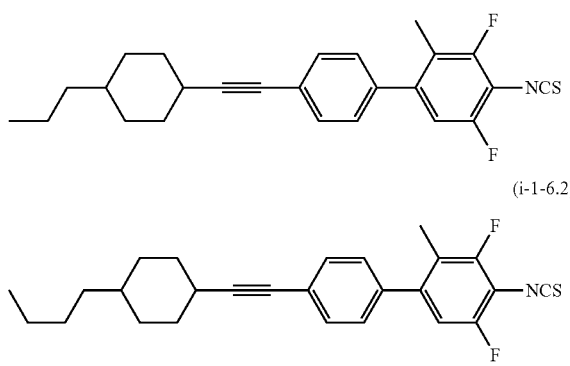

(i-1-6.1)

(i-1-6.2)

Specific examples of compounds represented by the general formula (i-1-7) include the compounds represented by the structural formulae (i-1-7.1) to (i-1-7.4):

[Chem. 26]

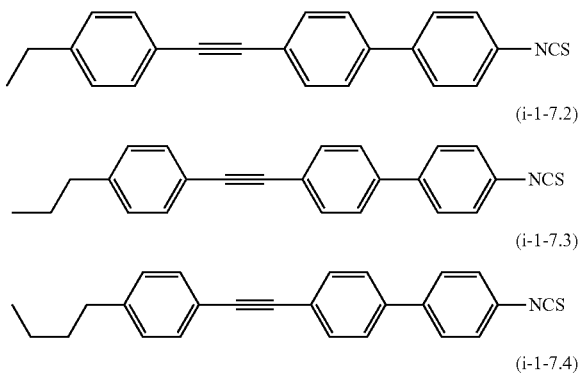

(i-1-7.1)

(i-1-7.2)

(i-1-7.3)

(i-1-7.4)

Specific examples of compounds represented by the general formula (i-1-8) include the compounds represented by the structural formulae (i-1-8.1) to (i-1-8.5):

[Chem. 27]

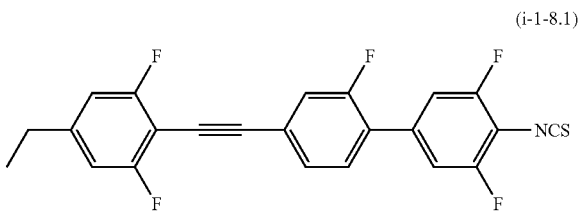

(i-1-8.1)

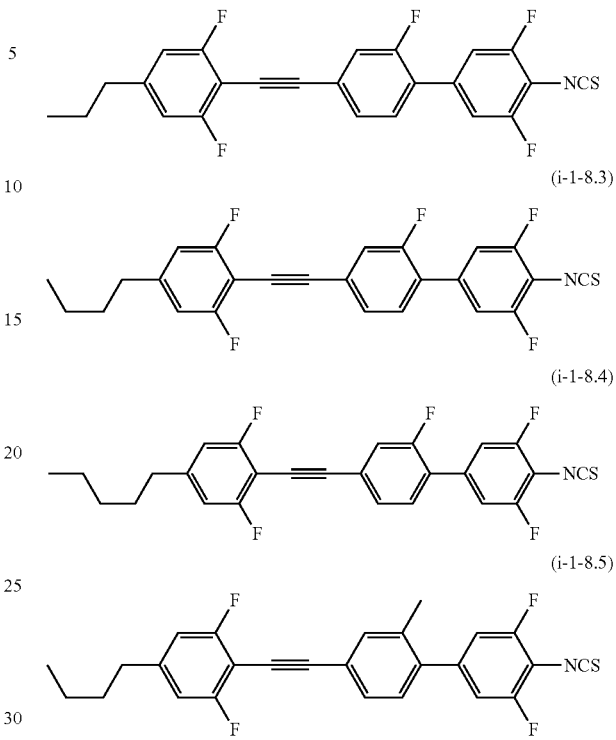

(i-1-8.2)

(i-1-8.3)

(i-1-8.4)

(i-1-8.5)

Specific examples of compounds represented by the general formula (i-1-9) include the compounds represented by the structural formulae (i-1-9.1) to (i-1-9.4):

[Chem. 28]

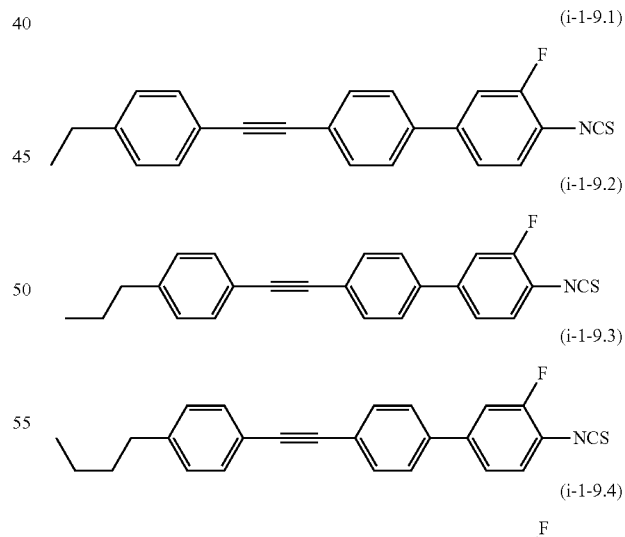

(i-1-9.1)

(i-1-9.2)

(i-1-9.3)

(i-1-9.4)

Specific examples of compounds represented by the general formula (i-1-10) include the compound represented by the structural formula (i-1-10.1):

[Chem. 29]
(i-1-10.1)
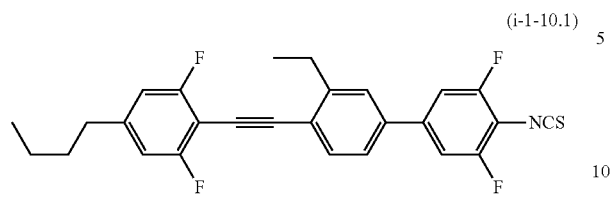
Specific examples of compounds represented by the general formula (i-1-11) include the compounds represented by the structural formulae (i-1-11.1) to (i-1-11.16):
[Chem. 30]
(i-1-11.1)
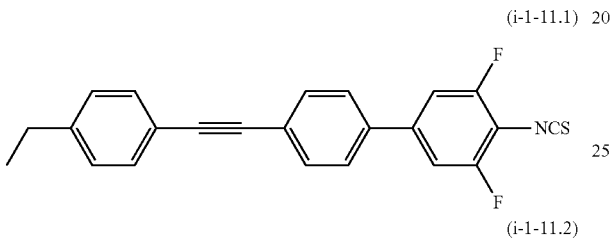
(i-1-11.2)
(i-1-11.3)
(i-1-11.4)
[Chem. 31]
(i-1-11.5)
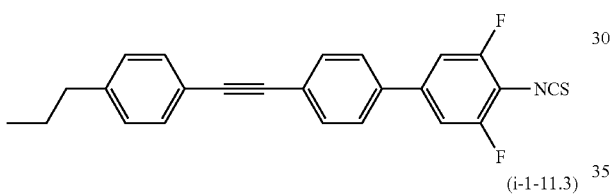
(i-1-11.6)
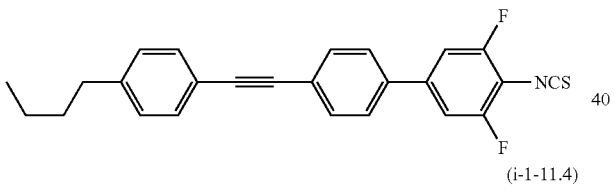
(i-1-11.7)
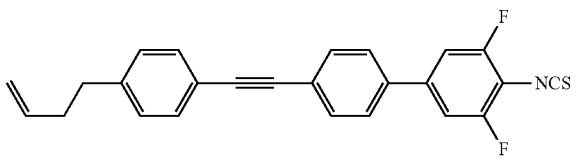
(i-1-11.8)
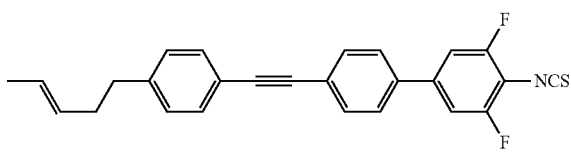
[Chem. 32]
(i-1-11.9)
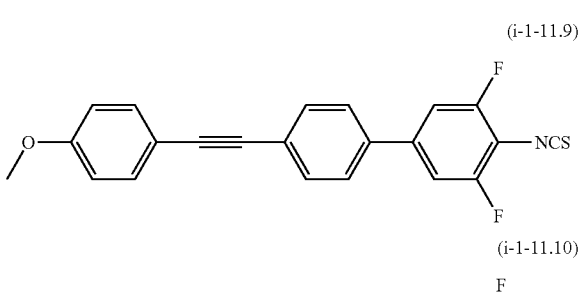
(i-1-11.10)
(i-1-11.11)
(i-1-11.12)
[Chem. 33]
(i-1-11.13)
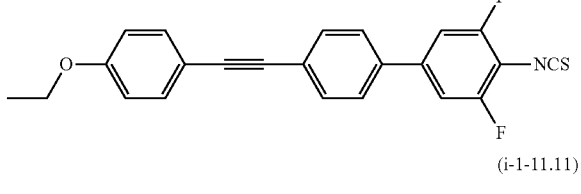
(i-1-11.14)
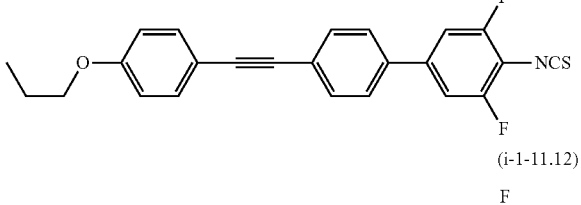
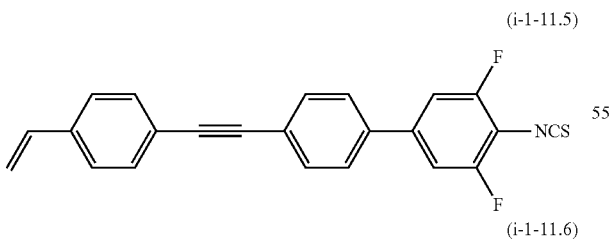
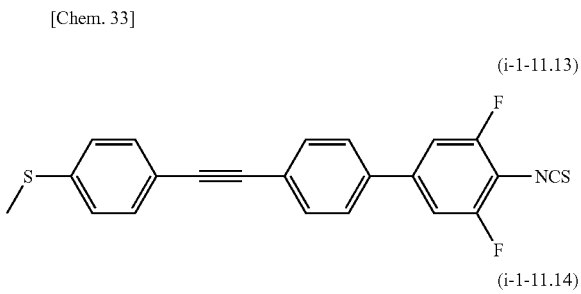
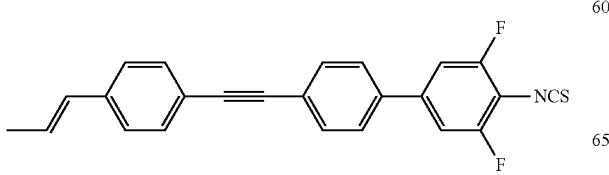
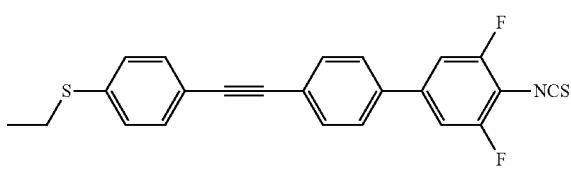

-continued (i-1-11.15)

(i-1-11.16)

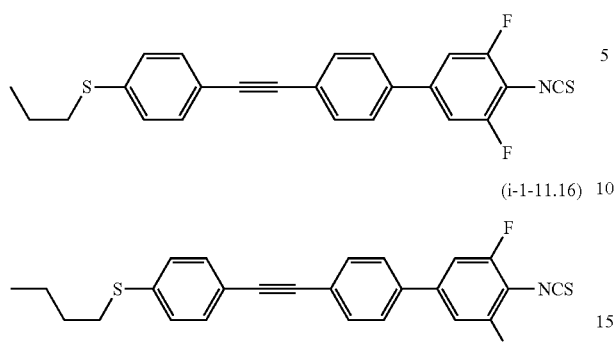

Specific examples of compounds represented by the general formula (i-1-12) include the compounds represented by the structural formulae (i-1-12.1) to (i-1-12.4):

[Chem. 34]

(i-1-12.1)

(i-1-12.2)

(i-1-12.3)

(i-1-12.4)

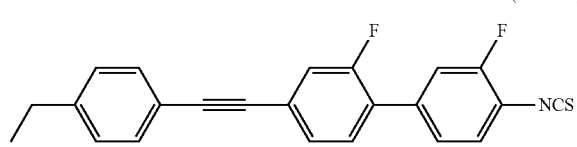

Specific examples of compounds represented by the general formula (i-1-13) include the compounds represented by the structural formulae (i-1-13.1) to (i-1-13.4):

[Chem. 35]

(i-1-13.1)

-continued (i-1-13.2)

(i-1-13.3)

(i-1-13.4)

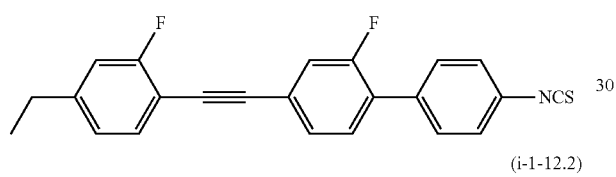
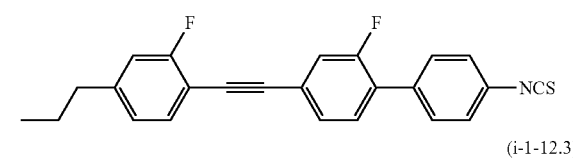
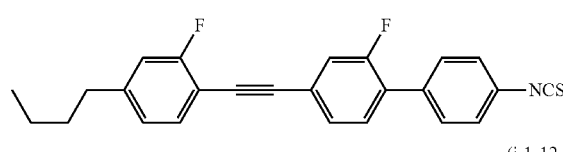
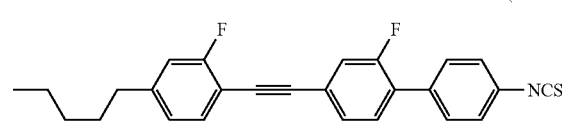

Specific examples of compounds represented by the general formula (i-1-14) include the compounds represented by the structural formulae (i-1-14.1) to (i-1-14.4):

[Chem. 36]

(i-1-14.1)

(i-1-14.2)

(i-1-14.3)

(i-1-14.4)

Specific examples of compounds represented by the general formula (i-1-15) include the compounds represented by the structural formulae (i-1-15.1) to (i-1-15.4):

[Chem. 37]

(i-1-15.1)

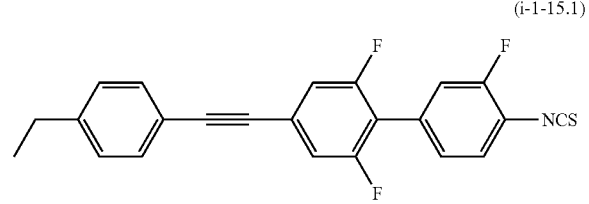

-continued

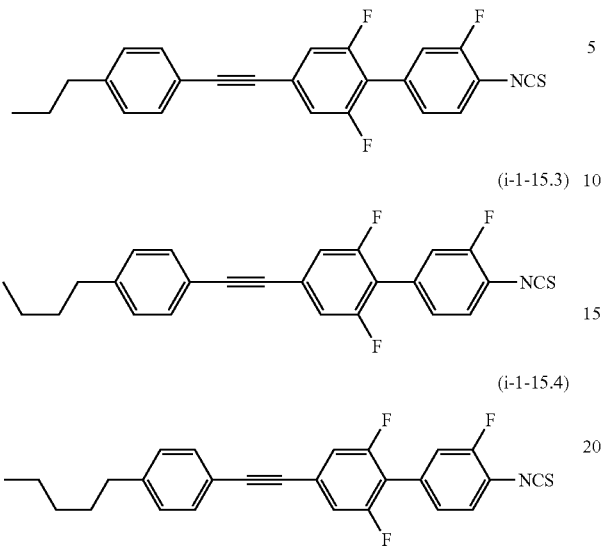

Specific examples of compounds represented by the general formula (i-1-16) include the compounds represented by the structural formulae (i-1-16.1) to (i-1-16.5):

[Chem. 38]

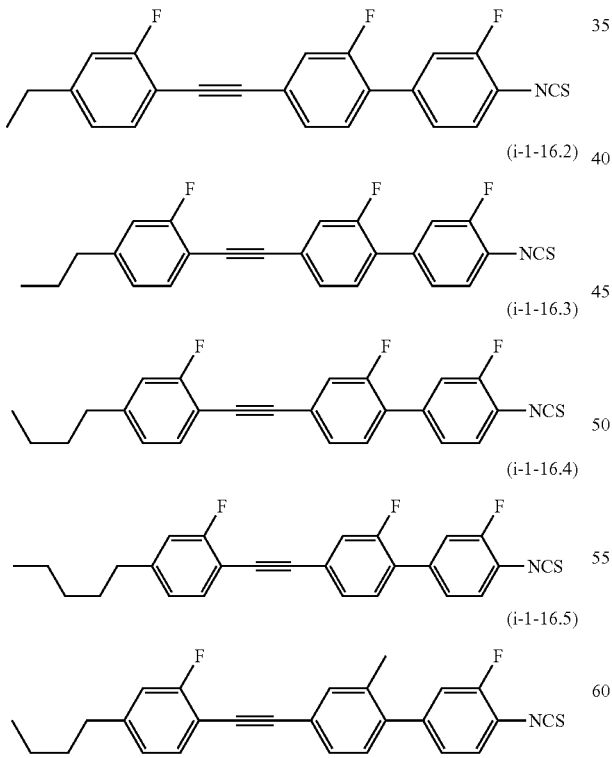

Specific examples of compounds represented by the general formula (i-1-17) include the compounds represented by the structural formulae (i-1-17.1) and (i-1-17.2):

[Chem. 39]

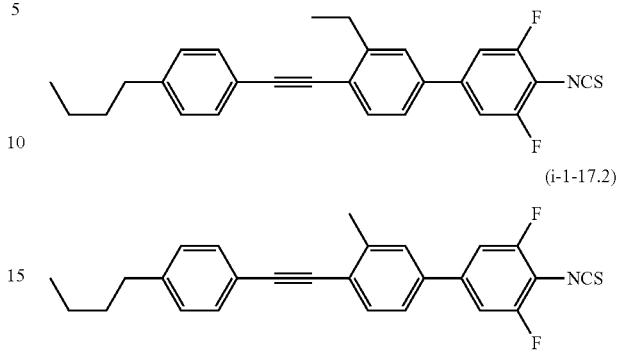

Specific examples of compounds represented by the general formula (i-1-18) include the compounds represented by the structural formulae (i-1-18.1) to (i-1-18.5):

[Chem. 40]

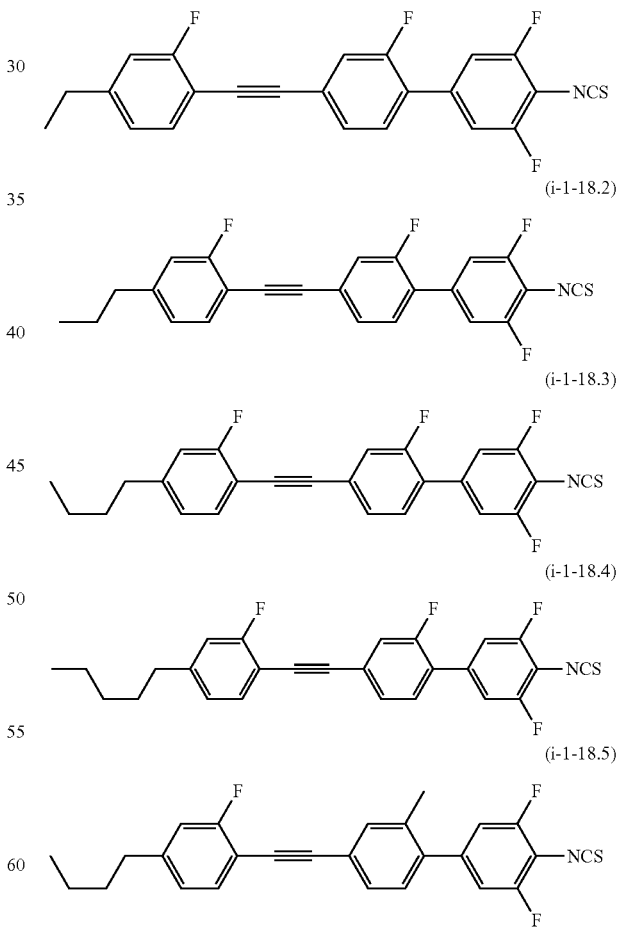

Specific examples of compounds represented by the general formula (i-1-19) include the compounds represented by the structural formulae (i-1-19.1) to (i-1-19.14):

[Chem. 41]
(i-1-19.1)
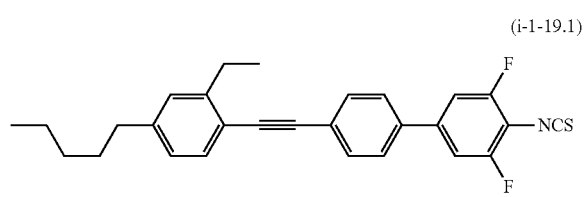
(i-1-19.2)
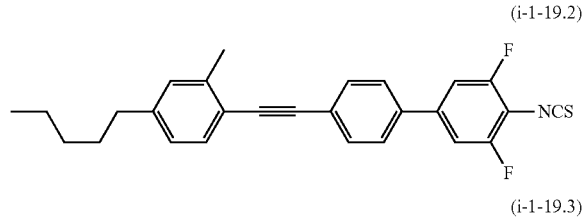
(i-1-19.3)
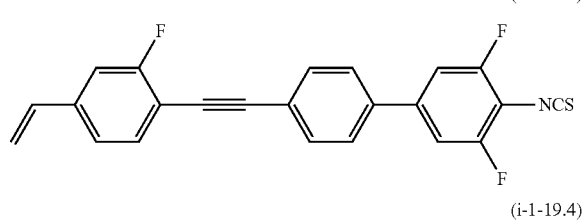
(i-1-19.4)
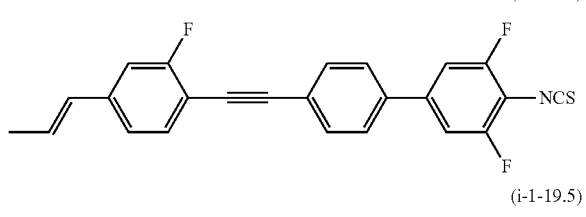
(i-1-19.5)
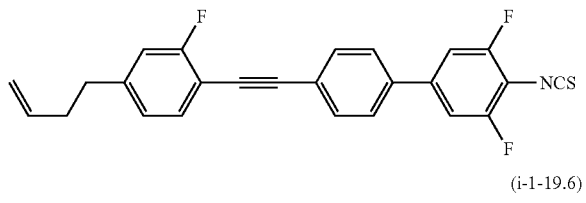
(i-1-19.6)
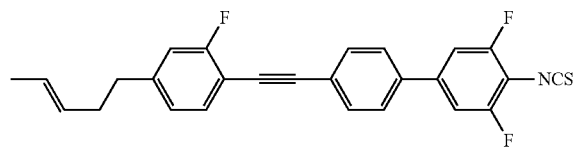
[Chem. 42]
(i-1-19.7)
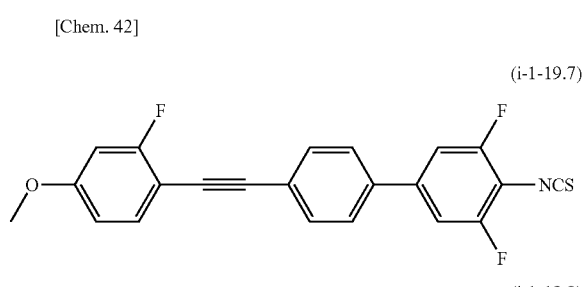
(i-1-19.8)
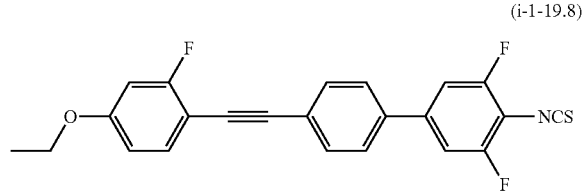
(i-1-19.9)
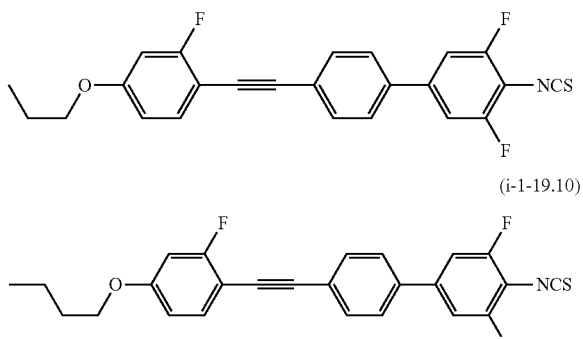
(i-1-19.10)
[Chem. 43]
(i-1-19.11)
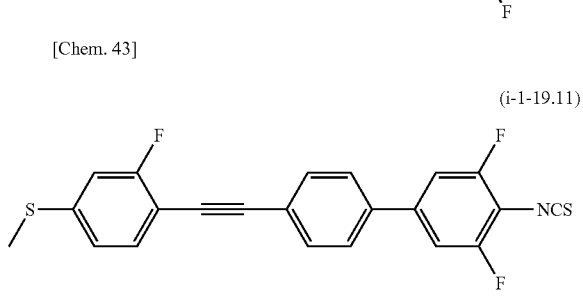
(i-1-19.12)
(i-1-19.13)
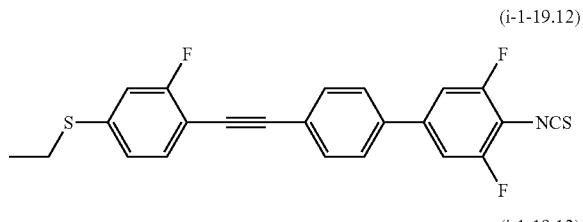
(i-1-19.14)
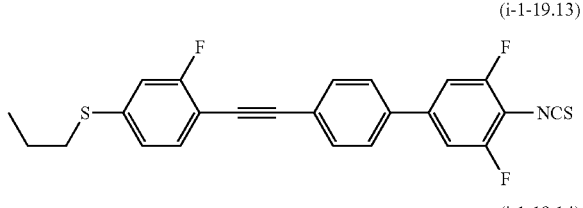
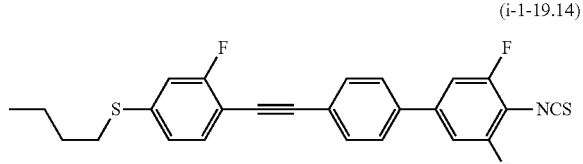
Specific examples of compounds represented by the general formula (i-1-20) include the compounds represented by the structural formulae (i-1-20.1) to (i-1-20.4):
[Chem. 44]
(i-1-20.1)
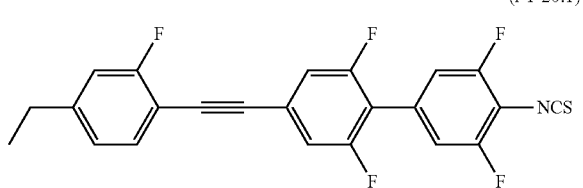

(i-1-20.2)
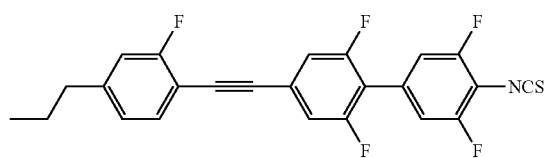

(i-1-20.3)
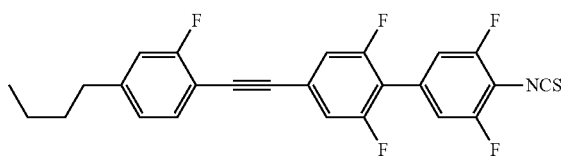

(i-1-20.4)
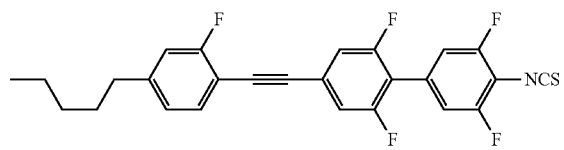

Specific examples of compounds represented by the general formula (i-1-21) include the compound represented by the structural formula (i-1-21.1):

[Chem. 45]

(i-1-21.1)
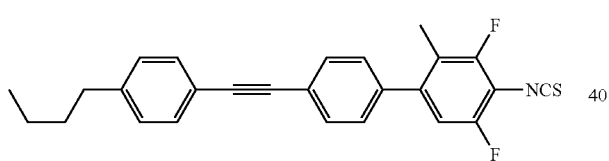

Specific examples of compounds represented by the general formula (i-1-22) include the compounds represented by the structural formulae (i-1-22.1) to (i-1-22.4):

[Chem. 46]

(i-1-22.1)
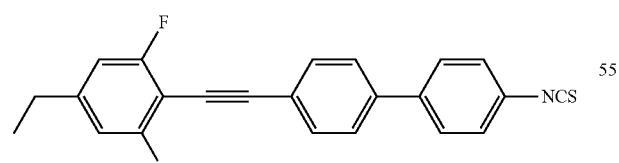

(i-1-22.2)
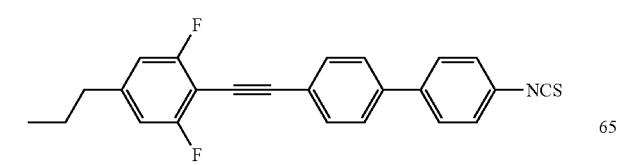

(i-1-22.3)
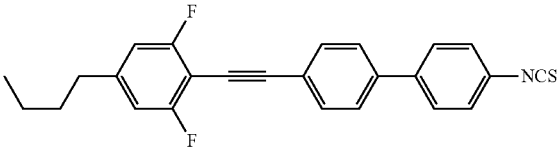

(i-1-22.4)
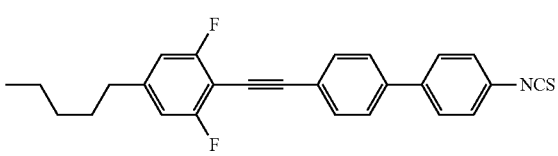

Specific examples of compounds represented by the general formula (i-1-23) include the compounds represented by the structural formulae (i-1-23.1) to (i-1-23.4):

[Chem. 47]

(i-1-23.1)
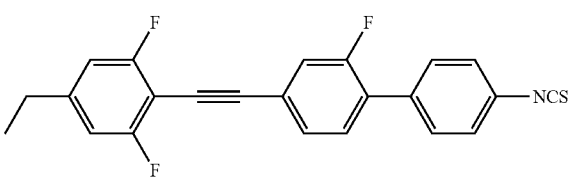

(i-1-23.2)
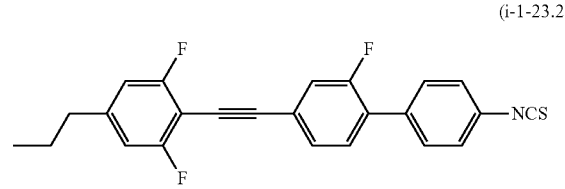

(i-1-23.3)
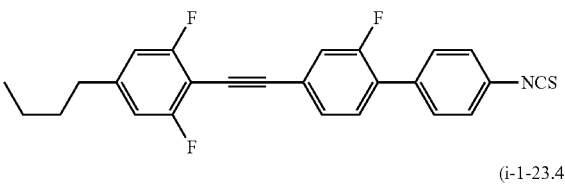

(i-1-23.4)
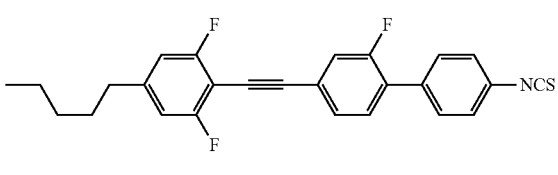

Specific examples of compounds represented by the general formula (i-1-24) include the compound represented by the structural formula (i-1-24.1):

[Chem. 48]

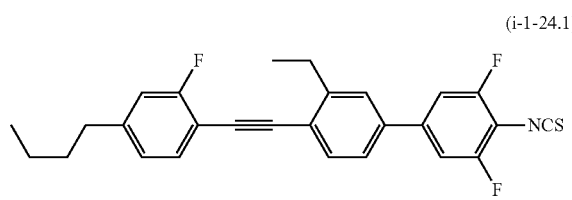
(i-1-24.1)

Specific examples of compounds represented by the general formula (i-1-25) include the compounds represented by the structural formulae (i-1-25.1) to (i-1-25.4):

[Chem. 49]

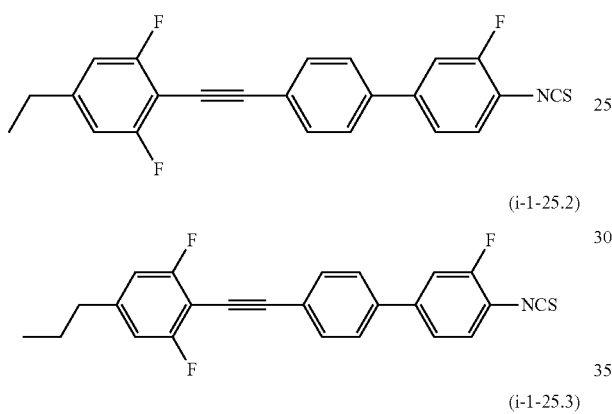
(i-1-25.1)
(i-1-25.2)
(i-1-25.3)
(i-1-25.4)

Specific examples of compounds represented by the general formula (i-1-26) include the compounds represented by the structural formulae (i-1-26.1) to (i-1-26.4):

[Chem. 50]

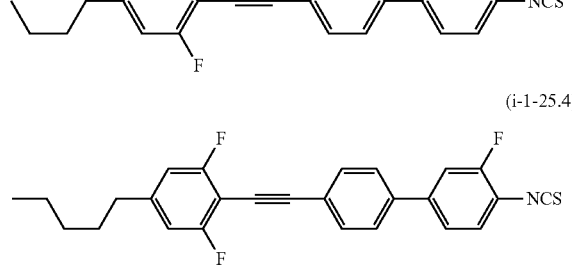
(i-1-26.1)
(i-1-26.2)
(i-1-26.3)
(i-1-26.4)

Specific examples of compounds represented by the general formula (i-1-27) include the compounds represented by the structural formulae (i-1-27.1) to (i-1-27.19):

[Chem. 51]

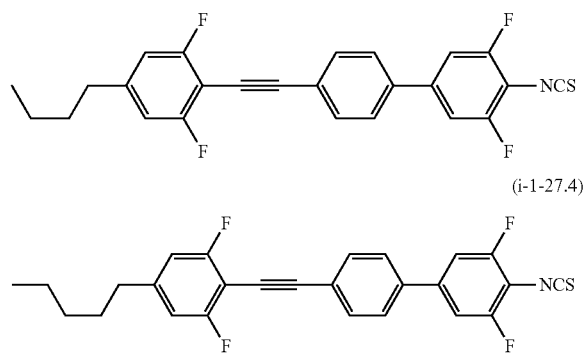
(i-1-27.1)
(i-1-27.2)
(i-1-27.3)
(i-1-27.4)

(i-1-27.5)
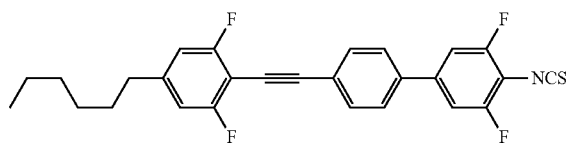
[Chem. 52]
(i-1-27.6)
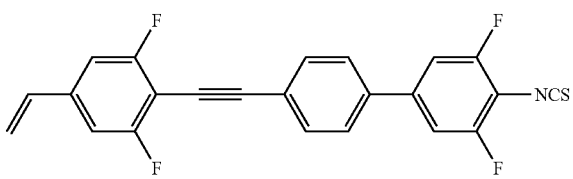
(i-1-27.7)
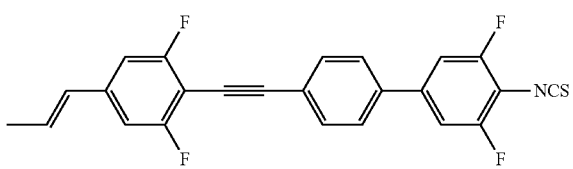
(i-1-27.8)
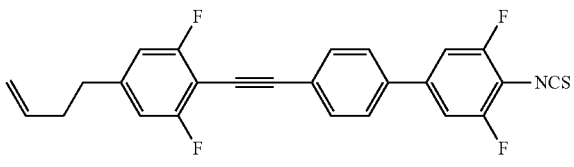
(i-1-27.9)
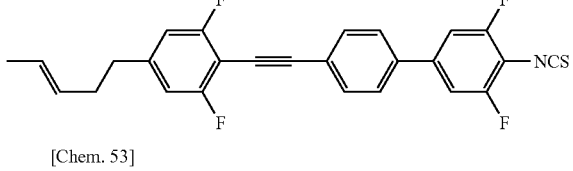
[Chem. 53]
(i-1-27.10)
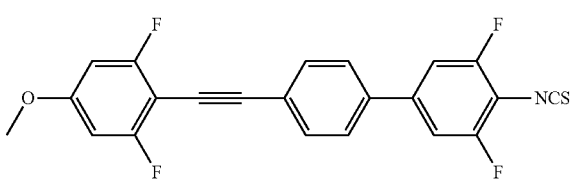
(i-1-27.11)
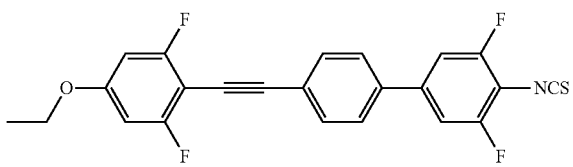
(i-1-27.12)
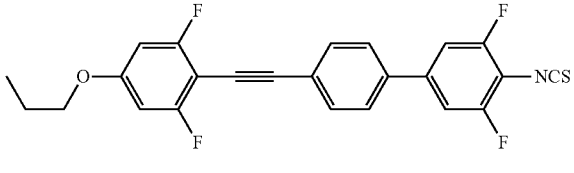
(i-1-27.13)
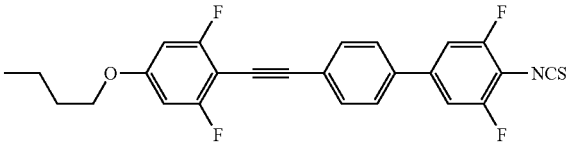
(i-1-27.14)
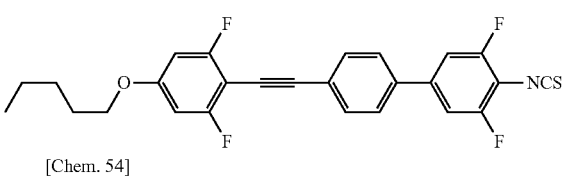
[Chem. 54]
(i-1-27.15)
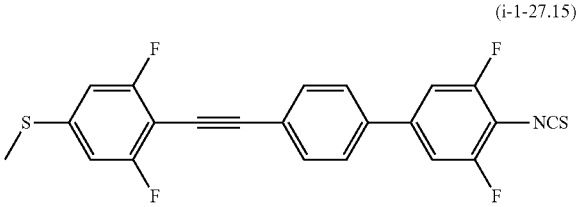
(i-1-27.16)
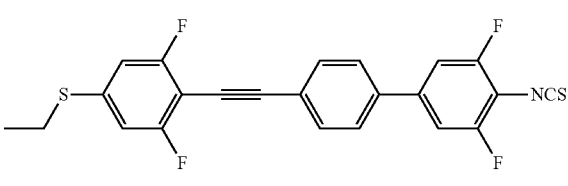
(i-1-27.17)
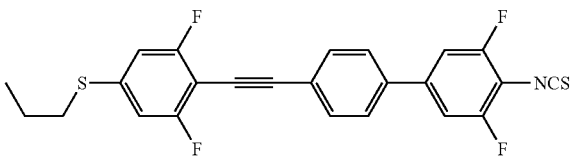
(i-1-27.18)
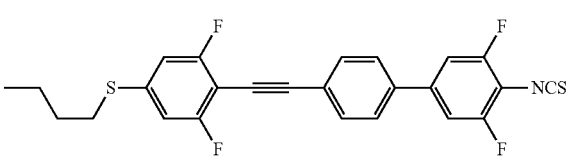
(i-1-27.19)
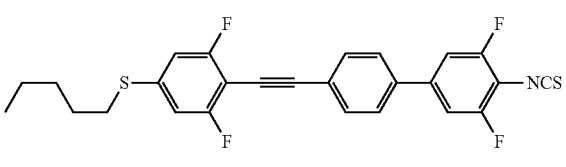
Specific examples of compounds represented by the general formula (i-1-28) include the compounds represented by the structural formulae (i-1-28.1) to (i-1-28.5):

[Chem. 55]

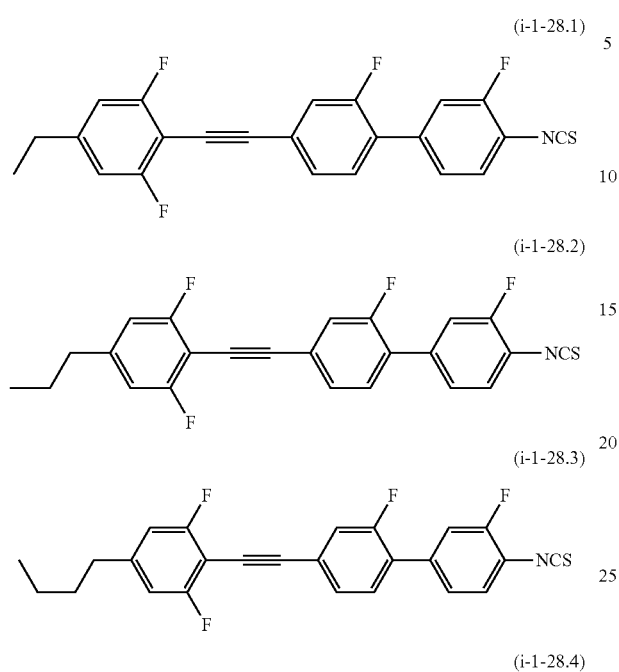

(i-1-28.1)
(i-1-28.2)
(i-1-28.3)
(i-1-28.4)
(i-1-28.5)

Specific examples of compounds represented by the general formula (i-1-29) include the compounds represented by the structural formulae (i-1-29.1) to (i-1-29.5):

[Chem. 56]

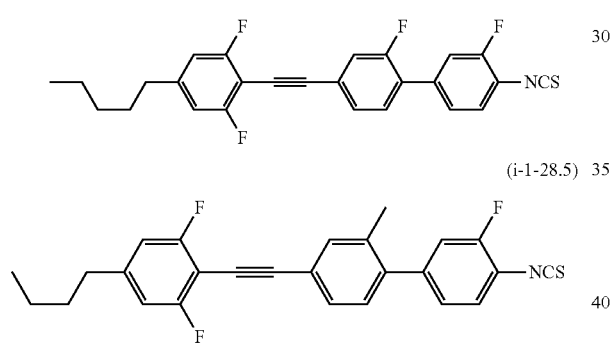

(i-1-29.1)
(i-1-29.2)

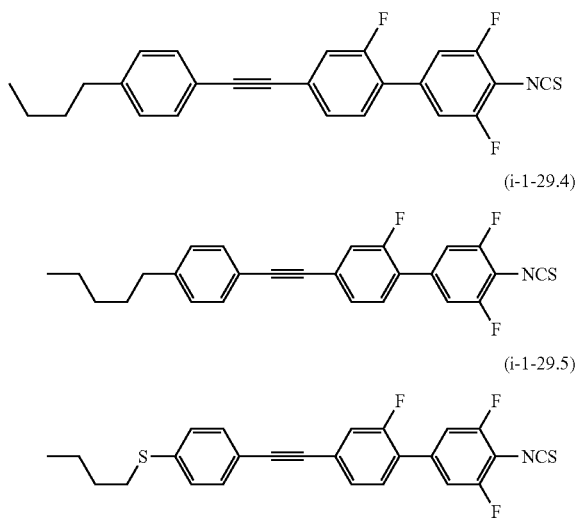

(i-1-29.3)
(i-1-29.4)
(i-1-29.5)

Specific examples of compounds represented by the general formula (i-1-30) include the compounds represented by the structural formulae (i-1-30.1) to (i-1-30.4):

[Chem. 57]

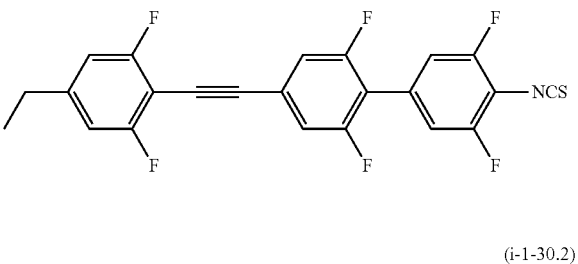

(i-1-30.1)
(i-1-30.2)
(i-1-30.3)
(i-1-30.4)

Specific examples of compounds represented by the general formula (i-1-31) include the compound represented by the structural formula (i-1-31.1):

[Chem. 58]

(i-1-31.1)
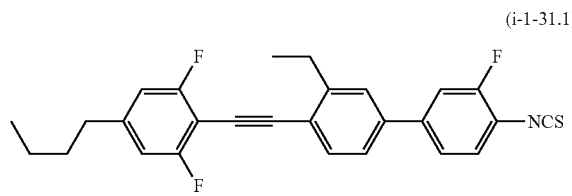

Specific examples of compounds represented by the general formula (i-1-32) include the compound represented by the structural formula (i-1-32.1):

[Chem. 59]

(i-1-32.1)
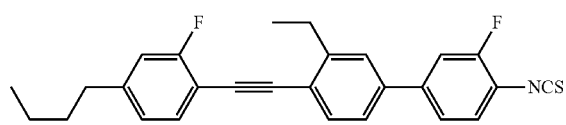

Specific examples of compounds represented by the general formula (i-1-33) include the compounds represented by the structural formulae (i-1-33.1) to (i-1-33.4):

[Chem. 60]

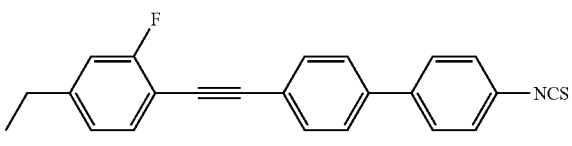
(i-1-33.1)

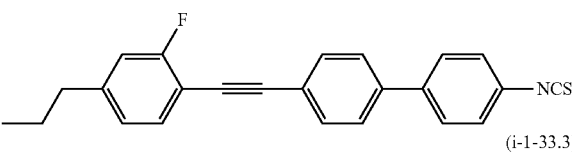
(i-1-33.2)

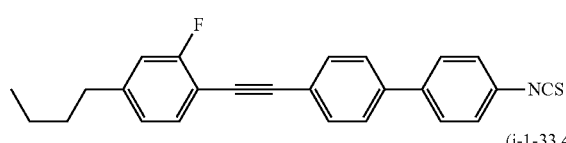
(i-1-33.3)

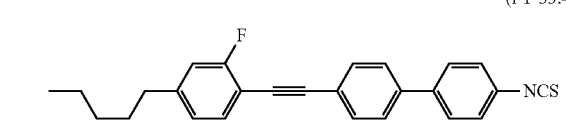
(i-1-33.4)

Specific examples of compounds represented by the general formula (i-1-34) include the compounds represented by the structural formulae (i-1-34.1) to (i-1-34.4):

[Chem. 61]

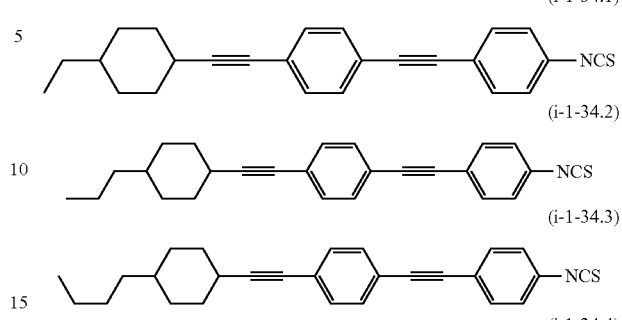
(i-1-34.1)
(i-1-34.2)
(i-1-34.3)
(i-1-34.4)

Specific examples of compounds represented by the general formula (i-1-35) include the compounds represented by the structural formulae (i-1-35.1) to (i-1-35.5):

[Chem. 62]

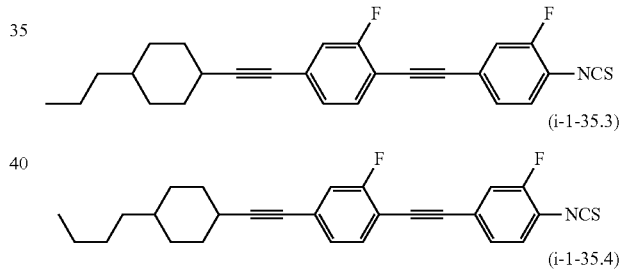
(i-1-35.1)
(i-1-35.2)

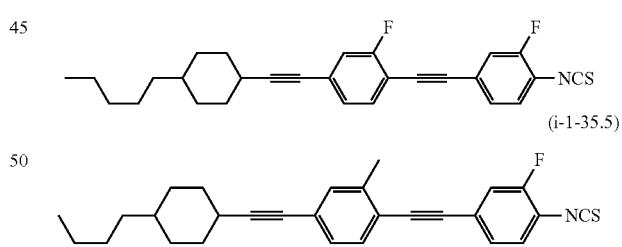
(i-1-35.3)
(i-1-35.4)

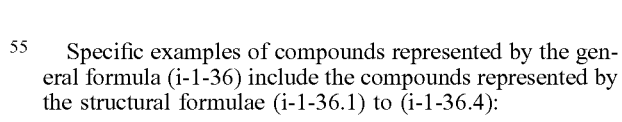
(i-1-35.5)

Specific examples of compounds represented by the general formula (i-1-36) include the compounds represented by the structural formulae (i-1-36.1) to (i-1-36.4):

[Chem. 63]

(i-1-36.1)
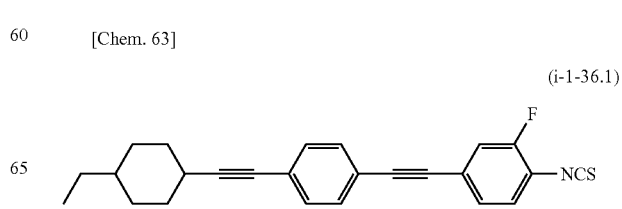

(i-1-36.2)
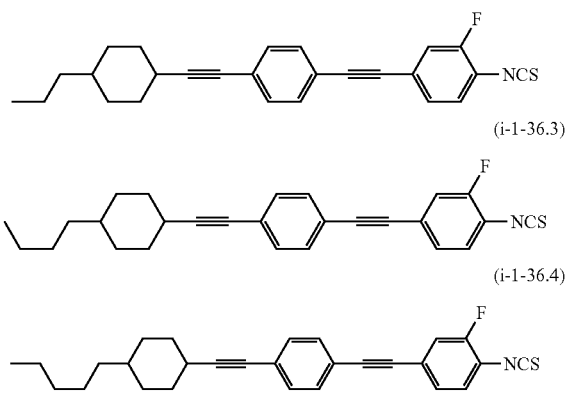
(i-1-36.3)
(i-1-36.4)
Specific examples of compounds represented by the general formula (i-1-37) include the compounds represented by the structural formulae (i-1-37.1) to (i-1-37.5):
[Chem. 64]
(i-1-37.1)
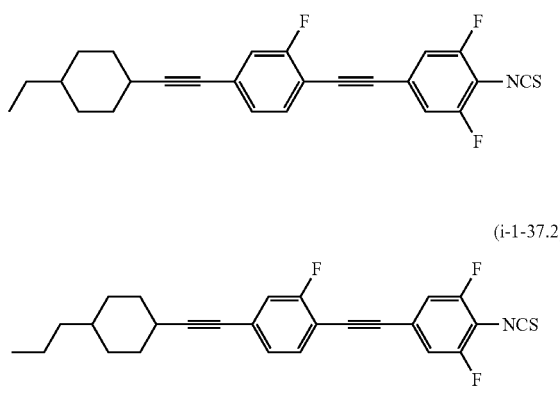
(i-1-37.2)
(i-1-37.3)
(i-1-37.4)
(i-1-37.5)
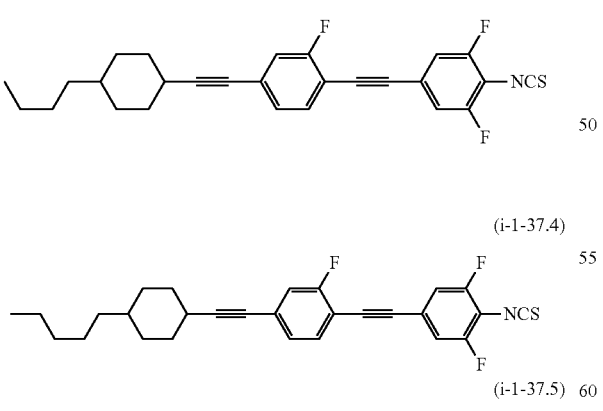
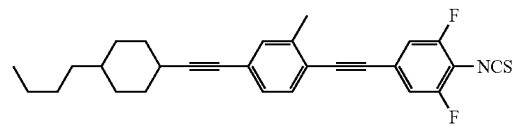
Specific examples of compounds represented by the general formula (i-1-38) include the compounds represented by the structural formulae (i-1-38.1) to (i-1-38.8):
[Chem. 65]
(i-1-38.1)
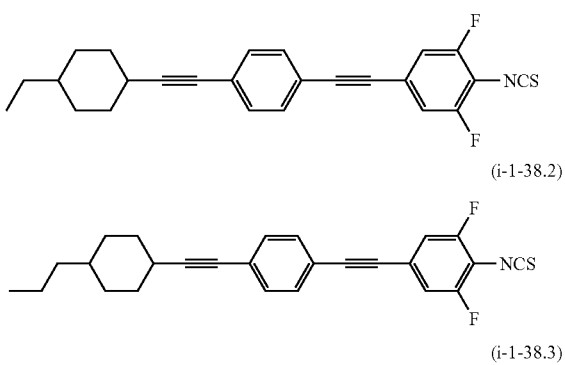
(i-1-38.2)
(i-1-38.3)
(i-1-38.4)
[Chem. 66]
(i-1-38.5)
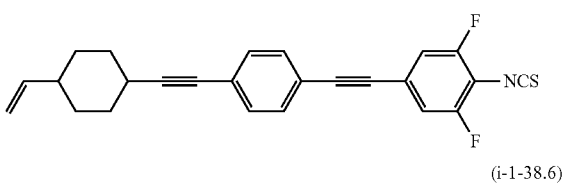
(i-1-38.6)
(i-1-38.7)
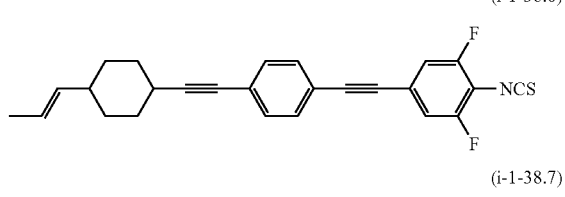
(i-1-38.8)

Specific examples of compounds represented by the general formula (i-1-39) include the compounds represented by the structural formulae (i-1-39.1) to (i-1-39.4):

[Chem. 67]

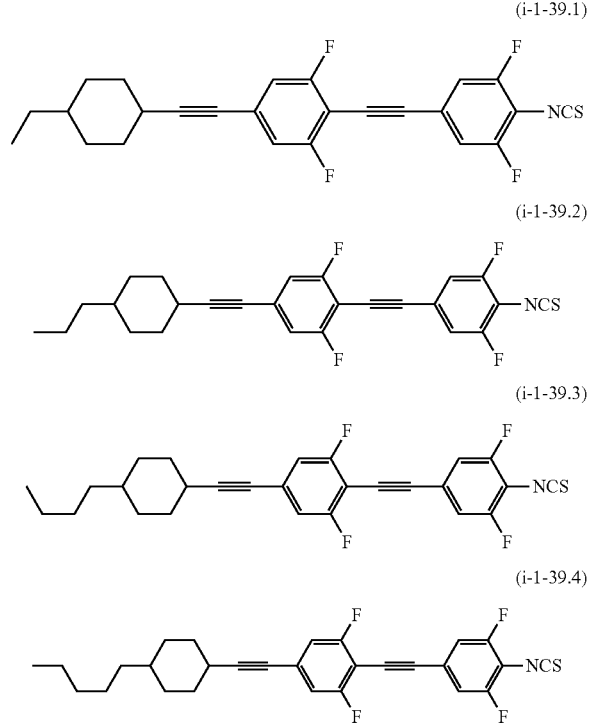

Specific examples of compounds represented by the general formula (i-1-40) include the compounds represented by the structural formulae (i-1-40.1) to (i-1-40.4):

[Chem. 68]

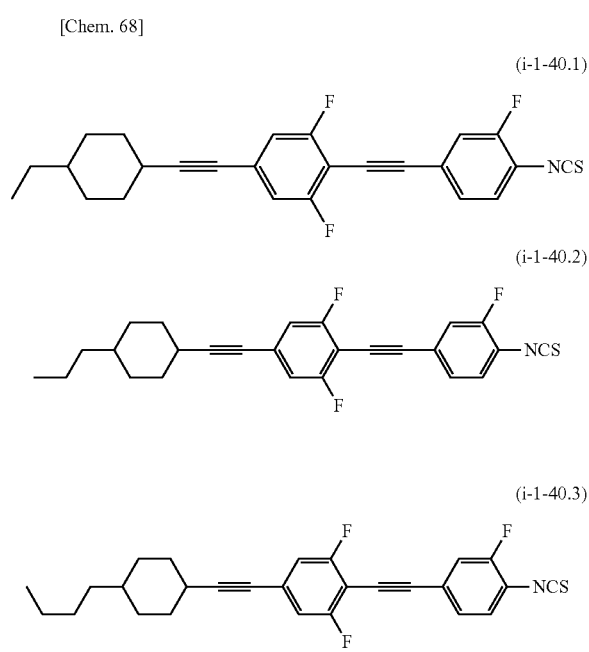

Specific examples of compounds represented by the general formula (i-1-41) include the compound represented by the structural formula (i-1-41.1):

[Chem. 69]

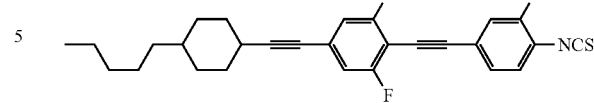

Specific examples of compounds represented by the general formula (i-1-42) include the compound represented by the structural formula (i-1-42.1):

[Chem. 70]

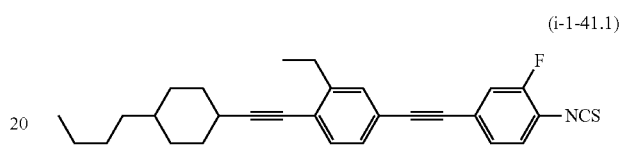

Specific examples of compounds represented by the general formula (i-1-43) include the compound represented by the structural formula (i-1-43.1):

[Chem. 71]

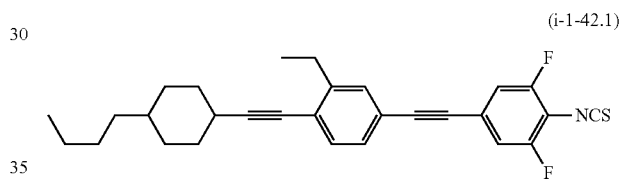

Compounds represented by the general formula (i-2) are preferably compounds represented by the general formula (i-2-1):

[Chem. 72]

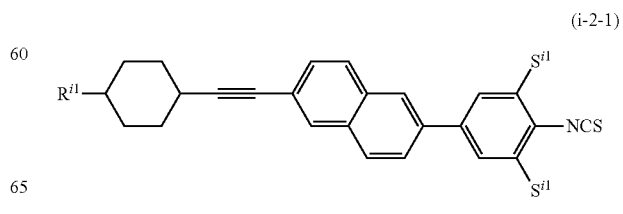

In the general formula (i-2-1), $R^{i1}$ and $S^{i1}$ each independently have the same meaning as $R^{i1}$ and $S^{i1}$, respectively, in the general formula (i).

Specific examples of compounds represented by the general formula (i-2-1) include the compound represented by the structural formula (i-2-1.1):

[Chem. 73]

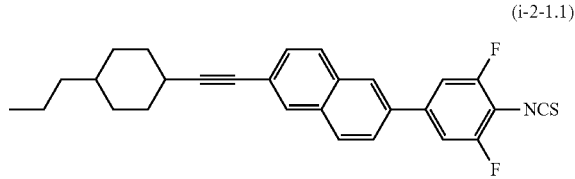

(i-2-1.1)

The types of compounds represented by the following formulae used for liquid crystal compositions are one or two or more types, preferably one to five types, preferably one to four types, or preferably one to three types: the general formula (i), the general formulae (i-1) and (i-2), the general formulae (i-1-1) to (i-1-43), the general formula (i-2-1), the structural formulae (i-1-1.1) to (i-1-1.4), the structural formulae (i-1-2.1) to (i-1-2.4), the structural formulae (i-1-3.1) to (i-1-3.4), the structural formulae (i-1-4.1) to (i-1-4.4), the structural formulae (i-1-5.1) to (i-1-5.8), the structural formulae (i-1-6.1) and (i-1-6.2), the structural formulae (i-1-7.1) to (i-1-7.4), the structural formulae (i-1-8.1) to (i-1-8.5), the structural formulae (i-1-9.1) to (i-1-9.4), the structural formula (i-1-10.1), the structural formulae (i-1-11.1) to (i-1-11.16), the structural formulae (i-1-12.1) to (i-1-12.4), the structural formulae (i-1-13.1) to (i-1-13.4), the structural formulae (i-1-14.1) to (i-1-14.4), the structural formulae (i-1-15.1) to (i-1-15.4), the structural formulae (i-1-16.1) to (i-1-16.5), the structural formulae (i-1-17.1) and (i-1-17.2), the structural formulae (i-1-18.1) to (i-1-18.5), the structural formulae (i-1-19.1) to (i-1-19.14), the structural formulae (i-1-20.1) to (i-1-20.4), the structural formula (i-1-21.1), the structural formulae (i-1-22.1) to (i-1-22.4), the structural formulae (i-1-23.1) to (i-1-23.4), the structural formula (i-1-24.1), the structural formulae (i-1-25.1) to (i-1-25.4), the structural formulae (i-1-26.1) to (i-1-26.4), the structural formulae (i-1-27.1) to (i-1-27.19), the structural formulae (i-1-28.1) to (i-1-28.5), the structural formulae (i-1-29.1) to (i-1-29.5), the structural formulae (i-1-30.1) to (i-1-30.4), the structural formula (i-1-31.1), the structural formula (i-1-32.1), the structural formulae (i-1-33.1) to (i-1-33.4), the structural formulae (i-1-34.1) to (i-1-34.4), the structural formulae (i-1-35.1) to (i-1-35.5), the structural formulae (i-1-36.1) to (i-1-36.4), the structural formulae (i-1-37.1) to (i-1-37.5), the structural formulae (i-1-38.1) to (i-1-38.8), the structural formulae (i-1-39.1) to (i-1-39.4), the structural formulae (i-1-40.1) to (i-1-40.4), the structural formulae (i-1-41.1), the structural formula (i-1-42.1), the structural formula (i-1-43.1), or the structural formulae (i-2-1.1).

The lower limit of the total amount of compounds represented by the following formulae per 100% by mass of a liquid crystal composition is preferably 3% by mass or more, preferably 5% by mass or more, preferably 10% by mass or more, preferably 15% by mass or more, preferably 20% by mass or more, preferably 25% by mass or more, preferably 30% by mass or more, or preferably 35% by mass or more: the general formula (i), the general formulae (i-1) and (i-2), the general formulae (i-1-1) to (i-1-43), the general formula (i-2-1), the structural formulae (i-1-1.1) to (i-1-1.4), the structural formulae (i-1-2.1) to (i-1-2.4), the structural formulae (i-1-3.1) to (i-1-3.4), the structural formulae (i-1-4.1) to (i-1-4.4), the structural formulae (i-1-5.1) to (i-1-5.8), the structural formulae (i-1-6.1) and (i-1-6.2), the structural formulae (i-1-7.1) to (i-1-7.4), the structural formulae (i-1-8.1) to (i-1-8.5), the structural formulae (i-1-9.1) to (i-1-9.4), the structural formulae (i-1-10.1), the structural formulae (i-1-11.1) to (i-1-11.16), the structural formulae (i-1-12.1) to (i-1-12.4), the structural formulae (i-1-13.1) to (i-1-13.4), the structural formulae (i-1-14.1) to (i-1-14.4), the structural formulae (i-1-15.1) to (i-1-15.4), the structural formulae (i-1-16.1) to (i-1-16.5), the structural formulae (i-1-17.1) and (i-1-17.2), the structural formulae (i-1-18.1) to (i-1-18.5), the structural formulae (i-1-19.1) to (i-1-19.14), the structural formulae (i-1-20.1) to (i-1-20.4), the structural formula (i-1-21.1), the structural formulae (i-1-22.1) to (i-1-22.4), the structural formulae (i-1-23.1) to (i-1-23.4), the structural formula (i-1-24.1), the structural formulae (i-1-25.1) to (i-1-25.4), the structural formulae (i-1-26.1) to (i-1-26.4), the structural formulae (i-1-27.1) to (i-1-27.19), the structural formulae (i-1-28.1) to (i-1-28.5), the structural formulae (i-1-29.1) to (i-1-29.5), the structural formulae (i-1-30.1) to (i-1-30.4), the structural formula (i-1-31.1), the structural formula (i-1-32.1), the structural formulae (i-1-33.1) to (i-1-33.4), the structural formulae (i-1-34.1) to (i-1-34.4), the structural formulae (i-1-35.1) to (i-1-35.5), the structural formulae (i-1-36.1) to (i-1-36.4), the structural formulae (i-1-37.1) to (i-1-37.5), the structural formulae (i-1-38.1) to (i-1-38.8), the structural formulae (i-1-39.1) to (i-1-39.4), the structural formulae (i-1-40.1) to (i-1-40.4), the structural formula (i-1-41.1), the structural formula (i-1-42.1), the structural formula (i-1-43.1), or the structural formula (i-2-1.1).

The upper limit of the total amount of compounds represented by the following formulae per 100% by mass of a liquid crystal composition is preferably 75% by mass or less, preferably 70% by mass or less, preferably 65% by mass or less, preferably 55% by mass or less, preferably 45% by mass or less, preferably 35% by mass or less, preferably 25% by mass or less, preferably 15% by mass or less, or preferably 10% by mass or less: the general formula (i), the general formulae (i-1) and (i-2), the general formulae (i-1-1) to (i-1-43), the general formula (i-2-1), the structural formulae (i-1-1.1) to (i-1-1.4), the structural formulae (i-1-2.1) to (i-1-2.4), the structural formulae (i-1-3.1) to (i-1-3.4), the structural formulae (i-1-4.1) to (i-1-4.4), the structural formulae (i-1-5.1) to (i-1-5.8), the structural formulae (i-1-6.1) and (i-1-6.2), the structural formulae (i-1-7.1) to (i-1-7.4), the structural formulae (i-1-8.1) to (i-1-8.5), the structural formulae (i-1-9.1) to (i-1-9.4), the structural formulae (i-1-10.1), the structural formulae (i-1-11.1) to (i-1-11.16), the structural formulae (i-1-12.1) to (i-1-12.4), the structural formulae (i-1-13.1) to (i-1-13.4), the structural formulae (i-1-14.1) to (i-1-14.4), the structural formulae (i-1-15.1) to (i-1-15.4), the structural formulae (i-1-16.1) to (i-1-16.5), the structural formulae (i-1-17.1) and (i-1-17.2), the structural formulae (i-1-18.1) to (i-1-18.5), the structural formulae (i-1-19.1) to (i-1-19.14), the structural formulae (i-1-20.1) to (i-1-20.4), the structural formula (i-1-21.1), the structural formulae (i-1-22.1) to (i-1-22.4), the structural formulae (i-1-23.1) to (i-1-23.4), the structural formula (i-1-24.1), the structural formulae (i-1-25.1) to (i-1-25.4), the structural formulae (i-1-26.1) to (i-1-26.4), the structural formulae (i-1-27.1) to (i-1-27.19), the structural formulae (i-1-28.1) to (i-1-28.5), the structural formulae (i-1-29.1) to (i-1-29.5), the structural formulae (i-1-30.1) to (i-1-30.4), the structural formula (i-1-31.1), the structural formula (i-1-32.1), the structural formulae (i-1-33.1) to (i-1-33.4), the structural formulae (i-1-34.1) to (i-1-34.4), the structural formulae (i-1-35.1) to (i-1-35.5), the structural formulae (i-1-36.1) to (i-1-36.4), the structural formulae (i-1-37.1) to (i-1-37.5), the structural formulae (i-1-38.1) to (i-1-38.8), the structural formulae (i-1-39.1) to (i-1-39.4), the structural formulae (i-1-40.1) to (i-1-40.4), the structural formula (i-1-41.1), the structural formula (i-1-42.1), the structural formula (i-1-43.1), or the structural formula (i-2-1.1).

From the perspective of solubility, Δn, and/or Δε$_r$, the total amount of compounds represented by the following formulae per 100% by mass of a liquid crystal composition preferably ranges from 5% to 75% by mass, preferably 10% to 70% by mass, or preferably 15% to 65% by mass: the general formula (i), the general formulae (i-1) and (i-2), the general formulae (i-1-1) to (i-1-43), the general formula (i-2-1), the structural formulae (i-1-1.1) to (i-1-1.4), the structural formulae (i-1-2.1) to (i-1-2.4), the structural formulae (i-1-3.1) to (i-1-3.4), the structural formulae (i-1-4.1) to (i-1-4.4), the structural formulae (i-1-5.1) to (i-1-5.8), the structural formulae (i-1-6.1) and (i-1-6.2), the structural formulae (i-1-7.1) to (i-1-7.4), the structural formulae (i-1-8.1) to (i-1-8.5), the structural formulae (i-1-9.1) to (i-1-9.4), the structural formulae (i-1-10.1), the structural formulae (i-1-11.1) to (i-1-11.16), the structural formulae (i-1-12.1) to (i-1-12.4), the structural formulae (i-1-13.1) to (i-1-13.4), the structural formulae (i-1-14.1) to (i-1-14.4), the structural formulae (i-1-15.1) to (i-1-15.4), the structural formulae (i-1-16.1) to (i-1-16.5), the structural formulae (i-1-17.1) and (i-1-17.2), the structural formulae (i-1-18.1) to (i-1-18.5), the structural formulae (i-1-19.1) to (i-1-19.14), the structural formulae (i-1-20.1) to (i-1-20.4), the structural formula (i-1-21.1), the structural formulae (i-1-22.1) to (i-1-22.4), the structural formulae (i-1-23.1) to (i-1-23.4), the structural formula (i-1-24.1), the structural formulae (i-1-25.1) to (i-1-25.4), the structural formulae (i-1-26.1) to (i-1-26.4), the structural formulae (i-1-27.1) to (i-1-27.19), the structural formulae (i-1-28.1) to (i-1-28.5), the structural formulae (i-1-29.1) to (i-1-29.5), the structural formulae (i-1-30.1) to (i-1-30.4), the structural formula (i-1-31.1), the structural formula (i-1-32.1), the structural formulae (i-1-33.1) to (i-1-33.4), the structural formulae (i-1-34.1) to (i-1-34.4), the structural formulae (i-1-35.1) to (i-1-35.5), the structural formulae (i-1-36.1) to (i-1-36.4), the structural formulae (i-1-37.1) to (i-1-37.5), the structural formulae (i-1-38.1) to (i-1-38.8), the structural formulae (i-1-39.1) to (i-1-39.4), the structural formulae (i-1-40.1) to (i-1-40.4), the structural formula (i-1-41.1), the structural formula (i-1-42.1), the structural formula (i-1-43.1), or the structural formula (i-2-1.1).

The compounds represented by the general formula (i) (including subordinate concepts) can be synthesized by a known synthesis method, and some examples are given below.

(Production Method 1) Production of Compound Represented by Formula (s-6):

[Chem. 74]

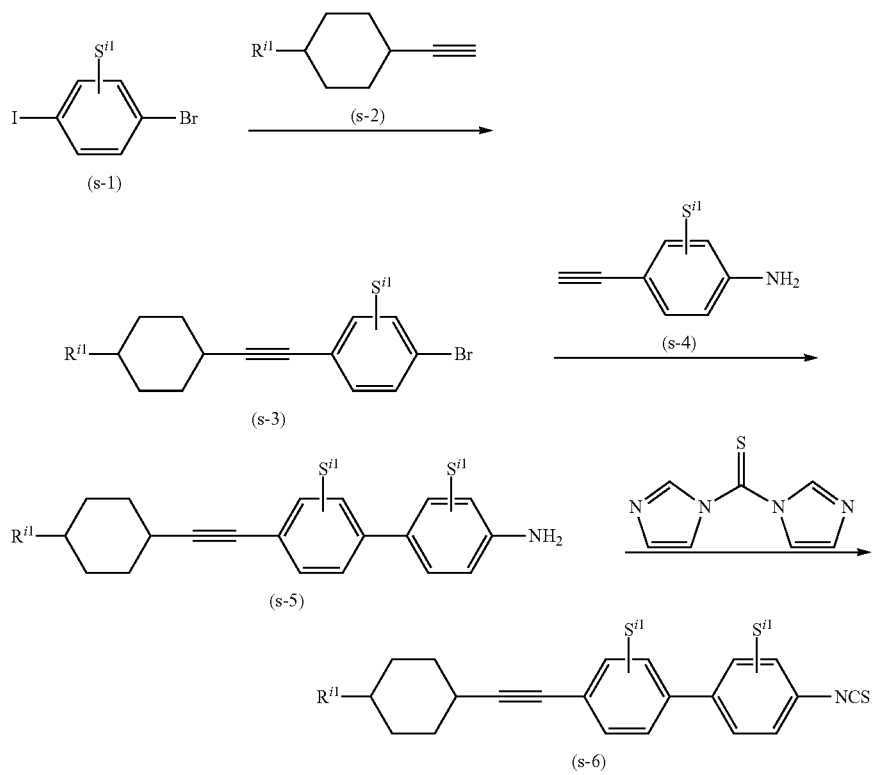

(In the formula, R$^{i1}$ and S$^{i1}$ have the same meaning as R$^{i1}$ and S$^{i1}$ in the general formula (i).)

A compound represented by the general formula (s-1) can be reacted with a compound represented by the general formula (s-2) to produce a compound represented by the general formula (s-3).

Examples of the reaction method include a Sonogashira coupling reaction using a palladium catalyst, a copper catalyst, and a base.

Specific examples of the palladium catalyst include [1,1'-bis(diphenylphosphino) ferrocene] palladium (II) dichloride, palladium (II) acetate, dichlorobis[di-tert-butyl(p-dimethylaminophenyl)phosphino] palladium (II), dichlorobis(triphenylphosphine) palladium (II), and tetrakis(triphenylphosphine) palladium (0).

When palladium (II) acetate is used as the palladium catalyst, a ligand, such as triphenylphosphine or 2-dicyclohexylphosphino-2',4',6'-triisopropylbiphenyl, may be added.

Specific examples of the copper catalyst include copper (I) iodide.

Specific examples of the base include triethylamine.

A compound represented by the general formula (s-3) can be reacted with a compound represented by the general formula (s-4) to produce a compound represented by the general formula (s-5).

Examples of the reaction method include a Sonogashira coupling reaction using a palladium catalyst, a copper catalyst, and a base.

Specific examples of the palladium catalyst, the copper catalyst, and the base include those described above.

Furthermore, a compound represented by the general formula (s-5) can be reacted with 1,1-thiocarbonyldiimidazole to produce a target compound represented by the general formula (s-6).

(Production Method 2) Production of Compound Represented by Formula (s-14):

[Chem. 75]

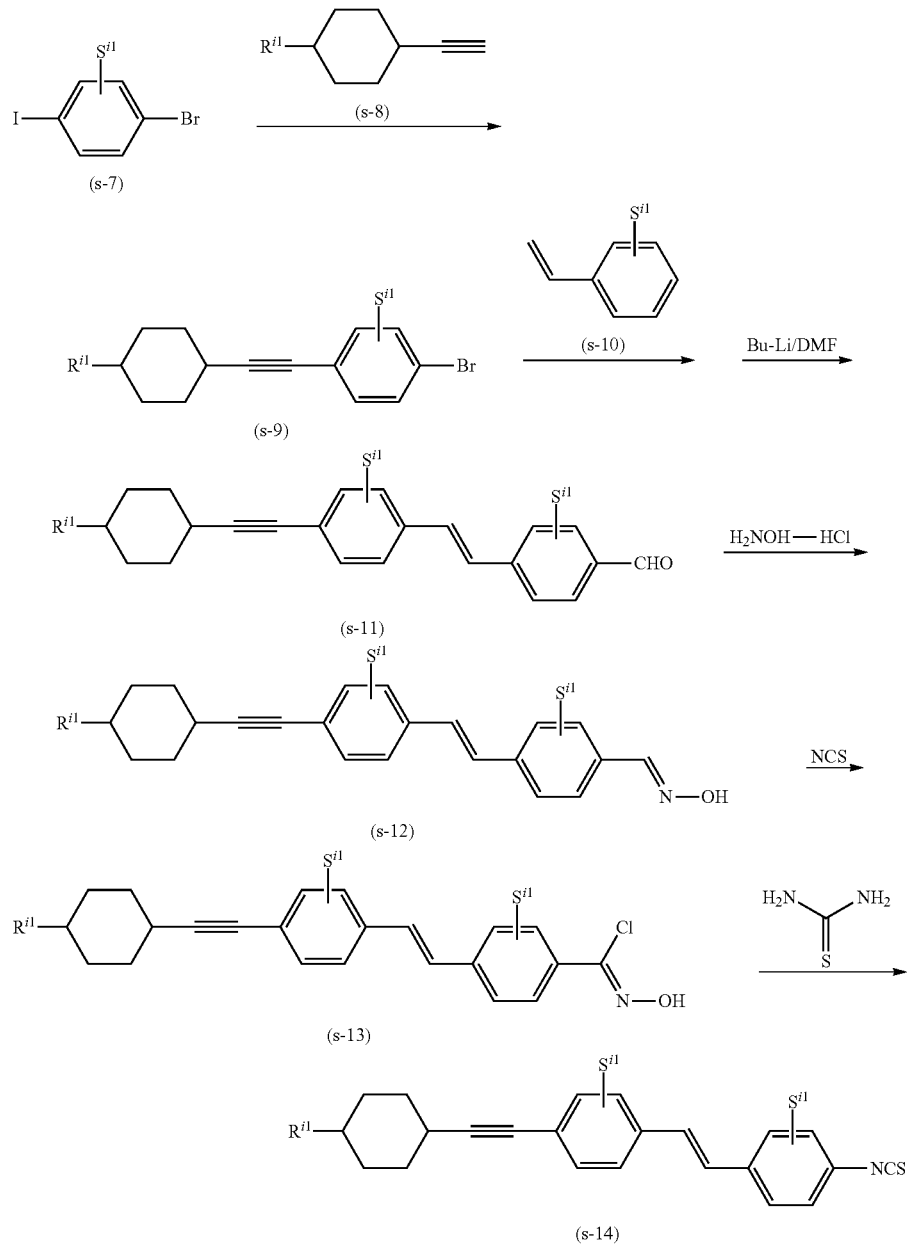

(In the formula, $R^{i1}$ and $S^{i1}$ have the same meaning as $R^{i1}$ and $S^{i1}$ in the general formula (i).)

A compound represented by the general formula (s-7) can be reacted with a compound represented by the general formula (s-8) to produce a compound represented by the general formula (s-9).

Examples of the reaction method include a Sonogashira coupling reaction using a palladium catalyst, a copper catalyst, and a base.

Specific examples of the palladium catalyst include [1,1'-bis(diphenylphosphino)ferrocene] palladium (II) dichloride, palladium (II) acetate, dichlorobis[di-tert-butyl(p-dimethylaminophenyl)phosphino] palladium (II), dichlorobis(triphenylphosphine) palladium (II), and tetrakis(triphenylphosphine) palladium (0).

When palladium (II) acetate is used as the palladium catalyst, a ligand, such as triphenylphosphine or 2-dicyclohexylphosphino-2',4',6'-triisopropylbiphenyl, may be added.

Specific examples of the copper catalyst include copper (I) iodide.

Specific examples of the base include triethylamine.

A compound represented by the general formula (s-9) can be reacted with a compound represented by the general formula (s-10), then with butyllithium at a very low temperature (−60° C. or less), and then with N,N-dimethylformamide to produce a compound represented by the general formula (s-11).

A compound represented by the general formula (3-9) may be reacted with a compound represented by the general formula (s-10), for example, by the Heck reaction using a palladium catalyst and a base.

Specific examples of the palladium catalyst and the base include those described above.

A compound represented by the general formula (s-11) can be reacted with, for example, hydroxylamine to produce a compound represented by the general formula (s-12).

A compound represented by the general formula (s-12) can be reacted with, for example, N-chlorosuccinimide to produce a compound represented by the general formula (s-13).

A compound represented by the general formula (s-13) can be reacted with, for example, thiourea to produce a target compound represented by the general formula (s-14).

(Production Method 3) Production of Compound Represented by Formula (s-20):

[Chem. 76]

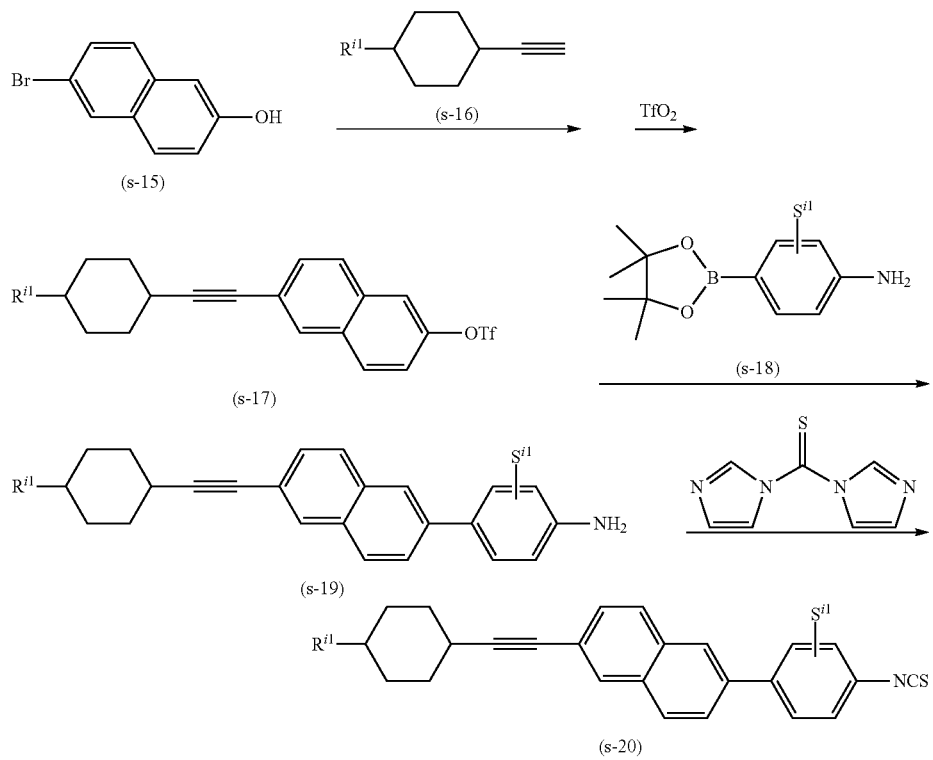

(In the formula, $R^{i1}$ and $S^{i1}$ have the same meaning as $R^{i1}$ and $S^{i1}$ in the general formula (i).)

A compound represented by the general formula (3-15) can be reacted with a compound represented by the general formula (s-16) and then with trifluoromethanesulfonic anhydride to produce a compound represented by the general formula (s-17).

Examples of the reaction method include a Sonogashira coupling reaction using a palladium catalyst, a copper catalyst, and a base.

Specific examples of the palladium catalyst include [1,1'-bis(diphenylphosphino)ferrocene] palladium (II) dichloride, palladium (II) acetate, dichlorobis[di-tert-butyl(p-dimethylaminophenyl)phosphino) palladium (II), dichlorobis(triphenylphosphino] palladium (II), and tetrakis(triphenylphosphine) palladium (0).

When palladium (II) acetate is used as the palladium catalyst, a ligand, such as triphenylphosphine or 2-dicyclohexylphosphino-2',4',6'-triisopropylbiphenyl, may be added.

Specific examples of the copper catalyst include copper (I) iodide.

Specific examples of the base include triethylamine.

A compound represented by the general formula (s-17) can be reacted with a compound represented by the general formula (s-18) to produce a compound represented by the general formula (3-19).

Examples of the reaction method include the Suzuki coupling reaction using a palladium catalyst and a base.

Specific examples of the palladium catalyst and the base include those described above.

Furthermore, a compound represented by the general formula (s-19) can be reacted with 1,1-thiocarbonyldiimidazole to produce a target compound represented by the general formula (s-20).

(Production Method 4) Production of Compound Represented by Formula (s-26):

palladium (II) acetate, dichlorobis[di-tert-butyl(p-dimethylaminophenyl)phosphino] palladium (II), dichlorobis(triphenylphosphine) palladium (II), and tetrakis(triphenylphosphine) palladium (0).

When palladium (II) acetate is used as the palladium catalyst, a ligand, such as triphenylphosphine or 2-dicyclohexylphosphino-2',4',6'-triisopropylbiphenyl, may be added.

Specific examples of the copper catalyst include copper (I) iodide.

Specific examples of the base include triethylamine.

A compound represented by the general formula (s-23) can be reacted with a compound represented by the general formula (s-24) to produce a compound represented by the general formula (s-25).

[Chem. 77]

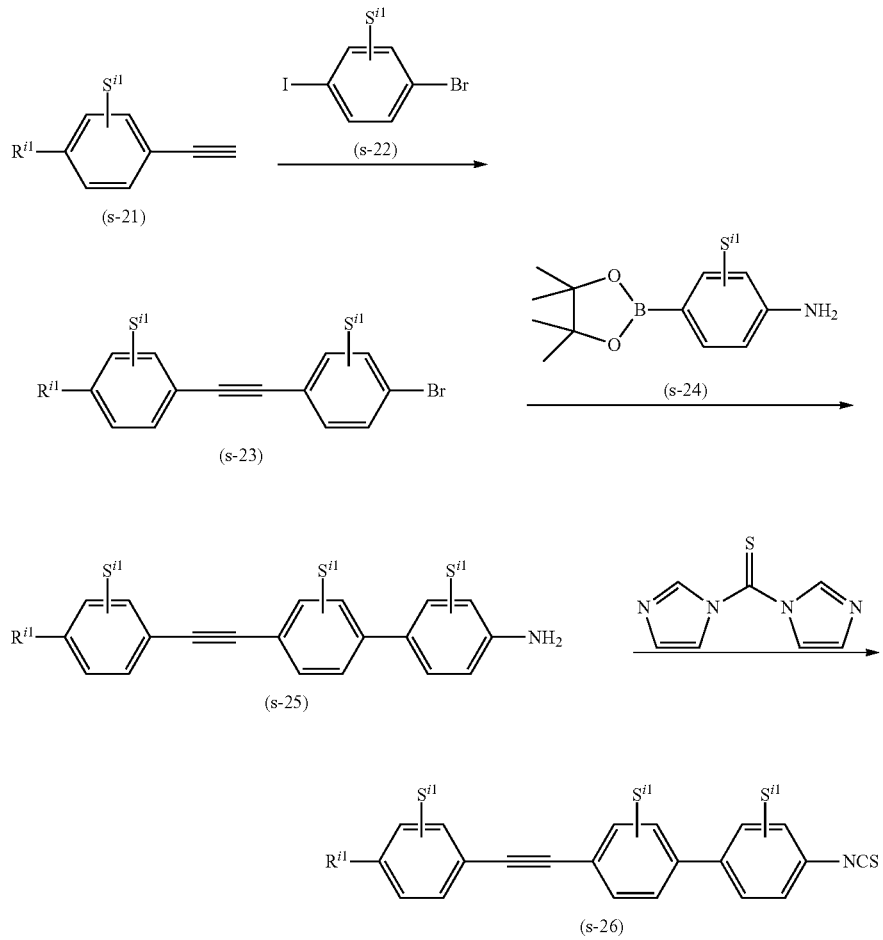

(In the formula, $R^{i1}$ and $S^{i1}$ have the same meaning as $R^{i1}$ and $S^{i1}$ in the general formula (i).)

A compound represented by the general formula (s-21) can be reacted with a compound represented by the general formula (s-22) to produce a compound represented by the general formula (s-23).

Examples of the reaction method include a Sonogashira coupling reaction using a palladium catalyst, a copper catalyst, and a base.

Specific examples of the palladium catalyst include [1,1'-bis(diphenylphosphino)ferrocene] palladium (II) dichloride, Examples of the reaction method include the Suzuki coupling reaction using a palladium catalyst and a base.

Specific examples of the palladium catalyst and the base include those described above.

Furthermore, a compound represented by the general formula (s-25) can be reacted with 1,1-thiocarbonyldiimidazole to produce a target compound represented by the general formula (s-26).

(Production Method 5) Production of Compound Represented by Formula (s-32):

[Chem. 78]

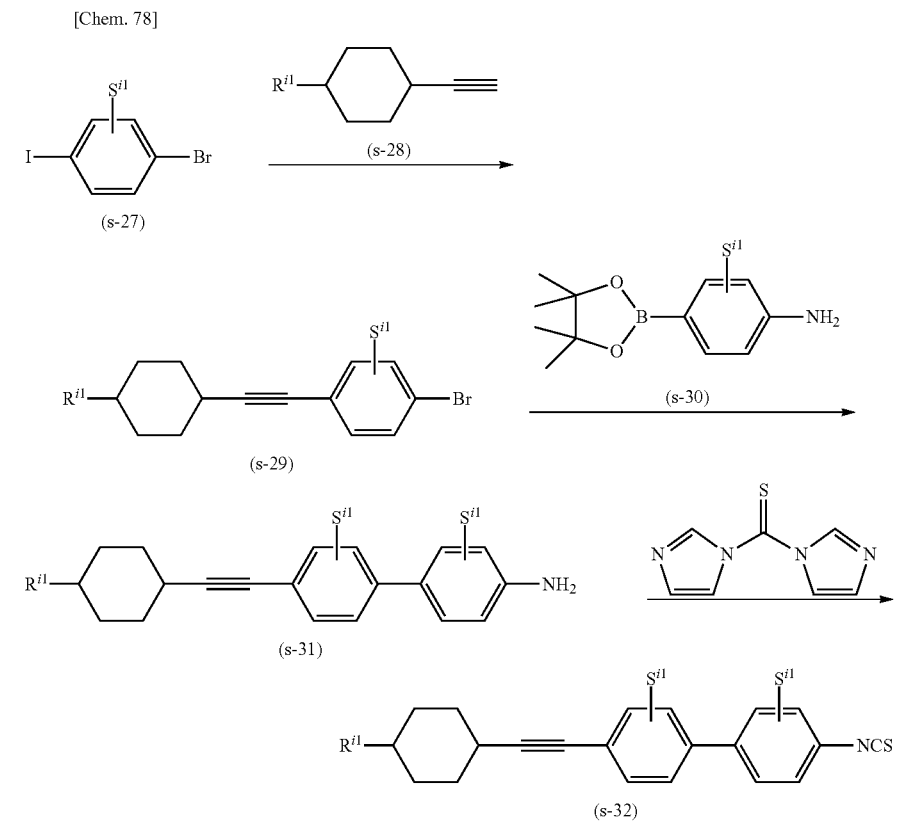

(In the formula, $R^{i1}$ and $S^{i1}$ have the same meaning as $R^{i1}$ and $S^{i1}$ in the general formula (i).)

A compound represented by the general formula (s-27) can be reacted with a compound represented by the general formula (s-28) to produce a compound represented by the general formula (3-29).

Examples of the reaction method include a Sonogashira coupling reaction using a palladium catalyst, a copper catalyst, and a base.

Specific examples of the palladium catalyst include [1,1'-bis(diphenylphosphino)ferrocene] palladium (II) dichloride, palladium (II) acetate, dichlorobis[di-tert-butyl(p-dimethylaminophenyl)phosphino] palladium (II), dichlorobis(triphenylphosphine) palladium (II), and tetrakis(triphenylphosphine) palladium (0).

When palladium (II) acetate is used as the palladium catalyst, a ligand, such as triphenylphosphine or 2-dicyclohexylphosphino-2',4',6'-triisopropylbiphenyl, may be added.

Specific examples of the copper catalyst include copper (I) iodide.

Specific examples of the base include triethylamine.

A compound represented by the general formula (s-29) can be reacted with a compound represented by the general formula (s-30) to produce a compound represented by the general formula (s-31).

Examples of the reaction method include the Suzuki coupling reaction using a palladium catalyst and a base.

Specific examples of the palladium catalyst and the base include those described above.

Furthermore, a compound represented by the general formula (s-31) can be reacted with 1,1-thiocarbonyldiimidazole to produce a target compound represented by the general formula (s-32).

(Other Compounds)
(Compound Represented by General Formula (ii))

From the perspective of solubility, Δn, and/or Δε$_r$, a liquid crystal composition according to the present invention may further contain one or two or more compounds represented by the general formula (ii) having an isothiocyanate group (—NCS).

[Chem. 79]

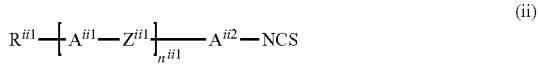

(ii)

In the general formula (ii), $R^{ii1}$ denotes an alkyl group with 1 to 20 carbon atoms.

The alkyl group is a linear, branched, or cyclic alkyl group, preferably a linear alkyl group.

The number of carbon atoms in the alkyl group preferably ranges from 2 to 10, preferably 2 to 6.

One or two or more —CH$_2$— groups in the alkyl group are each independently optionally substituted with —O—, —S—, —CO—, and/or —CS—.

One or two or more —CH$_2$—CH$_2$— groups in the alkyl group are optionally substituted with —CH=CH—, —CO—O—, —O—CO—, —CO—S—, —S—CO—, —CO—NH—, —NH—CO—, —CH=CH—, —CF=CF—, and/or —C≡C—.

One or two or more —CH$_2$—CH$_2$—CH$_2$— groups in the alkyl group are optionally substituted with —O—CO—O—.

One or two or more hydrogen atoms in the alkyl group are each independently optionally substituted with a halogen atom.

The halogen atom may be a fluorine atom, a chlorine atom, a bromine atom, or an iodine atom.

When the alkyl group is substituted with a predetermined group, however, oxygen atoms are not directly bonded to each other.

From the perspective of the stability of the compound, sulfur atoms are preferably not directly bonded to each other, and/or an oxygen atom and a sulfur atom are preferably not directly bonded to each other.

For example, $R^{ii1}$ can denote an alkoxy group with 1 to 19 carbon atoms by substituting one —CH$_2$— in the alkyl group with —O—.

The alkoxy group is a linear, branched, or cyclic alkoxy group, preferably a linear alkoxy group.

The number of carbon atoms in the alkoxy group preferably ranges from 2 to 10, preferably 2 to 6.

$R^{ii1}$ can denote a thioalkoxy group (alkylsulfanyl group, alkylthio group) with 1 to 19 carbon atoms by substituting one —CH$_2$— in the alkyl group with —S—.

The thioalkoxy group is a linear, branched, or cyclic thioalkoxy group, preferably a linear thioalkoxy group.

The number of carbon atoms in the thioalkoxy group preferably ranges from 2 to 10, preferably 2 to 6.

$R^{ii1}$ can denote an alkenyl group with 2 to 20 carbon atoms by substituting one or two or more —CH$_2$—CH$_2$— groups in the alkyl group with —CH=CH—.

The alkenyl group is a linear, branched, or cyclic alkenyl group, preferably a linear alkenyl group.

The number of carbon atoms in the alkenyl group preferably ranges from 2 to 10, preferably 2 to 6.

$R^{ii1}$ can denote an alkynyl group with 2 to 20 carbon atoms by substituting one or two or more —CH$_2$—CH$_2$— groups in the alkyl group with —C≡C—.

The alkynyl group is a linear, branched, or cyclic alkynyl group, preferably a linear alkynyl group.

The number of carbon atoms in the alkynyl group preferably ranges from 2 to 10, preferably 2 to 6.

$R^{ii1}$ can denote an alkenyloxy group with 2 to 19 carbon atoms by substituting one —CH$_2$— in the alkyl group with —O— and substituting one or two or more —CH$_2$—CH$_2$— groups with —CH=CH—.

The alkenyloxy group is a linear, branched, or cyclic alkenyloxy group, preferably a linear alkenyloxy group.

The number of carbon atoms in the alkenyloxy group preferably ranges from 2 to 10, preferably 2 to 6.

$R^{ii1}$ can denote a halogenated alkyl group with 1 to 20 carbon atoms by substituting one or two or more hydrogen atoms in the alkyl group with a halogen atom.

The halogenated alkyl group is a linear, branched, or cyclic halogenated alkyl group, preferably a linear halogenated alkyl group.

The number of carbon atoms in the halogenated alkyl group preferably ranges from 2 to 10, preferably 2 to 6.

$R^{ii1}$ can denote a halogenated alkoxy group with 1 to 19 carbon atoms by substituting one —CH$_2$— in the alkyl group with —O— and substituting one or two or more hydrogen atoms in the alkyl group with a halogen atom.

The halogenated alkoxy group is a linear, branched, or cyclic halogenated alkoxy group, preferably a linear halogenated alkoxy group.

The number of carbon atoms in the halogenated alkoxy group preferably ranges from 2 to 10, preferably 2 to 6.

Specific examples of the alkyl group with 1 to 20 carbon atoms (including substituted ones) in $R^{ii1}$ include the groups represented by the formulae ($R^{ii1}$-1) to ($R^{i11}$-37):

[Chem. 80]

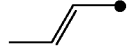

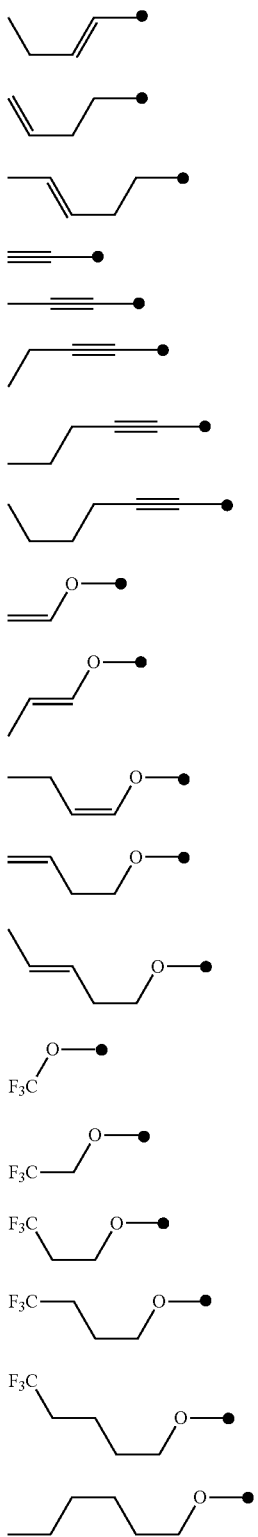

(R^{iii}-19)
(R^{iii}-20)
(R^{iii}-21)
(R^{iii}-22)
(R^{iii}-23)
(R^{iii}-24)
(R^{iii}-25)
(R^{iii}-26)
(R^{iii}-27)
(R^{iii}-28)
(R^{iii}-29)
(R^{iii}-30)
(R^{iii}-31)
(R^{iii}-32)
(R^{iii}-33)
(R^{iii}-34)
(R^{iii}-35)
(R^{iii}-36)
(R^{iii}-37)

In the formulae ($R^{iii}$-1) to ($R^{iii}$-37), a black dot represents a bonding arm to $A^{iii}$.

When the ring structure to which $R^{iii1}$ is bonded is a phenyl group (aromatic), a linear alkyl group with 1 to 5 carbon atoms, a linear alkoxy group with 1 to 4 carbon atoms, or an alkenyl group with 4 or 5 carbon atoms is preferred. When the ring structure to which $R^{iii1}$ is bonded is a saturated ring structure, such as cyclohexane, pyran, or dioxane, a linear alkyl group with 1 to 5 carbon atoms, a linear alkoxy group with 1 to 4 carbon atoms, or a linear alkenyl group with 2 to 5 carbon atoms is preferred.

To stabilize a nematic phase, in $R^{iii1}$, the total number of carbon atoms and, if present, oxygen atoms is preferably 5 or less, and a straight chain is preferred.

From the perspective of solubility, $R^{iii1}$ preferably denotes a linear alkyl group with 2 to 8 carbon atoms, a linear alkoxy group with 2 to 8 carbon atoms, or a linear halogenated alkoxy group with 2 to 8 carbon atoms.

In the general formula (ii), $A^{iii1}$ and $A^{iii2}$ each independently denote a group selected from the group consisting of the groups (a), (b), (c), and (d):

(a) a 1,4-cyclohexylene group (one —CH$_2$— or two or more nonadjacent —CH$_2$— groups in this group are optionally substituted with —O— and/or —S—), (b) a 1,4-phenylene group (one —CH= or two or more nonadjacent —CH= groups in this group are optionally substituted with —N=), (c) a 1,4-cyclohexenylene group, a bicyclo[2.2.2]octane-1,4-diyl group, a naphthalene-2,6-diyl group, a naphthalene-1,4-diyl group, a 1,2,3,4-tetrahydronaphthalene-2,6-diyl group, a 5,6,7,8-tetrahydronaphthalene-1,4-diyl group, a decahydronaphthalene-2,6-diyl group, an anthracene-2,6-diyl group, an anthracene-1,4-diyl group, an anthracene-9,10-diyl group, a phenanthrene-2,7-diyl group (one —CH= or two or more nonadjacent —CH= groups in the naphthalene-2,6-diyl group, the naphthalene-1,4-diyl group, the 1,2,3,4-tetrahydronaphthalene-2,6-diyl group, the 5,6,7,8-tetrahydronaphthalene-1,4-diyl group, the anthracene-2,6-diyl group, the anthracene-1,4-diyl group, the anthracene-9,10-diyl group, or the phenanthrene-2,7-diyl group are optionally substituted with —N=), and (d) a thiophene-2,5-diyl group, a benzothiophene-2,5-diyl group, a benzothiophene-2,6-diyl group, a dibenzothiophene-3,7-diyl group, a dibenzothiophene-2,6-diyl group, a thieno[3,2-b]thiophene-2,5-diyl group (one —CH= or two or more nonadjacent —CH= groups in this group are optionally substituted with —N=).

One or two or more hydrogen atoms in $A^{iii1}$ and $A^{iii2}$ are each independently optionally substituted with a substituent $S^{iii1}$.

The substituent $S^{iii1}$ denotes any one of a halogen atom, a pentafluorosulfanyl group, a nitro group, a cyano group, an isocyano group, an amino group, a hydroxy group, a mercapto group, a methylamino group, a dimethylamino group, a diethylamino group, a diisopropylamino group, a trimethylsilyl group, a dimethylsilyl group, a thioisocyano group, and an alkyl group with 1 to 20 carbon atoms.

The halogen atom may be a fluorine atom, a chlorine atom, a bromine atom, or an iodine atom.

The alkyl group with 1 to 20 carbon atoms is a linear, branched, or cyclic alkyl group, preferably a linear alkyl group.

The number of carbon atoms in the alkyl group with 1 to 20 carbon atoms preferably ranges from 2 to 10, preferably 2 to 6.

One or two or more —CH$_2$— groups in the alkyl group are each independently optionally substituted with —O—, —S—, —CO—, and/or —CS—.

One or two or more —CH$_2$—CH$_2$— groups in the alkyl group are each independently optionally substituted with —CO—O—, —O—CO—, —CO—S—, —S—CO—, —CO—NH—, —NH—CO—, —CH=CH—, —CF=CF—, and/or —C≡C—.

One or two or more —CH$_2$—CH$_2$—CH$_2$— groups in the alkyl group are each independently optionally substituted with —O—CO—O—.

One or two or more hydrogen atoms in the alkyl group are each independently optionally substituted with a halogen atom.

The halogen atom may be a fluorine atom, a chlorine atom, a bromine atom, or an iodine atom.

When the alkyl group is substituted with a predetermined group, however, oxygen atoms are not directly bonded to each other.

From the perspective of the stability of the compound, sulfur atoms are preferably not directly bonded to each other, and/or an oxygen atom and a sulfur atom are preferably not directly bonded to each other.

The substituent $S^{ii1}$ is preferably a fluorine atom or a chlorine atom.

At least one $A^{ii1}$ or $A^{ii2}$ is preferably substituted with at least one substituent $S^{ii1}$.

A plurality of substituents $S^{ii1}$, if present, may be the same or different.

The substitution position of the substituent $S^{ii1}$ in $A^{ii1}$ is preferably any one of the formulae ($A^{ii1}$-SP-1) to ($A^{ii1}$-SP-5):

[Chem. 81]

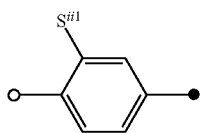
($A^{ii1}$-SP-1)

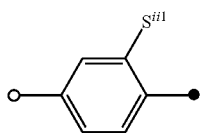
($A^{ii1}$-SP-2)

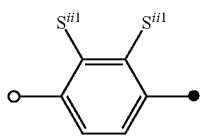
($A^{ii1}$-SP-3)

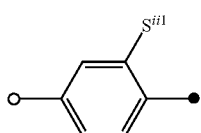
($A^{ii1}$-SP-4)

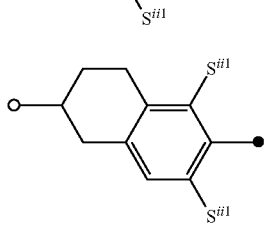
($A^{ii1}$-SP-5)

In the formulae ($A^{ii1}$-SP-1) to ($A^{ii1}$-SP-5), a white dot represents a bonding arm to $R^{ii1}$ or $Z^{ii1}$, and a black dot represents a bonding arm to $Z^{ii1}$.

The substitution position of the substituent $S^{ii1}$ in $A^{ii2}$ is preferably any one of the formulae ($A^{ii2}$-SP-1) to ($A^{ii2}$-sp-7):

[Chem. 82]

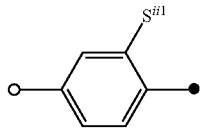
($A^{ii2}$-SP-1)

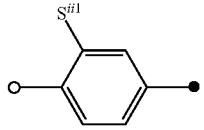
($A^{ii2}$-SP-2)

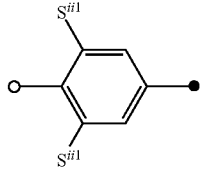
($A^{ii2}$-SP-3)

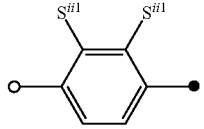
($A^{ii2}$-SP-4)

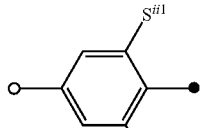
($A^{ii2}$-SP-5)

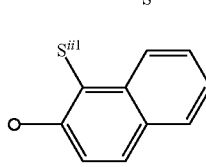
($A^{ii2}$-SP-6)

($A^{ii2}$-SP-7)

In the formulae ($A^{ii2}$-SP-1) to ($A^{ii2}$-SP-7), a white dot represents a bonding arm to $Z^{ii1}$, and a black dot represents a bonding arm to an isothiocyanate group (—NCS).

More specifically, $A^{ii1}$ preferably denotes any one of the formulae ($A^{ii1}$-1) to ($A^{ii1}$-7):

[Chem. 83]

($A^{ii1}$-1)

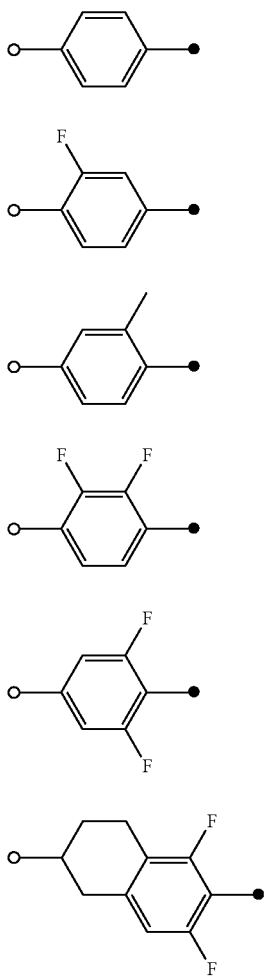

(A^{ii1}-2)
(A^{ii1}-3)
(A^{ii1}-4)
(A^{ii1}-5)
(A^{ii1}-6)
(A^{ii1}-7)

In the formulae ($A^{ii1}$-1) to ($A^{ii1}$-7), a white dot represents a bonding arm to $R^{ii1}$ or $Z^{ii1}$, and a black dot represents a bonding arm to $Z^{ii1}$.

More specifically, $A^{ii2}$ preferably denotes any one of the formulae ($A^{ii2}$-1) to ($A^{ii2}$-6)

[Chem. 84]

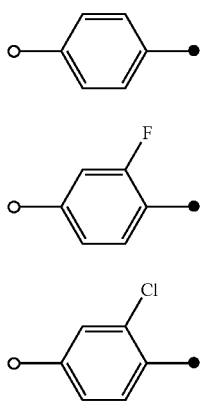

(A^{ii2}-1)
(A^{ii2}-2)
(A^{ii2}-3)

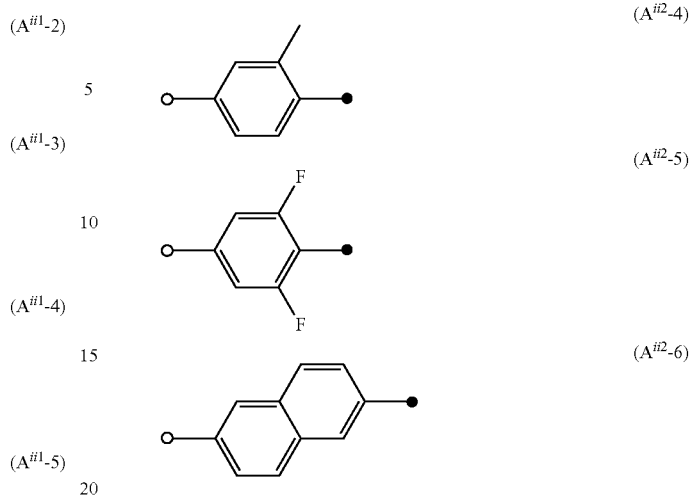

(A^{ii2}-4)
(A^{ii2}-5)
(A^{ii2}-6)

In the formulae ($A^{ii2}$-1) to ($A^{ii1}$-6), a white dot represents a bonding arm to $Z^{ii1}$, and a black dot represents a bonding arm to an isothiocyanate group (—NCS).

In the general formula (ii), $Z^{ii1}$ denotes any one of a single bond and an alkylene group with 1 to 20 carbon atoms.

One or two or more —CH$_2$— groups in the alkylene group are each independently optionally substituted with —O—.

One or two or more —CH$_2$—CH$_2$— groups in the alkylene group are each independently optionally substituted with —CH$_2$—CH(CH$_3$)—, —CH(CH$_3$)—CH$_2$—, —CH=CH—, —CF=CF—, —CH=C(CH$_3$)—, —C(CH$_3$)=CH—, —CH=N—, —N=CH—, —N=N—, —C≡C—, —CO—O—, and/or —O—CO—.

One or two or more —CH$_2$—CH$_2$—CH$_2$— groups in the alkylene group are each independently optionally substituted with —O—CO—O—.

When an alkylene group with 1 to 10 carbon atoms is substituted with a predetermined group, oxygen atoms are not directly bonded to each other.

From the perspective of the stability of the compound, sulfur atoms are preferably not directly bonded to each other, and/or an oxygen atom and a sulfur atom are preferably not directly bonded to each other.

Specific examples of the alkylene group with 1 to 20 carbon atoms (including substituted ones) include the groups represented by the formulae ($Z^{ii1}$-1) to ($Z^{ii1}$-24):

[Chem. 85]

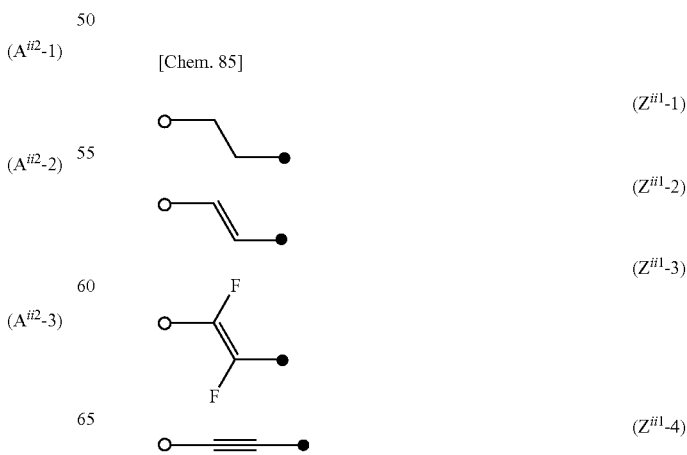

(Z^{ii1}-1)
(Z^{ii1}-2)
(Z^{ii1}-3)
(Z^{ii1}-4)

(Z$^{ii1}$-5) 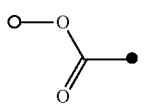

(Z$^{ii1}$-6) 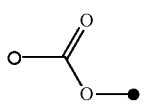

(Z$^{ii1}$-7) 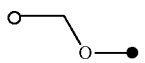

(Z$^{ii1}$-8) 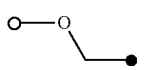

(Z$^{ii1}$-9) 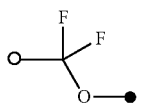

(Z$^{ii1}$-10) 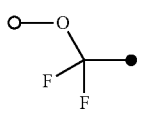

(Z$^{ii1}$-11) 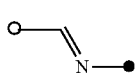

(Z$^{ii1}$-12) 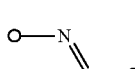

(Z$^{ii1}$-13) 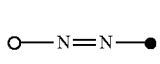

(Z$^{ii1}$-14) 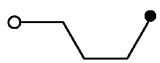

(Z$^{ii1}$-15) 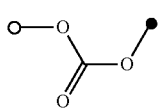

(Z$^{ii1}$-16) 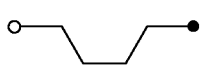

(Z$^{ii1}$-17) 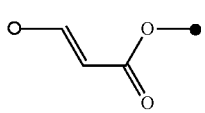

(Z$^{ii1}$-18) 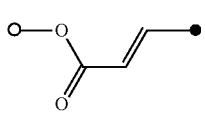

(Z$^{ii1}$-19) 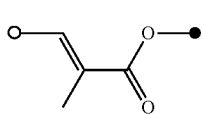

(Z$^{ii1}$-20) 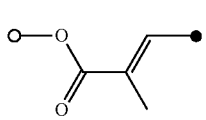

(Z$^{ii1}$-21) 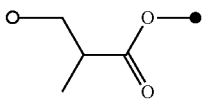

(Z$^{ii1}$-22) 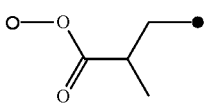

(Z$^{ii1}$-23) 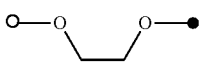

(Z$^{ii1}$-24) 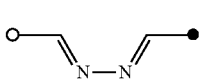

In the formulae (Z$^{ii1}$-1) to (Z$^{ii1}$-24), a white dot represents a bonding arm to A$^{ii1}$, and a black dot represents a bonding arm to A$^{ii1}$ or A$^{ii2}$.

In the general formula (ii), n$^{ii1}$ denotes an integer of 1 to 4, preferably 1 or 2.

When n$^{ii1}$ is 1, from the perspective of Δn and/or Δε$_r$, Z$^{ii1}$ preferably denotes a single bond or —C≡C—.

When n$^{ii1}$ is 2, from the perspective of Δn and/or Δε$_r$, Z$^{ii1}$ preferably denotes a single bond or —C≡C—.

In the general formula (ii), a plurality of A$^{ii1}$, if present, may be the same or different, and a plurality of Z$^{ii1}$, if present, may be the same or different.

Among the compounds represented by the general formula (ii), however, the compounds represented by the general formula (i) (including subordinate concepts) are excluded.

Compounds represented by the general formula (ii) are preferably compounds represented by the general formulae

[Chem. 86]

(ii-1) R$^{ii1}$—A$^{ii1}$—A$^{ii2}$—NCS (ii-2) R$^{ii1}$—A$^{ii1}$≡≡≡A$^{ii2}$—NCS (ii-3) R$^{ii1}$—A$^{ii1}$—A$^{ii1-2}$≡≡≡A$^{ii2}$—NCS (ii-4) R$^{ii1}$—A$^{ii1}$≡≡≡A$^{ii1-2}$≡≡≡A$^{ii2}$—NCS (ii-5) R$^{ii1}$—A$^{ii1}$—A$^{ii1-2}$—A$^{ii2}$—NCS (ii-6) R$^{ii1}$—A$^{ii1}$≡≡≡A$^{ii1-2}$—A$^{ii2}$—NCS

In the general formulae (ii-1) to (ii-6), R$^{ii1}$, A$^{ii1}$, and A$^{ii2}$ have the same meaning as R$^{ii1}$, A$^{ii1}$, and A$^{ii2}$, respectively, in the general formula (ii).

A$^{ii1-2}$ in the general formulae (ii-3) to (ii-6) is defined in the same way as A$^{ii1}$ in the general formula (ii).

Compounds represented by the general formula (ii-1) are preferably compounds represented by the general formulae (ii-1-1) and (ii-1-2):

[Chem. 87]

(ii-1-1) 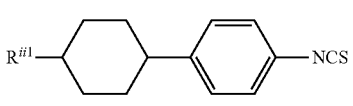

-continued (ii-1-2)

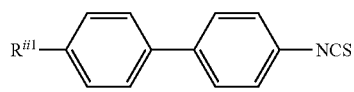

In the general formulae (ii-1-1) and (ii-1-2), $R^{ii1}$ each independently has the same meaning as $R^{ii1}$ in the general formula (ii).

Specific examples of compounds represented by the general formula (ii-1-1) include the compounds represented by the structural formulae (ii-1-1.1) to (ii-1-1.4):

[Chem. 88]

(ii-1-1.1)

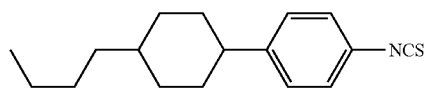

(ii-1-1.2)

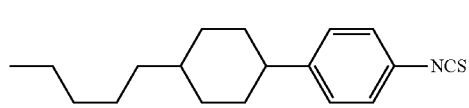

(ii-1-1.3)

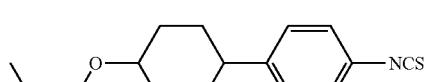

(ii-1-1.4)

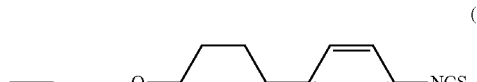

Specific examples of compounds represented by the general formula (ii-1-2) include the compounds represented by the structural formulae (ii-1-2.1) to (ii-1-2.6):

[Chem. 89]

(ii-1-2.1)

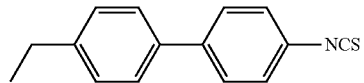

(ii-1-2.2)

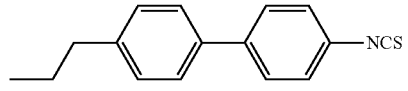

(ii-1-2.3)

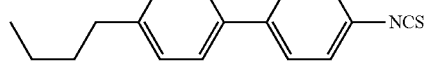

(ii-1-2.4)

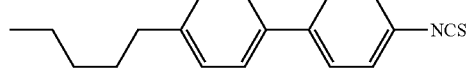

(ii-1-2.5)

(ii-1-2.6)

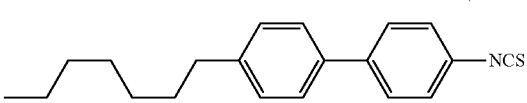

Compounds represented by the general formula (ii-2) are preferably compounds represented by the general formulae (ii-2-1) to (ii-2-5):

[Chem. 90]

(ii-2-1)

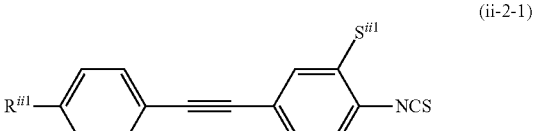

(ii-2-2)

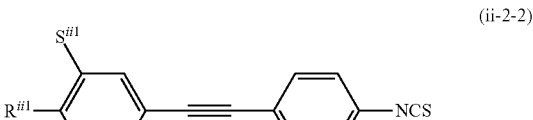

(ii-2-3)

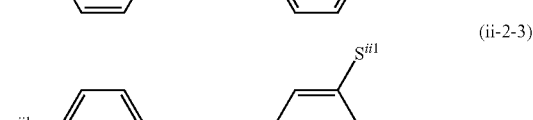

(ii-2-4)

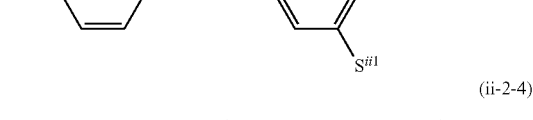

(ii-2-5)

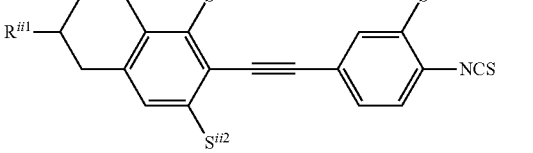

In the general formulae (ii-2-1) to (ii-2-5), $R^{ii1}$ and $S^{ii1}$ each independently have the same meaning as $R^{ii1}$ and $S^{ii1}$, respectively, in the general formula (ii).

Specific examples of compounds represented by the general formula (ii-2-1) include the compounds represented by the structural formulae (ii-2-1.1) to (ii-2-1.5):

[Chem. 91]

(ii-2-1.1)

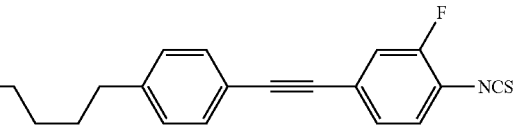

(ii-2-1.2)
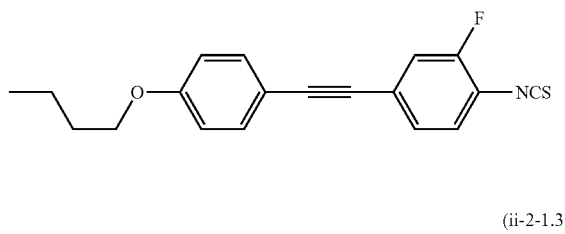

(ii-2-1.3)
(ii-2-1.4)
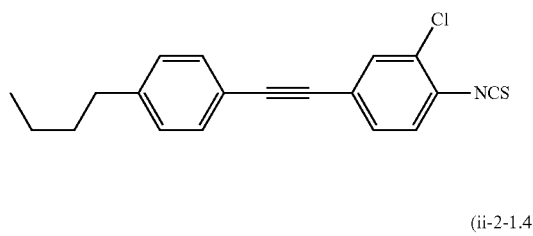

(ii-2-1.5)
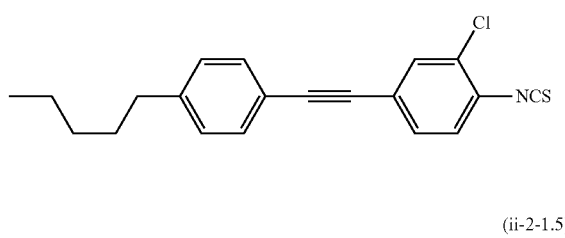

Specific examples of compounds represented by the general formula (ii-2-2) include the compounds represented by the structural formulae (ii-2-2.1) to (ii-2-2.3):

[Chem. 92]

(ii-2-2.1)
(ii-2-2.2)
(ii-2-2.3)
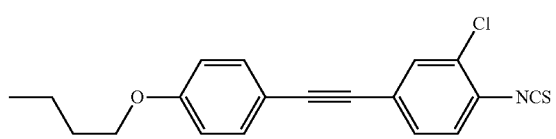
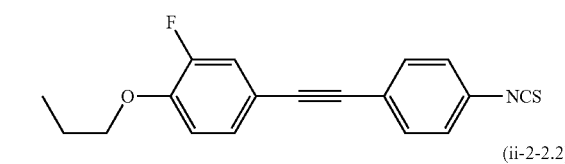
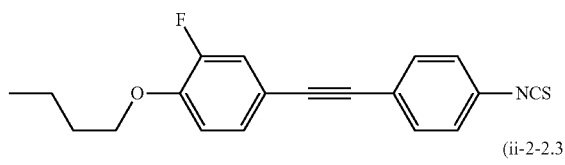
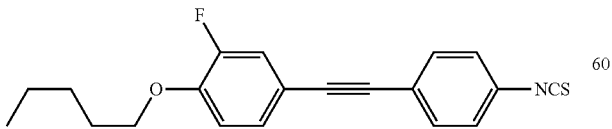

Specific examples of compounds represented by the general formula (ii-2-3) include the compounds represented by the structural formulae (ii-2-3.1) to (ii-2-3.3):

[Chem. 93]

(ii-2-3.1)
(ii-2-3.2)
(ii-2-3.3)
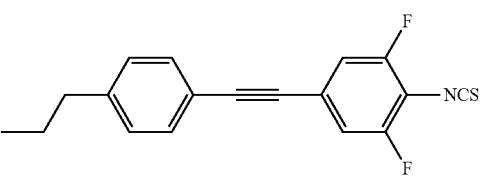
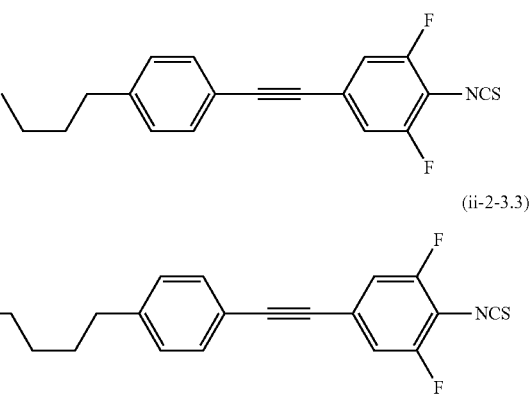

Specific examples of compounds represented by the general formula (ii-2-4) include the compounds represented by the structural formulae (ii-2-4.1) to (ii-2-4.3):

[Chem. 94]

(ii-2-4.1)
(ii-2-4.2)
(ii-2-4.3)
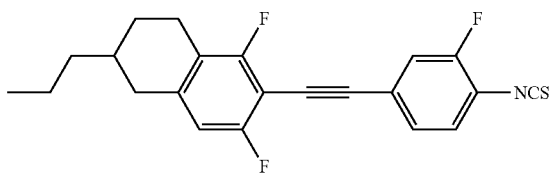
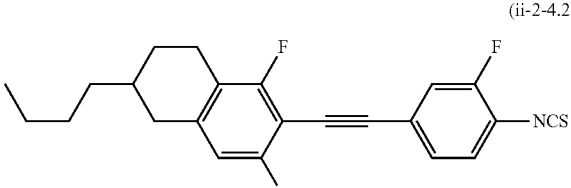

Specific examples of compounds represented by the general formula (ii-2-5) include the compounds represented by the structural formulae (ii-2-5.1) to (ii-2-5.3):

[Chem. 95]

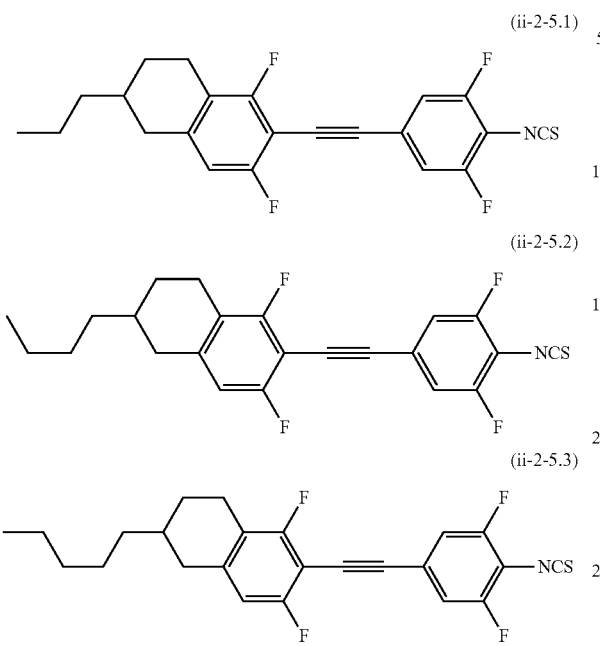

Compounds represented by the general formula (ii-3) are preferably compounds represented by the general formulae (ii-3-1) to (ii-3-6):

[Chem. 96]

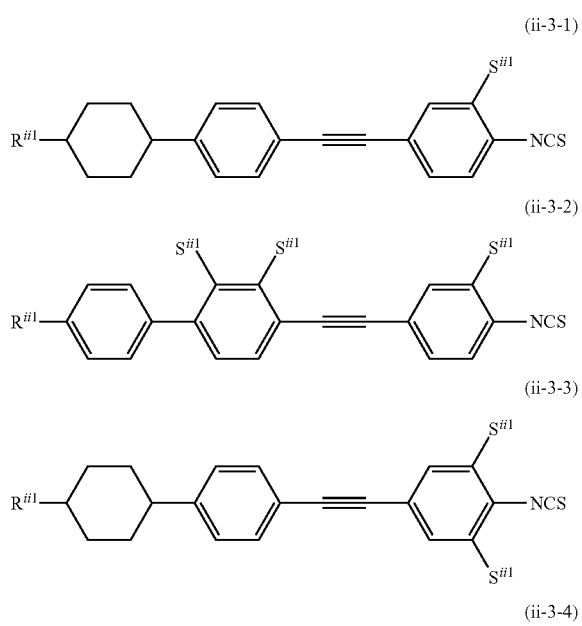

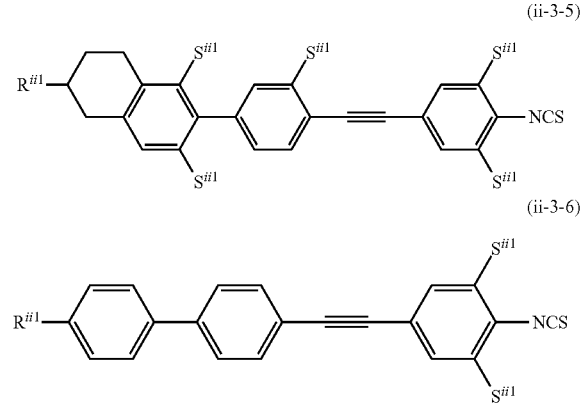

In the general formulae (ii-3-1) to (ii-3-6), $R^{ii1}$ and $S^{ii1}$ each independently have the same meaning as $R^{ii1}$ and $S^{ii1}$, respectively, in the general formula (ii).

Specific examples of compounds represented by the general formula (ii-3-1) include the compounds represented by the structural formulae (ii-3-1.1) to (ii-3-1.4):

[Chem. 97]

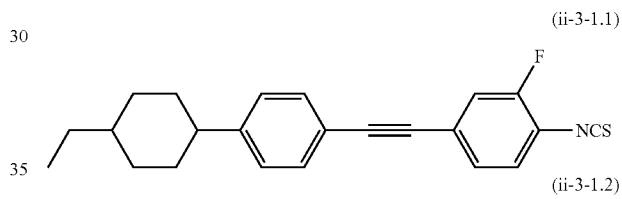

Specific examples of compounds represented by the general formula (ii-3-2) include the compounds represented by the structural formulae (ii-3-2.1) to (ii-3-2.3):

[Chem. 98]

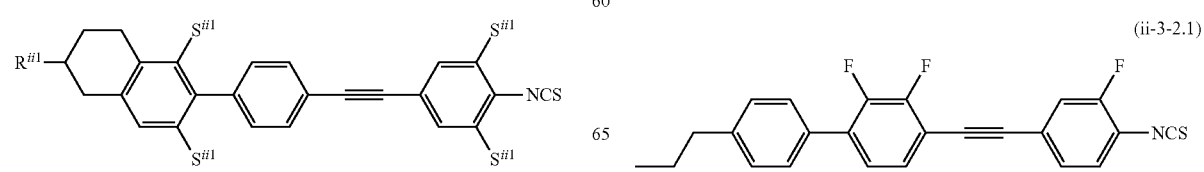

(ii-3-2.2)

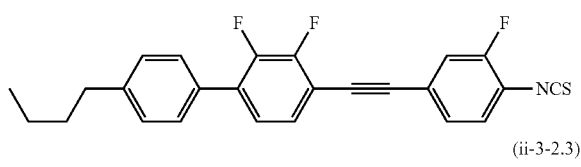

(ii-3-2.3)

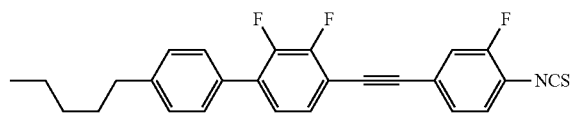

Specific examples of compounds represented by the general formula (ii-3-3) include the compounds represented by the structural formulae (ii-3-3.1) to (ii-3-3.3):

[Chem. 99]

(ii-3-3.1)

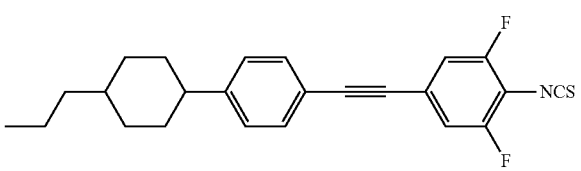

(ii-3-3.2)

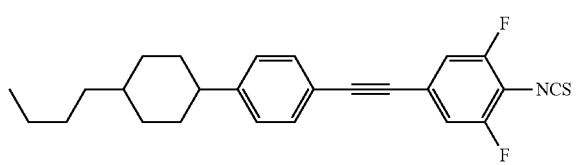

(ii-3-3.3)

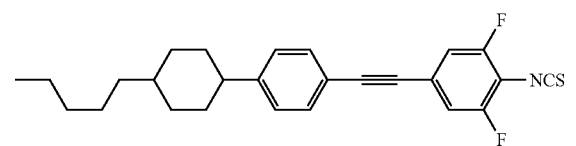

Specific examples of compounds represented by the general formula (ii-3-4) include the compounds represented by the structural formulae (ii-3-4.1) to (ii-3-4.3):

[Chem. 100]

(ii-3-4.1)

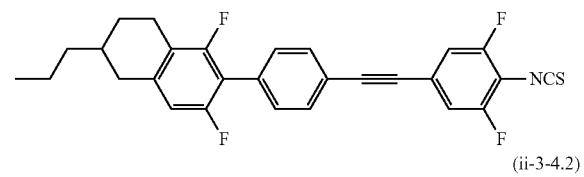

(ii-3-4.2)

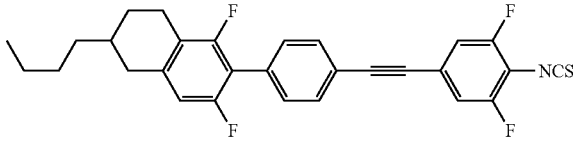

(ii-3-4.3)

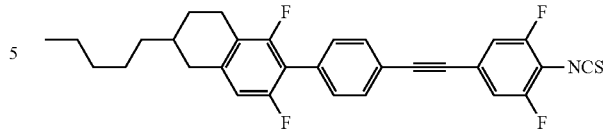

Specific examples of compounds represented by the general formula (ii-3-5) include the compounds represented by the structural formulae (ii-3-5.1) to (ii-3-5.3):

[Chem. 101]

(ii-3-5.1)

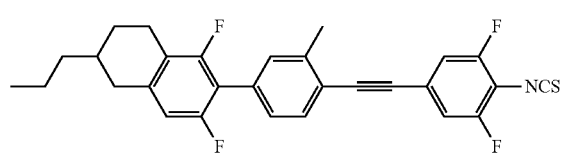

(ii-3-5.2)

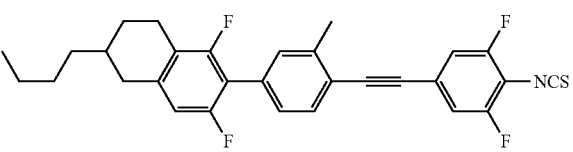

(ii-3-5.3)

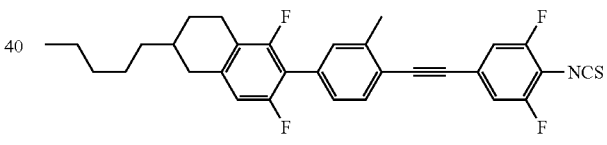

Specific examples of compounds represented by the general formula (ii-3-6) include the compounds represented by the structural formulae (ii-3-6.1) and (ii-3-6.2):

[Chem. 102]

(ii-3-6.1)

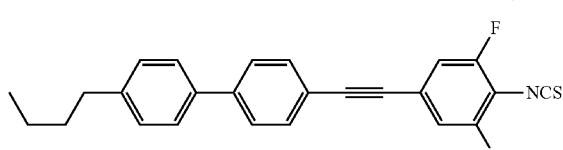

(ii-3-6.2)

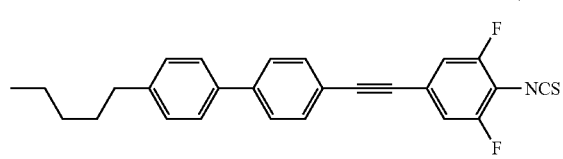

Compounds represented by the general formula (ii-4) are preferably compounds represented by the general formula (ii-4-1) to (ii-4-8):

[Chem. 103]

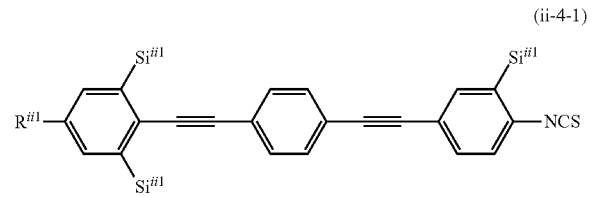
(ii-4-1)

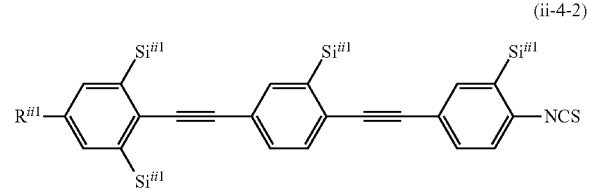
(ii-4-2)

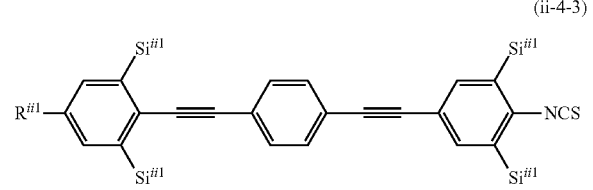
(ii-4-3)

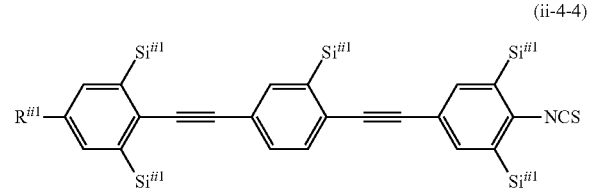
(ii-4-4)

[Chem. 104]

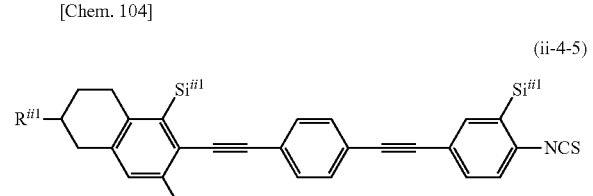
(ii-4-5)

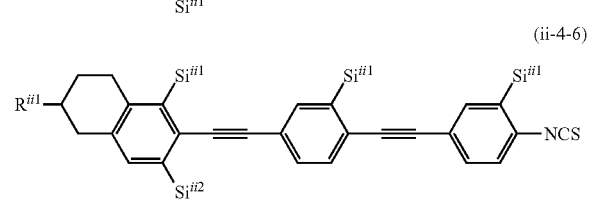
(ii-4-6)

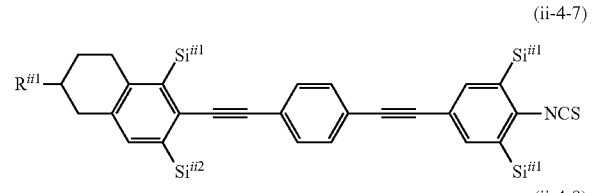
(ii-4-7)

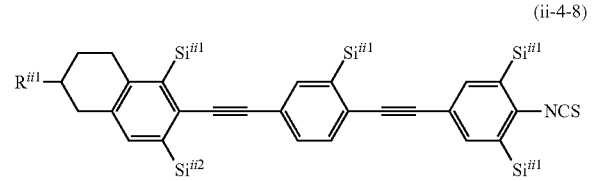
(ii-4-8)

In the general formulae (ii-4-1) to (ii-4-8), $R^{ii1}$ and $S^{ii1}$ each independently have the same meaning as $R^{ii1}$ and $S^{ii1}$, respectively, in the general formula (ii).

Specific examples of compounds represented by the general formula (ii-4-1) include the compounds represented by the structural formulae (ii-4-1.1) to (ii-4-1.3):

[Chem. 105]

(ii-4-1.1)

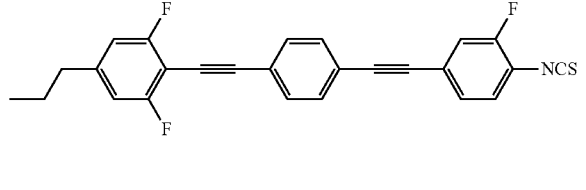
(ii-4-1.2)

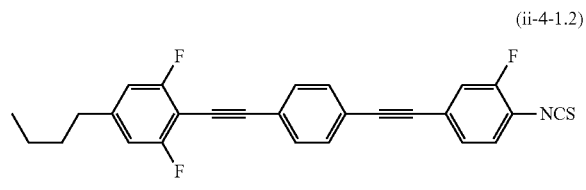
(ii-4-1.3)

Specific examples of compounds represented by the general formula (ii-4-2) include the compounds represented by the structural formulae (ii-4-2.1) to (ii-4-2.3):

[Chem. 106]

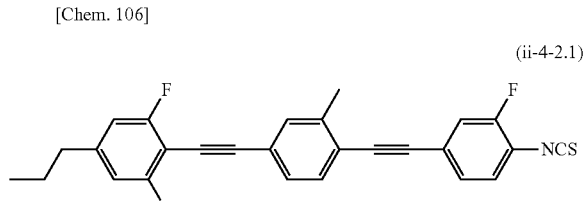
(ii-4-2.1)

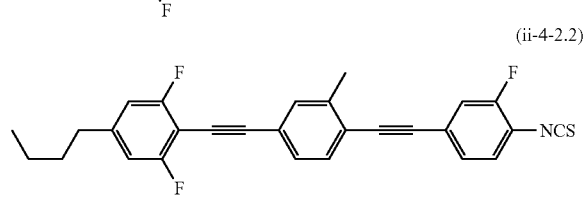
(ii-4-2.2)

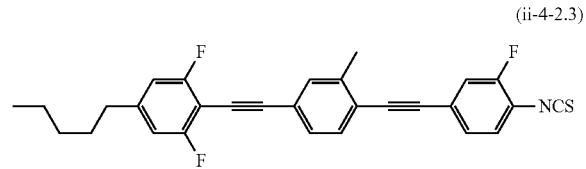
(ii-4-2.3)

Specific examples of compounds represented by the general formula (ii-4-3) include the compounds represented by the structural formulae (ii-4-3.1) to (ii-4-3.3):

[Chem. 107]

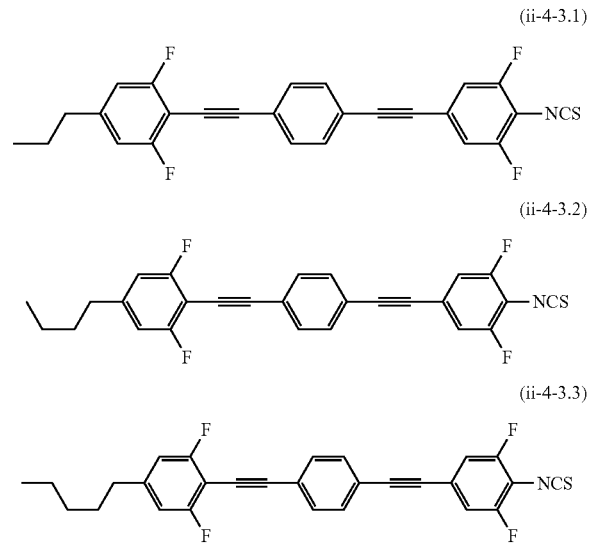

Specific examples of compounds represented by the general formula (ii-4-4) include the compounds represented by the structural formulae (ii-4-4.1) to (ii-4-4.3):

[Chem. 108]

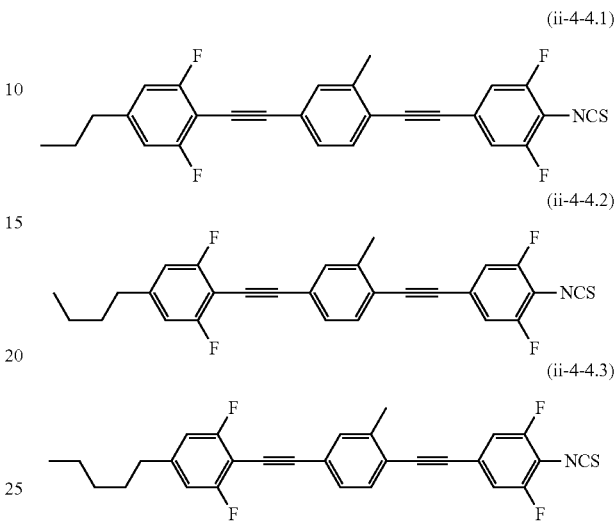

Specific examples of compounds represented by the general formula (ii-4-5) include the compounds represented by the structural formulae (ii-4-5.1) to (ii-4-5.3):

[Chem. 109]

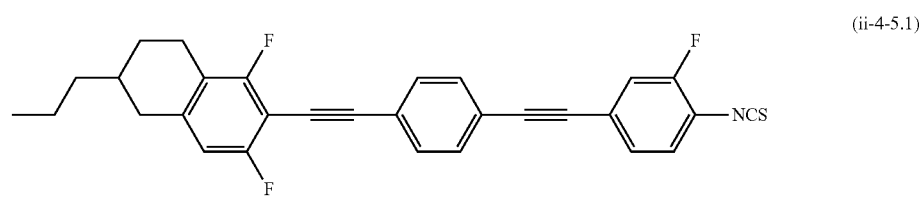

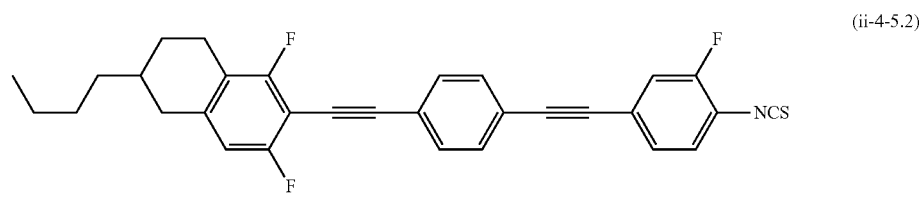

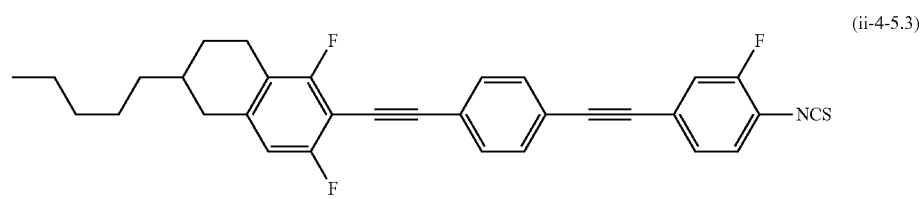

Specific examples of compounds represented by the general formula (ii-4-6) include the compounds represented by the structural formulae (ii-4-6.1) to (ii-4-6.3):

[Chem. 110]

(ii-4-6.1)
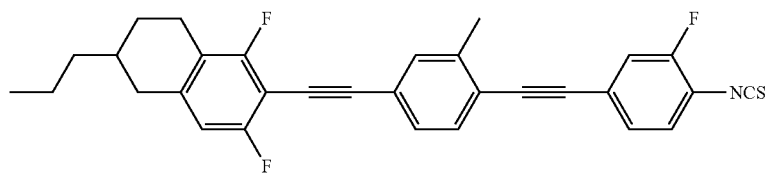

(ii-4-6.2)
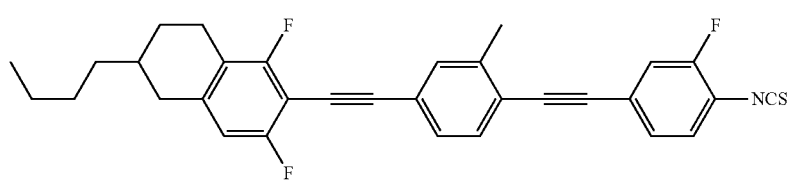

(ii-4-6.3)
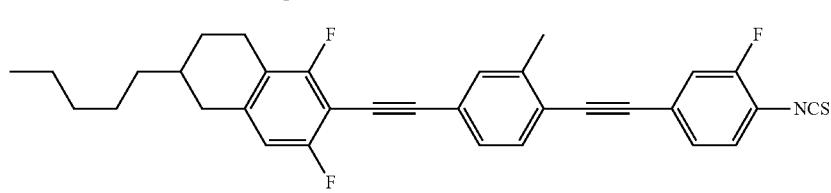

Specific examples of compounds represented by the general formula (ii-4-7) include the compounds represented by the structural formulae (ii-4-7.1) to (ii-4-7.3):

[Chem. 111]

(ii-4-7.1)
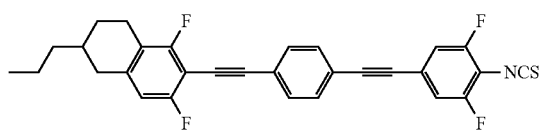

-continued (ii-4-7.2)
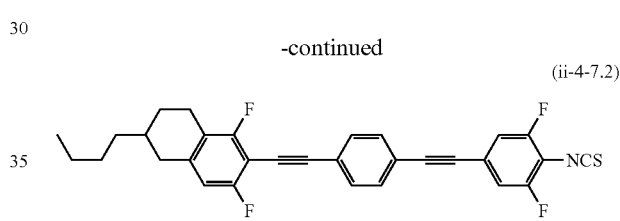

(ii-4-7.3)
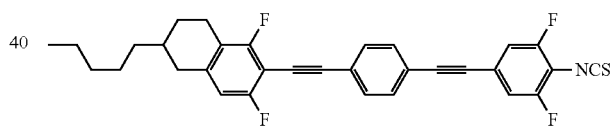

Specific examples of compounds represented by the general formula (ii-4-8) include the compounds represented by the structural formulae (ii-4-8.1) to (ii-4-8.3):

[Chem. 112]

(ii-4-8.1)
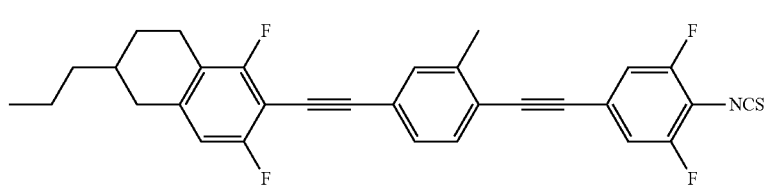

(ii-4-8.2)
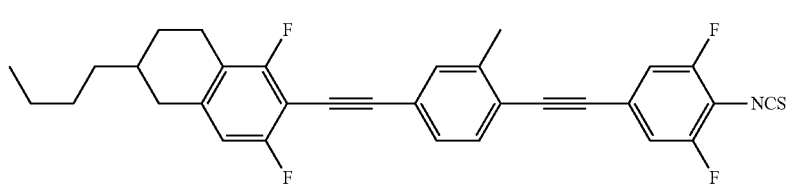

Compounds represented by the general formula (ii-5) are preferably compounds represented by the general formulae (ii-5-1) to (ii-5-5):

[Chem. 113]

[Chem. 114]

In the general formulae (ii-5-1) to (ii-5-5), $R^{ii1}$ and $S^{ii1}$ each independently have the same meaning as $R^{ii1}$ and $S^{ii1}$, respectively, in the general formula (ii).

Specific examples of compounds represented by the general formula (ii-5-1) include the compounds represented by the structural formulae (ii-5-1.1) to (ii-5-1.4):

Specific examples of compounds represented by the general formula (ii-5-2) include the compounds represented by the structural formulae (ii-5-2.1) to (ii-5-2.4):

[Chem. 115]

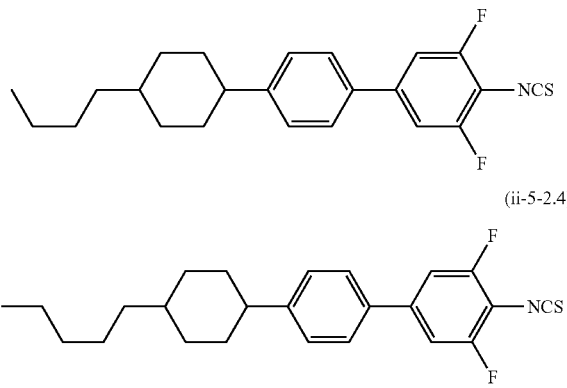

(ii-5-2.3)

(ii-5-2.4)

Specific examples of compounds represented by the general formula (ii-5-3) include the compounds represented by the structural formulae (ii-5-3.1) to (ii-5-3.3):

[Chem. 116]

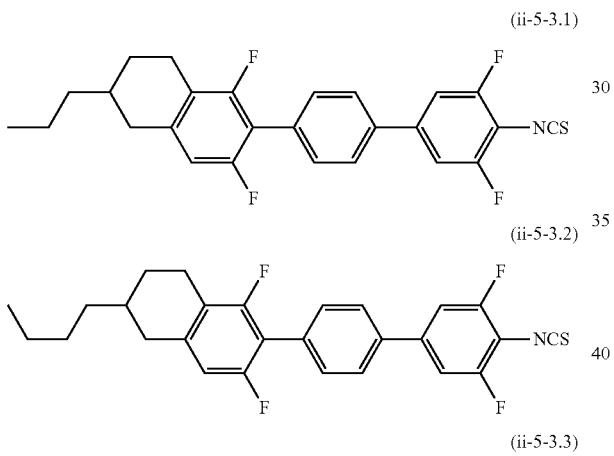

(ii-5-3.1)

(ii-5-3.2)

(ii-5-3.3)

Specific examples of compounds represented by the general formula (ii-5-4) include the compounds represented by the structural formulae (ii-5-4.1) to (ii-5-4.3):

[Chem. 117]

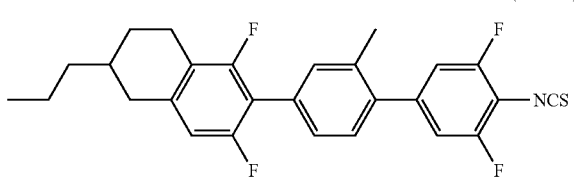

(ii-5-4.1)

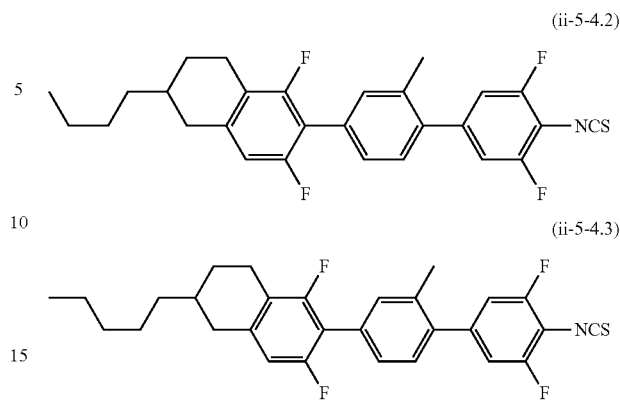

(ii-5-4.2)

(ii-5-4.3)

Specific examples of compounds represented by the general formula (ii-5-5) include the compound represented by the structural formula (ii-5-5.1):

[Chem. 118]

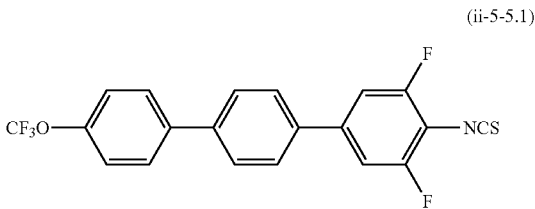

(ii-5-5.1)

Compounds represented by the general formula (ii-6) are preferably compounds represented by the general formulae (ii-6-1) and (ii-6-2):

[Chem. 119]

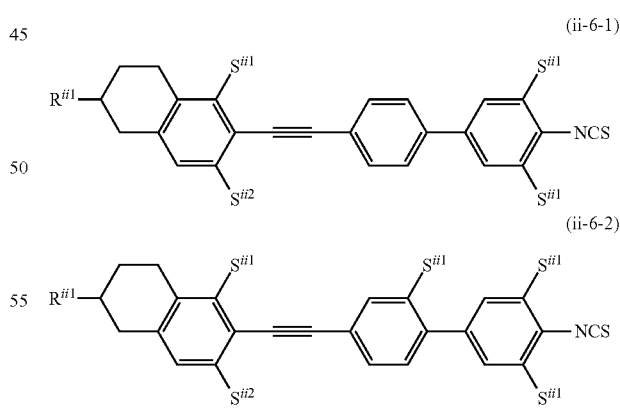

(ii-6-1)

(ii-6-2)

In the general formulae (ii-6-1) and (ii-6-2), $R^{ii1}$ and $S^{ii1}$ each independently have the same meaning as $R^{ii1}$ and $S^{ii1}$, respectively, in the general formula (ii).

Specific examples of compounds represented by the general formula (ii-6-1) include the compounds represented by the structural formulae (ii-6-1.1) to (ii-6-1.3):

[Chem. 120]

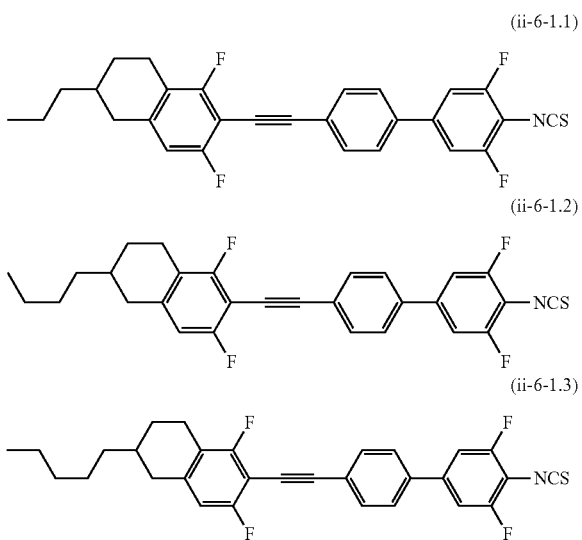

(ii-6-1.1)
(ii-6-1.2)
(ii-6-1.3)

Specific examples of compounds represented by the general formula (ii-6-2) include the compounds represented by the structural formulae (ii-6-2.1) to (ii-6-2.3):

[Chem. 121]

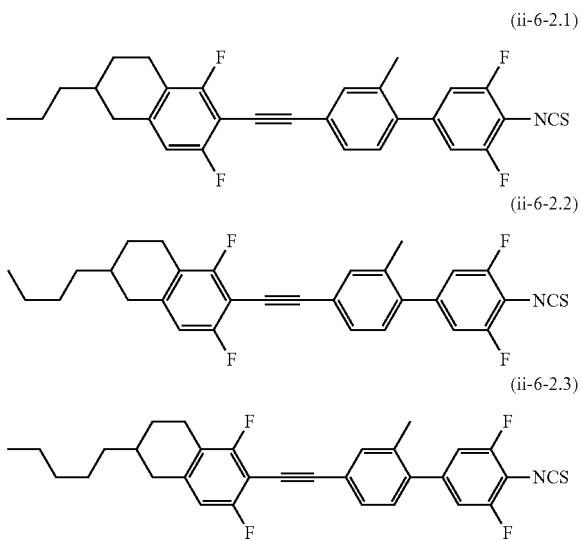

(ii-6-2.1)
(ii-6-2.2)
(ii-6-2.3)

The types of compounds represented by the following formulae used for liquid crystal compositions are one or two or more types, preferably one to ten types, preferably one to eight types, preferably one to six types, preferably one to four types, or preferably one to three types: the general formula (ii), the general formulae (ii-1) to (ii-6), the general formulae (ii-1-1) and (ii-1-2), the general formulae (ii-2-1) to (ii-2-5), the general formulae (ii-3-1) to (ii-3-6), the general formulae (ii-4-1) to (ii-4-8), the general formulae (ii-5-1) to (ii-5-5), the general formulae (ii-6-1) and (ii-6-2), the structural formulae (ii-1-1.1) to (ii-1-1.4), the structural formulae (ii-1-2.1) to (ii-1-2.6), the structural formulae (ii-2-1.1) to (ii-2-1.5), the structural formulae (ii-2-2.1) to (ii-2-2.3), the structural formulae (ii-2-3.1) to (ii-2-3.3), the structural formulae (ii-2-4.1) to (ii-2-4.3), the structural formulae (ii-2-5.1) to (ii-2-5.3), the structural formulae (ii-3-1.1) to (ii-3-1.4), the structural formulae (ii-3-2.1) to (ii-3-2.3), the structural formulae (ii-3-3.1) to (ii-3-3.3), the structural formulae (ii-3-4.1) to (ii-3-4.3), the structural formulae (ii-3-5.1) to (ii-3-5.3), the structural formulae (ii-3-6.1) and (ii-3-6.2), the structural formulae (ii-4-1.1) to (ii-4-1.3), the structural formulae (ii-4-2.1) to (ii-4-2.3), the structural formulae (ii-4-3.1) to (ii-4-3.3), the structural formulae (ii-4-4.1) to (ii-4-4.3), the structural formulae (ii-4-5.1) to (ii-4-5.3), the structural formulae (ii-4-6.1) to (ii-4-6.3), the structural formulae (ii-4-7.1) to (ii-4-7.3), the structural formulae (ii-4-8.1) to (ii-4-8.3), the structural formulae (ii-5-1.1) to (ii-5-1.4), the structural formulae (ii-5-2.1) to (ii-5-2.4), the structural formulae (ii-5-3.1) to (ii-5-3.3), the structural formulae (ii-5-4.1) to (ii-5-4.3), the structural formula (ii-5-5.1), the structural formulae (ii-6-1.1) to (ii-6-1.3), or the structural formulae (ii-6-2.1) to (ii-6-2.3).

The lower limit of the total amount of compounds represented by the following formulae per 100% by mass of a liquid crystal composition is preferably 1% by mass or more, preferably 3% by mass or more, preferably 10% by mass or more, preferably 15% by mass or more, preferably 20% by mass or more, preferably 30% by mass or more, preferably 40% by mass or more, or preferably 55% by mass or more: the general formula (ii), the general formulae (ii-1) to (ii-6), the general formulae (ii-1-1) and (ii-1-2), the general formulae (ii-2-1) to (ii-2-5), the general formulae (ii-3-1) to (ii-3-6), the general formulae (ii-4-1) to (ii-4-8), the general formulae (ii-5-1) to (ii-5-5), the general formulae (ii-6-1) and (ii-6-2), the structural formulae (ii-1-1.1) to (ii-1-1.4), the structural formulae (ii-1-2.1) to (ii-1-2.6), the structural formulae (ii-2-1.1) to (ii-2-1.5), the structural formulae (ii-2-2.1) to (ii-2-2.3), the structural formulae (ii-2-3.1) to (ii-2-3.3), the structural formulae (ii-2-4.1) to (ii-2-4.3), the structural formulae (ii-2-5.1) to (ii-2-5.3), the structural formulae (ii-3-1.1) to (ii-3-1.4), the structural formulae (ii-3-2.1) to (ii-3-2.3), the structural formulae (ii-3-3.1) to (ii-3-3.3), the structural formulae (ii-3-4.1) to (ii-3-4.3), the structural formulae (ii-3-5.1) to (ii-3-5.3), the structural formulae (ii-3-6.1) and (ii-3-6.2), the structural formulae (ii-4-1.1) to (ii-4-1.3), the structural formulae (ii-4-2.1) to (ii-4-2.3), the structural formulae (ii-4-3.1) to (ii-4-3.3), the structural formulae (ii-4-4.1) to (ii-4-4.3), the structural formulae (ii-4-5.1) to (ii-4-5.3), the structural formulae (ii-4-6.1) to (ii-4-6.3), the structural formulae (ii-4-7.1) to (ii-4-7.3), the structural formulae (ii-4-8.1) to (ii-4-8.3), the structural formulae (ii-5-1.1) to (ii-5-1.4), the structural formulae (ii-5-2.1) to (ii-5-2.4), the structural formulae (ii-5-3.1) to (ii-5-3.3), the structural formulae (ii-5-4.1) to (ii-5-4.3), the structural formula (ii-5-5.1), the structural formulae (ii-6-1.1) to (ii-6-1.3), or the structural formulae (ii-6-2.1) to (ii-6-2.3).

The upper limit of the total amount of compounds represented by the following formulae per 100% by mass of a liquid crystal composition is preferably 80% by mass or less, preferably 75% by mass or less, preferably 70% by mass or less, preferably 65% by mass or less, preferably 50% by mass or less, preferably 30% by mass or less, preferably 25% by mass or less, or preferably 15% by mass or less: the general formula (ii), the general formulae (ii-1) to (ii-6), the general formulae (ii-1-1) and (ii-1-2), the general formulae (ii-2-1) to (ii-2-5), the general formulae (ii-3-1) to (ii-3-6), the general formulae (ii-4-1) to (ii-4-8), the general formulae (ii-5-1) to (ii-5-5), the general formulae (ii-6-1) and (ii-6-2), the structural formulae (ii-1-1.1) to (ii-1-1.4), the structural formulae (ii-1-2.1) to (ii-1-2.6), the structural formulae (ii-2-1.1) to (ii-2-1.5), the structural formulae (ii-2-2.1) to (ii-2-2.3), the structural formulae (ii-2-3.1) to (ii-2-3.3), the structural formulae (ii-2-4.1) to (ii-2-4.3), the structural formulae (ii-2-5.1) to (ii-2-5.3), the structural formulae (ii-3-1.1) to (ii-3-1.4), the structural formulae (ii-3-2.1) to (ii-3-2.3), the structural formulae (ii-3-3.1) to (ii-3-3.3), the structural formulae (ii-3-4.1) to (ii-3-4.3), the structural formulae (ii-3-5.1) to (ii-3-5.3), the structural formulae (ii-3-6.1) and (ii-3-6.2), the structural formulae (ii-4-1.1) to (ii-4-1.3), the structural formulae (ii-4-2.1) to (ii-4-2.3), the structural formulae (ii-4-3.1) to (ii-4-3.3), the structural formulae (ii-4-4.1) to (ii-4-4.3), the structural formulae (ii-4-5.1) to (ii-4-5.3), the structural formulae (ii-4-6.1) to (ii-4-6.3), the structural formulae (ii-4-7.1) to (ii-4-7.3), the structural formulae (ii-4-8.1) to (ii-4-8.3), the structural formulae (ii-5-1.1) to (ii-5-1.4), the structural formulae (ii-5-2.1) to (ii-5-2.4), the structural formulae (ii-5-3.1) to (ii-5-3.3), the structural formulae (ii-5-4.1) to (ii-5-4.3), the structural formula (ii-5-5.1), the structural formulae (ii-6-1.1) to (ii-6-1.3), or the structural formulae (ii-6-2.1) to (ii-6-2.3).

From the perspective of solubility, Δn, and/or Δε$_r$, the total amount of compounds represented by the following formulae per 100% by mass of a liquid crystal composition preferably ranges from 10% to 80% by mass, preferably 15% to 75% by mass, or preferably 20% to 70% by mass: the general formula (ii), the general formulae (ii-1) to (ii-6), the general formulae (ii-1-1) and (ii-1-2), the general formulae (ii-2-1) to (ii-2-5), the general formulae (ii-3-1) to (ii-3-6), the general formulae (ii-4-1) to (ii-4-8), the general formulae (ii-5-1) to (ii-5-5), the general formulae (ii-6-1) and (ii-6-2), the structural formulae (ii-1-1.1) to (ii-1-1.4), the structural formulae (ii-1-2.1) to (ii-1-2.6), the structural formulae (ii-2-1.1) to (ii-2-1.5), the structural formulae (ii-2-2.1) to (ii-2-2.3), the structural formulae (ii-2-3.1) to (ii-2-3.3), the structural formulae (ii-2-4.1) to (ii-2-4.3), the structural formulae (ii-2-5.1) to (ii-2-5.3), the structural formulae (ii-3-1.1) to (ii-3-1.4), the structural formulae (ii-3-2.1) to (ii-3-2.3), the structural formulae (ii-3-3.1) to (ii-3-3.3), the structural formulae (ii-3-4.1) to (ii-3-4.3), the structural formulae (ii-3-5.1) to (ii-3-5.3), the structural formulae (ii-3-6.1) and (ii-3-6.2), the structural formulae (ii-4-1.1) to (ii-4-1.3), the structural formulae (ii-4-2.1) to (ii-4-2.3), the structural formulae (ii-4-3.1) to (ii-4-3.3), the structural formulae (ii-4-4.1) to (ii-4-4.3), the structural formulae (ii-4-5.1) to (ii-4-5.3), the structural formulae (ii-4-6.1) to (ii-4-6.3), the structural formulae (ii-4-7.1) to (ii-4-7.3), the structural formulae (ii-4-8.1) to (ii-4-8.3), the structural formulae (ii-5-1.1) to (ii-5-1.4), the structural formulae (ii-5-2.1) to (ii-5-2.4), the structural formulae (ii-5-3.1) to (ii-5-3.3), the structural formulae (ii-5-4.1) to (ii-5-4.3), the structural formula (ii-5-5.1), the structural formulae (ii-6-1.1) to (ii-6-1.3), or the structural formulae (ii-6-2.1) to (ii-6-2.3).

The compounds represented by the general formula (ii) (including subordinate concepts) can be synthesized by a known synthesis method.

From the perspective of V$_{th}$, Δn, and/or Δε$_r$, a liquid crystal composition according to the present invention may further contain one or two or more compounds represented by the general formula (iii) having a cyano group (—CN).

[Chem. 122]

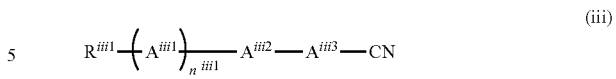

(iii)

In the general formula (iii), R$^{iii1}$ denotes an alkyl group with 1 to 20 carbon atoms.

The alkyl group is a linear, branched, or cyclic alkyl group, preferably a linear alkyl group.

The number of carbon atoms in the alkyl group preferably ranges from 2 to 10, preferably 2 to 6.

One or two or more —CH$_2$— groups in the alkyl group are each independently optionally substituted with —O—, —S—, —CO—, and/or —CS—.

One or two or more —CH$_2$—CH$_2$— groups in the alkyl group are optionally substituted with —CH=CH—, —CO—O—, —O—CO—, and/or —C≡C—.

One or two or more hydrogen atoms in the alkyl group are each independently optionally substituted with a halogen atom.

The halogen atom may be a fluorine atom, a chlorine atom, a bromine atom, or an iodine atom.

When the alkyl group is substituted with a predetermined group, however, oxygen atoms are not directly bonded to each other.

From the perspective of the stability of the compound, sulfur atoms are preferably not directly bonded to each other, and/or an oxygen atom and a sulfur atom are preferably not directly bonded to each other.

For example, R$^{iii1}$ can denote an alkoxy group with 1 to 19 carbon atoms by substituting one —CH$_2$— in the alkyl group with —O—.

The alkoxy group is a linear, branched, or cyclic alkoxy group, preferably a linear alkoxy group.

The number of carbon atoms in the alkoxy group preferably ranges from 2 to 10, preferably 2 to 6.

R$^{iii1}$ can denote a thioalkoxy group (alkylsulfanyl group, alkylthio group) with 1 to 19 carbon atoms by substituting one —CH$_2$— in the alkyl group with —S—.

The thioalkoxy group is a linear, branched, or cyclic thioalkoxy group, preferably a linear thioalkoxy group.

The number of carbon atoms in the thioalkoxy group preferably ranges from 1 to 10, preferably 1 to 6.

R$^{iii1}$ can denote an alkenyl group with 2 to 20 carbon atoms by substituting one or two or more —CH$_2$—CH$_2$— groups in the alkyl group with —CH=CH—.

The alkenyl group is a linear, branched, or cyclic alkenyl group, preferably a linear alkenyl group.

The number of carbon atoms in the alkenyl group preferably ranges from 2 to 10, preferably 2 to 6.

R$^{iii1}$ can denote an alkynyl group with 2 to 20 carbon atoms by substituting one or two or more —CH$_2$—CH$_2$— groups in the alkyl group with —C≡C—.

The alkynyl group is a linear, branched, or cyclic alkynyl group, preferably a linear alkynyl group.

The number of carbon atoms in the alkynyl group preferably ranges from 2 to 10, preferably 2 to 6.

R$^{iii1}$ can denote an alkenyloxy group with 2 to 19 carbon atoms by substituting one —CH$_2$— in the alkyl group with —O— and substituting one or two or more —CH$_2$—CH$_2$— groups with —CH=CH—.

The alkenyloxy group is a linear, branched, or cyclic alkenyloxy group, preferably a linear alkenyloxy group.

The number of carbon atoms in the alkenyloxy group preferably ranges from 2 to 10, preferably 2 to 6.

$R^{iii1}$ can denote a halogenated alkyl group with 1 to 20 carbon atoms by substituting one or two or more hydrogen atoms in the alkyl group with a halogen atom.

The halogenated alkyl group is a linear, branched, or cyclic halogenated alkyl group, preferably a linear halogenated alkyl group.

The number of carbon atoms in the halogenated alkyl group preferably ranges from 2 to 10, preferably 2 to 6.

$R^{iii1}$ can denote a halogenated alkoxy group with 1 to 19 carbon atoms by substituting one —$CH_2$— in the alkyl group with —O— and substituting one or two or more hydrogen atoms in the alkyl group with a halogen atom.

The halogenated alkoxy group is a linear, branched, or cyclic halogenated alkoxy group, preferably a linear halogenated alkoxy group.

The number of carbon atoms in the halogenated alkoxy group preferably ranges from 2 to 10, preferably 2 to 6.

Specific examples of the alkyl group with 1 to 20 carbon atoms (including substituted ones) in $R^{iii1}$ include the groups represented by the formulae ($R^{iii1}$-1) to ($R^{iii1}$-36):

[Chem. 123]

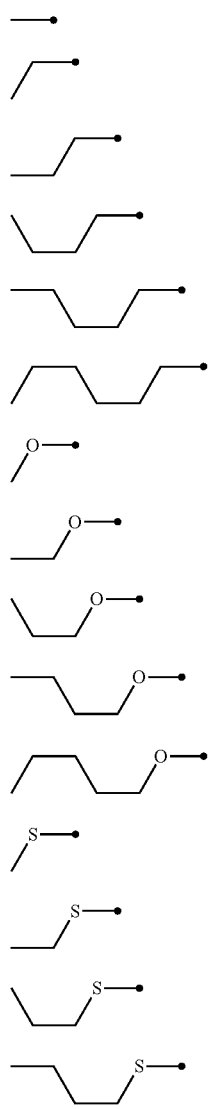
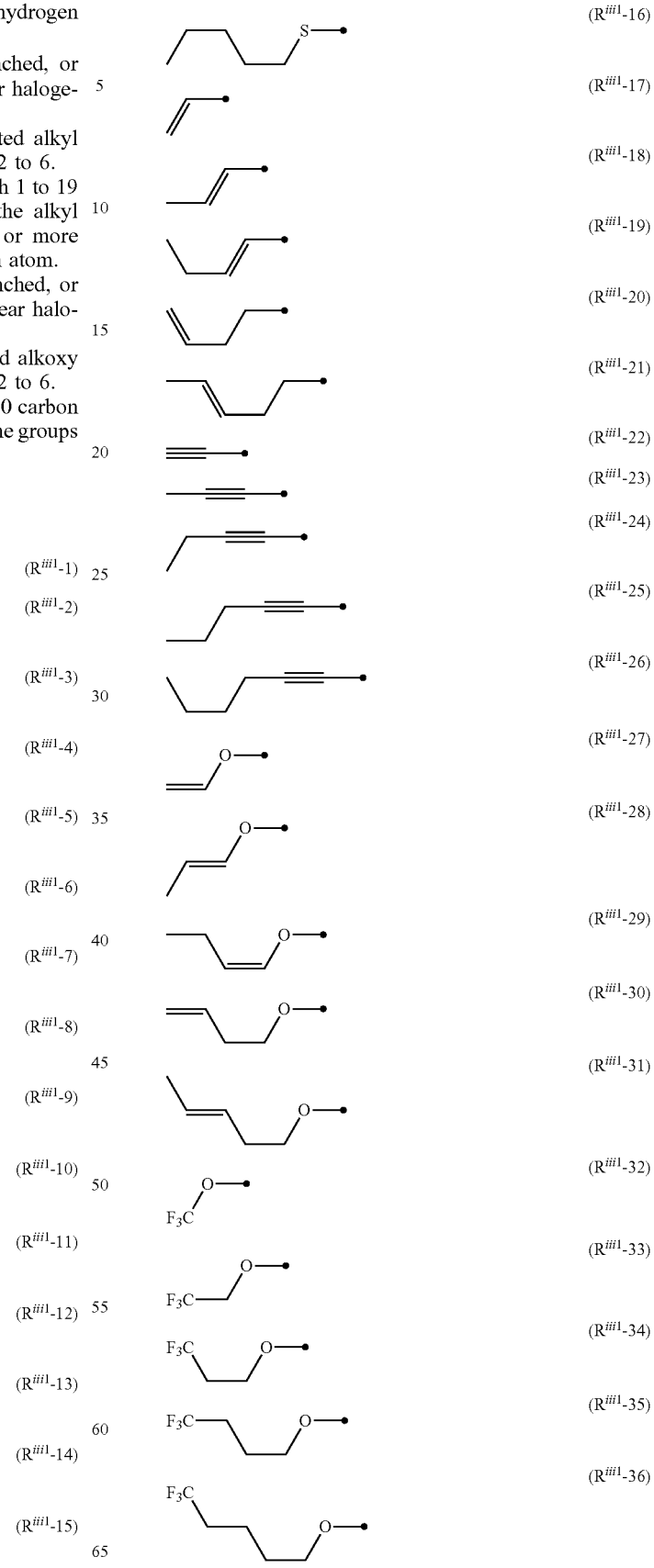

In the formulae ($R^{iii1}$-1) to ($R^{iii1}$-36), a black dot represents a bonding arm to $A^{iii1}$.

When the ring structure to which $R^{iii1}$ is bonded is a phenyl group (aromatic), a linear alkyl group with 1 to 5 carbon atoms, a linear alkoxy group with 1 to 4 carbon atoms, or an alkenyl group with 4 or 5 carbon atoms is preferred. When the ring structure to which $R^{iii1}$ is bonded is a saturated ring structure, such as cyclohexane, pyran, or dioxane, a linear alkyl group with 1 to 5 carbon atoms, a linear alkoxy group with 1 to 4 carbon atoms, or a linear alkenyl group with 2 to 5 carbon atoms is preferred.

To stabilize a nematic phase, in $R^{iii1}$, the total number of carbon atoms and, if present, oxygen atoms is preferably 5 or less, and a straight chain is preferred.

From the perspective of solubility, $R^{iii1}$ preferably denotes a linear alkyl group with 2 to 8 carbon atoms.

In the general formula (iii), $A^{iii1}$, $A^{iii2}$, and $A^{iii3}$ each independently denote a group selected from the group consisting of the groups (a), (b), (c), and (d):
- (a) a 1,4-cyclohexylene group (one —$CH_2$— or two or more nonadjacent —$CH_2$— groups in this group are optionally substituted with —O— and/or —S—),
- (b) a 1,4-phenylene group (one —CH= or two or more nonadjacent —CH= groups in this group are optionally substituted with —N=),
- (c) a naphthalene-2,6-diyl group, a 1,2,3,4-tetrahydronaphthalene-2,6-diyl group, or a decahydronaphthalene-2,6-diyl group (one —CH= or two or more nonadjacent —CH= groups in the naphthalene-2,6-diyl group or the 1,2,3,4-tetrahydronaphthalene-2,6-diyl group are optionally substituted with —N=), and
- (d) a thiophene-2,5-diyl group, a benzothiophene-2,5-diyl group, a benzothiophene-2,6-diyl group, a dibenzothiophene-3,7-diyl group, a dibenzothiophene-2,6-diyl group, a thieno[3,2-b]thiophene-2,5-diyl group (one —CH= or two or more nonadjacent —CH= groups in this group are optionally substituted with —N=).

One or two or more hydrogen atoms in $A^{iii1}$, $A^{iii2}$, and $A^{iii3}$ are each independently optionally substituted with a substituent $S^{iii1}$.

The substituent $S^{iii1}$ denotes any one of a halogen atom, a cyano group, and an alkyl group with 1 to 6 carbon atoms.

The halogen atom may be a fluorine atom, a chlorine atom, a bromine atom, or an iodine atom.

One or two or more —$CH_2$— groups in the alkyl group are each independently optionally substituted with —O—, —S—, —CO—, and/or —CS—.

One or two or more hydrogen atoms in the alkyl group are each independently optionally substituted with a halogen atom.

The halogen atom may be a fluorine atom, a chlorine atom, a bromine atom, or an iodine atom.

When the alkyl group is substituted with a predetermined group, however, oxygen atoms are not directly bonded to each other.

From the perspective of the stability of the compound, sulfur atoms are preferably not directly bonded to each other, and/or an oxygen atom and a sulfur atom are preferably not directly bonded to each other.

At least one $A^{iii1}$, $A^{iii2}$, or $A^{iii3}$ is preferably substituted with at least one substituent $S^{iii1}$.

$A^{iii2}$ is preferably substituted with at least one substituent $S^{iii1}$.

A plurality of substituents $S^{iii1}$, if present, may be the same or different.

From the perspective of solubility, the substitution position of the substituent $S^{iii1}$ in $A^{iii2}$ is preferably represented by the formula ($A^{iii2}$-SP-1):

[Chem. 124]

($A^{iii2}$-SP-1)

In the formula ($A^{iii2}$-SP-1), a white dot represents a bonding arm to $A^{iii1}$, and a black dot represents a bonding arm to $A^{iii3}$.

More specifically, $A^{iii1}$ preferably denotes any one of the formulae ($A^{iii1}$-1) and ($A^{iii1}$-2):

[Chem. 125]

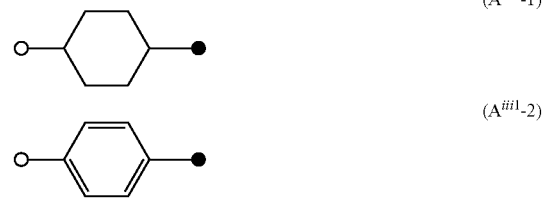

($A^{iii1}$-1)

($A^{iii1}$-2)

In the formulae ($A^{iii1}$-1) and ($A^{iii1}$-2), a white dot represents a bonding arm to $R^{iii1}$ or $A^{iii1}$, and a black dot represents a bonding arm to $A^{iii1}$ or $A^{iii2}$.

More specifically, $A^{iii2}$ preferably denotes any one of the formulae ($A^{iii2}$-1) to ($A^{iii2}$-3):

[Chem. 126]

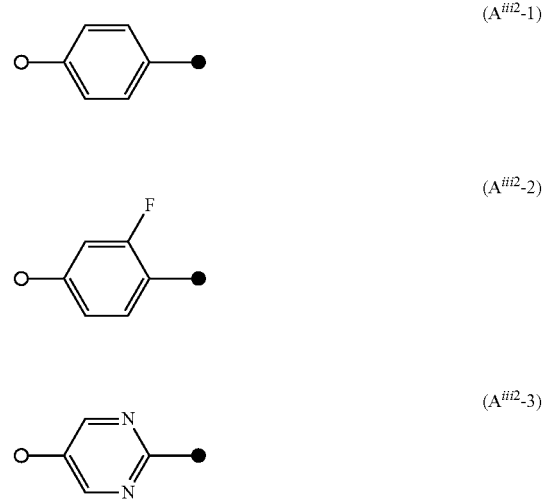

($A^{iii2}$-1)

($A^{iii2}$-2)

($A^{iii2}$-3)

In the formulae ($A^{iii2}$-1) to ($A^{iii2}$-3), a white dot represents a bonding arm to $A^{iii1}$, and a black dot represents a bonding arm to $A^{iii3}$.

More specifically, $A^{iii3}$ preferably denotes any one of the formulae ($A^{iii3}$-1) and ($A^{iii3}$-2):

[Chem. 127]

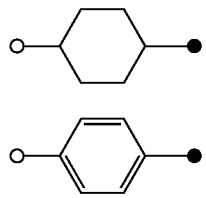

($A^{iii3}$-1)

($A^{iii3}$-2)

In the formulae ($A^{iii3}$-1) and ($A^{iii3}$-2), a white dot represents a bonding arm to $A^{iii2}$, and a black dot represents a bonding arm to a cyano group (—CN).

In the general formula (iii), niii1 denotes an integer of 1 or 2.

In the general formula (iii), a plurality of $A^{iii1}$, if present, may be the same or different.

Compounds represented by the general formula (iii) are preferably compounds represented by the general formula (iii-1):

[Chem. 128]

(iii-1)

In the general formula (iii-1), $R^{iii1}$, $A^{iii1}$, $A^{iii2}$, and $A^{iii3}$ have the same meaning as $R^{iii1}$, $A^{iii1}$, $A^{iii2}$, and $A^{iii3}$, respectively, in the general formula (iii).

Compounds represented by the general formula (iii-1) are preferably compounds represented by the general formulae (iii-1-1) to (iii-1-3):

[Chem. 129]

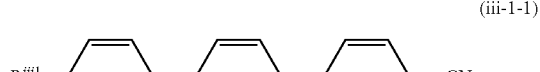

(iii-1-1)

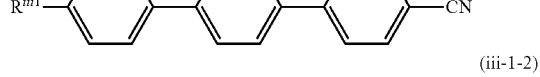

(iii-1-2)

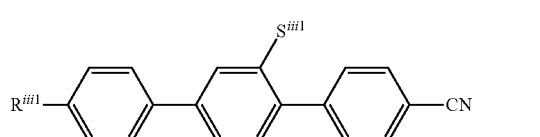

(iii-1-3)

In the general formula (iii-1-1) to (iii-1-3), $R^{iii1}$ and $S^{iii1}$ each independently have the same meaning as $R^{iii1}$ and $S^{iii1}$, respectively in the general formula (iii).

Specific examples of compounds represented by the general formula (iii-1-1) include the compounds represented by the structural formulae (iii-1-1.1) to (iii-1-1.3):

[Chem. 130]

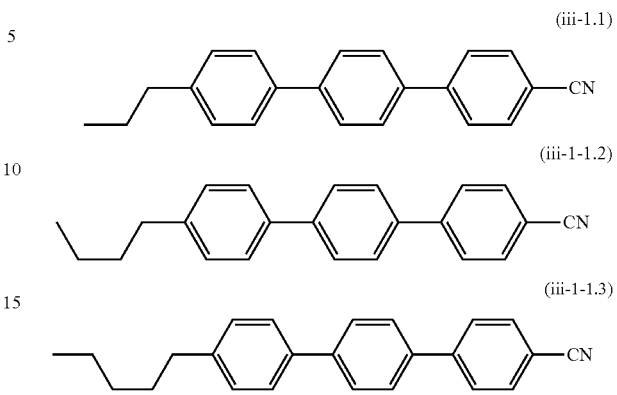

(iii-1.1)

(iii-1-1.2)

(iii-1-1.3)

Specific examples of compounds represented by the general formula (iii-1-2) include the compounds represented by the structural formulae (iii-1-2.1) to (iii-1-2.3):

[Chem. 131]

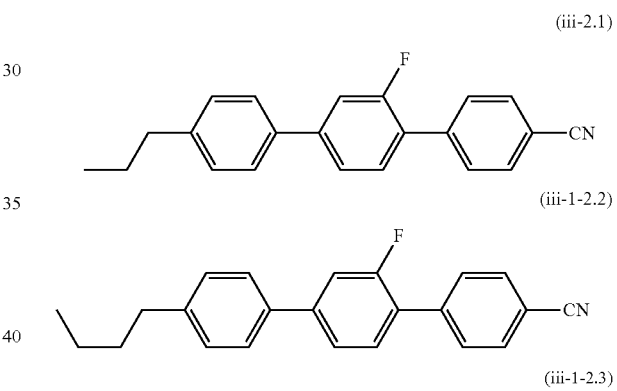

(iii-2.1)

(iii-1-2.2)

(iii-1-2.3)

Specific examples of compounds represented by the general formula (iii-1-3) include the compounds represented by the structural formulae (iii-1-3.1) to (iii-1-3.3):

[Chem. 132]

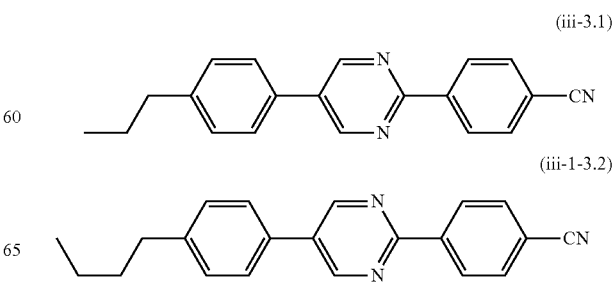

(iii-3.1)

(iii-1-3.2)

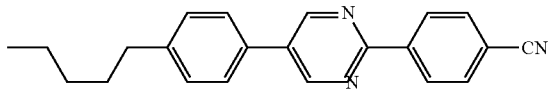

(iii-1-3.3)

The types of compounds represented by the following formulae used for liquid crystal compositions are one or two or more types, preferably one to five types, preferably one to four types, preferably one to three types, preferably one or two types, or preferably one type: the general formula (iii), the general formula (iii-1), the general formulae (iii-1-1) to (iii-1-3), the structural formulae (iii-1-1.1) to (iii-1-1.3), the structural formulae (iii-1-2.1) to (iii-1-2.3), or the structural formulae (iii-1-3.1) to (iii-1-3.3).

The lower limit of the total amount of compounds represented by the following formulae per 100% by mass of a liquid crystal composition is preferably 1% by mass or more, preferably 2% by mass or more, or preferably 3% by mass or more: the general formula (iii), the general formula (iii-1), the general formulae (iii-1-1) to (iii-1-3), the structural formulae (iii-1-1.1) to (iii-1-1.3), the structural formulae (iii-1-2.1) to (iii-1-2.3), or the structural formulae (iii-1-3.1) to (iii-1-3.3).

The upper limit of the total amount of compounds represented by the following formulae per 100% by mass of a liquid crystal composition is preferably 20% by mass or less, preferably 15% by mass or less, or preferably 10% by mass or less: the general formula (iii), the general formula (iii-1), the general formulae (iii-1-1) to (iii-1-3), the structural formulae (iii-1-1.1) to (iii-1-1.3), the structural formulae (iii-1-2.1) to (iii-1-2.3), or the structural formulae (iii-1-3.1) to (iii-1-3.3).

From the perspective of solubility and/or $V_{th}$, the total amount of compounds represented by the following formulae per 100% by mass of a liquid crystal composition preferably ranges from 1% to 15% by mass, preferably 2% to 15% by mass, or preferably 3% to 20% by mass: the general formula (iii), the general formula (iii-1), the general formulae (iii-1-1) to (iii-1-3), the structural formulae (iii-1-1.1) to (iii-1-1.3), the structural formulae (iii-1-2.1) to (iii-1-2.3), or the structural formulae (iii-1-3.1) to (iii-1-3.3).

The compounds represented by the general formula (iii) (including subordinate concepts) can be synthesized by a known synthesis method.

From the perspective of Vth, Δn, and/or $\delta\varepsilon_r$, a liquid crystal composition according to the present invention may further contain one or two or more compounds represented by the general formula (iv) having an alkynyl group ($R^{iv1}$—C≡C—) and a cyano group (—CN).

[Chem. 133]

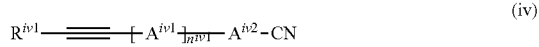
(iv)

In the general formula (iv), $R^{iv1}$ denotes an alkyl group with 1 to 20 carbon atoms.

The alkyl group with 1 to 20 carbon atoms is a linear, branched, or cyclic alkyl group, preferably a linear alkyl group.

The number of carbon atoms in the alkyl group preferably ranges from 2 to 10, preferably 2 to 6.

One or two or more —CH₂— groups in the alkyl group are each independently optionally substituted with —O—, —S—, —CO—, and/or —CS—.

One or two or more —CH₂—CH₂— groups in the alkyl group are optionally substituted with —CH═CH—, —COO—, —OCO—, and/or —C≡C—.

One or two or more hydrogen atoms in the alkyl group are each independently optionally substituted with a halogen atom.

The halogen atom may be a fluorine atom, a chlorine atom, a bromine atom, or an iodine atom.

When the alkyl group is substituted with a predetermined group, however, oxygen atoms are not directly bonded to each other.

From the perspective of the stability of the compound, sulfur atoms are preferably not directly bonded to each other, and/or an oxygen atom and a sulfur atom are preferably not directly bonded to each other.

For example, $R^{iv1}$ can denote an alkoxy group with 1 to 19 carbon atoms by substituting one —CH₂— in the alkyl group with —O—.

The alkoxy group is a linear, branched, or cyclic alkoxy group, preferably a linear alkoxy group.

The number of carbon atoms in the alkoxy group preferably ranges from 2 to 10, preferably 2 to 6.

$R^{iv1}$ can denote a thioalkoxy group (alkylsulfanyl group, alkylthio group) with 1 to 19 carbon atoms by substituting one —CH₂— in the alkyl group with —S—.

The thioalkoxy group is a linear, branched, or cyclic thioalkoxy group, preferably a linear thioalkoxy group.

The number of carbon atoms in the thioalkoxy group preferably ranges from 2 to 10, preferably 2 to 6.

$R^{iv1}$ can denote an alkenyl group with 2 to 20 carbon atoms by substituting one or two or more —CH₂—CH₂— groups in the alkyl group with —CH═CH—.

The alkenyl group is a linear, branched, or cyclic alkenyl group, preferably a linear alkenyl group.

The number of carbon atoms in the alkenyl group preferably ranges from 2 to 10, preferably 2 to 6.

$R^{iv1}$ can denote an alkynyl group with 2 to 20 carbon atoms by substituting one or two or more —CH₂—CH₂— groups in the alkyl group with —C≡C—.

The alkynyl group is a linear, branched, or cyclic alkynyl group, preferably a linear alkynyl group.

The number of carbon atoms in the alkynyl group preferably ranges from 2 to 10, preferably 2 to 6.

$R^{iv1}$ can denote an alkenyloxy group with 2 to 19 carbon atoms by substituting one —CH₂— in the alkyl group with —O— and substituting one or two or more —CH₂—CH₂— groups with —CH═CH—.

The alkenyloxy group is a linear, branched, or cyclic alkenyloxy group, preferably a linear alkenyloxy group.

The number of carbon atoms in the alkenyloxy group preferably ranges from 2 to 10, preferably 2 to 6.

$R^{iv1}$ can denote a halogenated alkyl group with 1 to 20 carbon atoms by substituting one or two or more hydrogen atoms in the alkyl group with a halogen atom.

The halogenated alkyl group is a linear, branched, or cyclic halogenated alkyl group, preferably a linear halogenated alkyl group.

The number of carbon atoms in the halogenated alkyl group preferably ranges from 2 to 10, preferably 2 to 6.

$R^{iv1}$ can denote a halogenated alkoxy group with 1 to 19 carbon atoms by substituting one —CH₂— in the alkyl group with —O— and substituting one or two or more hydrogen atoms in the alkyl group with a halogen atom.

The halogenated alkoxy group is a linear, branched, or cyclic alkoxy group, preferably a linear alkoxy group.

The number of carbon atoms in the halogenated alkoxy group preferably ranges from 2 to 10, preferably 2 to 6.

Specific examples of the alkyl group with 1 to 20 carbon atoms (including substituted ones) in $R^{iv1}$ include the groups represented by the formulae ($R^{iv1}$-1) to ($R^{iv1}$-36):

[Chem. 134]

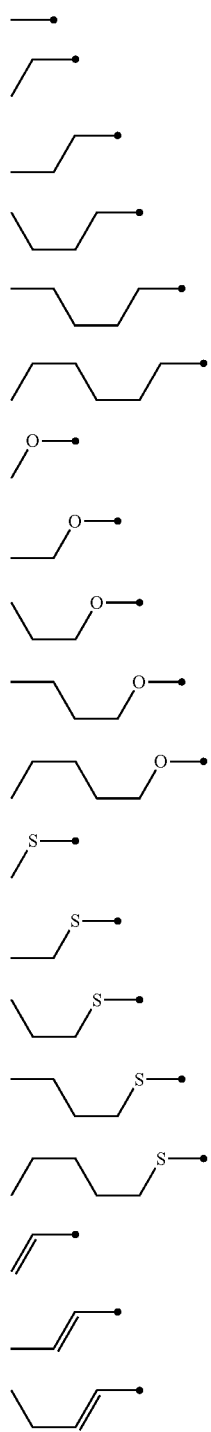
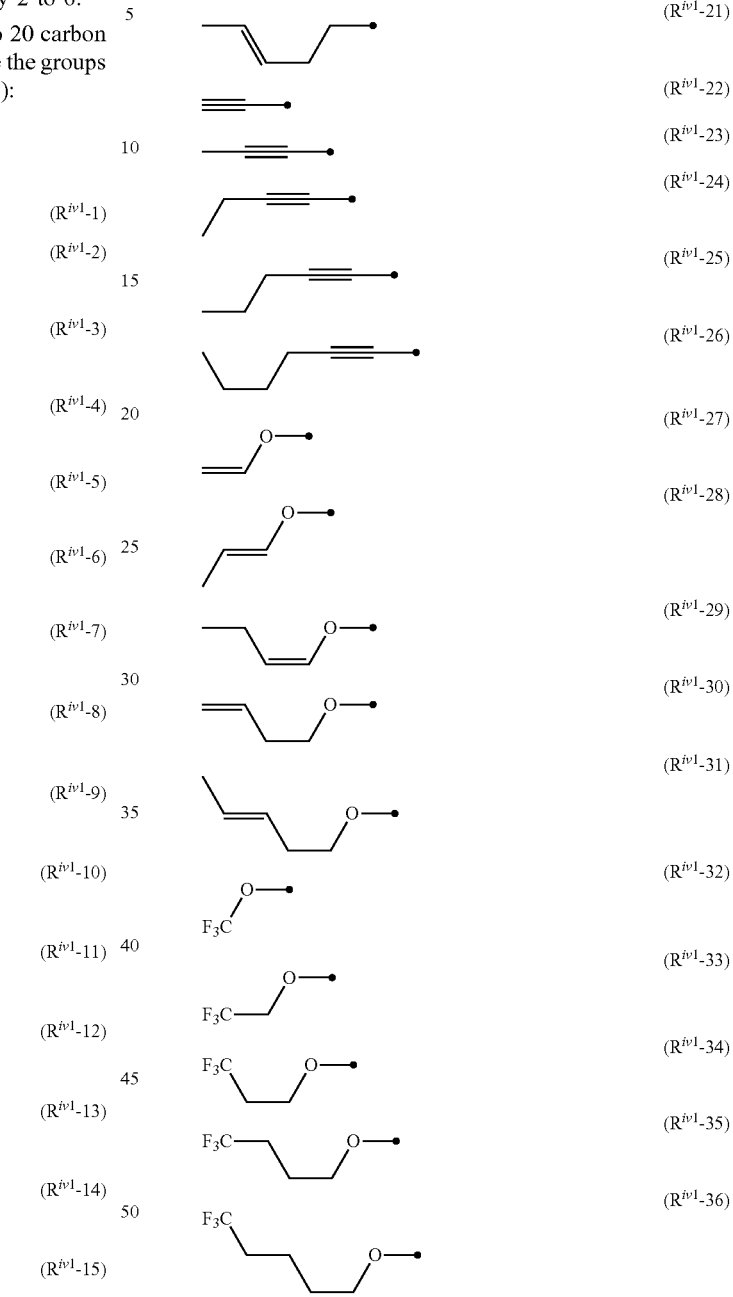

In the formulae ($R^{iv1}$-1) to ($R^{iv1}$-36), a black dot represents a bonding arm to —C≡C—.

From the perspective of solubility, $R^{iv1}$ preferably denotes a linear alkyl group with 2 to 8 carbon atoms.

In the general formula (iv), $A^{iv1}$ and $A^{iv2}$ each independently denote a group selected from the group consisting of the groups (a), (b), (c), and (d):
  (a) a 1,4-cyclohexylene group (one —CH$_2$— or two or more nonadjacent —CH$_2$— groups in this group are optionally substituted with —O— and/or —S—),
  (b) a 1,4-phenylene group (one —CH= or two or more nonadjacent —CH= groups in this group are optionally substituted with —N=), (c) a naphthalene-2,6-diyl group, a 1,2,3,4-tetrahydronaphthalene-2,6-diyl group, or a decahydronaphthalene-2,6-diyl group (one —CH= or two or more nonadjacent —CH= groups in the naphthalene-2,6-diyl group or the 1,2,3,4-tetrahydronaphthalene-2,6-diyl group are optionally substituted with —N=), and (d) a thiophene-2,5-diyl group, a benzothiophene-2,5-diyl group, a benzothiophene-2,6-diyl group, a dibenzothiophene-3,7-diyl group, a dibenzothiophene-2,6-diyl group, a thieno[3,2-b]thiophene-2,5-diyl group (one —CH= or two or more nonadjacent —CH= groups in this group are optionally substituted with —N=).

One or two or more hydrogen atoms in $A^{iv1}$ and $A^{iv2}$ are each independently optionally substituted with a substituent $S^{iv1}$.

The substituent $S^{iv1}$ denotes any one of a halogen atom, a cyano group, and an alkyl group with 1 to 6 carbon atoms. The halogen atom may be a fluorine atom, a chlorine atom, a bromine atom, or an iodine atom.

One or two or more —$CH_2$— groups in the alkyl group are each independently optionally substituted with —O—, —S—, —CO—, and/or —CS—.

One or two or more hydrogen atoms in the alkyl group are each independently optionally substituted with a halogen atom.

The halogen atom may be a fluorine atom, a chlorine atom, a bromine atom, or an iodine atom.

When the alkyl group is substituted with a predetermined group, however, oxygen atoms are not directly bonded to each other.

From the perspective of the stability of the compound, sulfur atoms are preferably not directly bonded to each other, and/or an oxygen atom and a sulfur atom are preferably not directly bonded to each other.

At least one $A^{iv1}$ is preferably substituted with a substituent $S^{iv1}$.

A plurality of substituents $S^{iv1}$, if present, may be the same or different.

From the perspective of solubility, the substitution position of the substituent $S^{iv1}$ in $A^{iv1}$ is preferably represented by the formula ($A^{iv1}$-SP-1):

[Chem. 135]

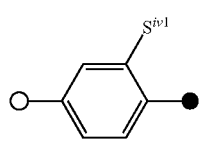

($A^{iv1}$-SP-1)

In the formula ($A^{iv1}$-SP-1), a white dot represents a bonding arm to —C≡C— or $A^{iv1}$, and a black dot represents a bonding arm to $A^{iv:}$ or $A^{iv2}$.

The substitution position of the substituent $S^{iv1}$ in $A^{iv2}$ is preferably any one of the formulae ($A^{iv2}$-SP-1) and ($A^{iv2}$-SP-2):

[Chem. 136]

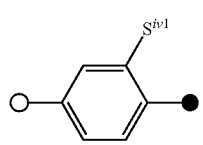

($A^{iv2}$-SP-1)

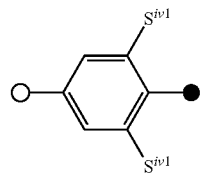

($A^{iv2}$-SP-2)

In the formulae ($A^{iv2}$-SP-1) and ($A^{iv2}$-SP-2), a white dot represents a bonding arm to $A^{iv1}$, and a black dot represents a bonding arm to a cyano group (—CN).

More specifically, $A^{iv1}$ preferably denotes any one of the formulae ($A^{iv1}$-1) to ($A^{iv1}$-3):

[Chem. 137]

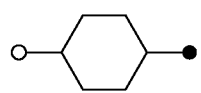

($A^{iv1}$-1)

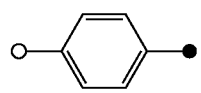

($A^{iv1}$-2)

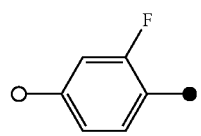

($A^{iv1}$-3)

In the formulae ($A^{iv1}$-1) to ($A^{iv1}$-3), a white dot represents a bonding arm to —C≡C— or $A^{iv1}$, and a black dot represents a bonding arm to $A^{iv1}$ or $A^{iv2}$.

More specifically, $A^{iv2}$ preferably denotes any one of the formulae ($A^{iv2}$-1) to ($A^{iv2}$-4):

[Chem. 138]

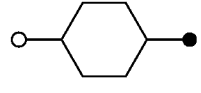

($A^{iv2}$-1)

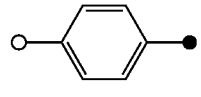

($A^{iv2}$-2)

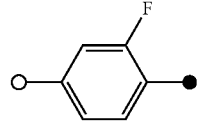

($A^{iv2}$-3)

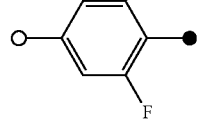

($A^{iv2}$-4)

In the formulae ($A^{iv2}$-1) and ($A^{iv2}$-4), a white dot represents a bonding arm to $A^{iv1}$, and a black dot represents a bonding arm to a cyano group (—CN).

$n^{iv1}$ denotes an integer of 1 or 2.

In the general formula (iv), a plurality of $A^{iv1}$, if present, may be the same or different.

Compounds represented by the general formula (iv) are preferably compounds represented by the general formula (iv-1):

[Chem. 139]

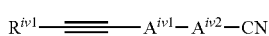
(iv-1)

In the general formula (iv-1), $R^{iv1}$, $A^{iv1}$, and $A^{iv2}$ have the same meaning as $R^{iv1}$, $A^{iv1}$, and $A^{iv2}$, respectively, in the general formula (iv).

Compounds represented by the general formula (iv-1) are preferably compounds represented by the general formulae (iv-1-1) to (iv-1-6):

[Chem. 140]

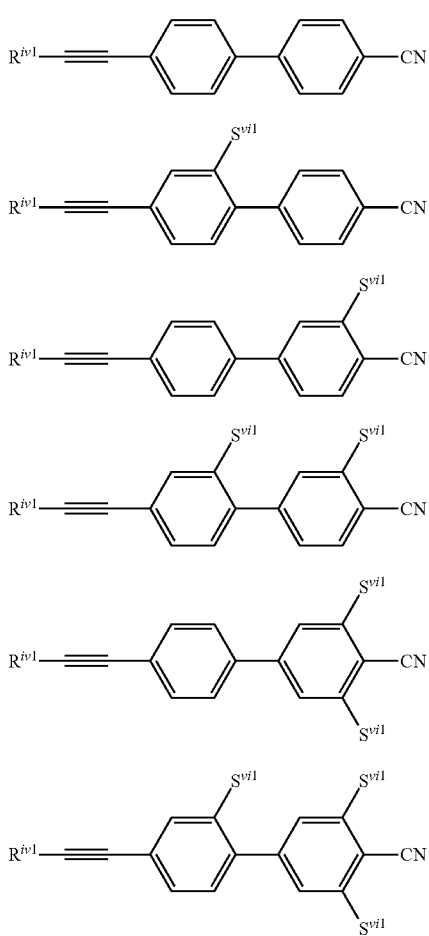

In the general formulae (iv-1-1) to (iv-1-6), $R^{iv1}$ and $S^{iv1}$ each independently have the same meaning as $R^{iv1}$ and $S^{iv1}$, respectively, in the general formula (iv).

Specific examples of compounds represented by the general formula (iv-1-1) include the compounds represented by the structural formulae (iv-1-1.1) and (iv-1-1.2):

[Chem. 141]

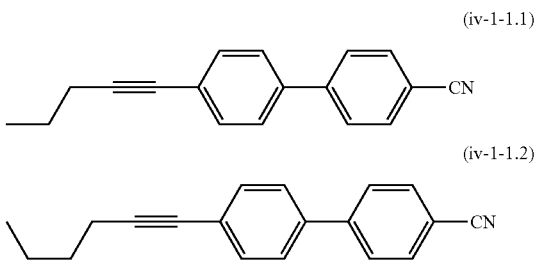

Specific examples of compounds represented by the general formula (iv-1-2) include the compounds represented by the structural formulae (iv-1-2.1) and (iv-1-2.2):

[Chem. 142]

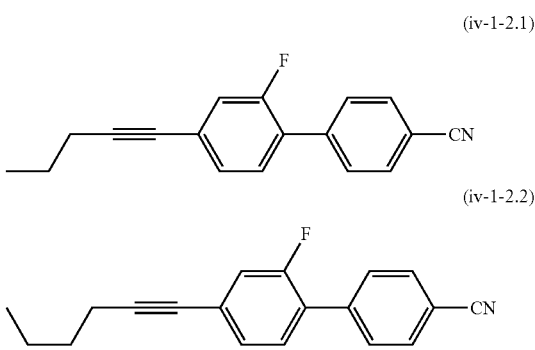

Specific examples of compounds represented by the general formula (iv-1-3) include the compounds represented by the structural formulae (iv-1-3.1) and (iv-1-3.2):

[Chem. 143]

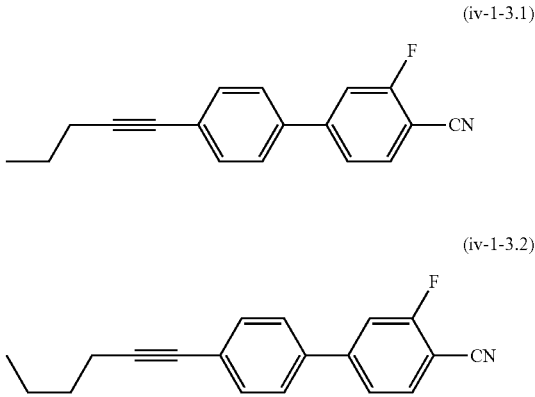

Specific examples of compounds represented by the general formula (iv-1-4) include the compounds represented by the structural formulae (iv-1-4.1) and (iv-1-4.2):

[Chem. 144]

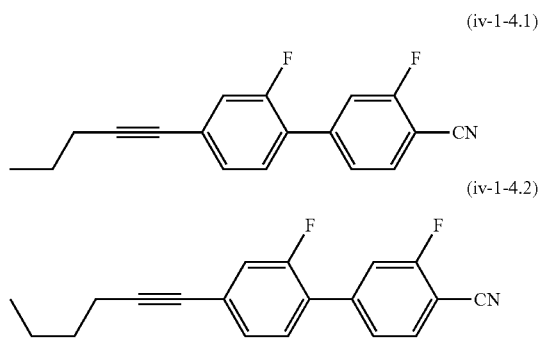

(iv-1-4.1)

(iv-1-4.2)

Specific examples of compounds represented by the general formula (iv-1-5) include the compounds represented by the structural formulae (iv-1-5.1) and (iv-1-5.2):

[Chem. 145]

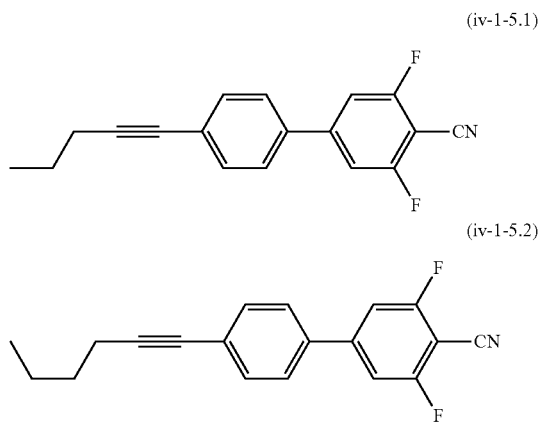

(iv-1-5.1)

(iv-1-5.2)

Specific examples of compounds represented by the general formula (iv-1-6) include the compounds represented by the structural formulae (iv-1-6.1) and (iv-1-6.2):

[Chem. 146]

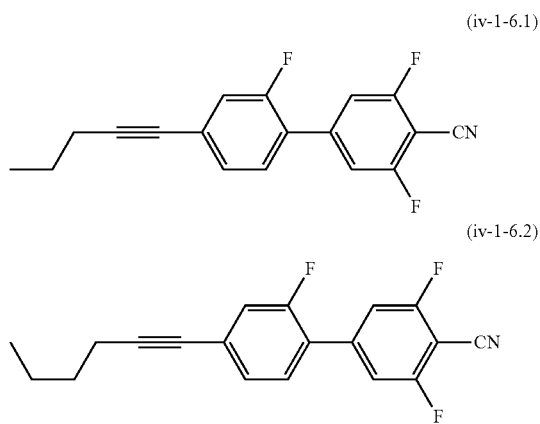

(iv-1-6.1)

(iv-1-6.2)

The types of compounds represented by the following formulae used for liquid crystal compositions are one or two or more types, preferably one to five types, preferably one to four types, preferably one to three types, preferably one or two types, or preferably one type: the general formula (iv), the general formula (iv-1), the general formulae (iv-1-1) to (iv-1-6), the structural formulae (iv-1-1.1) and (iv-1-1.2), the structural formulae (iv-1-2.1) and (iv-1-2.2), the structural formulae (iv-1-3.1) and (iv-1-3.2), the structural formulae (iv-1-4.1) and (iv-1-4.2), the structural formulae (iv-1-5.1) and (iv-1-5.2), or the structural formulae (iv-1-6.1) and (iv-1-6.2).

The lower limit of the total amount of compounds represented by the following formulae per 100% by mass of a liquid crystal composition is preferably 0% by mass or more, preferably 1% by mass or more, or preferably 5% by mass or more: the general formula (iv), the general formula (iv-1), the general formulae (iv-1-1) to (iv-1-6), the structural formulae (iv-1-1.1) and (iv-1-1.2), the structural formulae (iv-1-2.1) and (iv-1-2.2), the structural formulae (iv-1-3.1) and (iv-1-3.2), the structural formulae (iv-1-4.1) and (iv-1-4.2), the structural formulae (iv-1-5.1) and (iv-1-5.2), or the structural formulae (iv-1-6.1) and (iv-1-6.2).

The upper limit of the total amount of compounds represented by the following formulae per 100% by mass of a liquid crystal composition is preferably 35% by mass or less, preferably 30% by mass or less, or preferably 25% by mass or less: the general formula (iv), the general formula (iv-1), the general formulae (iv-1-1) to (iv-1-6), the structural formulae (iv-1-1.1) and (iv-1-1.2), the structural formulae (iv-1-2.1) and (iv-1-2.2), the structural formulae (iv-1-3.1) and (iv-1-3.2), the structural formulae (iv-1-4.1) and (iv-1-4.2), the structural formulae (iv-1-5.1) and (iv-1-5.2), or the structural formulae (iv-1-6.1) and (iv-1-6.2).

From the perspective of compatibility with another liquid crystal compound, the total amount of compounds represented by the following formulae per 100% by mass of a liquid crystal composition preferably ranges from 0% to 35% by mass, preferably 1% to 30% by mass, preferably 5% to 25% by mass: the general formula (iv), the general formula (iv-1), the general formulae (iv-1-1) to (iv-1-6), the structural formulae (iv-1-1.1) and (iv-1-1.2), the structural formulae (iv-1-2.1) and (iv-1-2.2), the structural formulae (iv-1-3.1) and (iv-1-3.2), the structural formulae (iv-1-4.1) and (iv-1-4.2), the structural formulae (iv-1-5.1) and (iv-1-5.2), or the structural formulae (iv-1-6.1) and (iv-1-6.2).

The compounds represented by the general formula (iv) (including subordinate concepts) can be synthesized by a known synthesis method.

From the perspective of Vth, Δn, and/or $\Delta\varepsilon_r$, a liquid crystal composition according to the present invention may further contain one or two or more compounds represented by the general formula (v) having at least one —C≡C— as a linking group and a cyano group (—CN).

[Chem. 147]

(v)

$$R^{v1} + A^{v1} - Z^{v1} \frac{}{\ln v1} A^{v2} - CN$$

In the general formula (v), $R^{v1}$ denotes an alkyl group with 1 to 20 carbon atoms.

The alkyl group is a linear, branched, or cyclic alkyl group, preferably a linear alkyl group.

The number of carbon atoms in the alkyl group preferably ranges from 2 to 10, preferably 2 to 6.

One or two or more —CH$_2$— groups in the alkyl group are each independently optionally substituted with —O—, —S—, —CO—, and/or —CS—.

One or two or more —CH$_2$—CH$_2$— groups in the alkyl group are each independently optionally substituted with —CH=CH—, —CO—O—, —O—CO—, and/or —C≡C—.

One or two or more hydrogen atoms in the alkyl group are each independently optionally substituted with a halogen atom.

The halogen atom may be a fluorine atom, a chlorine atom, a bromine atom, or an iodine atom.

When the alkyl group is substituted with a predetermined group, however, oxygen atoms are not directly bonded to each other.

From the perspective of the stability of the compound, sulfur atoms are preferably not directly bonded to each other, and/or an oxygen atom and a sulfur atom are preferably not directly bonded to each other.

For example, R$^{v1}$ can denote an alkoxy group with 1 to 19 carbon atoms by substituting one —CH$_2$— in the alkyl group with —O—.

The alkoxy group is a linear, branched, or cyclic alkoxy group, preferably a linear alkoxy group.

The number of carbon atoms in the alkoxy group preferably ranges from 2 to 10, preferably 2 to 6.

R$^{v1}$ can denote a thioalkoxy group (alkylsulfanyl group, alkylthio group) with 1 to 19 carbon atoms by substituting one —CH$_2$— in R$^{v1}$ with —S—.

The thioalkoxy group is a linear, branched, or cyclic thioalkoxy group, preferably a linear thioalkoxy group.

The number of carbon atoms in the thioalkoxy group preferably ranges from 2 to 10, preferably 2 to 6.

R$^{v1}$ can denote an alkenyl group with 2 to 20 carbon atoms by substituting one or two or more —CH$_2$—CH$_2$— groups in the alkyl group with —CH=CH—.

The alkenyl group is a linear, branched, or cyclic alkenyl group, preferably a linear alkenyl group.

The number of carbon atoms in the alkenyl group preferably ranges from 2 to 10, preferably 2 to 6.

R$^{v1}$ can denote an alkynyl group with 2 to 20 carbon atoms by substituting one or two or more —CH$_2$—CH$_2$— groups in the alkyl group with —C≡C—.

The alkynyl group is a linear, branched, or cyclic alkynyl group, preferably a linear alkynyl group.

The number of carbon atoms in the alkynyl group preferably ranges from 2 to 10, preferably 2 to 6.

R$^{v1}$ can denote an alkenyloxy group with 2 to 19 carbon atoms by substituting one —CH$_2$— in the alkyl group with —O— and substituting one or two or more —CH$_2$—CH$_2$— groups with —CH=CH—.

The alkenyloxy group is a linear, branched, or cyclic alkenyloxy group, preferably a linear alkenyloxy group.

The number of carbon atoms in the alkenyloxy group preferably ranges from 2 to 10, preferably 2 to 6.

R$^{v1}$ can denote a halogenated alkyl group with 1 to 20 carbon atoms by substituting one or two or more hydrogen atoms in the alkyl group with a halogen atom.

The halogenated alkyl group is a linear, branched, or cyclic halogenated alkyl group, preferably a linear halogenated alkyl group.

The number of carbon atoms in the halogenated alkyl group preferably ranges from 2 to 10, preferably 2 to 6.

R$^{v1}$ can denote a halogenated alkoxy group with 1 to 19 carbon atoms by substituting one —CH$_2$— in the alkyl group with —O— and substituting one or two or more hydrogen atoms in the alkyl group with a halogen atom.

The halogenated alkoxy group is a linear, branched, or cyclic halogenated alkoxy group, preferably a linear halogenated alkoxy group.

The number of carbon atoms in the halogenated alkoxy group preferably ranges from 2 to 10, preferably 2 to 6.

Specific examples of the alkyl group with 1 to 20 carbon atoms (including substituted ones) in R$^{v1}$ include the groups represented by the formulae (R$^{v1}$-1) to (R$^{v1}$-36):

[Chem. 148]

 (R$^{v1}$-1)

 (R$^{v1}$-2)

 (R$^{v1}$-3)

 (R$^{v1}$-4)

 (R$^{v1}$-5)

 (R$^{v1}$-6)

 (R$^{v1}$-7)

 (R$^{v1}$-8)

 (R$^{v1}$-9)

 (R$^{v1}$-10)

 (R$^{v1}$-11)

 (R$^{v1}$-12)

 (R$^{v1}$-13)

 (R$^{v1}$-14)

 (R$^{v1}$-15)

 (R$^{v1}$-16)

 (R$^{v1}$-17)

 (R$^{v1}$-18)

 (R$^{v1}$-19)

-continued

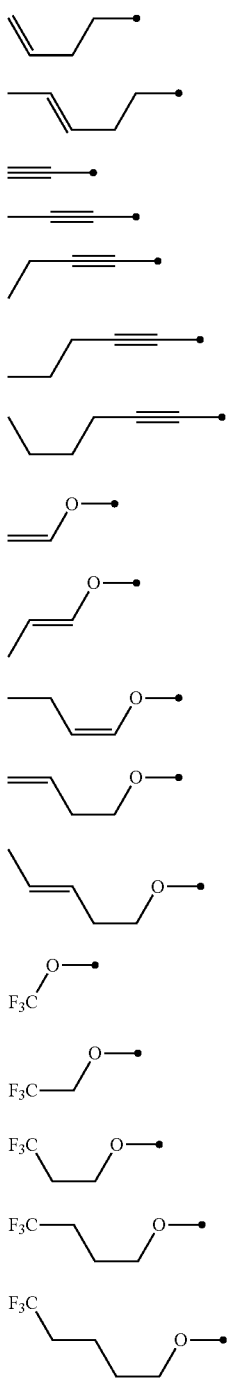

(R$^{v1}$-20)
(R$^{v1}$-21)
(R$^{v1}$-22)
(R$^{v1}$-23)
(R$^{v1}$-24)
(R$^{v1}$-25)
(R$^{v1}$-26)
(R$^{v1}$-27)
(R$^{v1}$-28)
(R$^{v1}$-29)
(R$^{v1}$-30)
(R$^{v1}$-31)
(R$^{v1}$-32)
(R$^{v1}$-33)
(R$^{v1}$-34)
(R$^{v1}$-35)
(R$^{v1}$-36)

In the formulae (R$^{v1}$-1) to (R$^{v1}$-36), a black dot represents a bonding arm to A$^{v1}$.

When the ring structure to which R$^{v1}$ is bonded is a phenyl group (aromatic), a linear alkyl group with 1 to 5 carbon atoms, a linear alkoxy group with 1 to 4 carbon atoms, or an alkenyl group with 4 or 5 carbon atoms is preferred. When the ring structure to which R$^{v1}$ is bonded is a saturated ring structure, such as cyclohexane, pyran, or dioxane, a linear alkyl group with 1 to 5 carbon atoms, a linear alkoxy group with 1 to 4 carbon atoms, or a linear alkenyl group with 2 to 5 carbon atoms is preferred.

To stabilize a nematic phase, in R$^{v1}$, the total number of carbon atoms and, if present, oxygen atoms is preferably 5 or less, and a straight chain is preferred.

From the perspective of solubility, R$^{v1}$ preferably denotes a linear alkyl group with 2 to 8 carbon atoms.

In the general formula (v), A$^{v1}$ and A$^{v2}$ each independently denote a group selected from the group consisting of the groups (a), (b), (c), and (d):

(a) a 1,4-cyclohexylene group (one —CH$_2$— or two or more nonadjacent —CH$_2$— groups in this group are optionally substituted with —O— and/or —S—), (b) a 1,4-phenylene group (one —CH═ or two or more nonadjacent —CH═ groups in this group are optionally substituted with —N═), (c) a naphthalene-2,6-diyl group, a 1,2,3,4-tetrahydronaphthalene-2,6-diyl group, or a decahydronaphthalene-2,6-diyl group (one —CH═ or two or more nonadjacent —CH═ groups in the naphthalene-2,6-diyl group or the 1,2,3,4-tetrahydronaphthalene-2,6-diyl group are optionally substituted with —N═), and (d) a thiophene-2,5-diyl group, a benzothiophene-2,5-diyl group, a benzothiophene-2,6-diyl group, a dibenzothiophene-3,7-diyl group, a dibenzothiophene-2,6-diyl group, a thieno[3,2-b]thiophene-2,5-diyl group (one —CH═ or two or more nonadjacent —CH═ groups in this group are optionally substituted with —N═).

One or two or more hydrogen atoms in A$^{v1}$ and A$^{v2}$ are each independently optionally substituted with a substituent S$^{v1}$.

The substituent S$^{v1}$ denotes any one of a halogen atom, a cyano group, and an alkyl group with 1 to 6 carbon atoms.

The halogen atom may be a fluorine atom, a chlorine atom, a bromine atom, or an iodine atom.

One or two or more —CH$_2$— groups in the alkyl group are each independently optionally substituted with —O—, —S—, —CO—, and/or —CS—.

One or two or more hydrogen atoms in the alkyl group are each independently optionally substituted with a halogen atom.

The halogen atom may be a fluorine atom, a chlorine atom, a bromine atom, or an iodine atom.

When an alkyl group with 1 to 6 carbon atoms is substituted with a predetermined group, oxygen atoms are not directly bonded to each other.

From the perspective of the stability of the compound, sulfur atoms are preferably not directly bonded to each other, and/or an oxygen atom and a sulfur atom are preferably not directly bonded to each other.

At least one A$^{v1}$ or A$^{v2}$ is preferably substituted with at least one substituent S$^{v1}$.

A plurality of substituents S$^{v1}$, if present, may be the same or different.

From the perspective of solubility, the substitution position of the substituent S$^{v1}$ in A$^{v1}$ is preferably represented by the formula (A$^{v1}$-SP-1):

[Chem. 149]

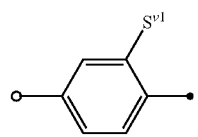

(A$^{v1}$-SP-1)

In the formula (A$^{v1}$-SP-1), a white dot represents a bonding arm to R$^{v1}$ or Z$^{v1}$, and a black dot represents a bonding arm to Z$^{v1}$.

The substitution position of the substituent S$^{v1}$ in A$^{v2}$ is preferably any one of the formulae (A$^{v2}$-SP-1) and (A$^{v2}$-SP-2):

[Chem. 150]

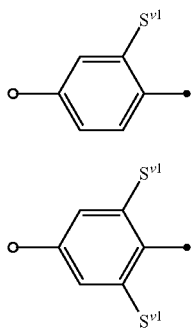

(A$^{v2}$-SP-1)

(A$^{v2}$-SP-2)

In the formulae (A$^{v2}$-SP-1) and (A$^{v2}$-SP-2), a white dot represents a bonding arm to Z$^{v1}$, and a black dot represents a bonding arm to a cyano group (—CN).

More specifically, A$^{v2}$ preferably denotes any one of the formulae (A$^{v1}$-1) to (A$^{v1}$-3):

[Chem. 151]

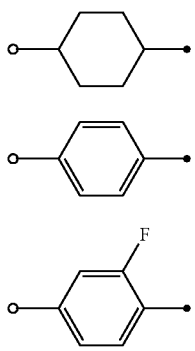

(A$^{v1}$-1)

(A$^{v1}$-2)

(A$^{v1}$-3)

In the formulae (A$^{v1}$-1) to (A$^{v1}$-3), a white dot represents a bonding arm to R$^{v1}$ or Z$^{v1}$, and a black dot represents a bonding arm to Z$^{v1}$.

More specifically, A$^{v2}$ preferably denotes any one of the formulae (A$^{v2}$-1) to (A$^{v2}$-3):

[Chem. 152]

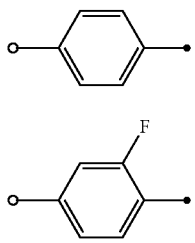

(A$^{v2}$-1)

(A$^{v2}$-2)

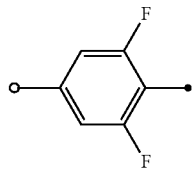

(A$^{v2}$-3)

In the formulae (A$^{v2}$-1) to (A$^{v2}$-3), a white dot represents a bonding arm to Z$^{v1}$, and a black dot represents a bonding arm to a cyano group (—CN).

In the general formula (v), Z$^{v1}$ denotes any one of a single bond, —C≡C—, —CH=CH—, and —CF=CF—.

At least one Z$^{v1}$ denotes —C≡C—.

In the general formula (v), n$^{v1}$ denotes an integer of 1 or 2.

In the general formula (v), a plurality of A$^{v1}$ and Z$^{v1}$, if present, may be the same or different.

Compounds represented by the general formula (v) are preferably compounds represented by the general formulae (v-1) and (v-2):

[Chem. 153]

R$^{v1}$—A$^{v1}$—≡≡≡—A$^{v1-2}$—A$^{v2}$—CN (v-1)

R$^{v1}$—A$^{v1}$—A$^{v1-2}$—≡≡≡—A$^{v2}$—CN (v-2)

In the general formulae (v-1) and (v-2), R$^{v1}$, A$^{v1}$, and A$^{v2}$ have the same meaning as R$^{v1}$, A$^{v1}$, and A$^{v2}$, respectively, in the general formula (v).

A$^{v1-2}$ in the general formulae (v-1) and (v-2) is defined in the same way as A$^{v1}$ in the general formula (v).

Compounds represented by the general formula (v-1) are preferably compounds represented by the general formulae (v-1-1) to (v-1-6):

[Chem. 154]

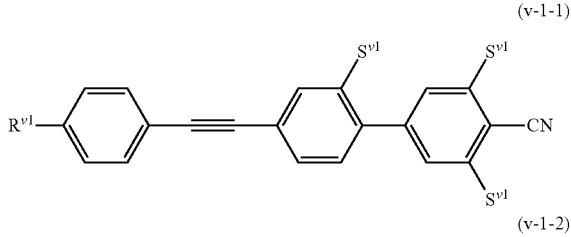

(v-1-1)

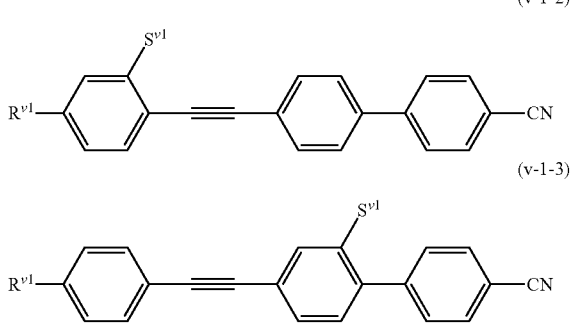

(v-1-2)

(v-1-3)

-continued

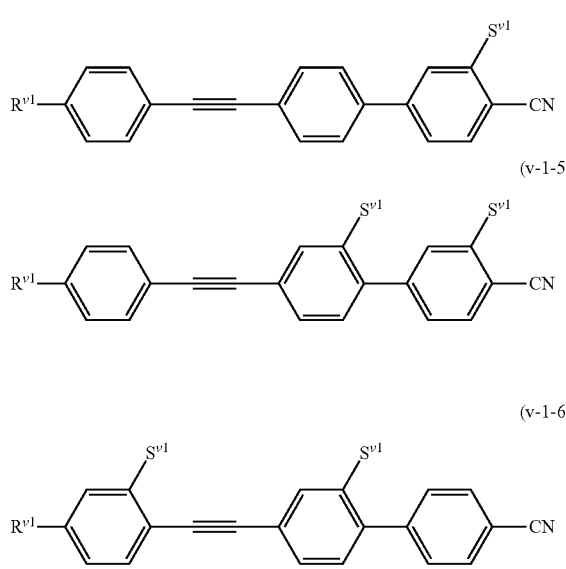

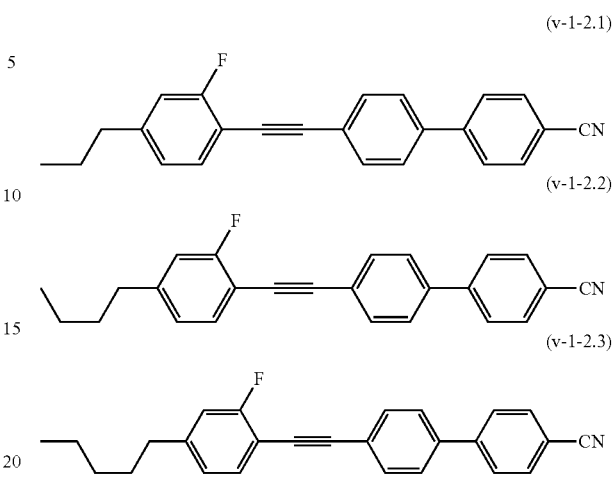

In the general formulae (v-1-1) to (v-1-6), $R^{v1}$ and $S^{v1}$ each independently have the same meaning as $R^{v1}$ and $S^{v1}$, respectively, in the general formula (v).

Specific examples of compounds represented by the general formula (v-1-1) include the compounds represented by the structural formulae (v-1-1.1) to (v-1-1.3):

[Chem. 155]

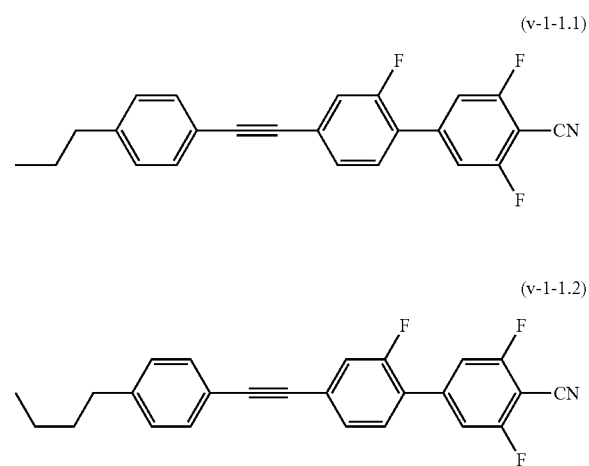

Specific examples of compounds represented by the general formula (v-1-2) include the compounds represented by the structural formulae (v-1-2.1) to (v-1-2.3):

[Chem. 156]

Specific examples of compounds represented by the general formula (v-1-3) include the compounds represented by the structural formulae (v-1-3.1) to (v-1-3.3):

[Chem. 157]

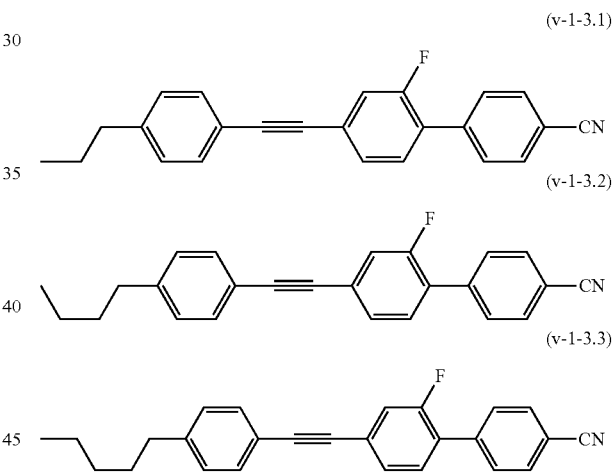

Specific examples of compounds represented by the general formula (v-1-4) include the compounds represented by the structural formulae (v-1-4.1) to (v-1-4.3):

[Chem. 158]

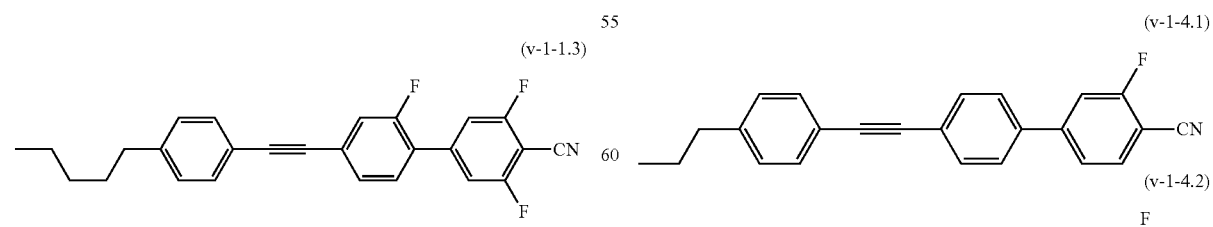

(v-1-4.3)

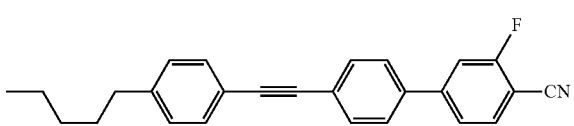

Specific examples of compounds represented by the general formula (v-1-5) include the compounds represented by the structural formulae (v-1-5.1) to (v-1-5.3):

[Chem. 159]

(v-1-5.1)

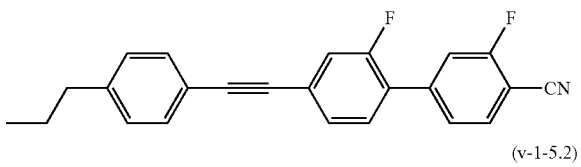

(v-1-5.2)

(v-1-5.3)

Specific examples of compounds represented by the general formula (v-1-6) include the compounds represented by the structural formulae (v-1-6.1) to (v-1-6.3):

[Chem. 160]

(v-1-6.1)

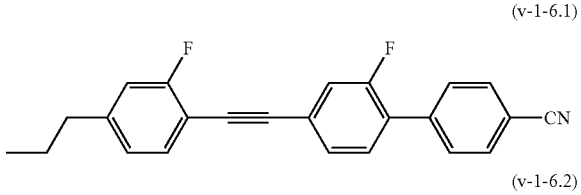

(v-1-6.2)

(v-1-6.3)

Compounds represented by the general formula (v-2) are preferably compounds represented by the general formulae (v-2-1) and (v-2-2):

[Chem. 161]

(v-2-1)

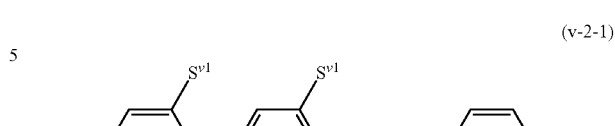

(v-2-2)

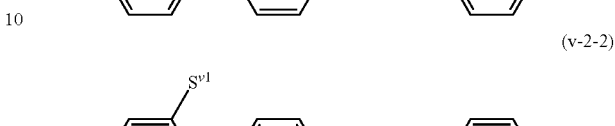

In the general formulae (v-2-1) and (v-2-2), $R^{v1}$ and $S^{v1}$ each independently have the same meaning as $R^{v1}$ and $S^{v1}$, respectively, in the general formula (v).

Specific examples of compounds represented by the general formula (v-2-1) include the compounds represented by the structural formulae (v-2-1.1) to (v-2-1.3):

[Chem. 162]

(v-2-1.1)

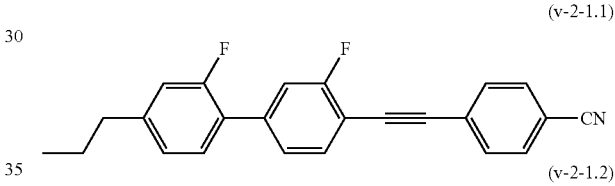

(v-2-1.2)

(v-2-1.3)

Specific examples of compounds represented by the general formula (v-2-2) include the compounds represented by the structural formulae (v-2-2.1) to (v-2-2.3):

[Chem. 163]

(v-2-2.1)

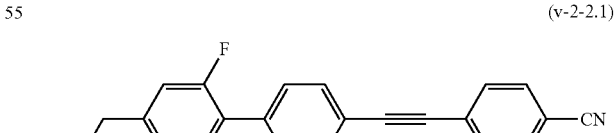

(v-2-2.2)

-continued (v-2-2.3)

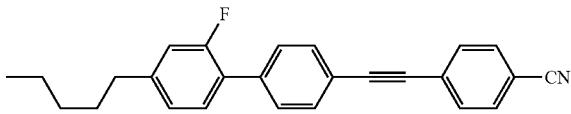

The types of compounds represented by the following formulae used for liquid crystal compositions are one or two or more types, preferably one to five types, preferably one to four types, preferably one to three types, preferably one or two types, or preferably one type: the general formula (v), the general formulae (v-1) and (v-2), the general formulae (v-1-1) to (v-1-6), the general formulae (v-2-1) and (v-2-2), the structural formulae (v-1-1.1) to (v-1-1.3), the structural formulae (v-1-2.1) to (v-1-2.3), the structural formulae (v-1-3.1) to (v-1-3.3), the structural formulae (v-1-4.1) to (v-1-4.3), the structural formulae (v-1-5.1) to (v-1-5.3), the structural formulae (v-1-6.1) to (v-1-6.3), the structural formulae (v-2-1.1) to (v-2-1.3), or the structural formulae (v-2-2.1) to (v-2-2.3).

The lower limit of the total amount of compounds represented by the following formulae per 100% by mass of a liquid crystal composition is preferably 1% by mass or more, preferably 3% by mass or more, or preferably 5% by mass or more: the general formula (v), the general formulae (v-1) and (v-2), the general formulae (v-1-1) to (v-1-6), the general formulae (v-2-1) and (v-2-2), the structural formulae (v-1-1.1) to (v-1-1.3), the structural formulae (v-1-2.1) to (v-1-2.3), the structural formulae (v-1-3.1) to (v-1-3.3), the structural formulae (v-1-4.1) to (v-1-4.3), the structural formulae (v-1-5.1) to (v-1-5.3), the structural formulae (v-1-6.1) to (v-1-6.3), the structural formulae (v-2-1.1) to (v-2-1.3), or the structural formulae (v-2-2.1) to (v-2-2.3).

The upper limit of the total amount of compounds represented by the following formulae per 100% by mass of a liquid crystal composition is preferably 30% by mass or less, preferably 25% by mass or less, or preferably 20% by mass or less: the general formula (v), the general formulae (v-1) and (v-2), the general formulae (v-1-1) to (v-1-6), the general formulae (v-2-1) and (v-2-2), the structural formulae (v-1-1.1) to (v-1-1.3), the structural formulae (v-1-2.1) to (v-1-2.3), the structural formulae (v-1-3.1) to (v-1-3.3), the structural formulae (v-1-4.1) to (v-1-4.3), the structural formulae (v-1-5.1) to (v-1-5.3), the structural formulae (v-1-6.1) to (v-1-6.3), the structural formulae (v-2-1.1) to (v-2-1.3), or the structural formulae (v-2-2.1) to (v-2-2.3).

From the perspective of solubility and/or $V_{th}$, the total amount of compounds represented by the following formulae per 100% by mass of a liquid crystal composition preferably ranges from 1% to 30% by mass, preferably 3% to 25% by mass, or preferably 5% to 20% by mass: the general formula (v), the general formulae (v-1) and (v-2), the general formulae (v-1-1) to (v-1-6), the general formulae (v-2-1) and (v-2-2), the structural formulae (v-1-1.1) to (v-1-1.3), the structural formulae (v-1-2.1) to (v-1-2.3), the structural formulae (v-1-3.1) to (v-1-3.3), the structural formulae (v-1-4.1) to (v-1-4.3), the structural formulae (v-1-5.1) to (v-1-5.3), the structural formulae (v-1-6.1) to (v-1-6.3), the structural formulae (v-2-1.1) to (v-2-1.3), or the structural formulae (v-2-2.1) to (v-2-2.3).

The compounds represented by the general formula (v) (including subordinate concepts) can be synthesized by a known synthesis method.

From the perspective of $\Delta n$ and/or $\Delta \varepsilon_r$, a liquid crystal composition according to the present invention may further contain one or two or more compounds represented by the general formula (vi) having at least one —C≡C— as a linking group.

[Chem. 164]

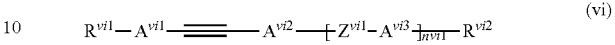

(vi)

In the general formula (vi), $R^{vi1}$ denotes a hydrogen atom or an alkyl group with 1 to 20 carbon atoms.

The alkyl group with 1 to 20 carbon atoms is a linear, branched, or cyclic alkyl group, preferably a linear alkyl group.

The number of carbon atoms in the alkyl group with 1 to 20 carbon atoms preferably ranges from 2 to 10, preferably 2 to 6.

One or two or more —CH$_2$— groups in the alkyl group are each independently optionally substituted with —O—, —S—, —CO—, and/or —CS—.

One or two or more —CH$_2$—CH$_2$— groups in the alkyl group are each independently optionally substituted with —CO—O—, —O—CO—, —CO—S—, —S—CO—, —CO—NH—, —NH—CO—, —CH═CH—, —CF═CF—, and/or —C≡C—.

One or two or more —CH$_2$—CH$_2$—CH$_2$— groups in the alkyl group are each independently optionally substituted with —O—CO—O—.

One or two or more hydrogen atoms in the alkyl group are each independently optionally substituted with a halogen atom.

The halogen atom may be a fluorine atom, a chlorine atom, a bromine atom, or an iodine atom.

When the alkyl group is substituted with a predetermined group, however, oxygen atoms are not directly bonded to each other.

From the perspective of the stability of the compound, sulfur atoms are preferably not directly bonded to each other, and/or an oxygen atom and a sulfur atom are preferably not directly bonded to each other.

For example, $R^{vi1}$ can denote an alkoxy group with 1 to 19 carbon atoms by substituting one —CH$_2$— in the alkyl group with —O—.

The alkoxy group is a linear, branched, or cyclic alkoxy group, preferably a linear alkoxy group.

The number of carbon atoms in the alkoxy group preferably ranges from 2 to 10, preferably 2 to 6.

$R^{vi1}$ can denote a thioalkoxy group (alkylsulfanyl group, alkylthio group) with 1 to 19 carbon atoms by substituting one —CH$_2$— in the alkyl group with —S—.

The thioalkoxy group is a linear, branched, or cyclic thioalkoxy group, preferably a linear thioalkoxy group.

The number of carbon atoms in the thioalkoxy group preferably ranges from 2 to 10, preferably 2 to 6.

$R^{vi1}$ can denote an alkenyl group with 2 to 20 carbon atoms by substituting one or two or more —CH$_2$—CH$_2$— groups in the alkyl group with —CH═CH—.

The alkenyl group is a linear, branched, or cyclic alkenyl group, preferably a linear alkenyl group.

The number of carbon atoms in the alkenyl group preferably ranges from 2 to 10, preferably 2 to 6.

$R^{vi1}$ can denote an alkynyl group with 2 to 20 carbon atoms by substituting one or two or more —CH$_2$—CH$_2$— groups in the alkyl group with —C≡C—.

The alkynyl group is a linear, branched, or cyclic alkynyl group, preferably a linear alkynyl group.

The number of carbon atoms in the alkynyl group preferably ranges from 2 to 10, preferably 2 to 6.

$R^{vi1}$ can denote an alkenyloxy group with 2 to 19 carbon atoms by substituting one —$CH_2$— in the alkyl group with —O— and substituting one or two or more —$CH_2$—$CH_2$— groups with —CH=CH—.

The alkenyloxy group is a linear, branched, or cyclic alkenyloxy group, preferably a linear alkenyloxy group.

The number of carbon atoms in the alkenyloxy group preferably ranges from 2 to 10, preferably 2 to 6.

$R^{vi1}$ can denote a halogenated alkyl group with 1 to 20 carbon atoms by substituting one or two or more hydrogen atoms in the alkyl group with a halogen atom.

The halogenated alkyl group is a linear, branched, or cyclic halogenated alkyl group, preferably a linear halogenated alkyl group.

The number of carbon atoms in the halogenated alkyl group preferably ranges from 2 to 10, preferably 2 to 6.

$R^{vi1}$ can denote a halogenated alkoxy group with 1 to 19 carbon atoms by substituting one —$CH_2$— in the alkyl group with —O— and substituting one or two or more hydrogen atoms in the alkyl group with a halogen atom.

The halogenated alkoxy group is a linear, branched, or cyclic alkoxy group, preferably a linear alkoxy group.

The number of carbon atoms in the halogenated alkoxy group preferably ranges from 2 to 10, preferably 2 to 6.

Specific examples of the alkyl group with 1 to 20 carbon atoms (including substituted ones) in $R^{vi1}$ include the groups represented by the formulae ($R^{vi1}$-1) to ($R^{vi1}$-36):

[Chem. 165]

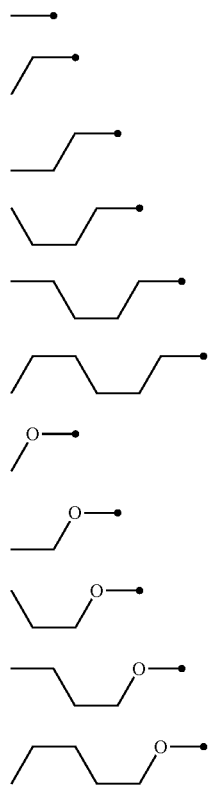

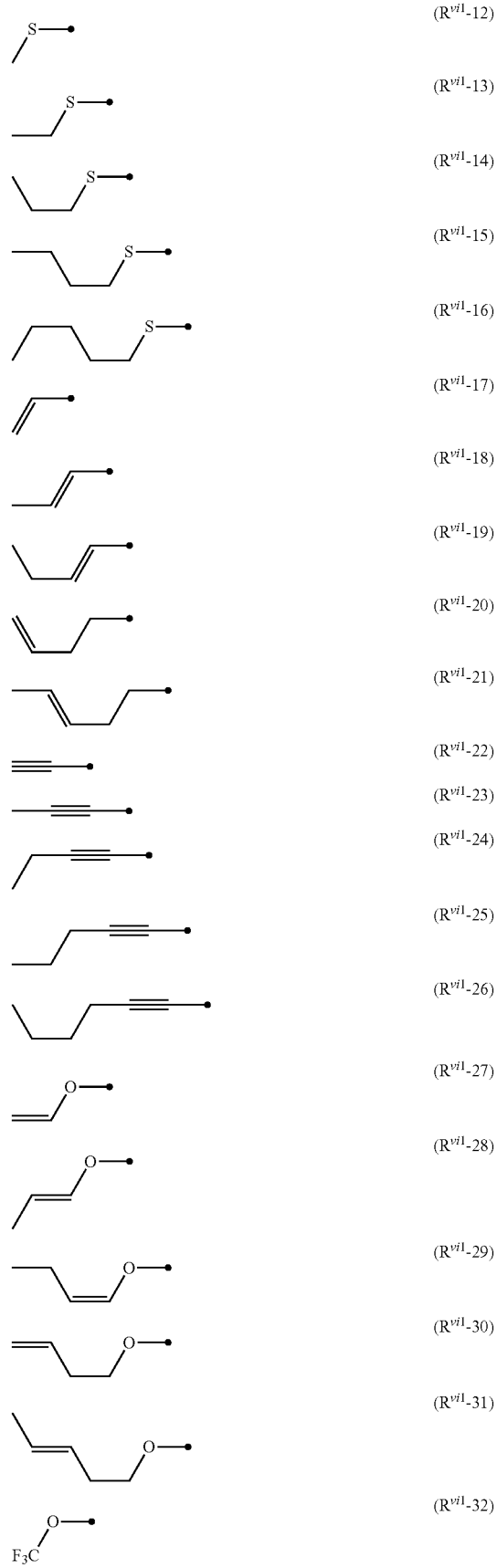

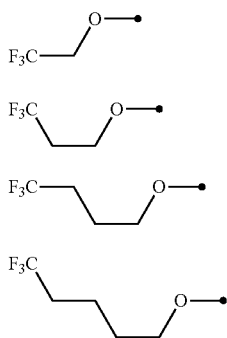

(R$^{vi1}$-33)

(R$^{vi1}$-34)

(R$^{vi1}$-35)

(R$^{vi1}$-36)

In the formulae (R$^{vi1}$-1) to (R$^{vi1}$-36), a black dot represents a bonding arm to A$^{vi1}$.

R$^{vi1}$ is preferably an alkyl group with 1 to 12 carbon atoms when the reliability of the entire liquid crystal composition is regarded as important, and is preferably an alkenyl group with 2 to 8 carbon atoms when the decrease in viscosity of the entire liquid crystal composition is regarded as important.

When the ring structure to which R$^{vi1}$ is bonded is a phenyl group (aromatic), a linear alkyl group with 1 to 5 carbon atoms, a linear alkoxy group with 1 to 4 carbon atoms, or an alkenyl group with 4 or 5 carbon atoms is preferred. When the ring structure to which R$^{vi1}$ is bonded is a saturated ring structure, such as cyclohexane, pyran, or dioxane, a linear alkyl group with 1 to 5 carbon atoms, a linear alkoxy group with 1 to 4 carbon atoms, or a linear alkenyl group with 2 to 5 carbon atoms is preferred.

To stabilize a nematic phase, in R$^{vi1}$, the total number of carbon atoms and, if present, oxygen atoms is preferably 5 or less, and a straight chain is preferred.

From the perspective of solubility, R$^{vi1}$ preferably denotes a linear alkyl group with 2 to 6 carbon atoms.

In the general formula (vi), R$^{vi2}$ denotes any one of a hydrogen atom, a fluorine atom, a chlorine atom, a bromine atom, an iodine atom, a pentafluorosulfanyl group, a nitro group, a cyano group, an isocyano group, an amino group, a hydroxy group, a mercapto group, a methylamino group, a dimethylamino group, a diethylamino group, a diisopropylamino group, a trimethylsilyl group, a dimethylsilyl group, and an alkyl group with 1 to 20 carbon atoms.

The alkyl group with 1 to 20 carbon atoms is a linear, branched, or cyclic alkyl group, preferably a linear alkyl group.

The number of carbon atoms in the alkyl group preferably ranges from 2 to 10, preferably 2 to 6. One or two or more —CH$_2$— groups in the alkyl group are each independently optionally substituted with —O—, —S—, —CO—, and/or —CS—.

One or two or more —CH$_2$—CH$_2$— groups in the alkyl group are each independently optionally substituted with —CO—O—, —O—CO—, —CO—S—, —S—CO—, —CO—NH—, —NH—CO—, —CH=CH—, —CF=CF—, and/or —C≡C—.

One or two or more —CH$_2$—CH$_2$—CH$_2$— groups in the alkyl group are each independently optionally substituted with —O—CO—O—.

One or two or more hydrogen atoms in the alkyl group are each independently optionally substituted with a halogen atom.

The halogen atom may be a fluorine atom, a chlorine atom, a bromine atom, or an iodine atom.

When the alkyl group is substituted with a predetermined group, however, oxygen atoms are not directly bonded to each other.

From the perspective of the stability of the compound, sulfur atoms are preferably not directly bonded to each other, and/or an oxygen atom and a sulfur atom are preferably not directly bonded to each other.

For example, R$^{vi2}$ can denote an alkoxy group with 1 to 19 carbon atoms by substituting one —CH$_2$— in the alkyl group with —O—.

The alkoxy group is a linear, branched, or cyclic alkoxy group, preferably a linear alkoxy group.

The number of carbon atoms in the alkoxy group preferably ranges from 2 to 10, preferably 2 to 6.

R$^{vi2}$ can denote a thioalkoxy group (alkylsulfanyl group, alkylthio group) with 1 to 19 carbon atoms by substituting one —CH$_2$— in the alkyl group with —S—.

The thioalkoxy group is a linear, branched, or cyclic thioalkoxy group, preferably a linear thioalkoxy group.

The number of carbon atoms in the thioalkoxy group preferably ranges from 2 to 10, preferably 2 to 6.

R$^{vi2}$ can denote an alkenyl group with 2 to 20 carbon atoms by substituting one or two or more —CH$_2$—CH$_2$— groups in the alkyl group with —CH=CH—.

The alkenyl group is a linear, branched, or cyclic alkenyl group, preferably a linear alkenyl group.

The number of carbon atoms in the alkenyl group preferably ranges from 2 to 10, preferably 2 to 6.

R$^{vi2}$ can denote an alkynyl group with 2 to 20 carbon atoms by substituting one or two or more —CH$_2$—CH$_2$— groups in the alkyl group with —C≡C—.

The alkynyl group is a linear, branched, or cyclic alkynyl group, preferably a linear alkynyl group.

The number of carbon atoms in the alkynyl group preferably ranges from 2 to 10, preferably 2 to 6.

R$^{vi2}$ can denote an alkenyloxy group with 2 to 19 carbon atoms by substituting one —CH$_2$— in the alkyl group with —O— and substituting one or two or more —CH$_2$—CH$_2$— groups with —CH=CH—.

The alkenyloxy group is a linear, branched, or cyclic alkenyloxy group, preferably a linear alkenyloxy group.

The number of carbon atoms in the alkenyloxy group preferably ranges from 2 to 10, preferably 2 to 6.

R$^{vi2}$ can denote a halogenated alkyl group with 1 to 20 carbon atoms by substituting one or two or more hydrogen atoms in the alkyl group with a halogen atom.

The halogenated alkyl group is a linear, branched, or cyclic halogenated alkyl group, preferably a linear halogenated alkyl group.

The number of carbon atoms in the halogenated alkyl group preferably ranges from 2 to 10, preferably 2 to 6.

R$^{vi2}$ can denote a halogenated alkoxy group with 1 to 19 carbon atoms by substituting one —CH$_2$— in the alkyl group with —O— and substituting one or two or more hydrogen atoms in the alkyl group with a halogen atom.

The halogenated alkoxy group is a linear, branched, or cyclic alkoxy group, preferably a linear alkoxy group.

The number of carbon atoms in the halogenated alkoxy group preferably ranges from 2 to 10, preferably 2 to 6.

Specific examples of the alkyl group with 1 to 20 carbon atoms (including substituted ones) in R$^{vi2}$ include the groups represented by the formulae (R$^{vi2}$-1) to (R$^{vi2}$-36):

[Chem. 166]

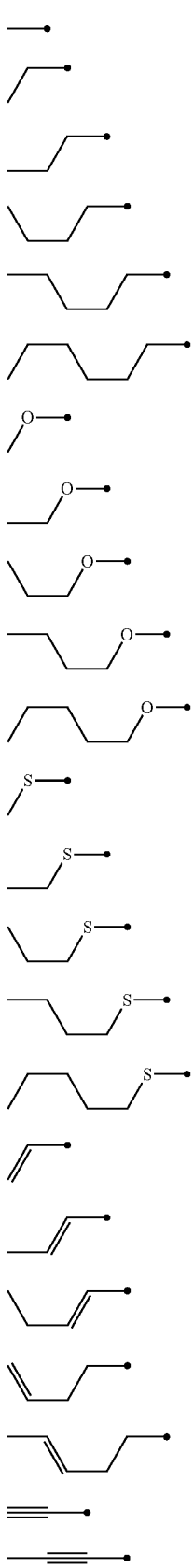
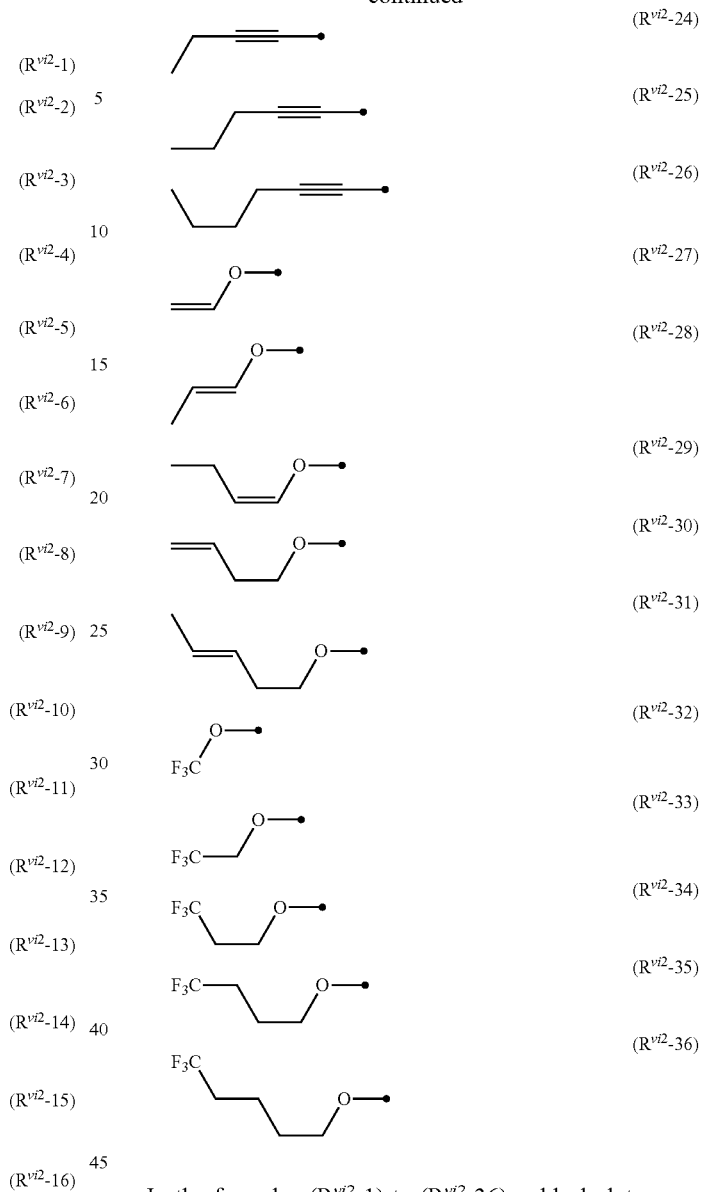

In the formulae ($R^{vi2}$-1) to ($R^{vi2}$-36), a black dot represents a bonding arm to $A^{vi3}$.

When the ring structure to which $R^{vi2}$ is bonded is a phenyl group (aromatic), a linear alkyl group with 1 to 5 carbon atoms, a linear alkoxy group with 1 to 4 carbon atoms, or an alkenyl group with 4 or 5 carbon atoms is preferred. When the ring structure to which $R^{vi2}$ is bonded is a saturated ring structure, such as cyclohexane, pyran, or dioxane, a linear alkyl group with 1 to 5 carbon atoms, a linear alkoxy group with 1 to 4 carbon atoms, or a linear alkenyl group with 2 to 5 carbon atoms is preferred.

To stabilize a nematic phase, in $R^{vi2}$, the total number of carbon atoms and, if present, oxygen atoms is preferably 5 or less, and a straight chain is preferred.

From the perspective of solubility, Δn and/or $\Delta\varepsilon_r$, $R^{vi2}$ is preferably a linear alkyl group with 2 to 6 carbon atoms or a linear thioalkoxy group with 1 to 6 carbon atoms.

In the general formula (vi), $A^{vi1}$, $A^{vi2}$, and $A^{vi3}$ each independently denotes any one of a hydrocarbon ring with 3 to 16 carbon atoms or a heterocycle with 3 to 16 carbon atoms.

More specifically, a hydrocarbon ring with 3 to 16 carbon atoms or a heterocycle with 3 to 16 carbon atoms preferably denotes a group selected from the group consisting of the groups (a), (b), (c), and (d):

(a) a 1,4-cyclohexylene group (one —CH$_2$— or two or more nonadjacent —CH$_2$— groups in this group are optionally substituted with —O— or —S—), (b) a 1,4-phenylene group (one —CH= or two or more nonadjacent —CH= groups in this group are optionally substituted with —N=), (c) a 1,4-cyclohexenylene group, a bicyclo[2.2.2]octane-1,4-diyl group, a naphthalene-2,6-diyl group, a naphthalene-1,4-diyl group, a 1,2,3,4-tetrahydronaphthalene-2,6-diyl group, a 5,6,7,8-tetrahydronaphthalene-1,4-diyl group, a decahydronaphthalene-2,6-diyl group, an anthracene-2,6-diyl group, an anthracene-1,4-diyl group, an anthracene-9,10-diyl group, a phenanthrene-2,7-diyl group (one —CH= or two or more —CH= groups in the naphthalene-2,6-diyl group, the naphthalene-1,4-diyl group, the 1,2,3,4-tetrahydronaphthalene-2,6-diyl group, the 5,6,7,8-tetrahydronaphthalene-1,4-diyl group, the anthracene-2,6-diyl group, the anthracene-1,4-diyl group, the anthracene-9,10-diyl group, or the phenanthrene-2,7-diyl group are optionally substituted with —N=), and (d) a thiophene-2,5-diyl group, a benzothiophene-2,5-diyl group, a benzothiophene-2,6-diyl group, a dibenzothiophene-3,7-diyl group, a dibenzothiophene-2,6-diyl group, a thieno[3,2-b]thiophene-2,5-diyl group (one —CH= or two or more nonadjacent —CH= groups in this group are optionally substituted with —N=).

One or two or more hydrogen atoms in $A^{vi1}$, $A^{vi2}$, and $A^{vi3}$ are each independently optionally substituted with a substituent $S^{vi1}$.

The substituent $S^{vi1}$ denotes any one of a fluorine atom, a chlorine atom, a bromine atom, an iodine atom, a pentafluorosulfanyl group, a nitro group, a cyano group, an isocyano group, an amino group, a hydroxy group, a mercapto group, a methylamino group, a dimethylamino group, a diethylamino group, a diisopropylamino group, a trimethylsilyl group, a dimethylsilyl group, a thioisocyano group, and an alkyl group with 1 to 20 carbon atoms.

The alkyl group is a linear, branched, or cyclic alkyl group, preferably a linear alkyl group.

The number of carbon atoms in the alkyl group preferably ranges from 2 to 10, preferably 3 to 6.

One or two or more —CH$_2$— groups in the alkyl group are each independently optionally substituted with —O—, —S—, and/or —CO—.

One or two or more —CH$_2$—CH$_2$— groups in the alkyl group are each independently optionally substituted with —CH=CH—, —CF=CF—, —C≡C—, —CO—O—, —O—CO—, —CO—S—, —S—CO—, —CO—NH—, and/or —NH—CO—.

One or two or more —CH$_2$—CH$_2$—CH$_2$— groups in the alkyl group are optionally substituted with —O—CO—O—.

One or two or more hydrogen atoms in the alkyl group are each independently optionally substituted with a halogen atom.

The halogen atom may be a fluorine atom, a chlorine atom, a bromine atom, or an iodine atom.

When the alkyl group is substituted with a predetermined group, however, oxygen atoms are not directly bonded to each other.

From the perspective of the stability of the compound, sulfur atoms are preferably not directly bonded to each other, and/or an oxygen atom and a sulfur atom are preferably not directly bonded to each other.

The substituent $S^{vi1}$ is preferably a fluorine atom or a linear alkyl group with 1 to 3 carbon atoms.

At least one of $A^{vi1}$, $A^{vi2}$, and $A^{vi3}$ is preferably substituted with at least one substituent $S^{vi1}$.

$A^{vi1}$ is preferably substituted with at least one substituent $S^{vi1}$.

A plurality of substituents $S^{vi1}$, if present, may be the same or different.

The substitution position of the substituent $S^{vi1}$ in $A^{vi1}$ is preferably any one of the formulae ($A^{vi1}$-SP-1) and ($A^{vi1}$-SP-2):

[Chem. 167]

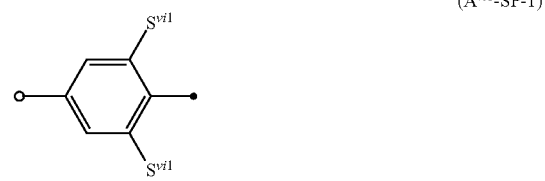

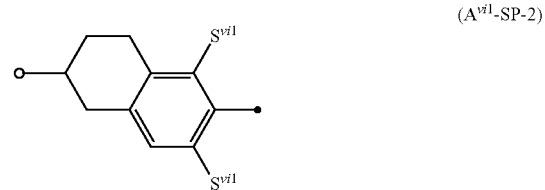

In the formulae ($A^{vi1}$-SP-1) and ($A^{vi1}$-SP-2), a white dot represents a bonding arm to $R^{vi1}$, and a black dot represents a bonding arm to —C≡C—.

The substitution position of the substituent $S^{vi1}$ in $A^{vi2}$ is preferably any one of the formulae ($A^{vi2}$-SP-1) to ($A^{vi2}$-S-7), preferably any one of the formulae ($A^{vi2}$-SP-1) to ($A^{vi2}$-SP-7) from the perspective of compatibility with another liquid crystal compound.

[Chem. 168]

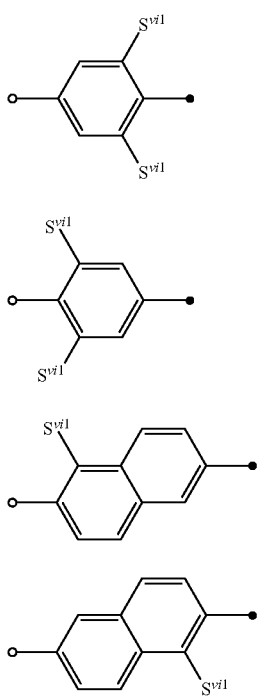

(A$^{vi2}$-SP-4)

(A$^{vi2}$-SP-5)

(A$^{vi2}$-SP-6)

(A$^{vi2}$-SP-7)

In the formulae (A$^{vi2}$-SP-1) to (A$^{vi2}$-SP-7), a white dot represents a bonding arm to —C≡C—, and a black dot represents a bonding arm to Z$^{vi1}$.

The substitution position of the substituent S$^{vi1}$ in A$^{vi3}$ is preferably any one of the formulae (A$^{vi3}$-SP-1) to (A$^{vi3}$-SP-7), preferably any one of the formulae (A$^{vi3}$-SP-1) to (A$^{vi3}$-SP-5) from the perspective of solubility.

[Chem. 169]

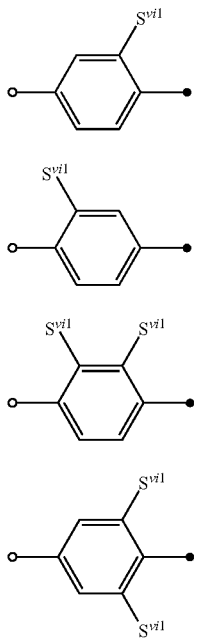

(A$^{vi3}$-SP-1)

(A$^{vi3}$-SP-2)

(A$^{vi3}$-SP-3)

(A$^{vi3}$-SP-4)

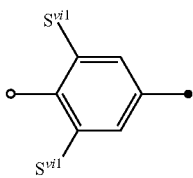
(A$^{vi3}$-SP-5)

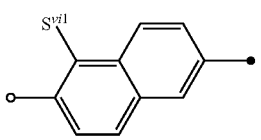
(A$^{vi3}$-SP-6)

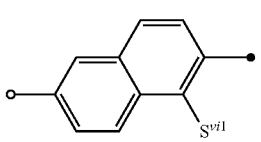
(A$^{vi3}$-SP-7)

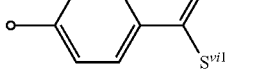

In the formulae (A$^{i3}$-SP-1) to (A$^{vi3}$-SP-7), a white dot represents a bonding arm to Z$^{vi1}$, and a black dot represents a bonding arm to Z$^{vi1}$ or R$^{vi2}$.

More specifically, A$^{vi1}$ preferably denotes any one of the formulae (A$^{vi1}$-1) to (A$^{vi1}$-4):

[Chem. 170]

(A$^{vi1}$-1)

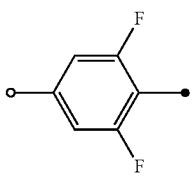
(A$^{vi1}$-2)

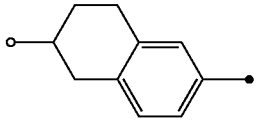
(A$^{vi1}$-3)

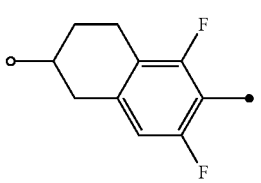
(A$^{vi1}$-4)

In the formulae (A$^{vi1}$-1) to (A$^{vi1}$-4), a white dot represents a bonding arm to R$^{vi1}$, and a black dot represents a bonding arm to —C≡C—.

More specifically, $A^{vi2}$ preferably denotes any one of the formulae $(A^{vi2}\text{-}1)$ to $(A^{vi2}\text{-}5)$:

[Chem. 171]

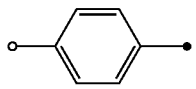
$(A^{vi2}\text{-}1)$

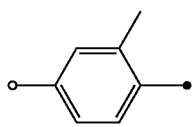
$(A^{vi2}\text{-}2)$

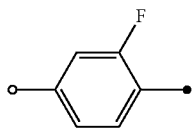
$(A^{vi2}\text{-}3)$

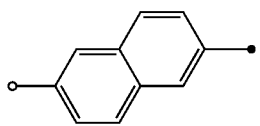
$(A^{vi2}\text{-}4)$

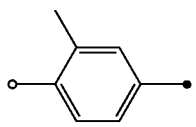
$(A^{vi2}\text{-}5)$

In the formulae $(A^{vi2}\text{-}1)$ to $(A^{vi2}\text{-}5)$, a white dot represents a bonding arm to —C≡C—, and a black dot represents a bonding arm to $Z^{i1}$.

More specifically, $A^{vi3}$ preferably denotes any one of the formulae $(A^{vi3}\text{-}1)$ to $(A^{vi3}\text{-}3)$:

[Chem. 172]

$(A^{vi3}\text{-}1)$

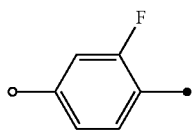
$(A^{vi3}\text{-}2)$

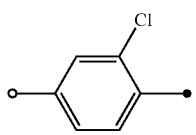
$(A^{vi3}\text{-}3)$

In the formulae $(A^{vi3}\text{-}1)$ to $(A^{vi3}\text{-}3)$, a white dot represents a bonding arm to $Z^{vi1}$, and a black dot represents a bonding arm to $Z^{vi1}$ or $R^{vi2}$.

In the general formula (vi), $Z^{vi1}$ each independently denotes any one of a single bond and an alkylene group with 1 to 20 carbon atoms.

The alkylene group is a linear, branched, or cyclic alkylene group, preferably a linear alkylene group.

The number of carbon atoms in the alkylene group preferably ranges from 2 to 10, preferably 2 to 6.

One or two or more —$CH_2$— groups in the alkylene group are each independently optionally substituted with —O—, —$CF_2$—, and/or —CO—.

One or two or more —$CH_2$—$CH_2$— groups in the alkylene group are each independently optionally substituted with —CH—CH($CH_3$)—, —CH($CH_3$)—$CH_2$—, —CH=CH—, —CF=CF—, —CH=C($CH_3$)—, —C($CH_3$)=CH—, —CH=N—, —N=CH—, —N=N—, —C≡C—, —CO—O—, and/or —O—CO—.

One or two or more —$CH_2$—$CH_2$—$CH_2$— groups in the alkyl group are each independently optionally substituted with —O—CO—O—.

However, when the alkylene group is substituted with a predetermined group, oxygen atoms are not directly bonded to each other.

Specific examples of the alkylene group with 2 to 20 carbon atoms (including substituted ones) include the groups represented by the formulae $(Z^{vi1}\text{-}1)$ to $(Z^{vi1}\text{-}24)$:

[Chem. 173]

$(Z^{vi1}\text{-}1)$ $(Z^{vi1}\text{-}2)$ $(Z^{vi1}\text{-}3)$ $(Z^{vi1}\text{-}4)$ $(Z^{vi1}\text{-}5)$ $(Z^{vi1}\text{-}6)$ $(Z^{vi1}\text{-}7)$ $(Z^{vi1}\text{-}8)$ $(Z^{vi1}\text{-}9)$ $(Z^{vi1}\text{-}10)$ $(Z^{vi1}\text{-}11)$

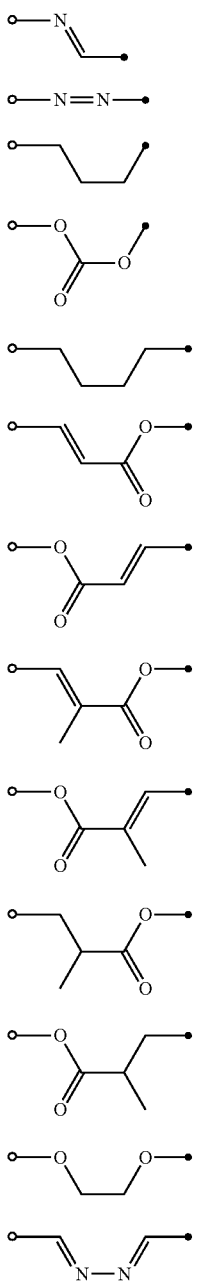

(Z$^{vi1}$-12)
(Z$^{vi1}$-13)
(Z$^{vi1}$-14)
(Z$^{vi1}$-15)
(Z$^{vi1}$-16)
(Z$^{vi1}$-17)
(Z$^{vi1}$-18)
(Z$^{vi1}$-19)
(Z$^{vi1}$-20)
(Z$^{vi1}$-21)
(Z$^{vi1}$-22)
(Z$^{vi1}$-23)
(Z$^{vi1}$-24)

In the formulae (Z$^{vi1}$-1) to (Z$^{vi1}$-24), a white dot represents a bonding arm to A$^{vi2}$ or A$^{vi3}$, and a black dot represents a bonding arm to A$^{vi3}$.

n$^{vi1}$ denotes an integer of 1 to 3, preferably 1 or 2.

When n$^{vi1}$ is 1, from the perspective of Δn and/or Δε$_r$, Z$^{vi1}$ preferably denotes —C≡C—.

When n$^{vi1}$ is 2 or 3, from the perspective of Δn and/or Δε$_r$, at least one Z$^{vi1}$ preferably denotes —C≡C—.

In the general formula (vi), a plurality of A$^{vi3}$ and Z$^{vi1}$, if present, may be the same or different.

Compounds represented by the general formula (vi) are preferably compounds represented by the general formula (vi-1):

[Chem. 174]

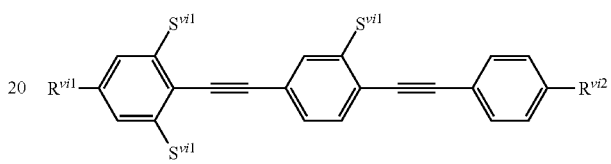

In the general formula (vi-1), R$^{vi1}$, R$^{vi2}$, A$^{vi1}$, A$^{vi2}$, and A$^{vi3}$ have the same meaning as R$^{vi1}$, R$^{vi2}$, A$^{vi1}$, A$^{vi2}$, and A$^{vi3}$, respectively, in the general formula (vi).

Compounds represented by the general formula (vi-1) are preferably compounds represented by the general formulae (vi-1-1) to (vi-1-7):

[Chem. 175]

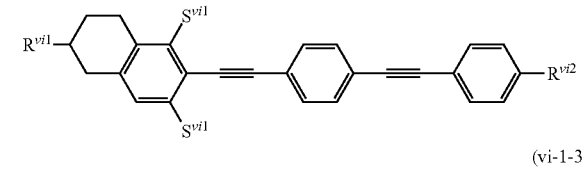

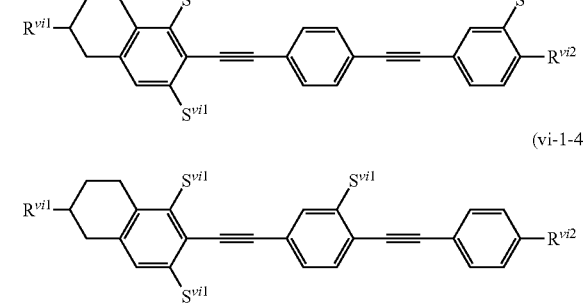

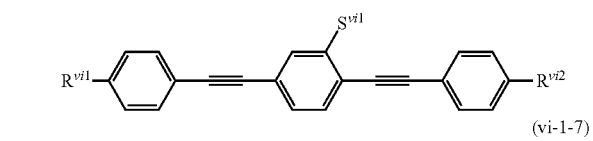

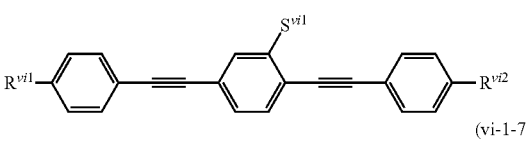

In the general formulae (vi-1-1) to (vi-1-7), R$^{vi1}$, R$^{vi2}$, and S$^{vi1}$ each independently have the same meaning as R$^{vi1}$, R$^{vi2}$, and S$^{vi1}$, respectively, in the general formula (vi).

Specific examples of compounds represented by the general formula (vi-1-1) include the compounds represented by the structural formulae (vi-1-1.1) and (vi-1-1.2):
[Chem. 176]
(vi-1-1.1)
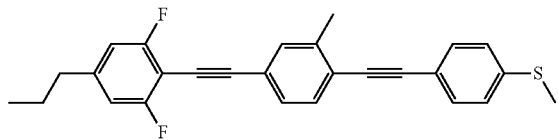
(vi-1-1.2)
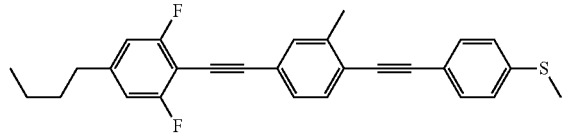
Specific examples of compounds represented by the general formula (vi-1-2) include the compounds represented by the structural formulae (vi-1-2.1) to (vi-1-2.6):
[Chem. 177]
(vi-1-2.1)
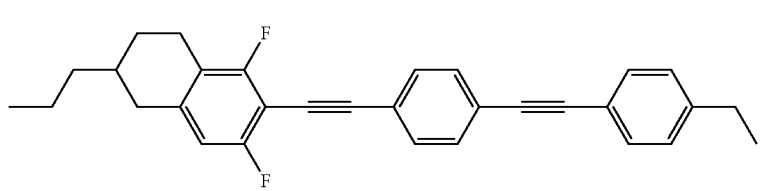
(vi-1-2.2)
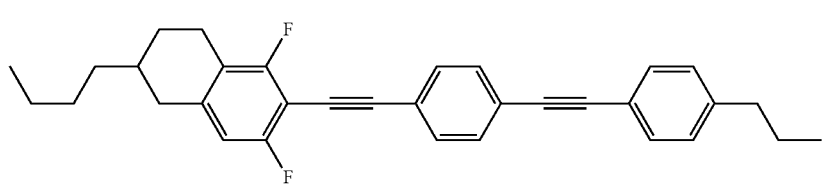
(vi-1-2.3)
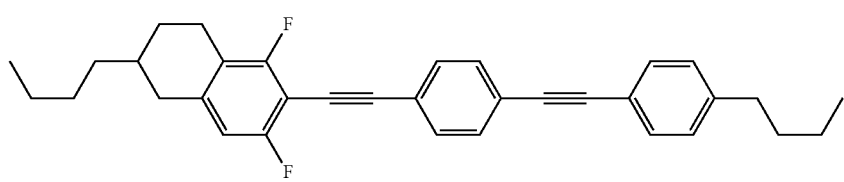
(vi-1-2.4)
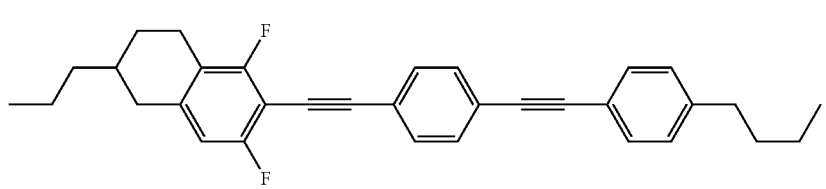
(vi-1-2.5)
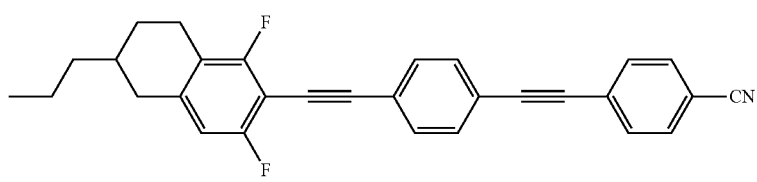
(vi-1-2.6)
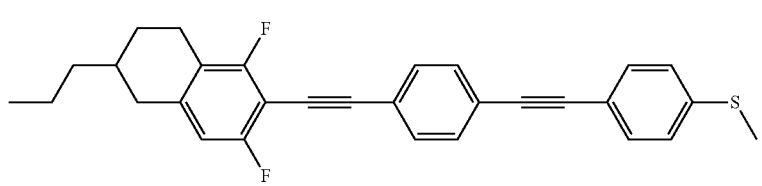

Specific examples of compounds represented by the general formula (vi-1-3) include the compounds represented by the structural formulae (vi-1-3.1) to (vi-1-3.4):
[Chem. 178]
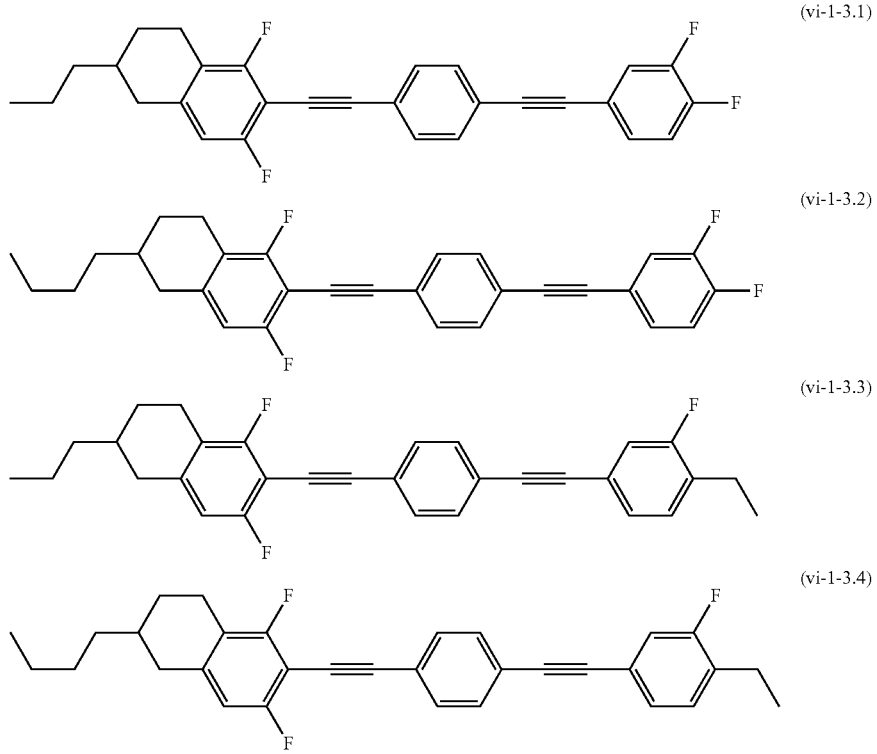
(vi-1-3.1)
(vi-1-3.2)
(vi-1-3.3)
(vi-1-3.4)
Specific examples of compounds represented by the general formula (vi-1-4) include the compounds represented by the structural formulae (vi-1-4.1) to (vi-1-4.5):
[Chem. 179]
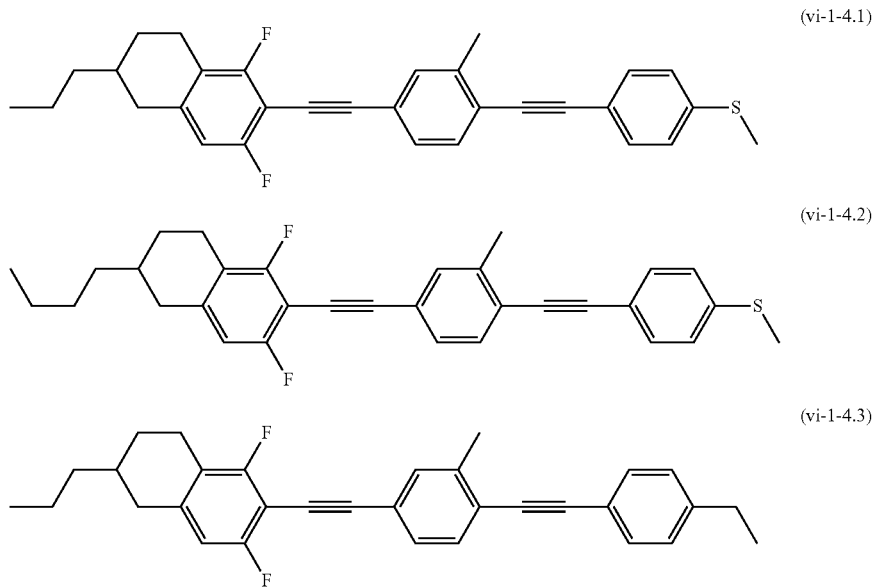
(vi-1-4.1)
(vi-1-4.2)
(vi-1-4.3)

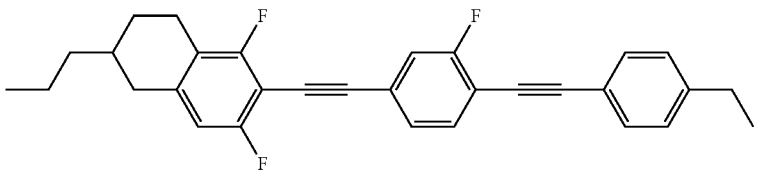
(vi-1-4.4)
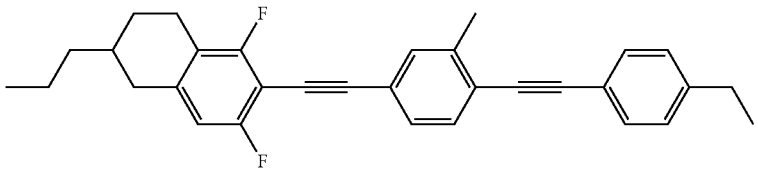
(vi-1-4.5)
Specific examples of compounds represented by the general formula (vi-1-5) include the compounds represented by the structural formulae (vi-1-5.1) to (vi-1-5.4):
[Chem. 180]
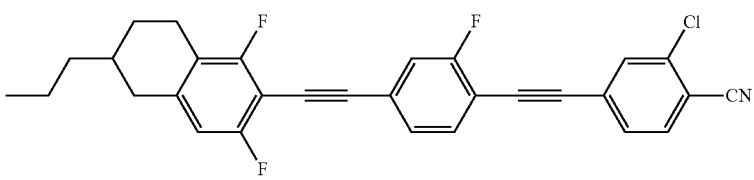
(vi-1-5.1)
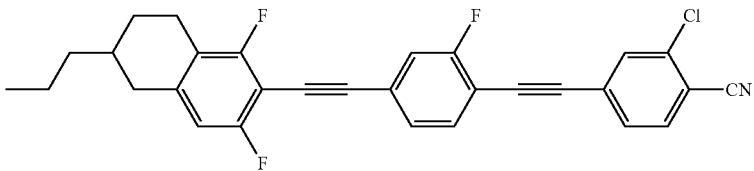
(vi-1-5.2)
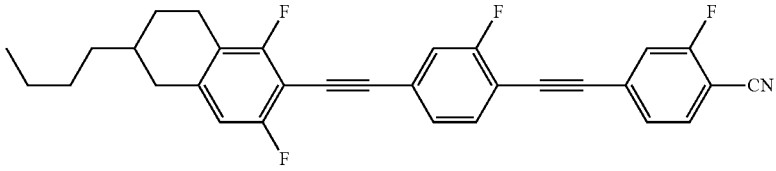
(vi-1-5.3)
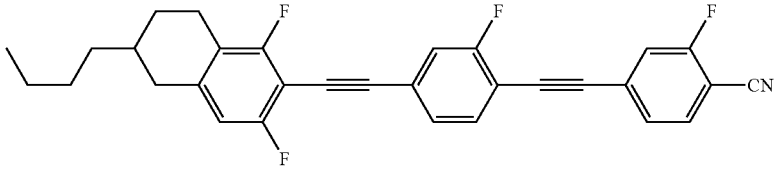
(vi-1-5.4)
Specific examples of compounds represented by the general formula (vi-1-6) include the compounds represented by the structural formulae (vi-1-6.1) to (vi-1-6.5):
[Chem. 181]
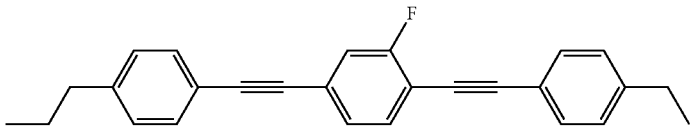
(vi-1-6.1)

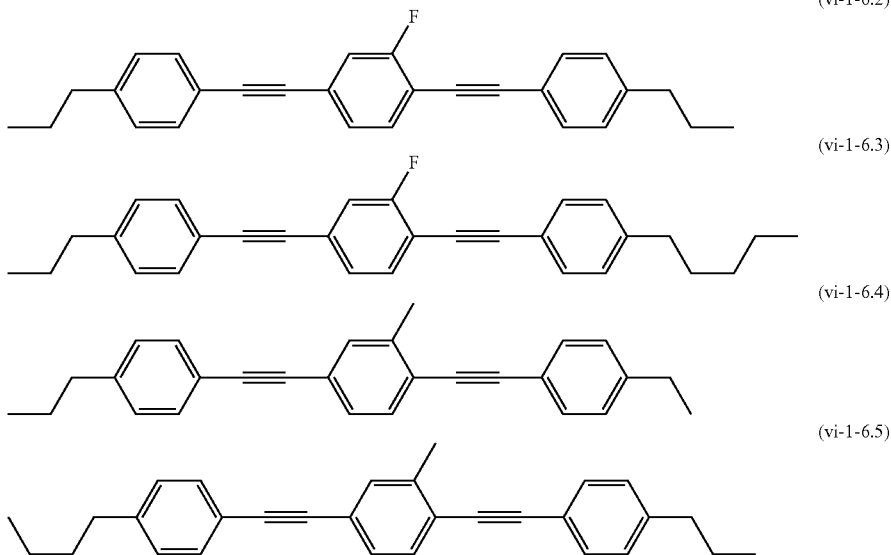

Specific examples of compounds represented by the general formula (vi-1-7) include the compound represented by the structural formula (vi-1-7.1):

[Chem. 182]

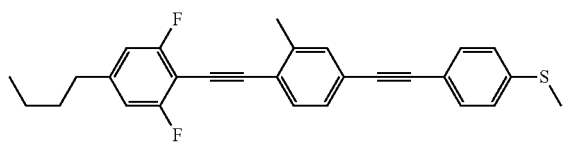

(vi-1-7.1)

The types of compounds represented by the following formulae used for liquid crystal compositions are one or two or more types, preferably one to ten types, preferably one to five types, or preferably one to three types: the general formula (vi), the general formula (vi-1), the general formulae (vi-1-1) to (vi-1-7), the structural formulae (vi-1-1.1) and (vi-1-1.2), the structural formulae (vi-1-2.1) to (vi-1-2.6), the structural formulae (vi-1-3.1) to (vi-1-3.4), the structural formulae (vi-1-4.1) to (vi-1-4.5), the structural formulae (vi-1-5.1) to (i-v1-5.4), the structural formulae (vi-1-6.1) to (i-v1-6.5), or the structural formula (vi-1-7.1).

The lower limit of the total amount of compounds represented by the following formulae per 100% by mass of a liquid crystal composition is preferably 1% by mass or more, preferably 3% by mass or more, or preferably 5% by mass or more: the general formula (vi), the general formula (vi-1), the general formulae (vi-1-1) to (vi-1-7), the structural formulae (vi-1-1.1) and (vi-1-1.2), the structural formulae (vi-1-2.1) to (vi-1-2.6), the structural formulae (vi-1-3.1) to (vi-1-3.4), the structural formulae (vi-1-4.1) to (vi-1-4.5), the structural formulae (vi-1-5.1) to (i-v1-5.4), the structural formulae (vi-1-6.1) to (i-v1-6.5), or the structural formula (vi-1-7.1).

The upper limit of the total amount of compounds represented by the following formulae per 100% by mass of a liquid crystal composition is preferably 35% by mass or less, preferably 30% by mass or less, or preferably 25% by mass or less: the general formula (vi), the general formula (vi-1), the general formulae (vi-1-1) to (vi-1-7), the structural formulae (vi-1-1.1) and (vi-1-1.2), the structural formulae (vi-1-2.1) to (vi-1-2.6), the structural formulae (vi-1-3.1) to (vi-1-3.4), the structural formulae (vi-1-4.1) to (vi-1-4.5), the structural formulae (vi-1-5.1) to (i-v1-5.4), the structural formulae (vi-1-6.1) to (i-v1-6.5), or the structural formula (vi-1-7.1).

From the perspective of solubility, $\Delta n$, and/or $\Delta \varepsilon_r$, the total amount of compounds represented by the following formulae per 100% by mass of a liquid crystal composition preferably ranges from 1% to 35% by mass, preferably 3% to 30% by mass, or preferably 5% to 25% by mass: the general formula (vi), the general formula (vi-1), the general formulae (vi-1-1) to (vi-1-7), the structural formulae (vi-1-1.1) and (vi-1-1.2), the structural formulae (vi-1-2.1) to (vi-1-2.6), the structural formulae (vi-1-3.1) to (vi-1-3.4), the structural formulae (vi-1-4.1) to (vi-1-4.5), the structural formulae (vi-1-5.1) to (i-v1-5.4), the structural formulae (vi-1-6.1) to (i-v1-6.5), or the structural formula (vi-1-7.1).

The compounds represented by the general formula (vi) (including subordinate concepts) can be synthesized by a known synthesis method.

From the perspective of $\Delta n$ and/or $\Delta \varepsilon_r$, a liquid crystal composition according to the present invention may further contain one or two or more compounds represented by the general formula (vii) having at least one —C≡C— and —N=N— as linking groups.

[Chem. 183]

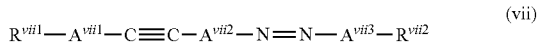

$$R^{vii1}—A^{vii1}—C{\equiv}C—A^{vii2}—N{=}N—A^{vii3}—R^{vii2} \quad \text{(vii)}$$

In the general formula (vii), $R^{vii1}$ and $R^{vii2}$ each independently denote a halogen atom, a cyano group, or an alkyl group with 1 to 20 carbon atoms.

The halogen atom may be a fluorine atom, a chlorine atom, a bromine atom, an iodine atom, or the like.

The alkyl group with 1 to 20 carbon atoms is a linear, branched, or cyclic alkyl group, preferably a linear alkyl group.

The number of carbon atoms in the alkyl group with 1 to 20 carbon atoms preferably ranges from 2 to 10, preferably 2 to 6.

One or two or more —CH$_2$— groups in the alkyl group are each independently optionally substituted with —O—, —S—, —CO—, and/or —CS—.

One or two or more —CH$_2$—CH$_2$— groups in the alkyl group are each independently optionally substituted with —CO—O—, —O—CO—, —CO—S—, —S—CO—, —CO—NH—, —NH—CO—, —CH=CH—, —CF=CF—, and/or —C≡C—.

One or two or more —CH$_2$—CH$_2$—CH$_2$— groups in the alkyl group are each independently optionally substituted with —O—CO—O—.

One or two or more hydrogen atoms in the alkyl group are each independently optionally substituted with a halogen atom.

The halogen atom may be a fluorine atom, a chlorine atom, a bromine atom, or an iodine atom.

When the alkyl group is substituted with a predetermined group, however, oxygen atoms are not directly bonded to each other.

From the perspective of the stability of the compound, sulfur atoms are preferably not directly bonded to each other, and/or an oxygen atom and a sulfur atom are preferably not directly bonded to each other.

For example, $R^{vii1}$ and $R^{vii2}$ can denote an alkoxy group with 1 to 19 carbon atoms by substituting one —CH$_2$— in the alkyl group with —O—.

The alkoxy group is a linear, branched, or cyclic alkoxy group, preferably a linear alkoxy group.

The number of carbon atoms in the alkoxy group preferably ranges from 2 to 10, preferably 2 to 6.

$R^{vii1}$ and $R^{vii2}$ can denote a thioalkoxy group (alkylsulfanyl group, alkylthio group) with 1 to 19 carbon atoms by substituting one —CH$_2$— in the alkyl group with —S—.

The thioalkoxy group is a linear, branched, or cyclic thioalkoxy group, preferably a linear thioalkoxy group.

The number of carbon atoms in the thioalkoxy group preferably ranges from 2 to 10, preferably 2 to 6.

$R^{vii1}$ and $R^{vii2}$ can denote an alkenyl group with 2 to 20 carbon atoms by substituting one or two or more —CH$_2$—CH$_2$-groups in the alkyl group with —CH=CH—.

The alkenyl group is a linear, branched, or cyclic alkenyl group, preferably a linear alkenyl group.

The number of carbon atoms in the alkenyl group preferably ranges from 2 to 10, preferably 2 to 6.

$R^{vii1}$ and $R^{vii2}$ can denote an alkynyl group with 2 to 20 carbon atoms by substituting one or two or more —CH$_2$—CH$_2$-groups in the alkyl group with —C≡C—.

The alkynyl group is a linear, branched, or cyclic alkynyl group, preferably a linear alkynyl group.

The number of carbon atoms in the alkynyl group preferably ranges from 2 to 10, preferably 2 to 6.

$R^{vii1}$ and $R^{vii2}$ can denote an alkenyloxy group with 2 to 19 carbon atoms by substituting one —CH$_2$— in the alkyl group with —O— and substituting one or two or more —CH$_2$—CH$_2$— groups with —CH=CH—.

The alkenyloxy group is a linear, branched, or cyclic alkenyloxy group, preferably a linear alkenyloxy group.

The number of carbon atoms in the alkenyloxy group preferably ranges from 2 to 10, preferably 2 to 6.

$R^{vii1}$ and $R^{vii2}$ can denote a halogenated alkyl group with 1 to 20 carbon atoms by substituting one or two or more hydrogen atoms in the alkyl group with a halogen atom.

The halogenated alkyl group is a linear, branched, or cyclic halogenated alkyl group, preferably a linear halogenated alkyl group.

The number of carbon atoms in the halogenated alkyl group preferably ranges from 2 to 10, preferably 2 to 6.

$R^{vii1}$ and $R^{vii2}$ can denote a halogenated alkoxy group with 1 to 19 carbon atoms by substituting one —CH$_2$— in the alkyl group with —O— and substituting one or two or more hydrogen atoms in the alkyl group with a halogen atom.

The halogenated alkoxy group is a linear, branched, or cyclic alkoxy group, preferably a linear alkoxy group.

The number of carbon atoms in the halogenated alkoxy group preferably ranges from 2 to 10, preferably 2 to 6.

Specific examples of the alkyl group with 1 to 20 carbon atoms (including substituted ones) in $R^{vii1}$ and $R^{vii2}$ include the groups represented by the formulae ($R^{vii1/2}$-1) to ($R^{vii1/2}$-36):

[Chem. 184]

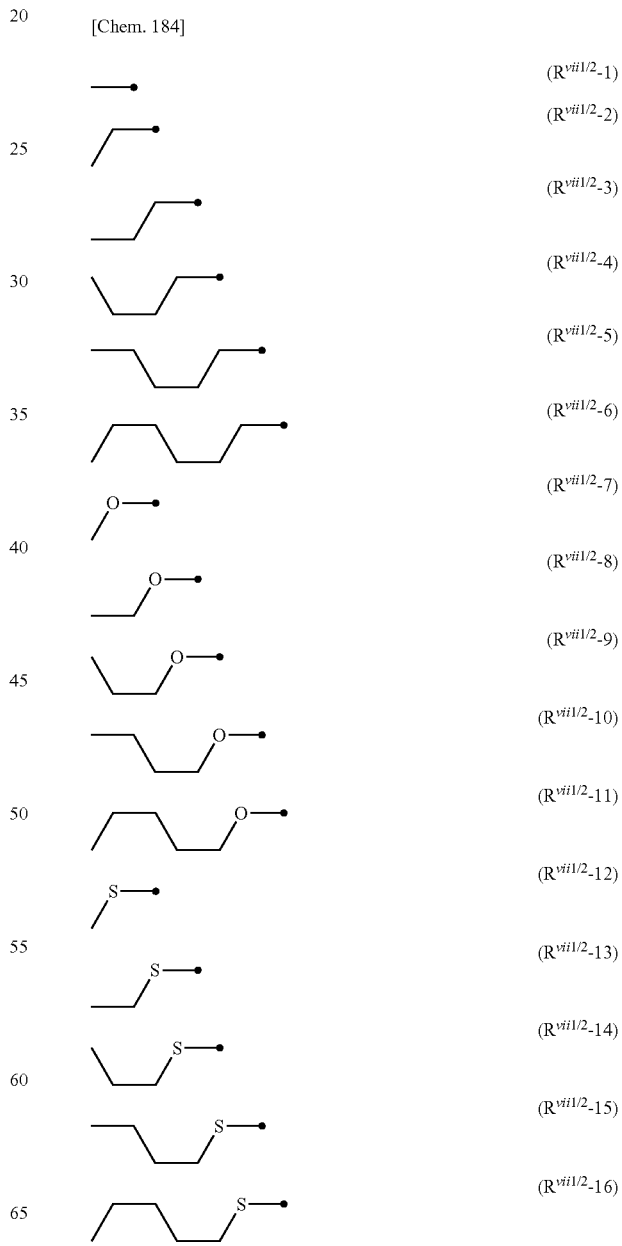

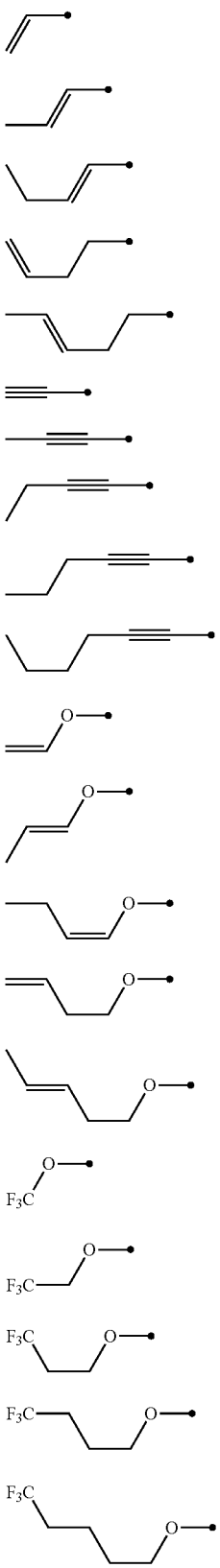

($R^{vii1/2}$-17)
($R^{vii1/2}$-18)
($R^{vii1/2}$-19)
($R^{vii1/2}$-20)
($R^{vii1/2}$-21)
($R^{vii1/2}$-22)
($R^{vii1/2}$-23)
($R^{vii1/2}$-24)
($R^{vii1/2}$-25)
($R^{vii1/2}$-26)
($R^{vii1/2}$-27)
($R^{vii1/2}$-28)
($R^{vii1/2}$-29)
($R^{vii1/2}$-30)
($R^{vii1/2}$-31)
($R^{vii1/2}$-32)
($R^{vii1/2}$-33)
($R^{vii1/2}$-34)
($R^{vii1/2}$-35)
($R^{vii1/2}$-36)

In the formulae ($R^{vii1/2}$-1) to ($R^{vii1/2}$-36), a black dot represents a bonding arm to $A^{vii1}$ or $A^{vii3}$.

$R^{vii1}$ is preferably an alkyl group with 1 to 12 carbon atoms when the reliability of the entire liquid crystal composition is regarded as important, and is preferably an alkenyl group with 2 to 8 carbon atoms when the decrease in viscosity of the entire liquid crystal composition is regarded as important.

When the ring structure to which $R^{vii1}$ is bonded is a phenyl group (aromatic), a linear alkyl group with 1 to 5 carbon atoms, a linear alkoxy group with 1 to 4 carbon atoms, or an alkenyl group with 4 or 5 carbon atoms is preferred. When the ring structure to which $R^{vii1}$ is bonded is a saturated ring structure, such as cyclohexane, pyran, or dioxane, a linear alkyl group with 1 to 5 carbon atoms, a linear alkoxy group with 1 to 4 carbon atoms, or a linear alkenyl group with 2 to 5 carbon atoms is preferred.

To stabilize a nematic phase, in $R^{vii1}$, the total number of carbon atoms and, if present, oxygen atoms is preferably 5 or less, and a straight chain is preferred.

When a compound represented by the general formula (vii) is a so-called p-type compound with positive $\Delta\varepsilon$, $R^{vii2}$ preferably denotes a fluorine atom, a cyano group, a trifluoromethyl group, or a trifluoromethoxy group, preferably a fluorine atom or a cyano group.

When a compound represented by the general formula (vii) is a so-called non-polar compound with $\Delta\varepsilon$ of approximately 0, $R^{vii2}$ has the same meaning as $R^{vii1}$, and $R^{vii2}$ and $R^{vii3}$ may be the same or different.

From the perspective of solubility, $R^{vii1/2}$ preferably denotes a linear alkyl group with 2 to 6 carbon atoms.

In the general formula (vii), $A^{vii1}$, $A^{vii2}$, and $A^{vii3}$ each independently denote a group selected from the group consisting of the groups (a), (b), and (c):

(a) a 1,4-cyclohexylene group (one —CH$_2$— or two or more nonadjacent —CH$_2$— groups in this group are optionally substituted with —O—), (b) a 1,4-phenylene group (one —CH═ or two or more nonadjacent —CH═ groups in this group are optionally substituted with —N═), and (c) a naphthalene-1,4-diyl group, a naphthalene-2,6-diyl group, a 1,2,3,4-tetrahydronaphthalene-2,6-diyl group, or a decahydronaphthalene-2,6-diyl group (one —CH═ or two or more nonadjacent —CH═ groups in the naphthalene-1,4-diyl group, the naphthalene-2,6-diyl group, or the 1,2,3,4-tetrahydronaphthalene-2,6-diyl group are optionally substituted with —N═).

One or two or more hydrogen atoms in the groups (a), (b), and (c) are each independently optionally substituted with a halogen atom, a cyano group, or an alkyl group with 1 to 6 carbon atoms.

The halogen atom may be a fluorine atom, a chlorine atom, a bromine atom, or an iodine atom, preferably a fluorine atom from the perspective of stability and safety.

$A^{vii1}$, $A^{vii2}$, and/or $A^{vii3}$ each independently preferably denote the group (a), which is an aliphatic divalent cyclic group, to improve the response speed, and, when it is required to increase $\Delta n$, preferably denote the group (b) or (c), which is an aromatic divalent cyclic group, and each independently preferably denote any one of the following structures, preferably any one of a 1,4-phenylene group, a naphthalene-2,6-diyl group, and a tetrahydronaphthalene-2,6-diyl group. One or two or more hydrogen atoms in the 1,4-phenylene group, the naphthalene-2,6-diyl group, and the tetrahydronaphthalene-2,6-diyl group are each independently optionally substituted with a fluorine atom or an alkyl group with 1 to 6 carbon atoms.

[Chem. 185]

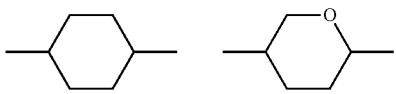
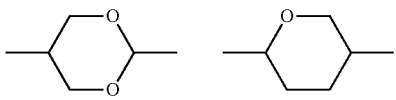
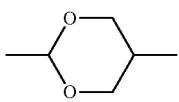
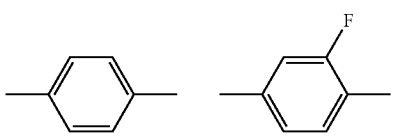
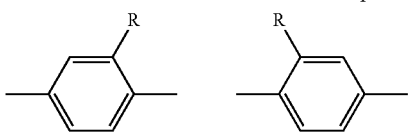
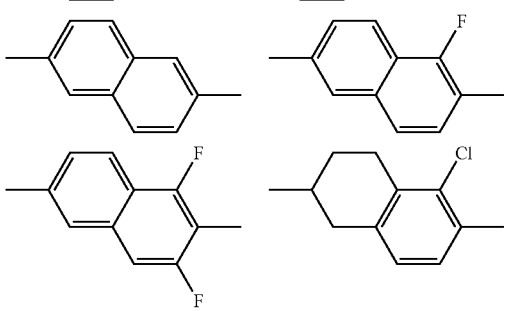
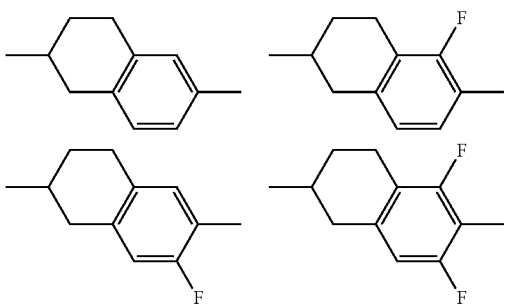

(R denotes an alkyl group with 1 to 6 carbon atoms.)

In particular, from the perspective of improved Δn, $A^{vii1}$ preferably denotes a group selected from the group consisting of the groups (d) to (f):

[Chem. 186]

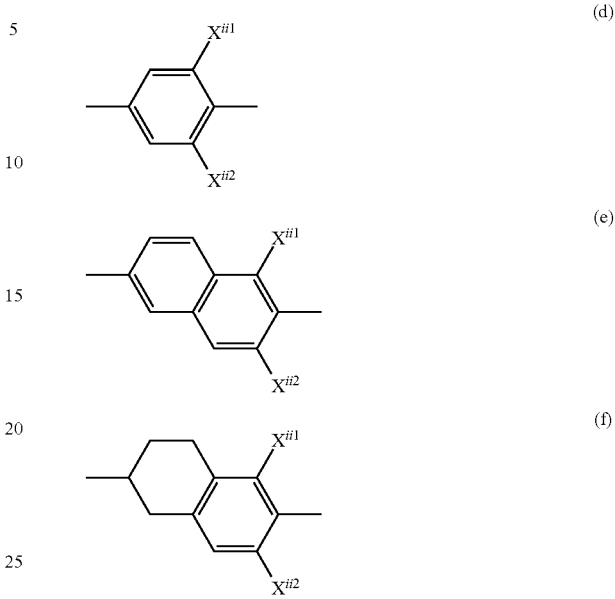

($X^{vii1}$ and $X^{vii2}$ each independently denote a hydrogen atom or a fluorine atom.)

From the perspective of compatibility with another liquid crystal compound, $A^{vii1}$ preferably denotes the group (f).

To increase compatibility with another liquid crystal composition, at least one of $A^{vii1}$, $A^{vii2}$, and/or $A^{vii3}$ preferably denotes a 1,4-phenylene group substituted with an alkyl group with 1 to 6 carbon atoms, more preferably a 1,4-phenylene group substituted with an ethyl group.

$A^{vii1}$, $A^{vii2}$, and/or $A^{vii3}$, which is a ring structure in one molecule of a compound represented by the general formula (vii) in the present invention, preferably has 1 to 5, more preferably 1 to 4, fluorine atoms in total.

Compounds represented by the general formula (vii) are preferably compounds represented by the general formulae (vii-1) to (vii-3):

[Chem. 187]

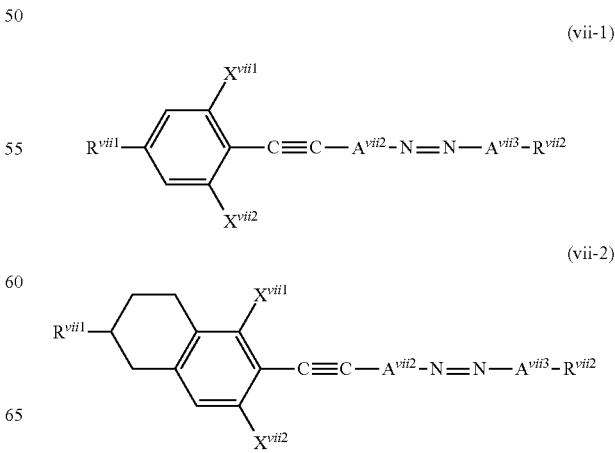

(vii-3)

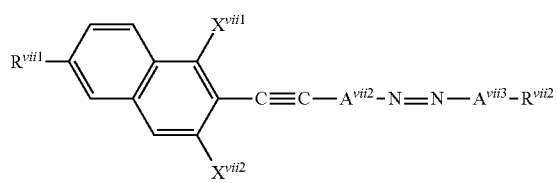

(In the general formulae (vii-1) to (vii-3), $R^{vii1}$, $R^{vii2}$, $A^{vii2}$, and $A^{vii3}$ have the same meaning as $R^{vii1}$, $R^{vii2}$, $A^{vii2}$, and $A^{vii3}$, respectively, in the general formula (vii), and preferred groups and preferred numbers thereof are also the same.)

In the general formulae (vii-1)) to (vii-3), Xviii and $X^{vii2}$ each independently denotes a hydrogen atom or a fluorine atom.

Specific examples of compounds represented by the general formula (vii-1) include the compounds represented by the structural formulae (vii-1.1) to (vii-1.74):

[Chem. 188]

(vii-1.1)

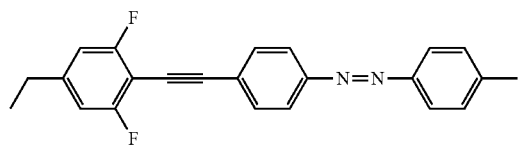

(vii-1.2)

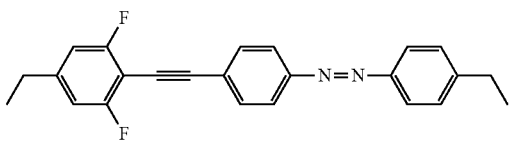

(vii-1.3)

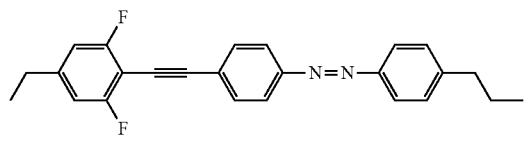

(vii-1.4)

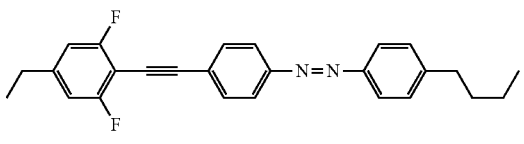

(vii-1.5)

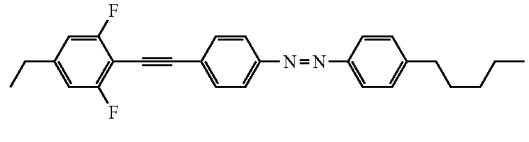

(vii-1.6)

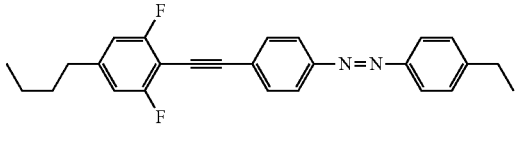

(vii-1.7)

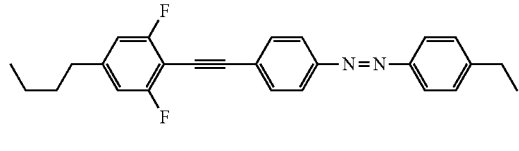

(vii-1.8)

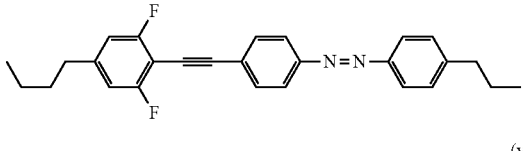

(vii-1.9)

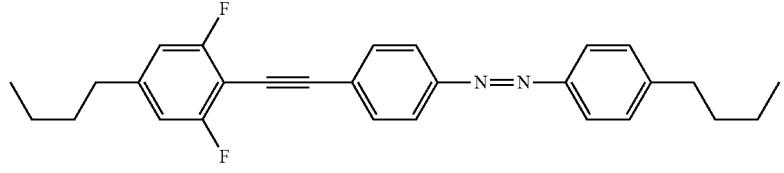

(vii-1.10)

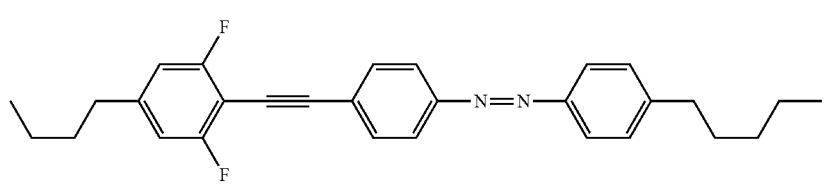

(vii-1.11)

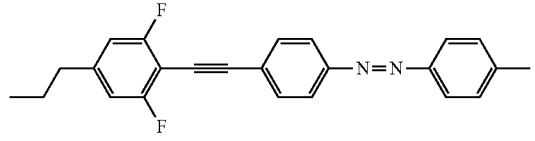

(vii-1.12)

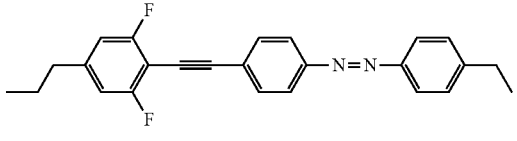

-continued
(vii-1.13)
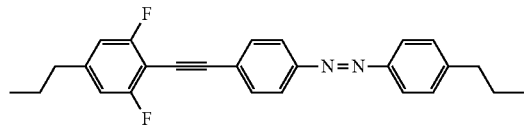
(vii-1.14)
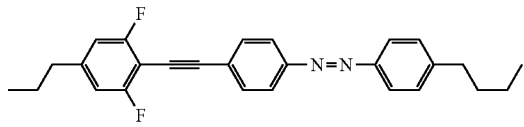
(vii-1.15)
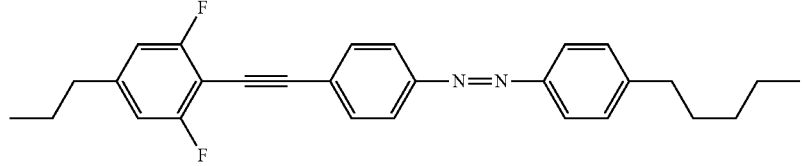
(vii-1.16)
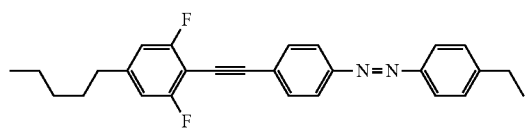
(vii-1.17)
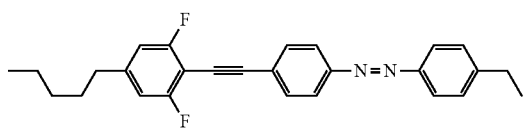
(vii-1.18)
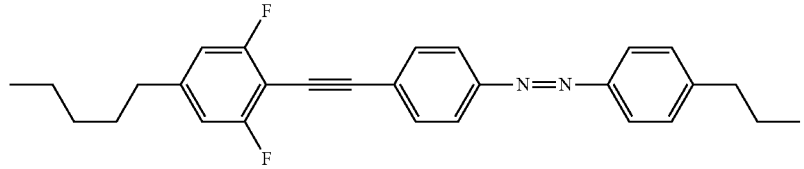
(vii-1.19)
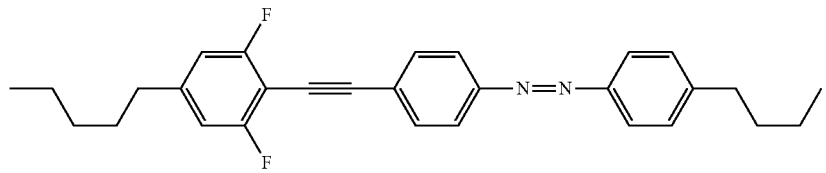
(vii-1.20)
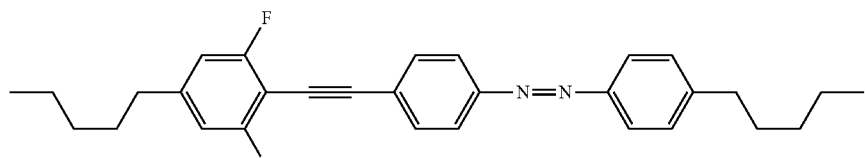
[Chem. 189]
(vii-1.21)
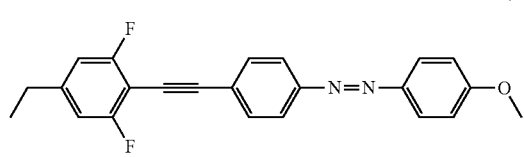
(vii-1.22)
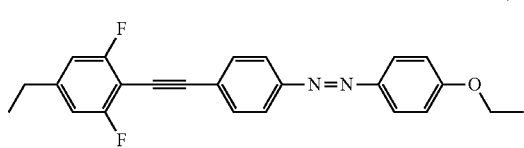
(vii-1.23)
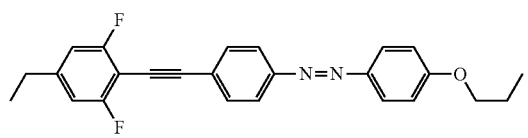
(vii-1.24)
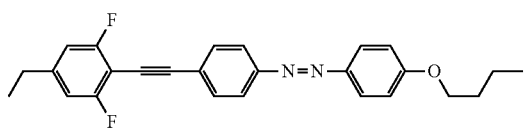
(vii-1.25)
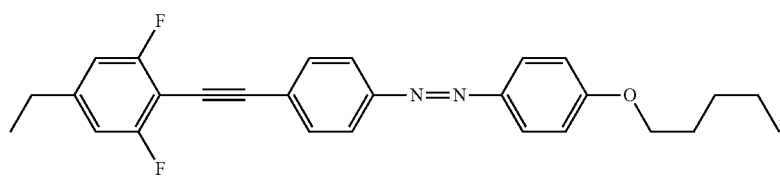

-continued
| (vii-1.26) | (vii-1.27) |
|---|---|
| 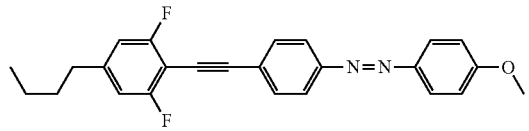 | 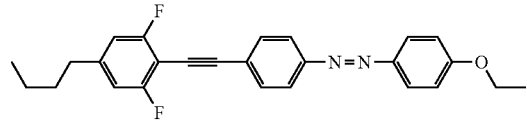 |
(vii-1.28)
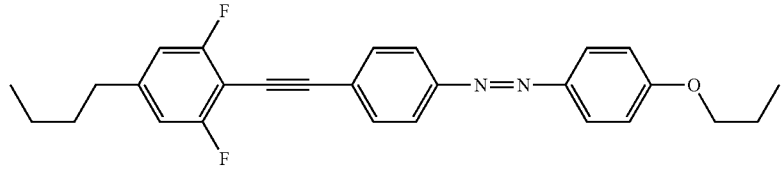
(vii-1.29)
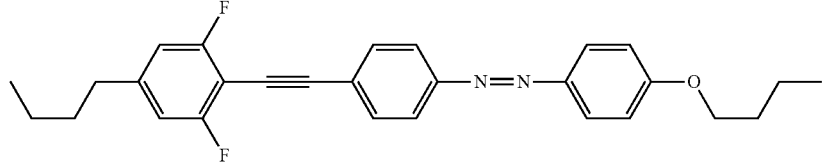
(vii-1.30)
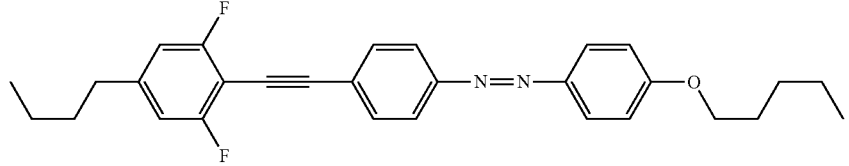
| (vii-1.31) | (vii-1.32) |
|---|---|
| 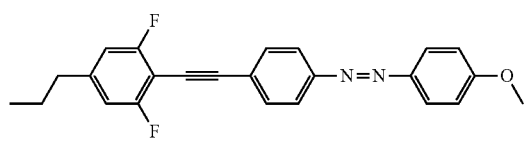 | |
(vii-1.33)
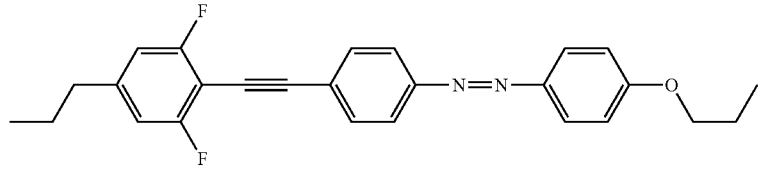
(vii-1.34)
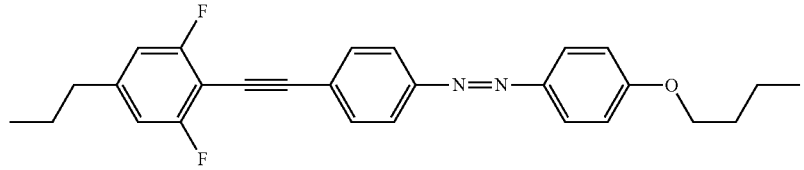
(vii-1.35)
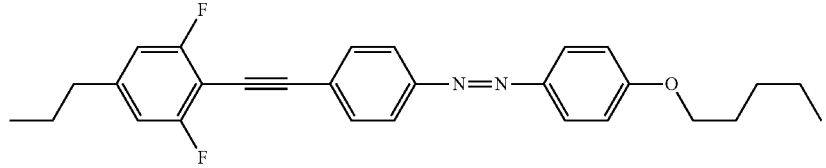
(vii-1.36)
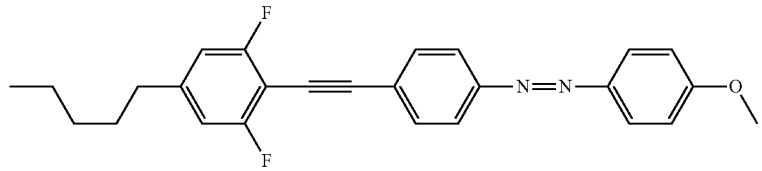

(vii-1.37)
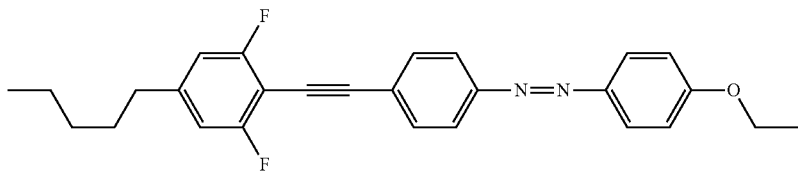
(vii-1.38)
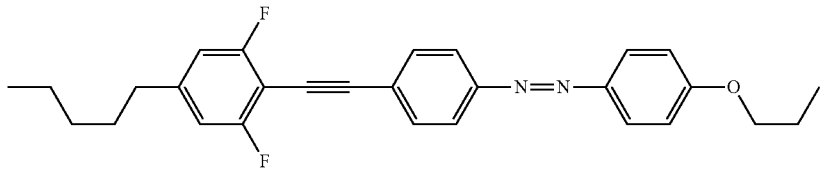
(vii-1.39)
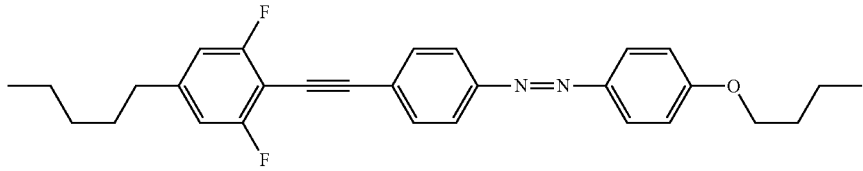
(vii-1.40)
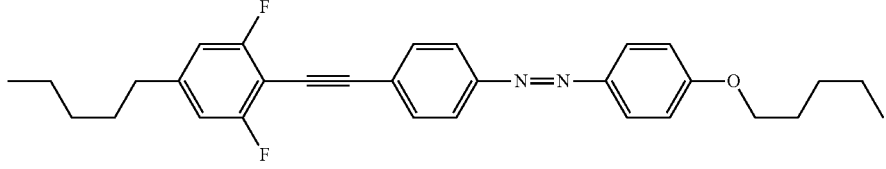
[Chem. 190]
(vii-1.41)
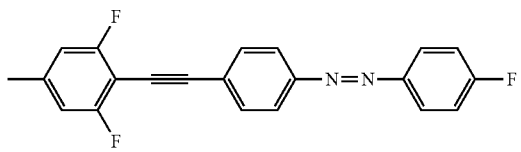
(vii-1.42)
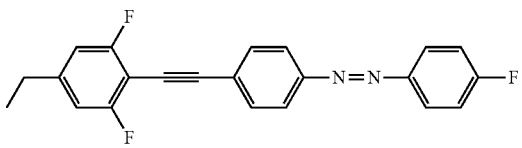
(vii-1.43)
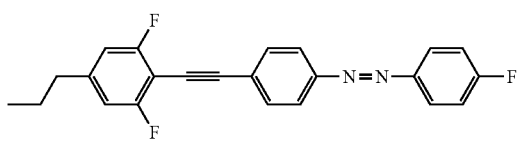
(vii-1.44)
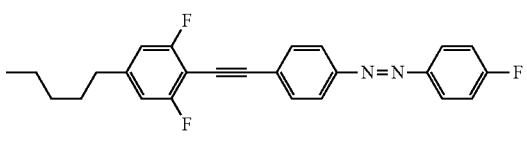
(vii-1.45)
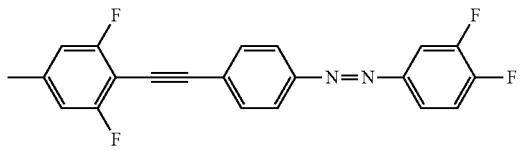
(vii-1.46)
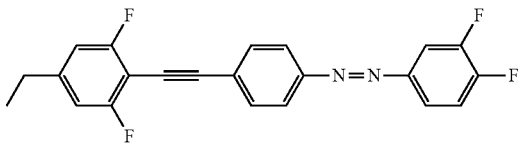
(vii-1.47)
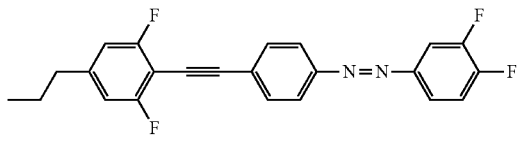
(vii-1.48)
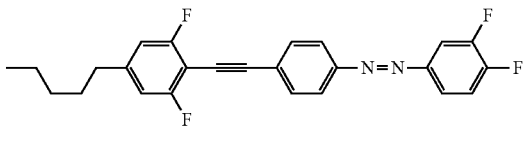
(vii-1.49)
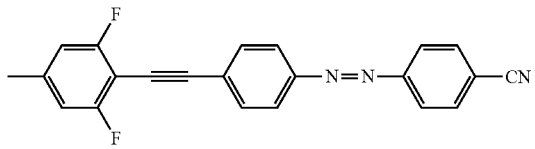
(vii-1.50)
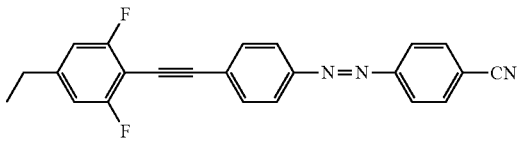

-continued
(vii-1.51)
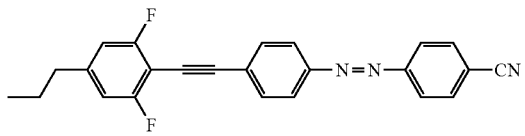
(vii-1.52)
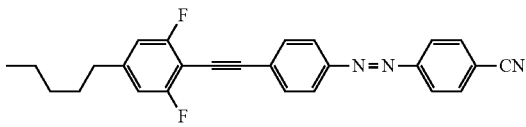
(vii-1.53)
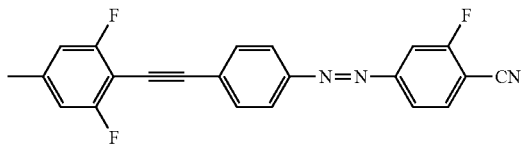
(vii-1.54)
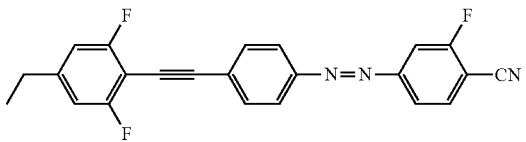
(vii-1.55)
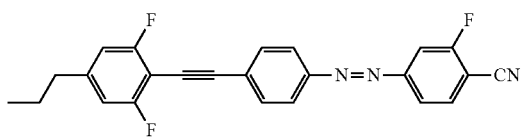
(vii-1.56)
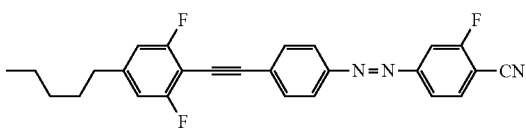
[Chem. 191]
(vii-1.57)
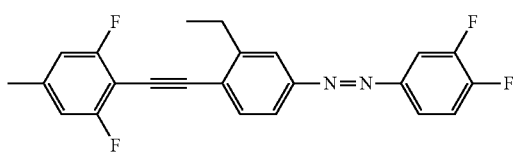
(vii-1.58)
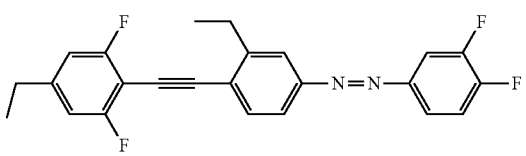
(vii-1.59)
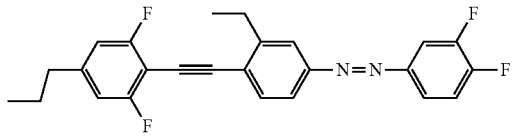
(vii-1.60)
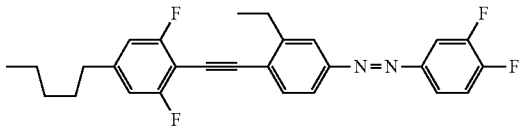
(vii-1.61)
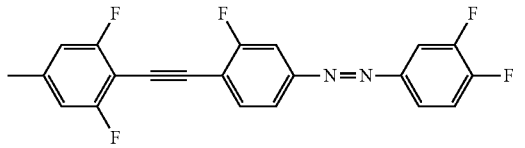
(vii-1.62)
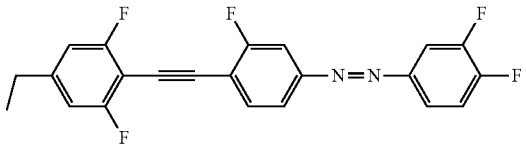
(vii-1.63)
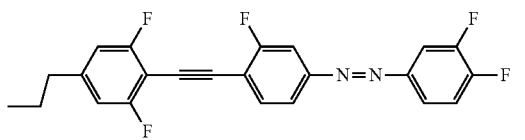
(vii-1.64)
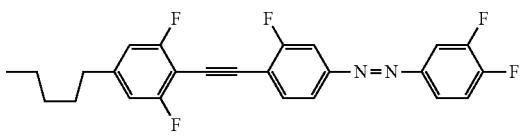
[Chem. 192]
(vii-1.65)
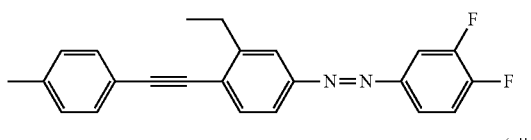
(vii-1.66)
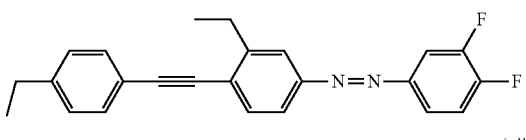
(vii-1.67)
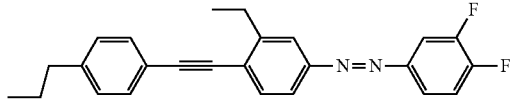
(vii-1.68)
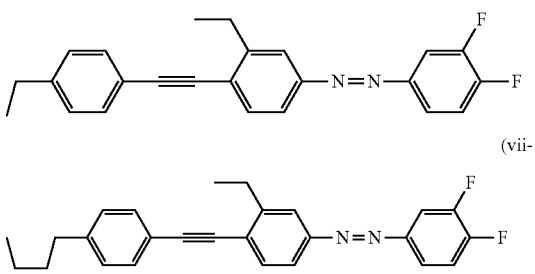

-continued
(vii-1.69)
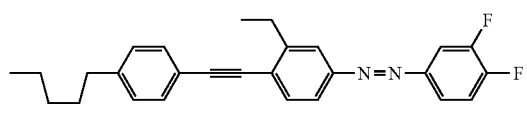
(vii-1.70)
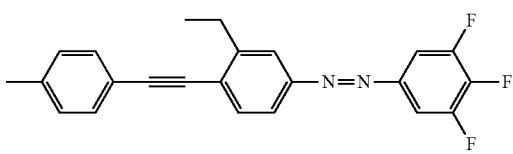
(vii-1.71)
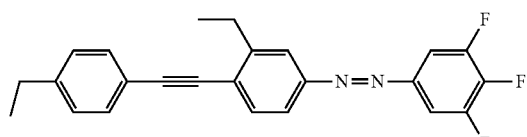
(vii-1.72)
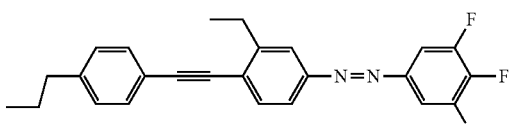
(vii-1.73)
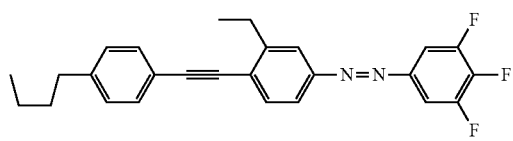
(vii-1.74)
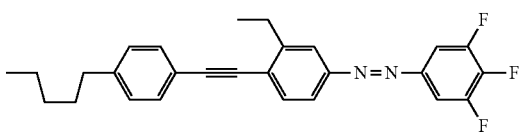
Specific examples of compounds represented by the general formula (vii-2) include the compounds represented by the structural formulae (vii-2.1) and (vii-2.22):
[Chem. 193]
(vii-2.1)
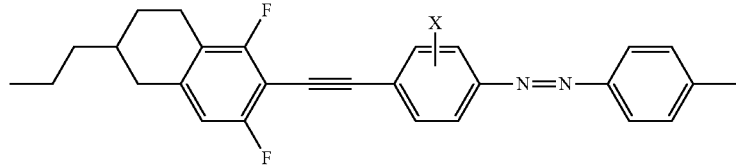
(vii-2.2)
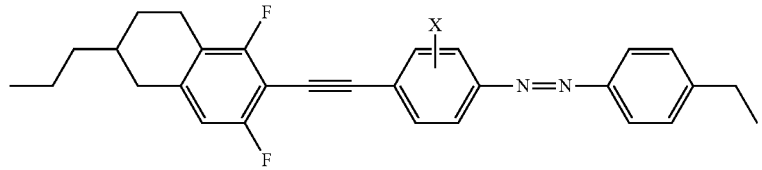
(vii-2.3)
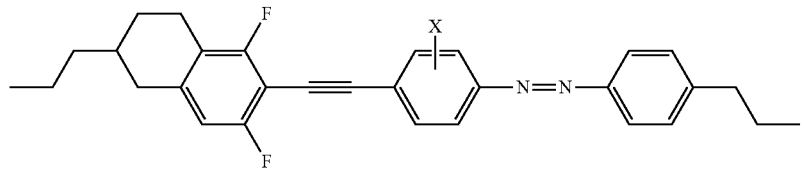
(vii-2.4)
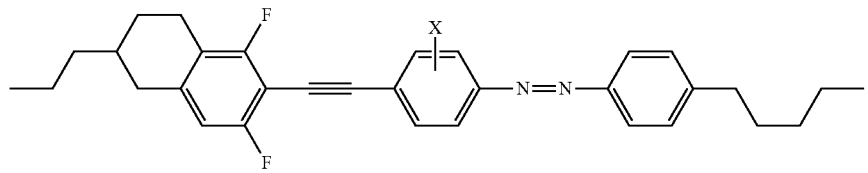
(vii-2.5)
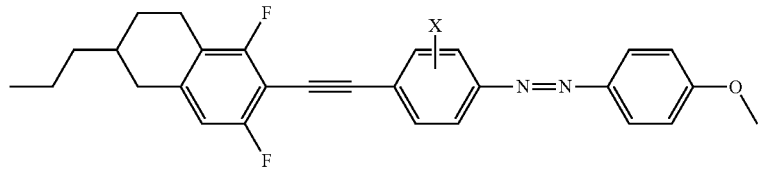

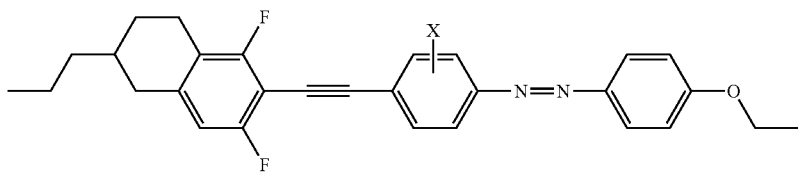
(vii-2.6)
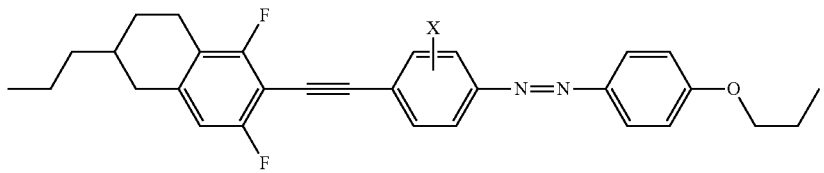
(vii-2.7)
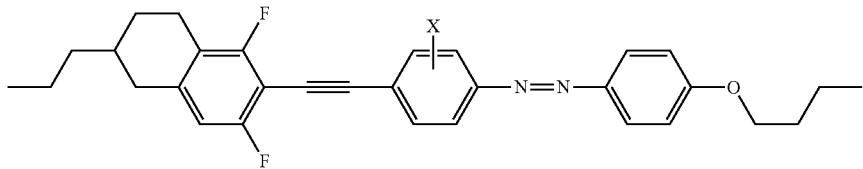
(vii-2.8)
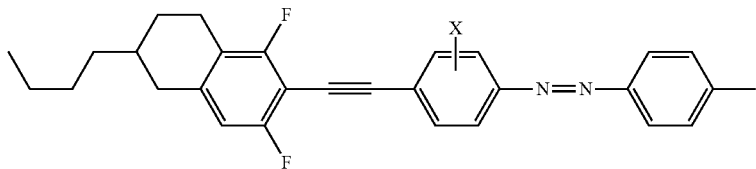
(vii-2.9)
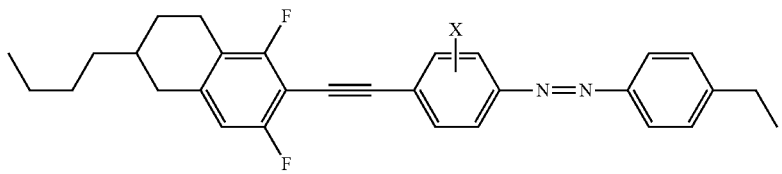
(vii-2.10)
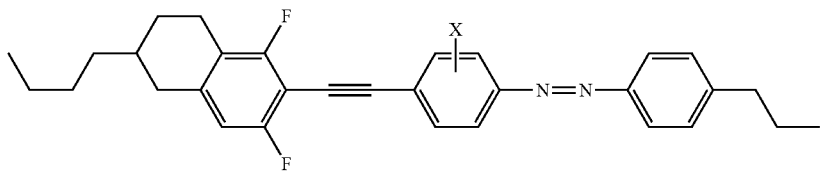
(vii-2.11)
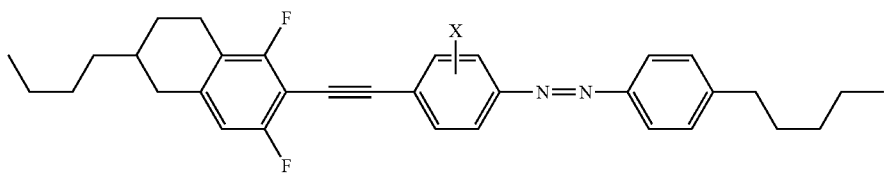
(vii-2.12)
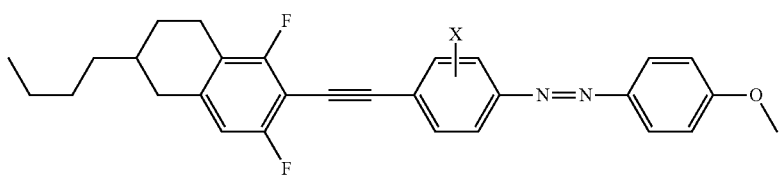
(vii-2.13)
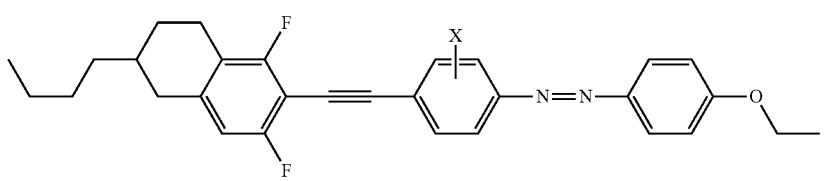
(vii-2.14)

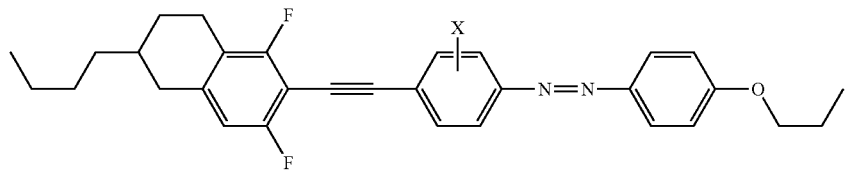
(vii-2.15)
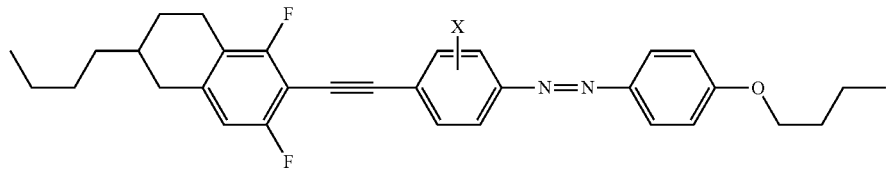
(vii-2.16)
In the formula, X each independently denotes a hydrogen atom, a fluorine atom, or an alkyl group with 1 to 6 carbon atoms.
[Chem. 194]
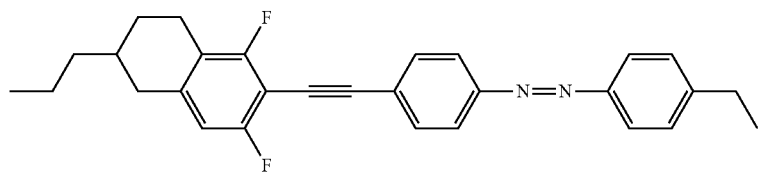
(vii-2.17)
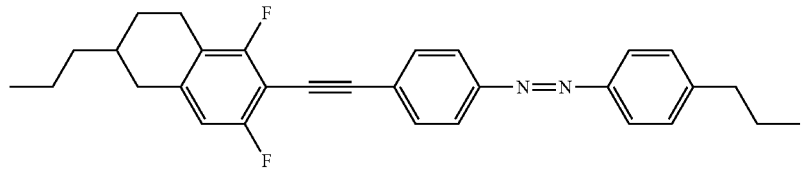
(vii-2.18)
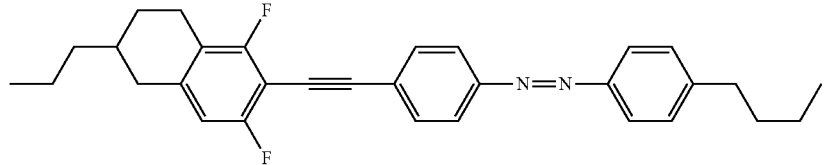
(vii-2.19)
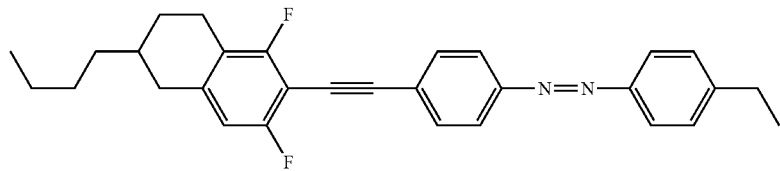
(vii-2.20)
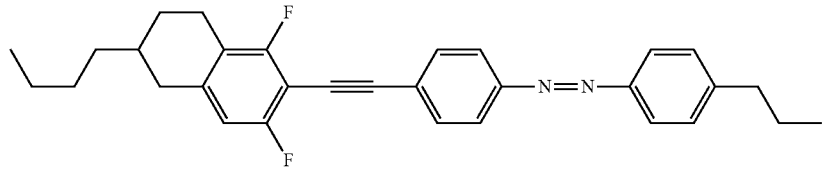
(vii-2.21)

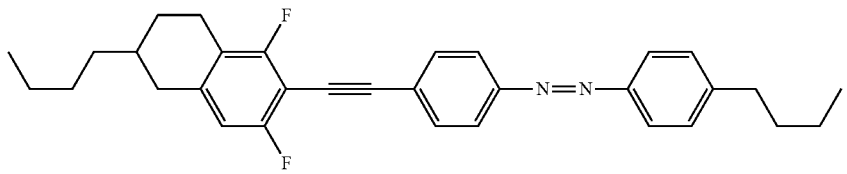

(vii-2.22)

Among the compounds represented by the structural formulae (vii-1.1) to (vii-1.74) and (vii-2.1) to (vii-2.22), the structural formulae (vii-1.1) to (vii-1.20) and the structural formulae (vii-2.17) to (vii-2.22) are preferred.

The types of compounds represented by the following formulae used for liquid crystal compositions are one or two or more types, preferably one to ten types, or preferably one to five types: the general formula (vii), the general formula (vii-1) to the general formula (vii-3), the structural formulae (vii-1.1) to (vii-1.74), or the structural formulae (vii-2.1) to (vii-2.22).

The lower limit of the total amount of compounds represented by the following formulae per 100% by mass of a liquid crystal composition is preferably 5% by mass, preferably 10% by mass, or preferably 15% by mass: the general formula (vii), the general formula (vii-1) to the general formula (vii-3), the structural formulae (vii-1.1) to (vii-1.74), or the structural formulae (vii-2.1) to (vii-2.22).

The upper limit of the total amount of compounds represented by the following formulae per 100% by mass of a liquid crystal composition is preferably 40% by mass, preferably 35% by mass, or preferably 30% by mass: the general formula (vii), the general formula (vii-1) to the general formula (vii-3), the structural formulae (vii-1.1) to (vii-1.74), or the structural formulae (vii-2.1) to (vii-2.22).

From the perspective of solubility, Δn, and/or $\Delta\varepsilon_r$, the total amount of compounds represented by the following formulae per 100% by mass of a liquid crystal composition preferably ranges from 5% to 40% by mass, preferably 10% to 35% by mass, or preferably 15% to 30% by mass: the general formula (vii), the general formula (vii-1) to the general formula (vii-3), the structural formulae (vii-1.1) to (vii-1.74), or the structural formulae (vii-2.1) to (vii-2.22).

The compounds (including subordinate concepts) represented by the general formula (vii) can be produced by a known method.

From the perspective of solubility, a liquid crystal composition according to the present invention may further contain one or two or more compounds represented by the general formulae (np-1) to (np-3):

[Chem. 195]

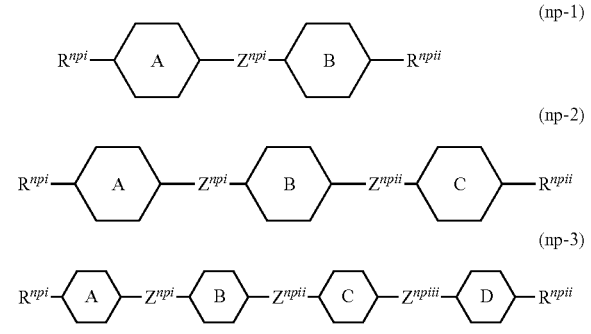

In the general formula (np-1) to (np-3), $R^{np1}$ and $R^{npi1}$ each independently denote any one of an alkyl group with 1 to 20 carbon atoms and a halogen atom.

The alkyl group with 1 to 20 carbon atoms is a linear, branched, or cyclic alkyl group, preferably a linear alkyl group.

The number of carbon atoms in the alkyl group with 1 to 20 carbon atoms preferably ranges from 2 to 10, preferably 2 to 6.

One or two or more —CH$_2$— groups in the alkyl group are each independently optionally substituted with —O—, —S—, —CO—, and/or —CS—.

One or two or more —CH$_2$—CH$_2$— groups in the alkyl group are each independently optionally substituted with —CO—O—, —O—CO—, —CO—S—, —S—CO—, —CO—NH—, —NH—CO—, —CH=CH—, —CF=CH—, —CH=CF—, —CF=CF—, and/or —C≡C—.

One or two or more —CH$_2$—CH$_2$—CH$_2$— groups in the alkyl group are each independently optionally substituted with —O—CO—O—.

One or two or more hydrogen atoms in the alkyl group are each independently optionally substituted with a halogen atom.

The halogen atom may be a fluorine atom, a chlorine atom, a bromine atom, or an iodine atom.

When the alkyl group is substituted with a predetermined group, however, oxygen atoms are not directly bonded to each other.

From the perspective of the stability of the compound, sulfur atoms are preferably not directly bonded to each other, and/or an oxygen atom and a sulfur atom are preferably not directly bonded to each other.

For example, $R^{npi}$ and $R^{npii}$ can denote an alkoxy group with 1 to 19 carbon atoms by substituting one —CH$_2$— in the alkyl group with —O—.

The alkoxy group is a linear, branched, or cyclic alkoxy group, preferably a linear alkoxy group.

The number of carbon atoms in the alkoxy group preferably ranges from 2 to 10, preferably 2 to 6.

$R^{npi}$ and $R^{npii}$ can denote a thioalkoxy group (alkylsulfanyl group, alkylthio group) with 1 to 19 carbon atoms by substituting one —CH$_2$— in the alkyl group with —S—.

The thioalkoxy group is a linear, branched, or cyclic thioalkoxy group, preferably a linear thioalkoxy group.

The number of carbon atoms in the thioalkoxy group preferably ranges from 1 to 10, preferably 1 to 6.

$R^{npi}$ and $R^{npii}$ can denote an alkenyl group with 2 to 20 carbon atoms by substituting one or two or more —CH$_2$—CH$_2$-groups in the alkyl group with —CH=CH—.

The alkenyl group is a linear, branched, or cyclic alkenyl group, preferably a linear alkenyl group.

The number of carbon atoms in the alkenyl group preferably ranges from 2 to 10, preferably 2 to 6.

$R^{npi}$ and $R^{npii}$ can denote an alkynyl group with 2 to 20 carbon atoms by substituting one or two or more —CH$_2$—CH$_2$-groups in the alkyl group with —C≡C—.

The alkynyl group is a linear, branched, or cyclic alkynyl group, preferably a linear alkynyl group.

The number of carbon atoms in the alkynyl group preferably ranges from 2 to 10, preferably 2 to 6.

$R^{npi}$ and $R^{npii}$ can denote an alkenyloxy group with 2 to 19 carbon atoms by substituting one —CH$_2$— in the alkyl group with —O— and substituting one or two or more —CH$_2$—CH$_2$— groups with —CH=CH—.

The alkenyloxy group is a linear, branched, or cyclic alkenyloxy group, preferably a linear alkenyloxy group.

The number of carbon atoms in the alkenyloxy group preferably ranges from 2 to 10, preferably 2 to 6.

$R^{npi}$ and $R^{npii}$ can denote a halogenated alkyl group with 1 to 20 carbon atoms by substituting one or two or more hydrogen atoms in the alkyl group with a halogen atom.

The halogenated alkyl group is a linear, branched, or cyclic halogenated alkyl group, preferably a linear halogenated alkyl group.

The number of carbon atoms in the halogenated alkyl group preferably ranges from 2 to 10, preferably 2 to 6.

$R^{npi}$ and $R^{npii}$ can denote a halogenated alkoxy group with 1 to 19 carbon atoms by substituting one —CH$_2$— in the alkyl group with —O— and substituting one or two or more hydrogen atoms in the alkyl group with a halogen atom.

The halogenated alkoxy group is a linear, branched, or cyclic alkoxy group, preferably a linear alkoxy group.

The number of carbon atoms in the halogenated alkoxy group preferably ranges from 2 to 10, preferably 2 to 6.

Specific examples of the alkyl group with 1 to 20 carbon atoms (including substituted ones) in $R^{npi}$ and $R^{npii}$ include the groups represented by the formulae ($R^{npi/ii}$-1) to ($R^{npi/ii}$-36):

[Chem. 196]

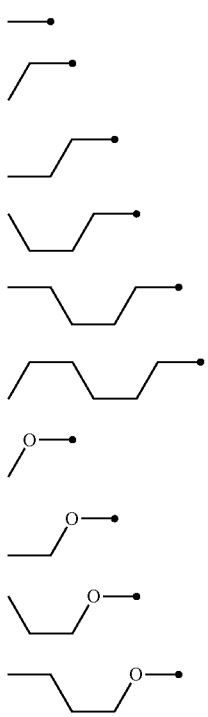

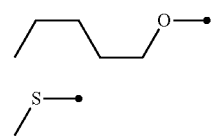
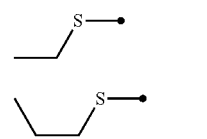
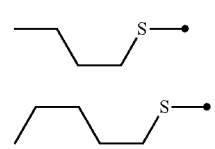
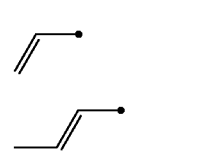
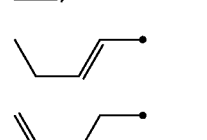
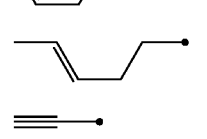
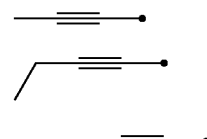
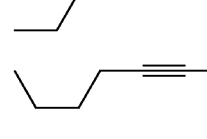
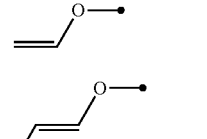
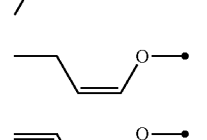
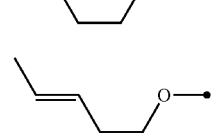
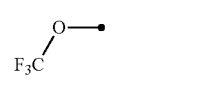
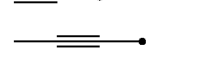
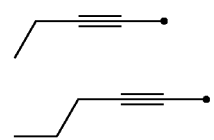
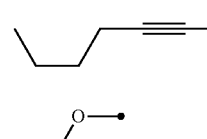
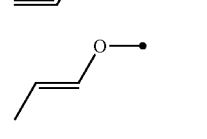
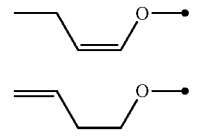
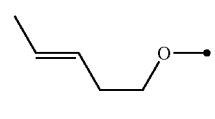

-continued

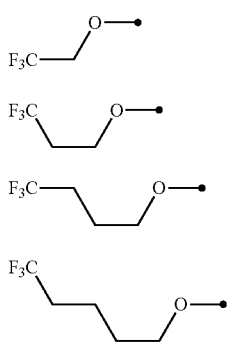

(R$^{npi/ii}$-33)

(R$^{npi/ii}$-34)

(R$^{npi/ii}$-35)

(R$^{npi/ii}$-36)

In the formulae (R$^{npi/ii}$-1) to (R$^{npi/ii}$-36), a black dot represents a bonding arm to a ring A, B, C, or D.

The halogen atom in R$^{npi}$ and R$^{npii}$ may be a fluorine atom, a chlorine atom, a bromine atom, an iodine atom, or the like.

In the general formulae (np-1) to (np-3), the rings A, B, C, and D each independently denote a group selected from the group consisting of the groups (a), (b), (c), and (d):

(a) a 1,4-cyclohexylene group (one —CH$_2$— or two or more nonadjacent —CH$_2$— groups in this group are optionally substituted with —O—), (b) a 1,4-phenylene group (one —CH= or two or more nonadjacent —CH= groups in this group are optionally substituted with —N=), (c) a naphthalene-2,6-diyl group, a 1,2,3,4-tetrahydronaphthalene-2,6-diyl group, or a decahydronaphthalene-2,6-diyl group (one —CH= or two or more nonadjacent —CH= groups in the naphthalene-2,6-diyl group or the 1,2,3,4-tetrahydronaphthalene-2,6-diyl group are optionally substituted with —N=), and (d) a 1,4-cyclohexenylene group, a 1,3-dioxane-trans-2,5-diyl group, a pyrimidine-2,5-diyl group, or a pyridine-2,5-diyl group.

One or two or more hydrogen atoms in the rings A, B, C, and D are each independently optionally substituted with a substituent S$^{npi1}$.

The substituent S$^{npi1}$ denotes any one of a halogen atom, a cyano group, and an alkyl group with 1 to 20 carbon atoms.

The halogen atom may be a fluorine atom, a chlorine atom, a bromine atom, or an iodine atom, preferably a fluorine atom from the perspective of stability and safety.

The alkyl group with 1 to 20 carbon atoms is a linear, branched, or cyclic alkyl group, preferably a linear alkyl group.

The number of carbon atoms in the alkyl group with 1 to 20 carbon atoms preferably ranges from 2 to 10, preferably 2 to 6.

One or two or more —CH$_2$— groups in the alkyl group are each independently optionally substituted with —O—, —S—, —CO—, and/or —CS—.

One or two or more —CH$_2$—CH$_2$— groups in the alkyl group are each independently optionally substituted with —CO—O—, —O—CO—, —CO—S—, —S—CO—, —CO—NH—, —NH—CO—, —CH=CH—, —CF=CF—, and/or —C≡C—.

One or two or more —CH$_2$—CH$_2$—CH$_2$— groups in the alkyl group are each independently optionally substituted with —O—CO—O—.

One or two or more hydrogen atoms in the alkyl group are each independently optionally substituted with a halogen atom.

The halogen atom may be a fluorine atom, a chlorine atom, a bromine atom, or an iodine atom.

When the alkyl group is substituted with a predetermined group, however, oxygen atoms are not directly bonded to each other.

From the perspective of the stability of the compound, sulfur atoms are preferably not directly bonded to each other, and/or an oxygen atom and a sulfur atom are preferably not directly bonded to each other.

From the perspective of V$_{th}$, the substituent S$^{npi1}$ is preferably a halogen atom, preferably a fluorine atom.

A plurality of substituents S$^{npi1}$, if present, may be the same or different.

The substitution position of the substituent S$^{npi1}$ in the ring A is preferably represented by the formula (A-SP-1):

[Chem. 197]

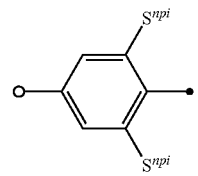

(A-SP-1)

In the formula (A-SP-1), a white dot represents a bonding arm to R$^{npi}$, and a black dot represents a bonding arm to Z$^{npi}$.

More specifically, the ring A preferably denotes any one of the formulae (A-1) to (A-3):

[Chem. 198]

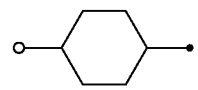

(A-1)

(A-2)

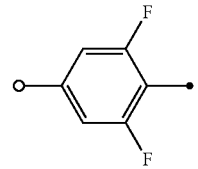

(A-3)

In the formulae (A-1) to (A-3), a white dot represents a bonding arm to R$^{npi}$, and a black dot represents a bonding arm to Z$^{npi}$.

More specifically, the ring B preferably denotes any one of the formulae (B-1) and (B-2):

[Chem. 199]

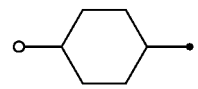

(B-1)

-continued (B-2)

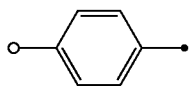

In the formulae (B-1) and (B-2), a white dot represents a bonding arm to $Z^{npi}$, and a black dot represents a bonding arm to $R^{npii}$ or $Z^{npii}$.

More specifically, the ring C preferably denotes any one of the formulae (C-1) and (C-2):

[Chem. 200]

(C-1)

(C-2)

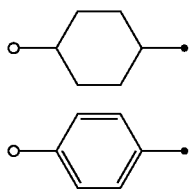

In the formulae (C-1) and (C-2), a white dot represents a bonding arm to $Z^{npii}$, and a black dot represents a bonding arm to $R^{npii}$ or $Z^{npiii}$.

In the general formulae (np-1) to (np-3), $Z^{npi}$, $Z^{npii}$, and $Z^{npiii}$ each independently denote any one of a single bond and an alkylene group with 1 to 20 carbon atoms.

One or two or more —$CH_2$— groups in the alkylene group are each independently optionally substituted with —O—.

One or two or more —$CH_2$—$CH_2$— groups in the alkylene group are each independently optionally substituted with —$CH_2$—$CH(CH_3)$—, —$CH(CH_3)$—$CH_2$—, —CH=CH—, —CF=CF—, —CH=C($CH_3$)—, —C($CH_3$)=CH—, —CH=N—, —N=CH—, —N=N—, —C≡C—, —CO—O—, and/or —O—CO—.

One or two or more —$CH_2$—$CH_2$—$CH_2$— groups in the alkyl group are each independently optionally substituted with —O—CO—O—.

When an alkyl group with 1 to 10 carbon atoms is substituted with a predetermined group, oxygen atoms are not directly bonded to each other.

From the perspective of the stability of the compound, sulfur atoms are preferably not directly bonded to each other, and/or an oxygen atom and a sulfur atom are preferably not directly bonded to each other.

Specific examples of the alkylene group with 1 to 20 carbon atoms (including substituted ones) include the groups represented by the formulae ($Z^{npi/ii/iii}$-1) to ($Z^{npi/ii/iii}$-24):

[Chem. 201]

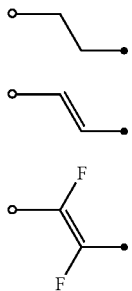

($Z^{npi/ii/iii}$-1)

($Z^{npi/ii/iii}$-2)

($Z^{npi/ii/iii}$-3)

-continued

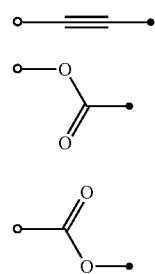

($Z^{npi/ii/iii}$-4)

($Z^{npi/ii/iii}$-5)

($Z^{npi/ii/iii}$-6)

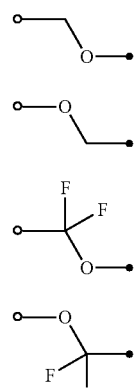

($Z^{npi/ii/iii}$-7)

($Z^{npi/ii/iii}$-8)

($Z^{npi/ii/iii}$-9)

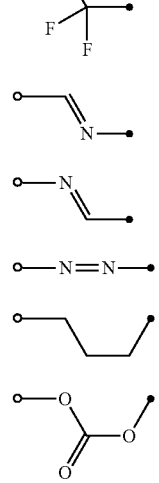

($Z^{npi/ii/iii}$-10)

($Z^{npi/ii/iii}$-11)

($Z^{npi/ii/iii}$-12)

($Z^{npi/ii/iii}$-13)

($Z^{npi/ii/iii}$-14)

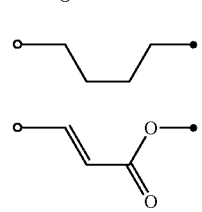

($Z^{npi/ii/iii}$-15)

($Z^{npi/ii/iii}$-16)

($Z^{npi/ii/iii}$-17)

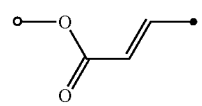

($Z^{npi/ii/iii}$-18)

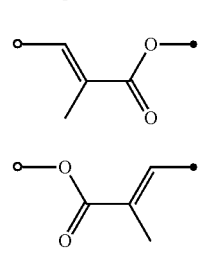

($Z^{npi/ii/iii}$-19)

($Z^{npi/ii/iii}$-20)

-continued (Z$^{npi/ii/iii}$-21)

(Z$^{npi/ii/iii}$-22)

(Z$^{npi/ii/iii}$-23)

(Z$^{npi/ii/iii}$-24)

In the formulae (Z$^{npi/ii/iii}$-1) to (Z$^{np/i/ii/iii}$-24), a white dot represents a bonding arm to the ring A, B, or C, and a black dot represents a bonding arm to the ring B, C, or D.

From the perspective of Δn and/or Δε$_r$, Z$^{npi}$, Z$^{npii}$, and Z$^{npiii}$ each independently preferably denote any one of a single bond, —C≡C—, and —CO—O—.

Among the compounds represented by the general formulae (np-1) to (np-3), however, the compounds represented by the general formulae (vi) and (vii) (including subordinate concepts) are excluded.

Compounds represented by the general formula (np-2) are preferably compounds represented by the general formulae (np-2-1) and (np-2-2):

[Chem. 202]

(np-2-1)

(np-2-2)

In the general formulae (np-2-1) and (np-2-2), R$^{npi}$, R$^{npii}$, and S$^{npi}$ have the same meaning as R$^{npi}$, R$^{npii}$, and S$^{npi}$, respectively, in the general formulae (np-1) to (np-3).

Specific examples of compounds represented by the general formula (np-2-1) include the compound represented by the structural formula (np-2-1.1):

[Chem. 203]

(np-2-1.1)

Specific examples of compounds represented by the general formula (np-2-2) include the compounds represented by the structural formulae (np-2-2.1) to (np-2-2.5):

[Chem. 204]

(np-2-2.1)

(np-2-2.2)

(np-2-2.3)

(np-2-2.4)

(np-2-2.5)

The types of compounds represented by the following formulae used for liquid crystal compositions are one or two or more types, preferably one to ten types, preferably one to eight types, preferably one to six types, preferably one to four types, or preferably one or two types: the general formulae (np-1) to (np-3), the general formulae (np-2-1) and (np-2-2), the structural formula (np-2-1.1), or the structural formulae (np-2-2.1) to (np-2-2.5).

The lower limit of the total amount of compounds represented by the following formulae per 100% by mass of a liquid crystal composition is preferably 1% by mass, preferably 5% by mass, or preferably 10% by mass: the general formulae (np-1) to (np-3), the general formulae (np-2-1) and (np-2-2), the structural formula (np-2-1.1), or the structural formulae (np-2-2.1) to (np-2-2.5).

The upper limit of the total amount of compounds represented by the following formulae per 100% by mass of a liquid crystal composition is preferably 50% by mass, preferably 40% by mass, or preferably 30% by mass: the general formulae (np-1) to (np-3), the general formulae (np-2-1) and (np-2-2), the structural formula (np-2-1.1), or the structural formulae (np-2-2.1) to (np-2-2.5).

From the perspective of solubility, Gn, and/or Acr, the total amount of compounds represented by the following formulae per 100% by mass of a liquid crystal composition preferably ranges from 1% to 50% by mass, preferably 5% to 40% by mass, or preferably 10% to 30% by mass: the general formulae (np-1) to (np-3), the general formulae (np-2-1) and (np-2-2), the structural formula (np-2-1.1), or the structural formulae (np-2-2.1) to (np-2-2.5).

The compounds represented by the general formulae (np-1) to (np-3), the general formulae (np-2-1) and (np-2-2), the structural formula (np-2-1.1), or the structural formulae (np-2-2.1) to (np-2-2.5) can be produced by a known method.

(Liquid Crystal Composition)

A liquid crystal composition according to the present invention can be produced, for example, by mixing the compound represented by the general formula (i), another optional compound described above, and an additive.

The additive may be a stabilizer, a dye compound, or a polymerizable compound.

The stabilizer is, for example, a hydroquinone, a hydroquinone monoalkyl ether, a tert-butylcatechol, a pyrogallol, a thiophenol, a nitro compound, a β-naphthylamine, a D-naphthol, a nitroso compound, a hindered phenol, or a hindered amine.

The hindered phenol may be a hindered phenol antioxidant represented by one of the structural formulae (XX-1) to (XX-3):

[Chem. 205]

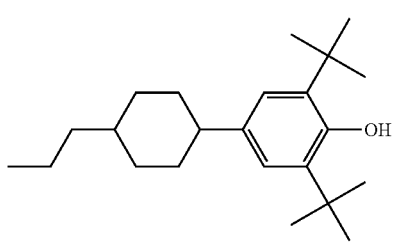

(XX-1)

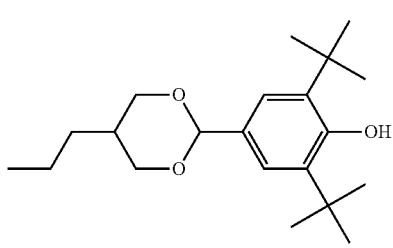

(XX-2)

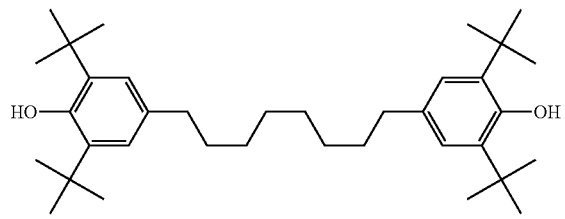

(XX-3)

The hindered amine may be a hindered amine light stabilizer represented by one of the structural formulae (YY-1) and (YY-2):

[Chem. 206]

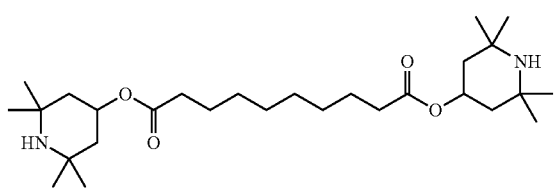

(YY-1)

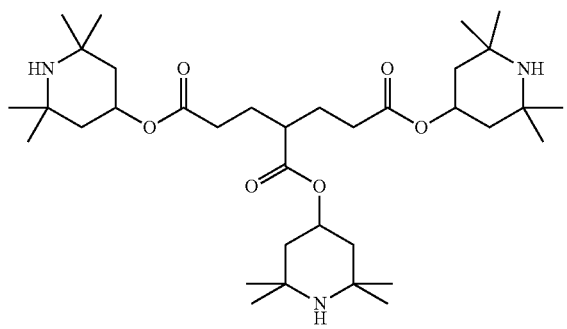

(YY-2)

The total content of stabilizer, if present, per 100% by mass of a liquid crystal composition preferably ranges from 0.005% to 1% by mass, preferably 0.02% to 0.50% by mass, or preferably 0.03% to 0.35% by mass.

From the perspective of solubility, $\Delta n$, and/or $\Delta \varepsilon_r$, a combination of compounds for use in a liquid crystal composition is preferably a combination of a compound represented by the general formula (i) (including a subordinate concept) and a compound represented by the general formula (ii) (including a subordinate concept), a combination of a compound represented by the general formula (i) (including a subordinate concept), a compound represented by the general formula (ii) (including a subordinate concept), and a compound represented by the general formula (vi) (including a subordinate concept), or a combination of a compound represented by the general formula (i) (including a subordinate concept), a compound represented by the general formula (ii) (including a subordinate concept), a compound represented by the general formula (vi) (including a subordinate concept), and a compound represented by the general formula (vii) (including a subordinate concept).

<Characteristic Values of Liquid Crystal Composition>

The liquid crystal phase upper limit temperature ($T_{ni}$) is a phase transition temperature of a liquid crystal composition from a nematic phase to an isotropic phase.

$T_{ni}$ is measured by preparing a preparation in which a liquid crystal composition is disposed between a slide glass and a cover glass, followed by polarized light microscopy during heating on a hot stage.

It can also be measured by differential scanning calorimetry (DSC).

The unit is "° C.".

With a higher $T_{ni}$, the nematic phase can be maintained even at high temperatures, and the driving temperature range can be widened.

The liquid crystal phase upper limit temperature ($T_{ni}$) of a liquid crystal composition according to the present invention can be appropriately set for the indoors or the inside of an automobile where the external temperature of a liquid crystal display element can be controlled, or for the outdoors, and, from the perspective of the driving temperature range, is preferably 100° C. or more, preferably 100° C. to 200° C., or preferably 110° C. to 190° C.

The liquid crystal phase lower limit temperature ($T_{\to N}$) is a phase transition temperature of a liquid crystal composition from another phase (glass, a smectic phase, or a crystalline phase) to a nematic phase.

$T_{\to N}$ is measured by filling a glass capillary with a liquid crystal composition, immersing the liquid crystal composition in a refrigerant at −70° C. for a phase transition to another phase, and observing the liquid crystal composition while increasing the temperature.

It can also be measured by differential scanning calorimetry (DSC).

The unit is "° C.".

With a lower $T_{\to N}$, the nematic phase can be maintained even at low temperatures, and the driving temperature range can therefore be widened.

The liquid crystal phase lower limit temperature ($T_{\to N}$) of a liquid crystal composition according to the present invention is preferably 10° C. or less, preferably −70° C. to 0° C., or preferably −40° C. to −5° C., from the perspective of the driving temperature range.

Δn (refractive index anisotropy) correlates with Δn in the near-infrared region used in an optical sensor described later.

A higher Δn results in a higher phase modulation power of light with a target wavelength and is therefore particularly suitable for an optical sensor.

Δn at 25° C. and at 589 nm is determined with an Abbe refractometer from the difference ($n_e - n_o$) between the extraordinary refractive index ($n_e$) and the ordinary refractive index ($n_o$) of a liquid crystal composition.

Δn can also be determined with a phase difference measuring apparatus.

The phase difference Re, the thickness d of a liquid crystal layer, and Δn have the relationship Δn=Re/d.

A liquid crystal composition is injected into a glass cell with a polyimide alignment film, which has a cell gap (d) of approximately 3.0 μm and has been subjected to antiparallel rubbing treatment, and the in-plane Re is measured using a retardation film and an optical material inspection apparatus RETS-100 (manufactured by Otsuka Electronics Co., Ltd.).

The measurement is performed at a temperature of 25° C. and at 589 nm.

There is no unit.

A liquid crystal composition according to the present invention preferably has Δn of 0.30 or more, preferably 0.30 to 0.60, preferably 0.35 to 0.55, or preferably 0.38 to 0.50, at 25° C. and at 589 nm.

The rotational viscosity ($\gamma_1$) is a viscosity coefficient related to the rotation of a liquid crystal molecule.

$\gamma_1$ can be measured with LCM-2 (manufactured by Toyo Corporation) by filling a glass cell having a cell gap of approximately 10 μm with a liquid crystal composition.

A horizontal alignment cell is used for a liquid crystal composition with positive permittivity anisotropy, and a vertical alignment cell is used for a liquid crystal composition with negative permittivity anisotropy.

The measurement is performed at a temperature of 25° C.

The unit is mPa·s.

A liquid crystal composition with lower $\gamma_1$ has a higher response speed and is suitable for any liquid crystal display element.

From the perspective of the response speed, a liquid crystal composition according to the present invention preferably has a rotational viscosity ($\gamma_1$) in the range of 150 to 2000 mPa·s, preferably 200 to 1800 mPa·s, or preferably 250 to 1500 mPa·s, at 25° C.

The threshold voltage ($V_{th}$) correlates with the drive voltage of a liquid crystal composition.

The $V_{th}$ can be determined from transmittance when a voltage is applied to a TN cell with a gap of 8.3 μm filled with a liquid crystal composition.

The measurement is performed at a temperature of 25° C.

The unit is "V".

A lower $V_{th}$ allows driving at a lower voltage.

From the perspective of the drive voltage, a liquid crystal composition according to the present invention preferably has a $V_{th}$ of 3.0 V or less, preferably 0.3 to 3.0 V, preferably 0.5 to 2.7 V, preferably 0.7 to 2.5 V, preferably 0.9 to 2.3 V, preferably 1.1 to 2.1 V, or preferably 1.3 to 2.0 V, at 25° C.

Higher permittivity anisotropy in a high-frequency region results in a higher phase modulation power for a radio wave in a target frequency band and is particularly suitable for antenna applications.

In antenna applications, a lower dielectric loss tangent in a high-frequency region is preferred due to a smaller energy loss in a target frequency band.

In a liquid crystal composition according to the present invention, the permittivity anisotropy $\Delta\varepsilon_r$ and the average value tan $\delta_{iso}$ of dielectric loss tangent at 10 GHZ were measured as representative characteristics in a high-frequency region.

$$\Delta\varepsilon_r = (\varepsilon_{r//} - \varepsilon_{r\perp}),$$

and $$\tan\delta_{iso} = (2\varepsilon_{r\perp}\tan\delta_\perp + \varepsilon_{r//}\tan\delta_{//})/(2\varepsilon_{r\perp} + \varepsilon_{r//}).$$

"εr" denotes a dielectric constant, "tan δ" denotes a dielectric loss tangent, the subscript "//" denotes a component in a direction parallel to the orientation direction of a liquid crystal, and the subscript "⊥" denotes a component in a direction perpendicular to the orientation direction of a liquid crystal.

$\Delta\varepsilon_r$ and tan $\delta_{iso}$ can be measured by the following method.

First, a liquid crystal composition is introduced into a capillary made of polytetrafluoroethylene (PTFE).

The capillary has an inner radius of 0.80 mm, an outer radius of 0.835 mm, and an effective length of 4.0 cm.

The capillary filled with the liquid crystal composition is introduced into the center of a cavity resonator with a resonance frequency of 10 GHz (manufactured by EM labs, Inc.).

The cavity resonator has an external shape with a diameter of 30 mm and a width of 26 mm.

A signal is inputted, and the result of an output signal is recorded with a network analyzer (manufactured by Keysight Technologies).

The dielectric constant ($\varepsilon_r$) and the loss angle ($\Delta$) at 10 GHz are determined using the difference between the resonance frequency or the like of a PTFE capillary without the liquid crystal composition and the resonance frequency or the like of the PTFE capillary filled with the liquid crystal composition.

The tangent of a thus determined is the dielectric loss tangent (tan $\delta$).

The resonance frequency or the like of the PTFE capillary filled with the liquid crystal composition is determined by the orientation control of liquid crystal molecules as the value of a characteristic component perpendicular to the orientation direction of the liquid crystal molecules and as the value of a characteristic component parallel to the orientation direction of the liquid crystal molecules.

A magnetic field of a permanent magnet or an electromagnet is used to arrange liquid crystal molecules in the vertical direction (perpendicular to the effective length direction) or in the parallel direction (parallel to the effective length direction) of the PTFE capillary.

The magnetic field has, for example, a distance of 45 mm between magnetic poles and a magnetic field strength of 0.23 tesla near the center.

The desired characteristic component is obtained by rotating the PTFE capillary filled with the liquid crystal composition in parallel or perpendicular to the magnetic field.

The measurement is performed at a temperature of 25° C. $\Delta\varepsilon_r$ and tan $\delta_{iso}$ have no unit.

The $\Delta\varepsilon_r$ of a liquid crystal composition according to the present invention at 25° C. is preferably higher and, from the perspective of the phase modulation power in the GHz band, is preferably 0.90 or more, preferably 0.90 to 1.40, preferably 0.95 to 1.40, or preferably 1.00 to 1.40.

The tan $\delta_{iso}$ of a liquid crystal composition according to the present invention at 25° C. is preferably lower and, from the perspective of loss in the GHz band, is preferably 0.025 or less, preferably 0.001 to 0.025, preferably 0.003 to 0.020, preferably 0.005 to 0.017, preferably 0.007 to 0.015, preferably 0.008 to 0.013, or preferably 0.009 to 0.012. (Liquid Crystal Display Element, Sensor, Liquid Crystal Lens, Optical Communication Equipment, and Antenna)

A liquid crystal display element, a sensor, a liquid crystal lens, optical communication equipment, and an antenna using a liquid crystal composition according to the present invention are described below.

A liquid crystal display element according to the present invention is characterized by using the liquid crystal composition and is preferably driven by an active matrix system or a passive matrix system.

A liquid crystal display element according to the present invention is preferably a liquid crystal display element that reversibly switches permittivity by reversibly changing the orientation direction of liquid crystal molecules of the liquid crystal composition.

A sensor according to the present invention is characterized by using the liquid crystal composition and is, for example, in one embodiment, a range sensor utilizing electromagnetic waves, visible light, or infrared light, an infrared sensor utilizing a temperature change, a temperature sensor utilizing a reflected light wavelength change due to a pitch change of a cholesteric liquid crystal, a pressure sensor utilizing a reflected light wavelength change, an ultraviolet sensor utilizing a reflected light wavelength change due to a composition change, an electric sensor utilizing a temperature change due to the voltage or the electric current, a radiation sensor utilizing a temperature change associated with a track of radiation particles, an ultrasonic sensor utilizing a liquid crystal molecular arrangement change due to mechanical vibration of ultrasonic waves, or an electromagnetic field sensor utilizing a reflected light wavelength change due to a temperature change or a liquid crystal molecular arrangement change due to an electric field.

The range sensor is preferably used for light detection and ranging (LiDAR) using a light source.

The LiDAR is preferably a LiDAR for an artificial satellite, an aircraft, an unmanned aerial vehicle (drone), an automobile, a railway, or a ship.

A LiDAR for an automobile is particularly preferably a LiDAR for a self-driving vehicle.

The light source is preferably an LED or a laser, preferably a laser.

The light used for LiDAR is preferably infrared light and preferably has a wavelength in the range of 800 to 2000 nm.

In particular, an infrared laser with a wavelength of 905 nm or 1550 nm is preferred.

An infrared laser with a wavelength of 905 nm is preferred when the cost of a photodetector to be used and the sensitivity in all weather are regarded as important, and an infrared laser with a wavelength of 1550 nm is preferred when the safety related to human vision is regarded as important.

A liquid crystal composition according to the present invention has a high $\Delta n$ and can therefore provide a sensor with a high phase modulation power in visible light, infrared light, and electromagnetic wave regions and with high detectivity.

A liquid crystal lens according to the present invention is characterized by using the liquid crystal composition and includes, for example, in one embodiment, a first transparent electrode layer, a second transparent electrode layer, a liquid crystal layer containing the liquid crystal composition between the first transparent electrode layer and the second transparent electrode layer, an insulating layer between the second transparent electrode layer and the liquid crystal layer, and a high-resistance layer between the insulating layer and the liquid crystal layer.

A liquid crystal lens according to the present invention is utilized, for example, as a 2D, 3D switching lens, a focusing lens of a camera, or the like.

Optical communication equipment according to the present invention is characterized by using the liquid crystal composition, and is, for example, in one embodiment, a liquid crystal on silicon (LCOS) including a liquid crystal layer in which a liquid crystal constituting each of a plurality of pixels is two-dimensionally arranged on a reflective layer (electrode).

Optical communication equipment according to the present invention is used as a spatial phase modulator, for example.

An antenna according to the present invention is characterized by using the liquid crystal composition.

More specifically, an antenna according to the present invention includes a first substrate with a plurality of slots, a second substrate facing the first substrate and having a power supply portion, a first dielectric layer between the first substrate and the second substrate, a plurality of patch electrodes arranged corresponding to the plurality of slots, a third substrate on which the patch electrodes are provided, and a liquid crystal layer between the first substrate and the third substrate, wherein the liquid crystal layer contains the liquid crystal composition described above.

A liquid crystal composition containing one or two or more compounds represented by the general formula (i) having an ethynylene group (—C≡C—) and an isothiocyanate group (—NCS) can be used as a liquid crystal composition to provide an antenna that has a high $T_{ni}$, a high Δn, a low $V_h$, a high $Δε_r$, a low tan $δ_{iso}$, and high storage stability at low temperatures and that therefore has high reliability against an external stimulus, such as heat.

This makes it possible to provide an antenna that enables greater phase control of a microwave or millimeter-wave electromagnetic wave.

An antenna according to the present invention is described below with reference to the drawings.

As illustrated in FIG. 1, an antenna assembly 11 including four coupled antenna units 1 is attached to a roof portion of a vehicle (automobile) 2. The antenna unit 1 is a planar antenna, is attached to the roof portion, and is always directed in the communication satellite direction. This enables satellite communications with two-way transmission and reception.

The term "antenna", as used herein, includes the antenna unit 1 or the antenna assembly 11 including a plurality of coupled antenna units 1.

An antenna according to the present invention preferably operates at a Ka band frequency, a K band frequency, or a Ku band frequency used for satellite communications.

Figure 2:
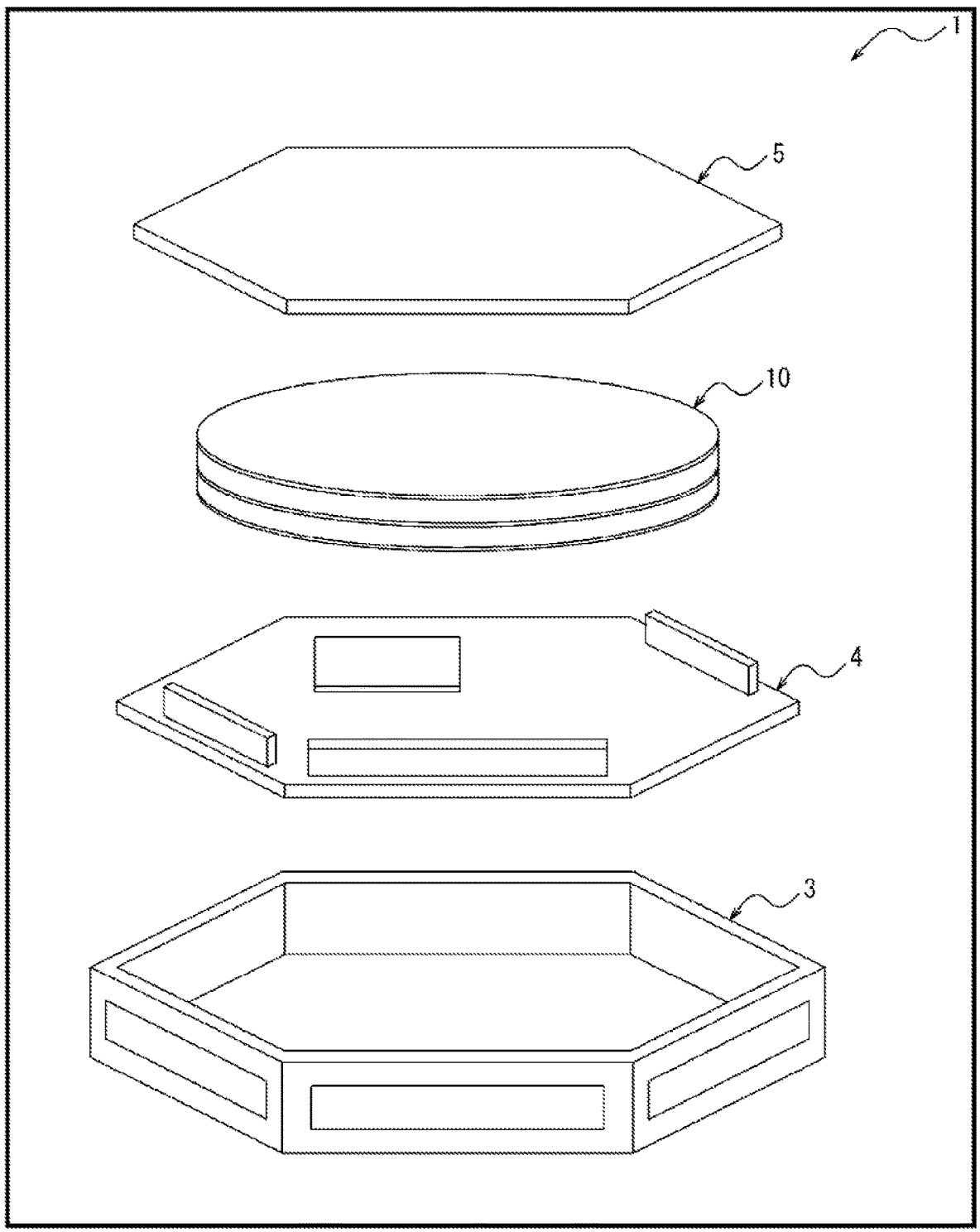
FIG. 2 is an example of an exploded view of an antenna according to the present invention.

Next, an example of an embodiment of a constituent of the antenna unit 1 is illustrated in FIG. 2. FIG. 2 is an exploded view of the antenna unit 1 illustrated in FIG. 1. More specifically, the antenna unit 1 includes an antenna main body 10, a control board 4 for controlling the antenna main body 10, a case 3 with a recessed portion capable of housing the antenna main body 10 and the control board 4, and a top cover 5 for sealing the case 3.

The control board 4 is provided with a transmitter and/or a receiver. The transmitter has a mechanism for, for example, voice coding or image coding of information from a signal source, such as sound or image data, by a source coding process, performing error correction coding by a transmission coding process, and then performing modulation and transmission as a radio wave. On the other hand, the receiver has a mechanism for modulating an incoming radio wave, performing error correction by a transmission decoding process, performing, for example, sound decoding or image decoding by an source decoding process, and then performing conversion into information, such as sound or image data. The control board 4 is composed of known microcomputers, such as a CPU, a RAM, and a ROM, and integrally controls the operation of the antenna main body 1, the transmitter, and/or the receiver. Various programs stored in advance in a CPU or ROM of the control board 4 are read into a RAM and are executed to perform a predetermined process. The control board 4 has the functions of a storage for storing various setting information or control programs, an arithmetic unit for executing various calculations related to the voltage and the voltage direction applied to a liquid crystal layer in the antenna main body 1, various calculations related to transmission of a radio wave, and/or various calculations related to reception of a radio wave, a detecting unit for detecting a received or transmitted radio wave or detecting the voltage applied to the liquid crystal layer, and the like.

Although the case 3 and the top cover 5 of a hexagonal prism type are illustrated in FIG. 2 as an example of the case 3 capable of housing the disk-shaped antenna main body 1, the case 3 and the top cover 5 can be appropriately changed to have a known shape, such as a cylindrical shape, an octagonal prism shape, or a triangular prism shape, depending on the shape of the antenna main body 1.

Figure 3:
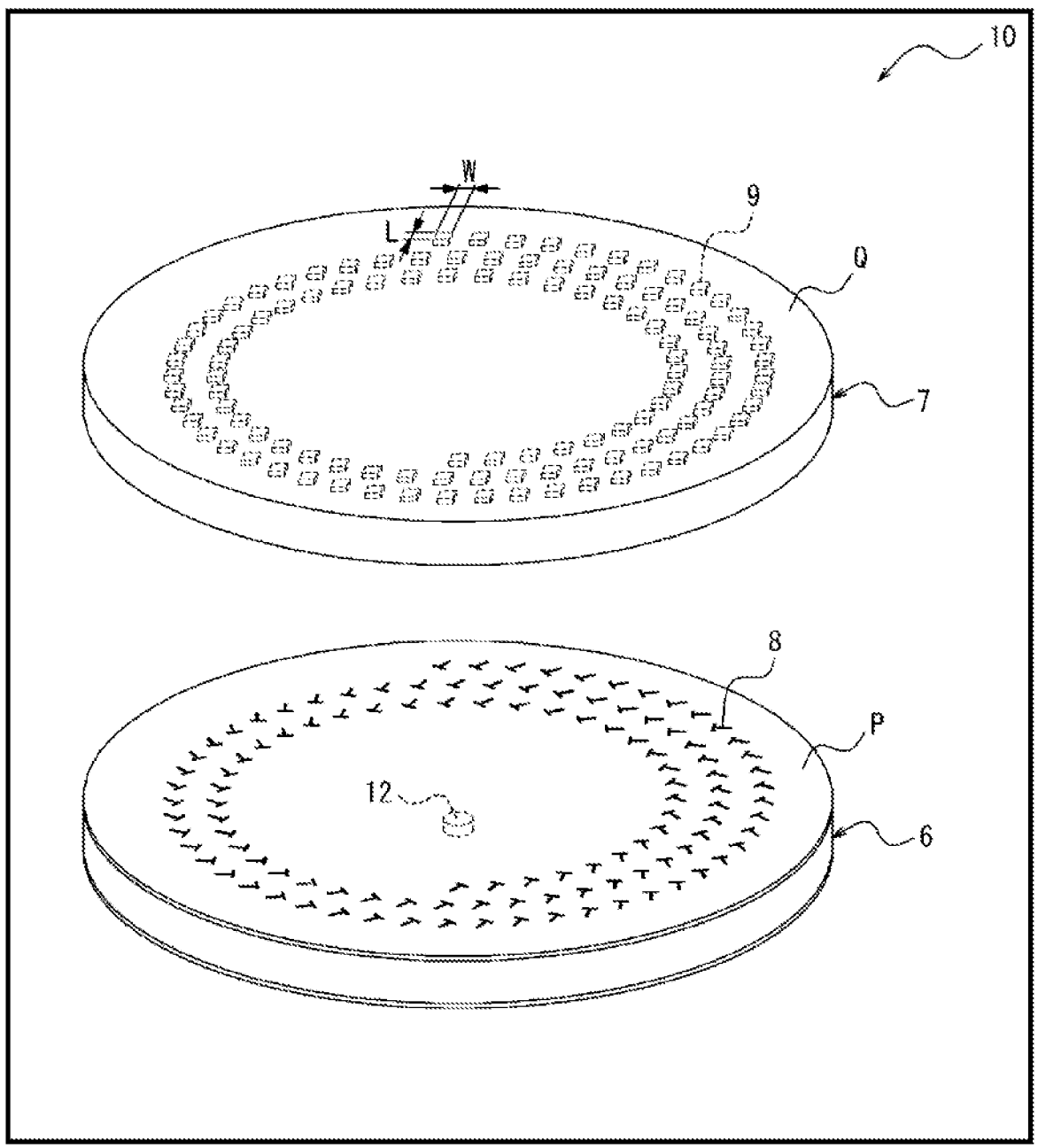
FIG. 3 is an example of an exploded view of an antenna main body according to the present invention.

The structure of the antenna main body 10 is described below with reference to FIGS. 3 to 10. FIG. 3 is a schematic exploded view of the constituents of the antenna main body 10.

As illustrated in FIG. 3, the antenna main body 10 includes a slot array portion 6 and a patch array portion 7. The slot array portion 6 includes a plurality of slots (cutouts) 8 in a disk-shaped conductor P and a power supply portion 12 inside the central portion thereof. The patch array portion 7 includes, as an example, a plurality of square or rectangular patches 9 with a length L and a width W on a disk Q. The antenna main body 10 has the slot array portion 6 including the disk-shaped conductor P in which the slots 8 are formed, and the disk-shaped patch array portion 7 on which the patches are formed. The patch array portion 7 and the slot array portion 6 are bonded together such that the patches 9 are arranged to face the slots 8 formed on the surface of the disk-shaped conductor P.

The slot array portion 6 is an antenna portion that has cutouts (hereinafter referred to as the slots 8) in the disk-shaped conductor P as radiation elements (or incident elements). The slot array portion 6 has the slots 8 and the power supply portion 12 provided in the central portion of the disk-shaped conductor P. The slot array portion 6 typically has a mechanism for direct excitation at the tip of a transmission line or excitation through a cavity provided in the back side of the slots. The slot array portion 6 can be used to supply electricity or the like to an antenna utilizing a ground plane or to a patch antenna from a microstrip line or the like through the slots. Although a radial line slot array is illustrates as an example of the slot array portion 6 in FIG. 3, the scope of the present invention is not limited to this.

Figure 4:
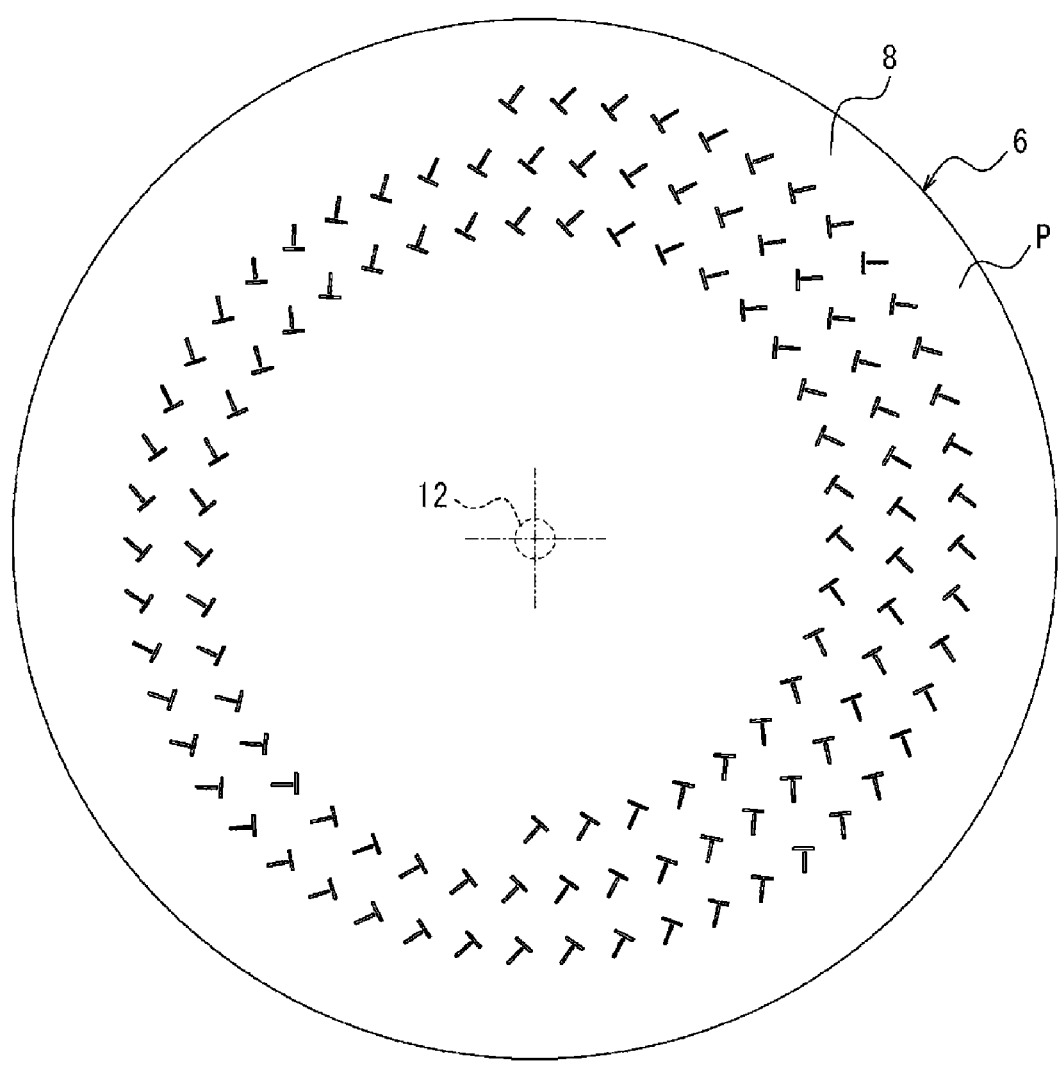
FIG. 4 is an example of a top view of a slot array portion in the present invention.

FIG. 4 is a top view of the slot array portion 6 illustrated in FIG. 3. The slot array portion 6 is described below with reference to FIG. 4. The slot array portion 6 has a structure in which electricity is supplied through a coaxial line in the central portion thereof. Thus, the power supply portion 12 is provided in the central portion of the slot array portion 6 illustrated in FIG. 4. The slot array portion 6 has a plurality of pairs of slots 8 (hereinafter referred to as "slot pairs") in the surface of the disk-shaped conductor P. The slot pairs 8 have a structure in which two rectangular cutouts are arranged in a "T" shape. More specifically, two rectangular parallelepiped slots 8 are arranged so as to intersect at right angles, and one slot of each slot pair 8 is disposed so as to be separated from the other slot by ¼ wavelength. This enables transmission and reception of circularly polarized waves with different rotational directions depending on the azimuth of the antenna.

In the present description, two slots 8 are referred to as a slot pair 8, one slot 8 is referred to simply as a slot 8, and the slots and the slot pairs are collectively referred to as a slot (pair) 8.

A plurality of slot pairs 8 are helically formed outward in the radial direction from the central portion of the disk-shaped conductor substrate P. The slot pairs 8 are formed in the disk-shaped substrate surface such that the distance between adjacent slot pairs 8 along the helix is constant. Thus, the phases are aligned in front of the slot array portion 6, thereby strengthening the electromagnetic field, so that a pencil beam can be formed at the front surface.

Figure 8:
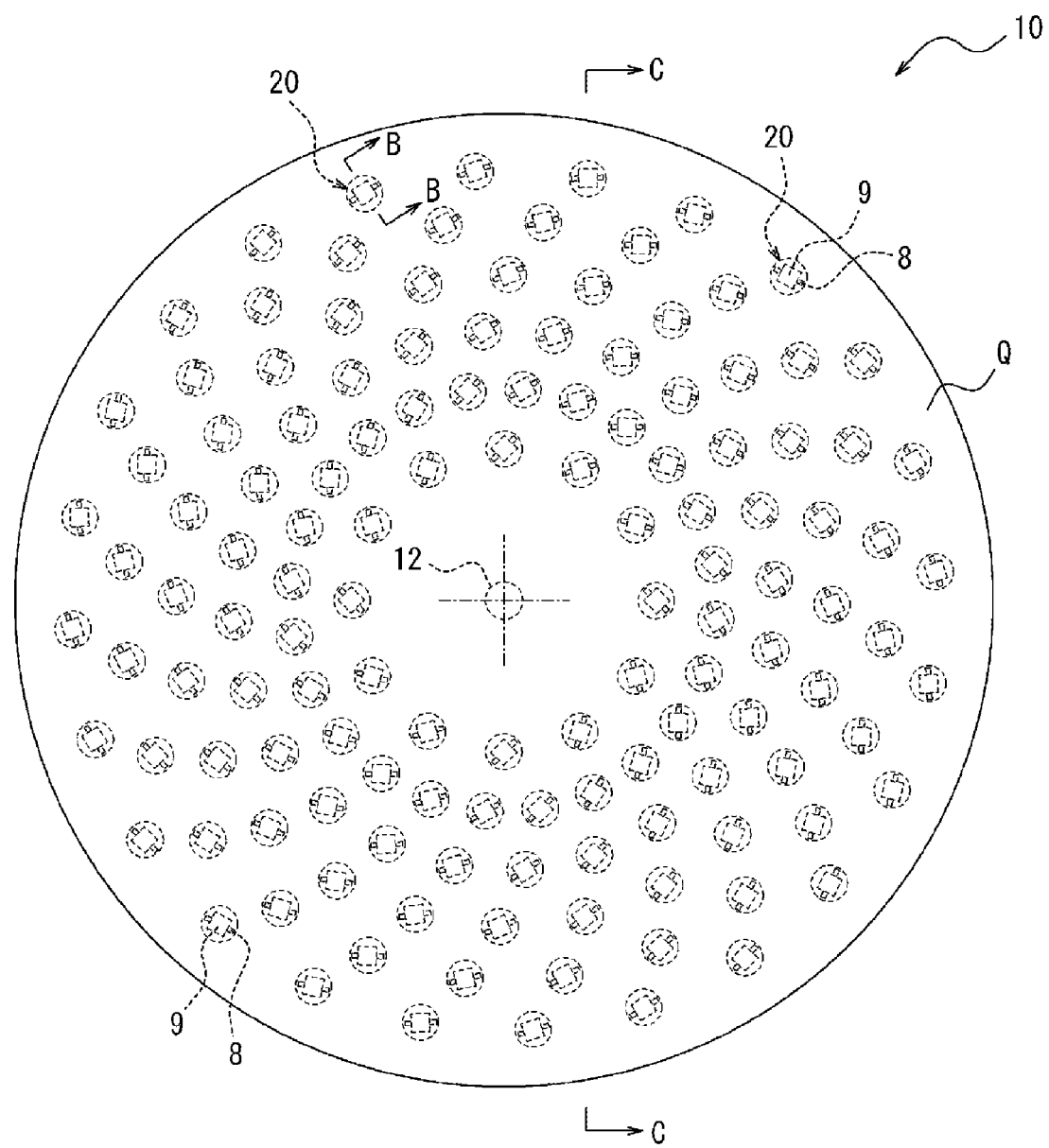
FIG. 8 is another example of a top view showing a projection view of an antenna main body according to the present invention.

Although an example of the shape of the slots 8 is a rectangular parallelepiped shape in FIGS. 3 and 4, the shape of the slots 8 in the present invention is not limited to the rectangular parallelepiped and may be a known shape, such as circular, elliptical, or polygonal. Although an example of the slots 8 is a slot pair in FIGS. 3 and 4, the slots 8 in the present invention is not limited to the slot pair. Furthermore, although the arrangement of the slots 8 in the surface of the disk-shaped conductor substrate P is illustrated as a helical shape as an example, the arrangement of the slots 8 is not limited to the helical shape, and the slots 8 may be arranged, for example, in a concentric shape as illustrated in FIG. 8 described later.

The power supply portion 12 in the present invention has the function of receiving an electromagnetic wave and/or radiating an electromagnetic wave. The power supply portion 12 in the present invention may be any portion for transmitting a high-frequency power generated by receiving a radio wave by the patches 9, which are radiation elements or incident elements, to the receiver, or any portion for connecting a radiation element and a power supply line to supply a high-frequency power, and a known power supply portion and a power supply line can be utilized. In FIGS. 3 and 4, a coaxial power supply portion is illustrated as an example.

As illustrated in FIG. 3, the patch array portion 7 includes a liquid crystal layer (not shown) filled between the disk Q including a plurality of square or rectangular patches 9 with a length L and a width W and the slot array portion 6. The patch array portion 7 in the present embodiment has a so-called microstrip antenna structure and is a resonator that resonates at a frequency at which the length L coincides with an integral multiple of ½ wavelength.

Figure 5:
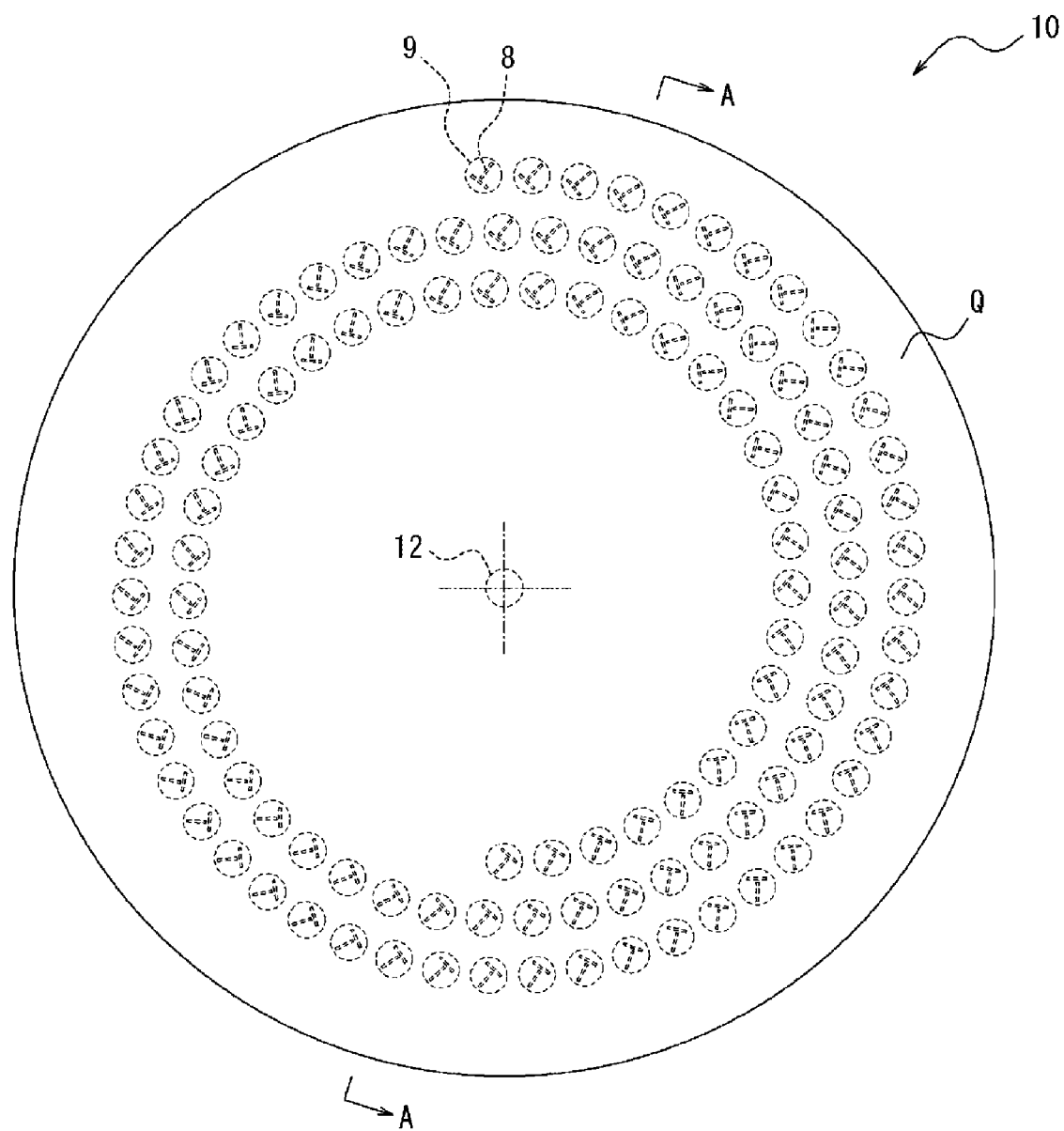
FIG. 5 is an example of a top view of a projection view of an antenna main body according to the present invention.

Although the square or rectangular patches 9 with a length L and a width W are illustrated as an example of the patches 9 in FIG. 3, the shape of the patches 9 is not limited to tetragonal and may be circular. FIG. 5 illustrates an embodiment of circular patches 9 as another embodiment of the present invention.

FIG. 5 is a top view of the antenna main body 10 in the present invention, more specifically the antenna main body 10 viewed from the patch array portion 7, wherein the patches 9, the power supply portion 12, and the slot pairs 8 are vertically projected onto the main surface of the disk Q. The patches 9, the power supply portion 12, and the slot pairs 8 are therefore indicated by broken lines. The patches 9 with a circular shape can be operated in an electromagnetic field distribution generally called a $TM_{11}$ mode. As illustrated in FIG. 5, the projections of the patches 9 overlap the projections of the slot pairs 8, showing that the patches 9 on the disk Q are arranged to face their respective slots 8 in the surface of the disk-shaped conductor P. Such a structure in which the patches 9 are arranged corresponding to their respective slots 8 can be utilized to supply electricity from the slots 8 to the patches 9 or transmit an incoming radio wave from the patches 9 to the slots 8 by an electromagnetic coupling power supply system. Thus, an antenna capable of transmitting and/or receiving a radio wave can be provided.

In general, a method of supplying electricity to the radiation elements (for example, the patches 9) of the patch array portion 7 using a typical transmission line, such as a coaxial line, or a planar transmission line is broadly divided into two types of a direct coupling power supply system and an electromagnetic coupling power supply system. Thus, a power supply system in the present invention may be two systems: the direct coupling power supply system of directly connecting a transmission line to the patches 9 (radiation elements) to excite the radiation elements; and the electromagnetic coupling power supply system of exciting the patch electrodes (radiation elements) by an electromagnetic field generated around a power supply line with an open or shorted end without directly connecting a transmission line to the patch electrodes (radiation elements). An embodiment of the electromagnetic coupling power supply system is described in the present invention.

In the present embodiment, the power supply line of the (coaxial) power supply portion 12 is open-ended, and a current standing wave is generated in which an end of the power supply line coincides with a node. This generates a magnetic field surrounding the power supply line (the (coaxial) power supply portion 12), and the magnetic field is incident on the slots 8 and excites the slots (pairs) 8. The patches 9 are excited when the magnetic field generated by the excitation of the slots (pairs) 8 is incident on the patches 9. The excitation intensity becomes maximum when the magnetic field incident on the slots 8 is maximum. Thus, the slots (pairs) 8 are preferably formed at a position where the magnetic field generated from the power supply line (the (coaxial) power supply portion 12) becomes maximum (an antinode of the current standing wave).

A preferred embodiment of an antenna according to the present invention is a structure in which a radial line slot array and a patch antenna array are combined.

Next, an embodiment of the antenna main body 10 is described with reference to FIG. 6, which is a cross-sectional view of the antenna main body 10 illustrated in FIG. 5. It is needless to say that FIG. 6 is a schematic view of the structure of the antenna.

Figure 6:
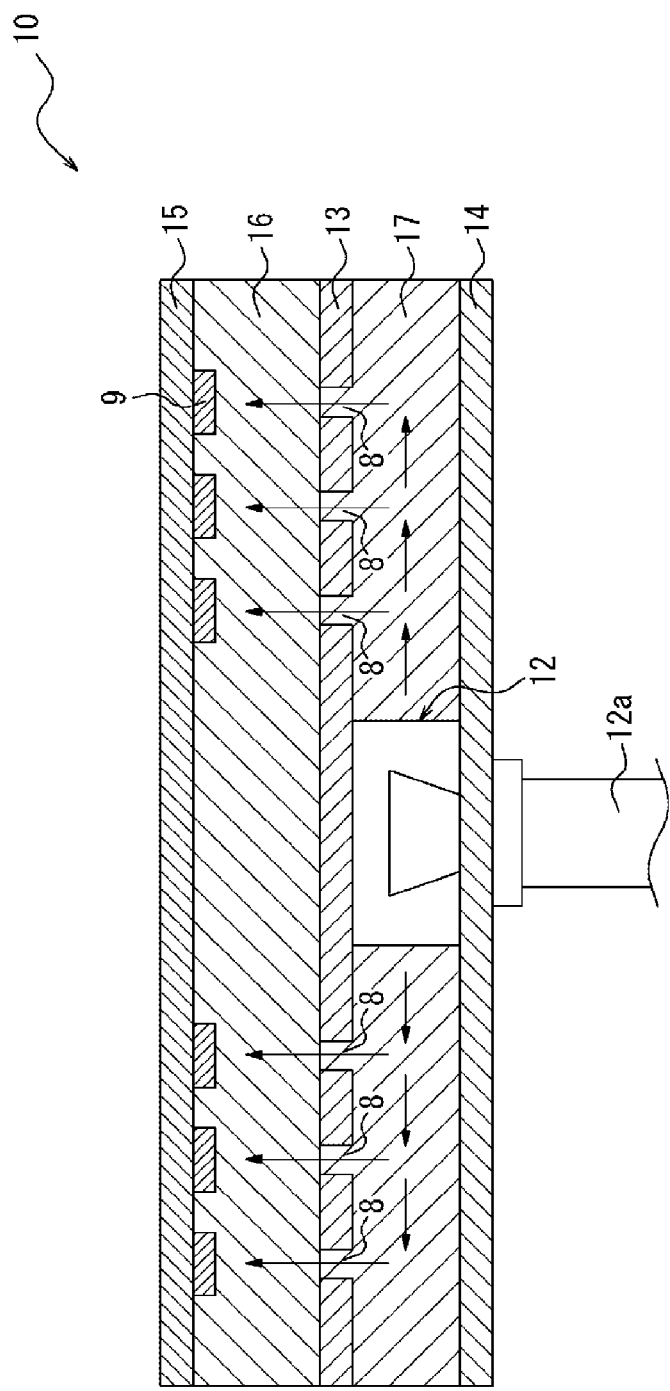
FIG. 6 is a cross-sectional view of the antenna main body of FIG. 5 taken along the line A-A.

As illustrated in FIG. 6, the antenna main body 10 includes a disk-shaped second substrate 14, a disk-shaped first substrate 13 (corresponding to the disk-shaped conductor P; hereinafter also referred to as a slot array substrate) in which a plurality of slots (pairs) 8 are formed outward in the radial direction from the central portion, a first dielectric layer 17 between the second substrate 14 and the first substrate 13, the power supply portion 12 in the central portion of the disk-shaped first substrate 13 and the disk-shaped second substrate 14, a disk-shaped third substrate 15 (corresponding to the disk Q; hereinafter also referred to as a patch substrate), the patches 9 (radiation elements or incident elements) attached to the third substrate 15, and a liquid crystal layer 16 between the third substrate 15 and the first substrate 13. The power supply portion 12 is electrically connected to the transmitter and/or the receiver provided on the control substrate via a power supply line 12a. The patches 9 correspond to their respective slot pairs 8.

The phrase "the patches 9 correspond to their respective slot pairs 8", as used herein, means that the projection plane obtained by vertically projecting the patches 9 onto the main surface of the second substrate 14 overlaps the slots (pairs) 8, as described above with reference to FIG. 5. In other words, the projection plane obtained by vertically projecting the slots (pairs) 8 onto the main surface of the third substrate 15 overlaps the patches 9.

The first substrate 13, the second substrate 14, and the third substrate 15 are preferably disks with the same area.

In FIG. 6, a radio wave (arrows) supplied by the (coaxial) power supply portion 12 is transmitted to the liquid crystal layer 16 through the slots (pairs) 8 while being transmitted as a cylindrical wave outward in the radial direction in the first dielectric layer 17. The slots (pairs) 8 can generate a circularly polarized wave when two orthogonal slots with a so-called "T" shape are arranged at an interval of ¼ wavelength, as illustrated in FIG. 4. As described above, the magnetic field generated from the slots (pairs) 8 due to the excitation of the slots (pairs) 8 is incident on the patches 9 and excites the patches 9 by the electromagnetic coupling power supply system. Consequently, the patches 9 can emit a radio wave with high directivity.

On the other hand, when an incoming radio wave is received, according to the principle of reversible transmission and reception, contrary to the above, the incoming radio wave is received by the patches 9 and is then transmitted to the power supply portion 12 through the slots (pairs) 8 provided directly under the patches 9.

Unlike linearly polarized waves, circularly polarized waves are radio waves having an electric field direction rotating with time and are classified into right-handed circularly polarized waves used in GPS or ETC and left-handed circularly polarized waves used in satellite radio broadcasting and the like. An antenna according to the present invention can receive any of these polarized waves.

A voltage can be applied to the liquid crystal layer 16 between the patches 9 and the first substrate 13 to change the orientation direction of liquid crystal molecules in the liquid crystal layer 16. This can change the permittivity of the liquid crystal layer 16, change the electrostatic capacitance of the slots (pairs) 8, and consequently control the reactance and the resonance frequency of the slots (pairs) 8. In other words, the permittivity of the liquid crystal layer 16 can be controlled to adjust the reactance and the resonance frequency of the slots 8, and the excitation of the slots (pairs) 8 and the patches 9 can be adjusted to control the power supply to each patch 9. This makes it possible to adjust radiated waves through the liquid crystal layer 16. Thus, for example, an applied voltage adjusting means, such as a TFT, for adjusting the voltage applied to the liquid crystal layer 16 may be provided. Furthermore, the orientation direction of liquid crystal molecules in the liquid crystal layer 16 can be changed to change the refractive index and consequently shift the phase of an electromagnetic wave transmitted through the liquid crystal layer 16, thus as an overall result enabling phased-array control.

The material of the first substrate 13 and the second substrate 14 may be any conductor, such as copper. The material of the third substrate 15 may be, but is not limited to, a known material, such as a glass substrate, an acrylic substrate, ceramic (alumina), silicon, glass cloth, or Teflon (registered trademark) (PTFE), depending on the use. The material of the first dielectric layer 17 can be appropriately selected from known materials depending on desired relative permittivity and may be a vacuum. The material of the patches 9 may be any conductor, such as copper or silver.

Next, another embodiment of the antenna main body 10 is described with reference to FIG. 7. In the embodiment illustrated in FIG. 7, the slot array portion 6 of the antenna main body 10 is different from that in the embodiment illustrated in FIG. 6.

Figure 7:
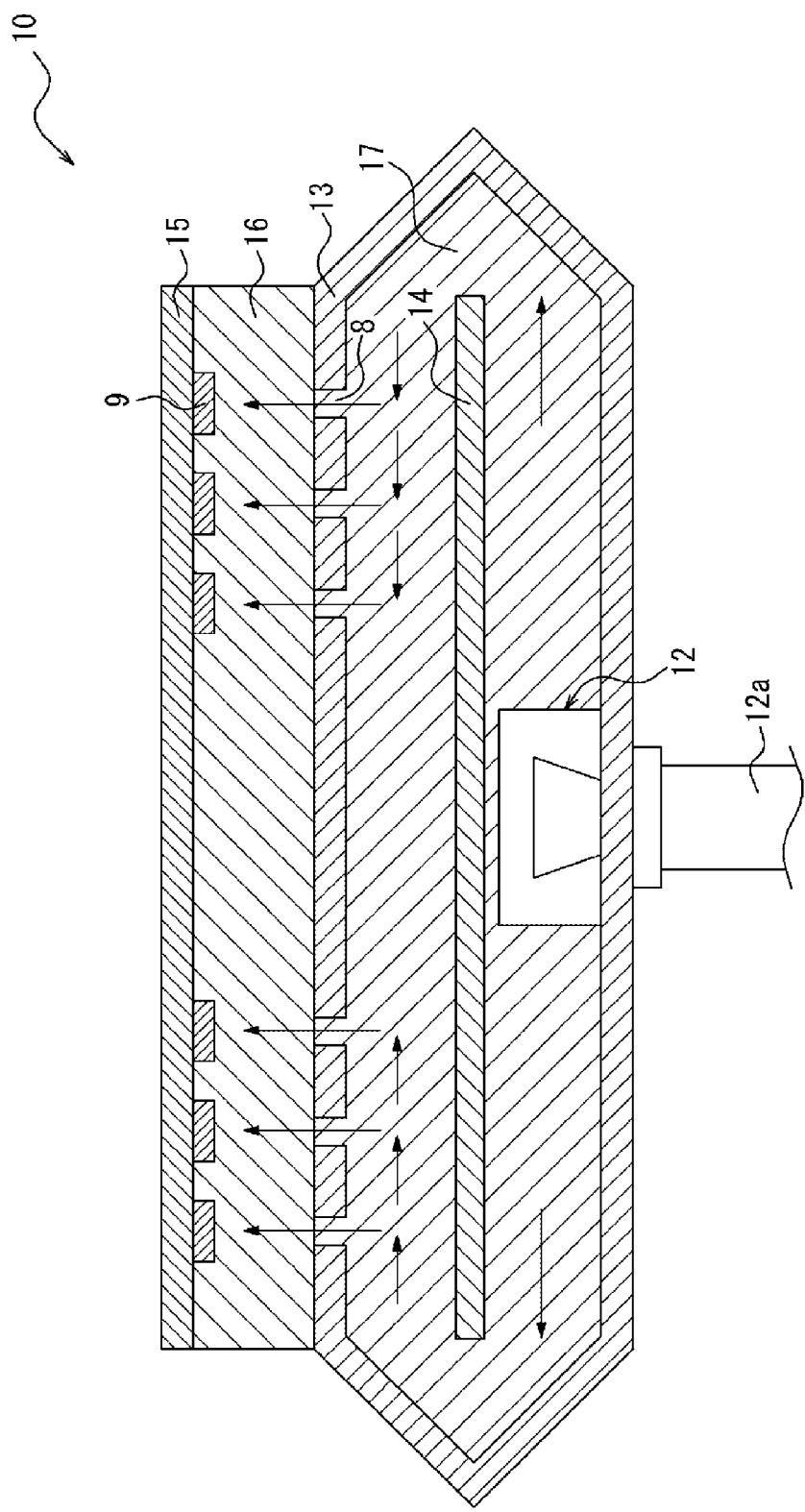
FIG. 7 is another cross-sectional view of the antenna main body of FIG. 5 taken along the line A-A.

In FIG. 7, the antenna main body 10 includes a hollow first substrate 13 having a plurality of slots (pairs) 8 on one surface, the disk-shaped second substrate 14, the first dielectric layer 17, and the power supply portion 12 housed inside the hollow first substrate 13, the disk-shaped third substrate 15, the patches 9 attached to the third substrate 15, and the liquid crystal layer 16 between the third substrate 15 and the first substrate 13, wherein the power supply portion 12 is provided between the second substrate 14 and the other surface of the first substrate 13 in which the plurality of slots (pairs) 8 are not formed, and is provided in the central portion of the first substrate 13 and the disk-shaped second substrate 14. The power supply portion 12 is electrically connected to the transmitter and/or the receiver provided on the control substrate via the power supply line 12*a*. The patches 9 correspond to their respective slot pairs 8. In FIG. 7, both sides of the hollow first substrate 13 protrude outward from the hollow body and more specifically have a surface inclined at 45 degrees with respect to the horizontal direction.

As illustrated in FIG. 7, a radio wave (arrows) supplied by the (coaxial) power supply portion 12 is transmitted as a cylindrical wave outward in the radial direction in the first dielectric layer 17. The transmitted cylindrical wave is reflected by both sides of the hollow first substrate 13, and the cylindrical wave that goes around the second substrate 14 is converted into a traveling wave (arrows) from the outer periphery of the disk-shaped first substrate 13 toward the center, and is transmitted in the first dielectric layer 17. At this time, the traveling wave is transmitted from the slots (pairs) 8 to the liquid crystal layer 16. Thus, the patches 9 can be excited in the same manner as in the embodiment illustrated in FIG. 6 and emit a radio wave with high directivity.

On the other hand, when an incoming radio wave is received, similarly, the incoming radio wave is received by the patches 9 and is then transmitted to the power supply portion 12 through the slots (pairs) 8 provided directly under the patches 9.

Next, another embodiment of the antenna main body 10 is described with reference to FIGS. 8 to 10. In the embodiments of the antenna main body 10 illustrated in FIGS. 5 to 7, the structure of the antenna main body 10 in which the liquid crystal layer 16 is uniformly provided between the first substrate 13 and the third substrate 15 is described. On the other hand, in the embodiments of FIGS. 8 to 10, the structure of the antenna main body 10 is described below in which the liquid crystal layer 16 is filled in the space (hereinafter referred to as a sealed region 20) in which the patches 9 and the slots 8 are disposed.

FIG. 8 is a top view of an example of an embodiment of the antenna main body 10 according to the present invention. More specifically, FIG. 8 illustrates the antenna main body 10 viewed from the patch array portion 7, in which the patches 9, the power supply portion 12, and the slots 8 are vertically projected onto the main surface of the disk Q. Thus, as in FIG. 5, the patches 9, the power supply portion 12, and the slots 8 are indicated by broken lines. In FIG. 8, the square or rectangular patch 9 and one rectangular parallelepiped slot 8 are arranged corresponding to the sealed region 20. As illustrated in FIG. 8, the projections of the patches 9 overlap the projections of the slots 8, showing that the slots 8 are formed directly under the patches 9. In the embodiment of the antenna main body 10 illustrated in FIG. 8, therefore, the electromagnetic coupling power supply system can supply electricity from the slots 8 to the patches 9 or transmit an incoming radio wave from the patches 9 to the slots 8. Thus, an antenna capable of transmitting and/or receiving a radio wave can be provided.

As illustrated in FIG. 8, in the present embodiment, the patches 9 and the slots 8 are arranged in concentric circles from the center of the disk Q in the outer peripheral direction of the disk Q. Thus, a conical beam is output by coaxial mode power supply, and the phases are aligned in front of the disk Q, thereby strengthening the electromagnetic field.

Next, an embodiment of the antenna main body 10 is described with reference to FIG. 9, which is a cross-sectional view of the antenna main body 10 illustrated in FIG. 8. It is needless to say that FIG. 9 is a schematic view of the structure of the antenna.

Figure 9:
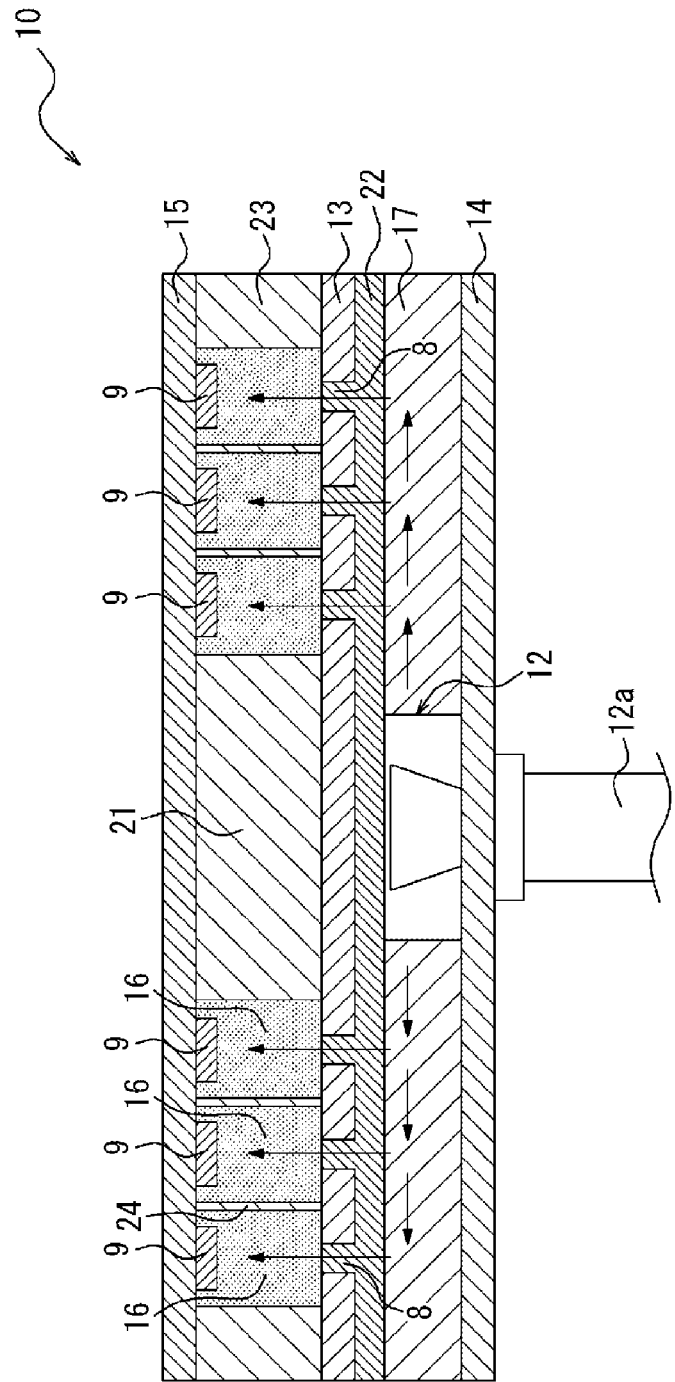
FIG. 9 is a cross-sectional view of the antenna main body of FIG. 8 taken along the line C-C.

As illustrated in FIG. 9, the antenna main body 10 includes the disk-shaped second substrate 14, the disk-shaped first substrate 13 including a plurality of slots 8 concentrically formed outward in the radial direction from the central portion, a buffer layer 22 provided on the surface of the first substrate 13 facing the second substrate 14, the first dielectric layer 17 between the buffer layer 22 and the second substrate 14, the power supply portion 12 provided in the central portion of the disk-shaped first substrate 13 and the disk-shaped second substrate 14 so as to be in contact with the first dielectric layer 17, the disk-shaped third substrate 15, the patches 9 (radiation elements or incident elements) attached to the third substrate 15, and the liquid crystal layer 16 separated by a seal wall 24 between the third substrate 15 and the first substrate 13 and filled so as to be in contact with the patches 9 in a plurality of sealed regions 20 in which the patches 9 are provided. The power supply portion 12 is electrically connected to the transmitter and/or the receiver provided on the control substrate via the power supply line 12a. The patches 9 correspond to their respective slots 8, at least one patch 9, at least one slot 8, and the liquid crystal layer 16 are present in each sealed region 20, and the plurality of sealed regions 20 are separated by seal walls 21, 23, and 24.

Although not shown in FIG. 9, if necessary, a thin-film transistor (TFT) for controlling the voltage of the liquid crystal layer 16 may be provided in each sealed region 20, for example, on the first substrate 13. Thus, the voltage applied to the liquid crystal layer 16 can be controlled in an active manner. If necessary, an alignment film may be provided in each sealed region 20 to fix the orientation direction of the liquid crystal molecules constituting the liquid crystal layer 16. As the alignment film, a homeotropic alignment film for facilitating the vertical alignment of the liquid crystal molecules or a homogeneous alignment film for facilitating the horizontal alignment of the liquid crystal molecules may be provided between the first substrate 13 and the liquid crystal layer 16. For example, a polyimide alignment film, a photo-alignment film, or the like may be used.

Next, the sealed region 20 in the present embodiment is described with reference to FIG. 10, which is a cross-sectional view taken along the line B-B of the antenna main body 10 illustrated in FIG. 8. It goes without saying that FIG. 10 is a schematic view of the sealed region 20.

Figure 10:
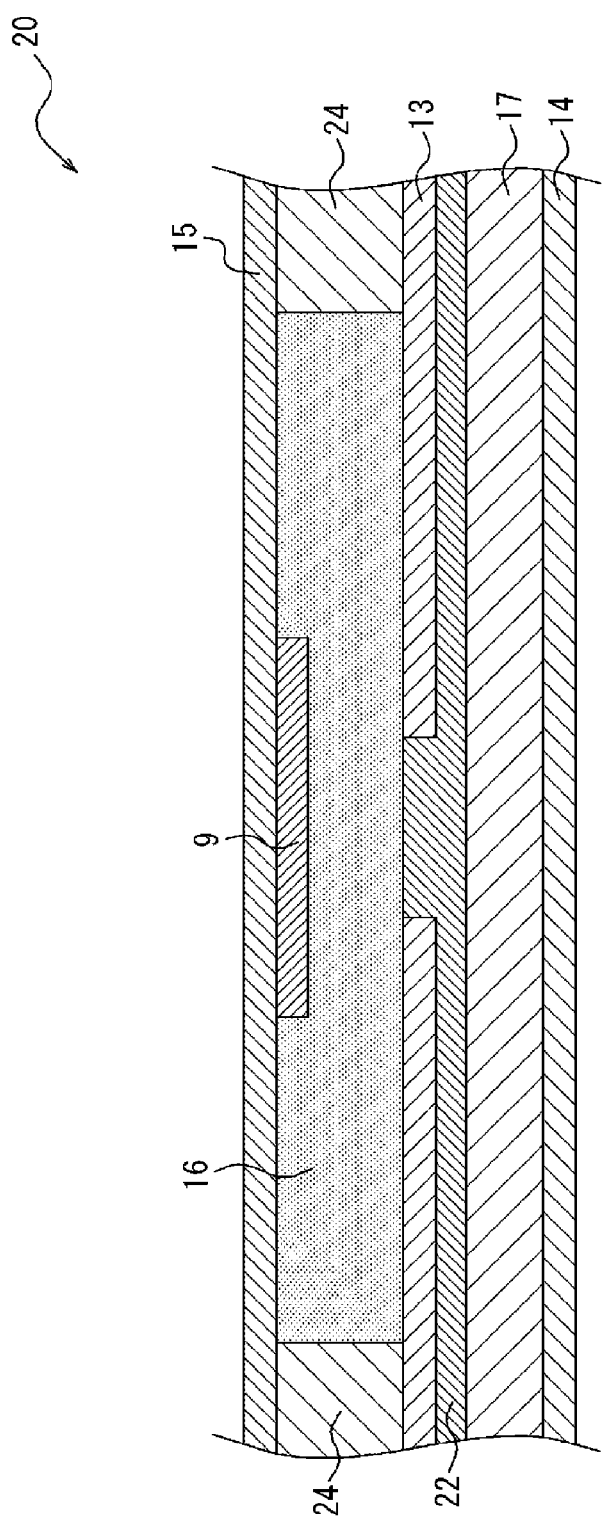
FIG. 10 is a cross-sectional view of the antenna main body of FIG. 8 taken along the line B-B.

As illustrated in FIG. 10, the sealed region 20 is a sealed space surrounded by the seal wall 24, the buffer layer 22, the first substrate 13, and the third substrate 15, and at least one patch 9 and at least one slot 8 facing each other is provided in the sealed space filled with the liquid crystal layer 16.

In the present embodiment, the seal wall 24 may be formed of a known insulator or the like. The buffer layer 22 may be formed of a known dielectric material or the like.

Although not shown in FIG. 10, if necessary, a thin-film transistor (TFT) for controlling the voltage of the liquid crystal layer 16 may be provided in the sealed region 20, for example, on the first substrate 13. Thus, the voltage applied to the liquid crystal layer 16 can be controlled in an active manner. More specifically, the active driving method is, for example, a method of using the patches 9 as a common electrode, using the first substrate 13 as a pixel electrode, and controlling the voltage between the patches 9 and the first substrate 13 by a TFT formed on the first substrate 13 to control the orientation of the liquid crystal molecules in the liquid crystal layer 16, a method of using the first substrate 13 as a pixel electrode, forming an electrode layer and a TFT on the first substrate 13, and controlling the voltage between the patches 9 and the first substrate 13 to control the orientation of the liquid crystal molecules in the liquid crystal layer 16, or a method of providing an inter-digitated electrode and a TFT on the first substrate 13 and controlling the orientation of the liquid crystal molecules in the liquid crystal layer 16 by the TFT. The method of controlling the voltage application to the liquid crystal layer 16 in an active manner is not limited to these methods.

At this time, an alignment film may be provided in each sealed region 20 to fix the orientation direction of the liquid crystal molecules constituting the liquid crystal layer 16. As the alignment film, a homeotropic alignment film for facilitating the vertical alignment of the liquid crystal molecules or a homogeneous alignment film for facilitating the horizontal alignment of the liquid crystal molecules may be provided between the first substrate 13 and the liquid crystal layer 16.

To tune the liquid crystal layer 16, the voltage applied to the liquid crystal layer 16 between the patches 9 and the first substrate 13 may be modulated. For example, as described above, the voltage applied to the liquid crystal layer 16 can be controlled in an active manner to change the electrostatic capacitance of the slots 8 and consequently control the reactance and the resonance frequency of the slots 8. The resonance frequency of the slots 8 correlates with energy radiated from a radio wave transmitted through a line. Thus, the resonance frequency of the slots 8 is adjusted so that the slots 8 are not substantially coupled to cylindrical wave energy from the power supply portion 12 or so that the slots 8 are coupled to cylindrical wave energy for radiation to the free space. Such control of the reactance and the resonance frequency of the slots 8 can be performed in each of the plurality of sealed regions 20. In other words, the permittivity of the liquid crystal layer 16 can be controlled to control the power supply to the patches 9 in each sealed region 20 by a TFT. This allows the patches 9 that transmit a radio wave and patches that do not transmit a radio wave to be controlled, thereby enabling the transmission and reception of a radiated wave to be adjusted through the liquid crystal layer 16.

EXAMPLES

Although the present invention is described in more detail in the following examples, the present invention is not limited to these examples.

A composition in the following examples and comparative examples contains compounds in the proportion shown in tables, and their respective contents are expressed in "% by mass".

The following abbreviations are used to describe the compounds. Unless otherwise specified, a compound that can have a cis form or a trans form is represented by a trans form.

<Ring Structure>

[Chem. 207]

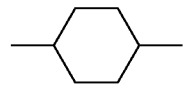
Cy

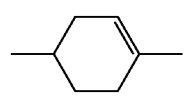
Cy1

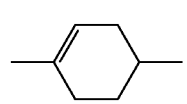
Cy2

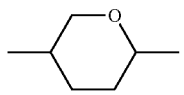
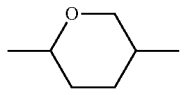
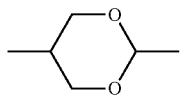
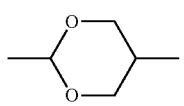
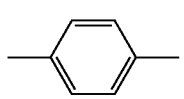
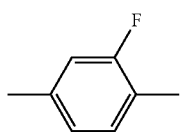
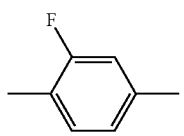
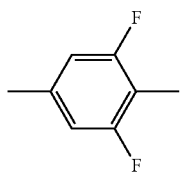
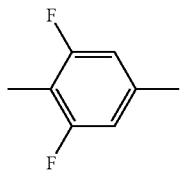
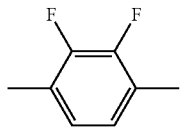
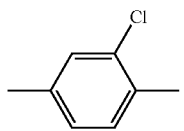
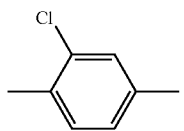
Py
Py'
Oc
Oc'
Ph
Ph1
Ph2
Ph3
Ph4
Ph5
Pc1
Pc2
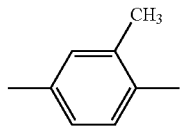
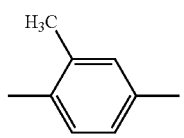
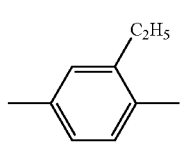
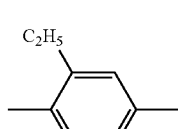
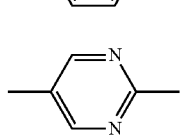
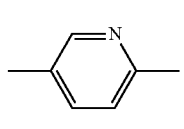
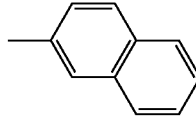
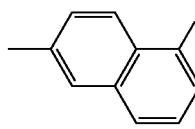
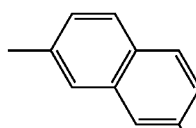
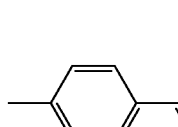
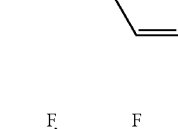
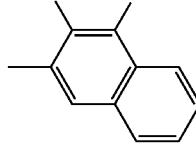
Pm1
Pm2
Pe1
Pe2
Ma
Mb
Np
Np1
Np2
Np3
Np4

-continued

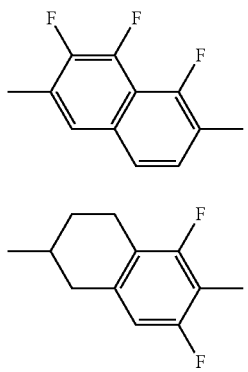

Np5

Tet3

<Terminal Structure>

TABLE 1

| Abbreviation | Chemical structure |
|---|---|
| -n | —$C_nH_{2n+1}$ |
| n- | $C_nH_{2n+1}$— |
| —On | —O—$C_nH_{2n+1}$ |
| nO— | $C_nH_{2n+1}$—O— |
| —Sn | —S—$C_nH_{2n+1}$ |
| nS— | $C_nH_{2n+1}$—S— |
| —V | —CH=$CH_2$ |
| V— | $CH_2$=CH— |
| —V1 | —CH=CH—$CH_3$ |
| 1V— | $CH_3$—CH=CH— |
| —2V | —$CH_2$—$CH_2$—CH=$CH_2$ |
| V2— | $CH_2$=CH—$CH_2$—$CH_2$— |
| —2V1 | —$CH_2$—$CH_2$—CH=CH—$CH_3$ |
| 1V2— | $CH_3$—CH=CH—$CH_2$—$CH_2$— |
| —OCF3 | —O—$CF_3$ |
| CF3O— | $CF_3$—O— |
| —H | —H |
| H— | H— |
| —CN | —CN |
| CN— | CN— |
| —NCS | —NCS |
| NCS— | NCS— |

(n in the table denotes a natural number.)

<Linking Structure>

TABLE 2

| Abbreviation | Chemical structure |
|---|---|
| -n- | —$C_nH_{2n}$— |
| -nO— | —$C_nH_{2n}$—O— |
| —On- | —O—$C_nH_{2n}$— |
| —COO— | —C(=O)—O— |
| —OCO— | —O—C(=O)— |
| —V— | —CH=CH— |
| -nV— | —$C_nH_{2n}$—CH=CH— |
| —Vn- | —CH=CH—$C_nH_{2n}$— |
| —T— | —CC— |
| —CF2O— | —$CF_2$—O— |
| —OCF2— | —O—$CF_2$— |
| —Az— | —N=N— |

(Hindered Phenol Antioxidant)

[Chem. 208]

(XX-1)

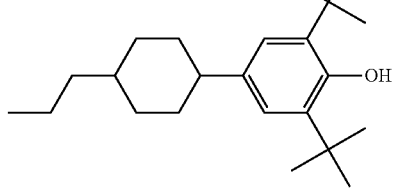

(XX-2)

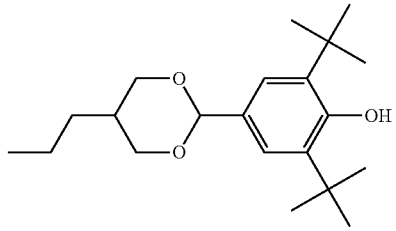

(XX-3)

(Hindered Amine Light Stabilizer)

[Chem. 209]

(YY-1)

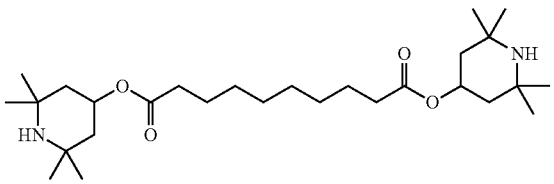

(YY-2)

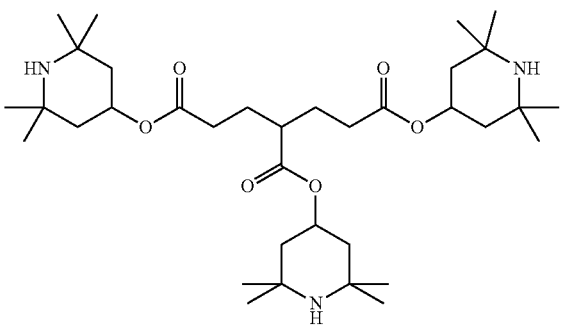

(Preparation of Liquid Crystal Composition)
LC-A, LC-B, and LC-1 to LC-4 in Table 3 were prepared.

TABLE 3

|  | LC-A | LC-B | LC-C | LC-1 | LC-2 | LC-3 | LC-4 |
|---|---|---|---|---|---|---|---|
| 4-Ph3-T-Ph-Ph-NCS |  |  |  |  | 4 |  |  |
| 3-Ph3-T-Ph-Ph3-NCS |  |  |  |  | 8 |  |  |
| 4-Ph3-T-Ph-Ph3-NCS |  |  |  | 15 | 8 | 5 | 5 |
| 5-Ph3-T-Ph-Ph3-NCS |  |  |  | 5 |  |  |  |
| 3-Cy-T-Ph-Ph3-NCS |  |  |  | 15 | 10 | 15 | 8 |
| 4-Cy-T-Ph-Ph3-NCS |  |  |  |  | 10 | 16 |  |
| 3-Cy-T-Ph-T-Ph3-NCS |  |  |  | 5 | 5 |  | 8 |
| 4-Cy-T-Ph-T-Ph3-NCS |  |  |  |  | 5 |  |  |
| 5-Cy-T-Ph-T-Ph3-NCS |  |  |  |  | 5 |  |  |
| 5-Cy-Ph-NCS | 6 |  |  | 3 |  |  |  |
| 7-Ph-Ph1-NCS |  |  | 8 |  |  |  |  |
| 4-Ph-T-Pc1-NCS | 10 |  |  |  |  |  |  |
| 4O-Ph2-T-Ph-NCS | 5 |  |  | 4 |  | 5 |  |
| 5O-Ph2-T-Ph-NCS | 4 |  |  |  |  | 5 |  |
| 5-Ph-T-Ph1-NCS | 4 |  |  |  |  |  |  |
| 4O-Ph-T-Ph1-NCS | 2 |  |  | 5 |  | 5 |  |
| 3-Ph-T-Ph3-NCS |  | 6 |  | 13 | 10 | 17 | 9 |
| 5-Ph-T-Ph3-NCS |  | 10 |  | 13 | 10 | 17 | 10 |
| 2-Cy-Ph-Ph3-NCS |  | 26 |  | 10 | 10 |  |  |
| 4-Cy-Ph-Ph3-NCS |  | 20 |  | 10 | 10 |  |  |
| 4-Cy-Ph-T-Ph1-NCS | 16 |  |  |  |  |  |  |
| 5-Cy-Ph-T-Ph1-NCS | 13 |  |  |  |  |  |  |
| CF3O-Ph-Ph-Ph3-NCS |  | 22 |  |  |  |  |  |
| 4-Ph-Ph-T-Ph3-NCS |  | 6 |  |  |  |  |  |
| 5-Ph-Ph-T-Ph3-NCS |  | 10 |  |  |  |  |  |
| 5-Ph-Ph5-T-Ph1-NCS | 40 |  |  |  |  |  |  |
| 3-Tet3-T-Ph-T-Ph1-NCS |  |  |  | 7 |  | 5 | 5 |
| 3-Ph-T-Ph1-Ph-CN |  |  |  |  |  |  | 12 |
| 3-Ph-T-Ph1-T-Ph-2 |  |  | 8 |  |  |  |  |
| 3-Ph-T-Ph1-T-Ph-3 |  |  | 7 |  |  |  |  |
| 3-Ph-T-Ph1-T-Ph-5 |  |  | 8 |  |  |  |  |
| 3-Ph-T-Pm1-T-Ph-2 |  |  | 7 |  |  |  |  |
| 4-Ph-T-Pm1-T-Ph-3 |  |  | 7 |  |  |  |  |
| 4-Ph3-T-Pm2-T-Ph-S1 |  |  |  |  |  |  | 7 |
| 3-Tet3-T-Ph-T-Ph-2 |  |  |  |  | 10 |  | 5 |
| 3-Tet3-T-Ph-T-Ph-4 |  |  |  |  |  |  | 8 |
| 2-Ph3-T-Ph-Az-Ph-2 |  |  |  |  |  |  | 5 |
| 3-Ph3-T-Ph-Az-Ph-2 |  |  |  |  |  |  | 8 |
| 3-Tet3-T-Ph-Az-Ph-2 |  |  |  |  |  |  | 5 |
| 3-Tet3-T-Ph-Az-Ph-4 |  |  |  |  |  |  | 5 |
| 3-Cy-COO-Ph-T-Ph-5 |  |  | 3 |  |  |  |  |
| 2-Ph3-T-Ph-Ph-3 |  |  | 5 |  |  |  |  |
| 2-Ph3-T-Ph-Ph-4 |  |  | 11 |  |  |  |  |
| 3-Ph3-T-Ph-Ph-2 |  |  | 11 |  |  |  |  |
| 3-Ph3-T-Ph-Ph-4 |  |  | 9 |  |  |  |  |
| 4-Ph3-T-Ph-Ph-3 |  |  | 16 |  |  |  |  |
| Total (mass %) | 100 | 100 | 100 | 100 | 100 | 100 | 100 |

Examples 1 to 28 and Comparative Examples 1 to 3

Liquid crystal compositions described in Tables 2 to 6 were prepared from LC-A and LC-B and LC-1 to LC-4, hindered phenol antioxidants (XX-1) to (XX-3), and hindered amine light stabilizers (YY-1) and (YY-2), and their physical properties were measured, and <Storage Stability Test> was performed. Tables 4 to 8 show the results.

<Storage Stability Test>

0.5 g of a liquid crystal composition was weighed in a 1-mL sample bottle (manufactured by Maruemu Corporation) and was degassed at 150 to 250 Pa for 10 minutes. The liquid crystal composition was then purged with dry nitrogen and was covered with a fitting lid. This was stored in a temperature-controlled thermostat (SH-241 manufactured by Espec Corp.) at 0° C. for 2 weeks, and the liquid crystal composition was visually inspected for crystallization every week.

TABLE 4

|  |  | Comparative example 1 | Comparative example 2 | Comparative example 3 | Example 1 | Example 2 | Example 3 | Example 4 |
|---|---|---|---|---|---|---|---|---|
| Liquid crystal composition [mass %] | LC-A | 100 |  |  |  |  |  |  |
|  | LC-B |  | 100 |  |  |  |  |  |
|  | LC-C |  |  | 100 |  |  |  |  |
|  | LC-1 |  |  |  | 100 |  |  |  |
|  | LC-2 |  |  |  |  | 100 |  |  |

TABLE 4-continued

|  |  | Comparative example 1 | Comparative example 2 | Comparative example 3 | Example 1 | Example 2 | Example 3 | Example 4 |
|---|---|---|---|---|---|---|---|---|
|  | LC-3 |  |  |  |  |  | 100 |  |
|  | LC-4 |  |  |  |  |  |  | 100 |
| Additive [mass %] | XX-1 |  |  |  |  |  |  |  |
|  | XX-2 |  |  |  |  |  |  |  |
|  | XX-3 |  |  |  |  |  |  |  |
|  | YY-1 |  |  |  |  |  |  |  |
|  | YY-2 |  |  |  |  |  |  |  |
| Total [mass %] |  | 100 | 100 | 100 | 100 | 100 | 100 | 100 |
| $T_{ni}[°C.]$ |  | 161 | 153 | 168 | 141 | 167 | 132 | 187 |
| $\Delta n$ |  | 0.424 | 0.366 | 0.400 | 0.394 | 0.428 | 0.402 | 0.451 |
| $\gamma_1[mPa \cdot s]$ |  | 623 | 436 | 268 | 574 | 685 | 549 | 1340 |
| $V_{th}[V]$ |  | 2.38 | 1.91 | 4.33 | 1.76 | 1.92 | 1.97 | 2.45 |
| $\Delta\varepsilon_r$ |  | 1.19 | 1.12 | 0.92 | 1.17 | 1.19 | 1.07 | 1.10 |
| $\tan\delta_{180}$ |  | 0.020 | 0.012 | 0.010 | 0.015 | 0.011 | 0.014 | 0.014 |
| Storage stability (0° C.) |  | Crystallization in one week | Crystallization in one week | No crystallization in two weeks | No crystallization in two weeks | No crystallization in two weeks | No crystallization in two weeks | No crystallization in two weeks |

TABLE 5

|  |  | Example 5 | Example 6 | Example 7 | Example 8 | Example 9 | Example 10 |
|---|---|---|---|---|---|---|---|
| Liquid crystal composition [mass %] | LC-A |  |  |  |  |  |  |
|  | LC-B |  |  |  |  |  |  |
|  | LC-C |  |  |  |  |  |  |
|  | LC-1 | 99.7 | 99.8 | 99.8 | 99.8 | 99.75 | 99.75 |
|  | LC-2 |  |  |  |  |  |  |
|  | LC-3 |  |  |  |  |  |  |
|  | LC-4 |  |  |  |  |  |  |
| Additive [mass %] | XX-1 |  |  |  | 0.2 |  |  |
|  | XX-2 |  |  |  |  | 0.2 | 0.2 |
|  | XX-3 | 0.3 | 0.15 |  |  |  |  |
|  | YY-1 |  |  |  |  | 0.05 |  |
|  | YY-2 |  | 0.05 |  |  |  |  |
| Total [mass %] |  | 100 | 100 | 100 | 100 | 100 | 100 |
| $T_{ni}[°C.]$ |  | 140 | 140 | 140 | 140 | 140 | 140 |
| $\Delta n$ |  | 0.393 | 0.393 | 0.393 | 0.393 | 0.393 | 0.393 |
| $\gamma_1[mPa \cdot s]$ |  | 578 | 575 | 576 | 576 | 577 | 578 |
| $V_{th}[V]$ |  | 1.76 | 1.76 | 1.76 | 1.76 | 1.76 | 1.76 |
| $\Delta\varepsilon_r$ |  | 1.17 | 1.17 | 1.17 | 1.17 | 1.17 | 1.17 |
| $\tan\delta_{180}$ |  | 0.015 | 0.015 | 0.015 | 0.015 | 0.015 | 0.015 |
| Storage stability (0° C.) |  | No crystallization in two weeks | No crystallization in two weeks | No crystallization in two weeks | No crystallization in two weeks | No crystallization in two weeks | No crystallization in two weeks |

TABLE 6

|  |  | Example 11 | Example 12 | Example 13 | Example 14 | Example 15 | Example 16 |
|---|---|---|---|---|---|---|---|
| Liquid crystal composition [mass %] | LC-A |  |  |  |  |  |  |
|  | LC-B |  |  |  |  |  |  |
|  | LC-C |  |  |  |  |  |  |
|  | LC-1 |  |  |  |  |  |  |
|  | LC-2 | 99.70 | 99.80 | 99.80 | 99.80 | 99.75 | 99.75 |
|  | LC-3 |  |  |  |  |  |  |
|  | LC-4 |  |  |  |  |  |  |
| Additive [mass %] | XX-1 |  |  |  | 0.20 |  |  |
|  | XX-2 |  |  |  |  | 0.20 | 0.20 |
|  | XX-3 | 0.30 | 0.15 |  |  |  | 0.20 |
|  | YY-1 |  |  |  |  | 0.05 | 0.05 |
|  | YY-2 |  | 0.05 |  |  |  |  |
| Total [mass %] |  | 100 | 100 | 100 | 100 | 100 | 100 |
| $T_{ni}[°C.]$ |  | 166 | 166 | 166 | 168 | 166 | 186 |
| $\Delta n$ |  | 0.427 | 0.427 | 0.427 | 0.427 | 0.427 | 0.427 |
| $\gamma_1[mPa \cdot s]$ |  | 691 | 687 | 686 | 688 | 688 | 689 |
| $V_{th}[V]$ |  | 1.76 | 1.76 | 1.76 | 1.76 | 1.76 | 1.76 |
| $\Delta\varepsilon_r$ |  | 1.19 | 1.19 | 1.19 | 1.19 | 1.19 | 1.19 |

TABLE 6-continued

|  | Example 11 | Example 12 | Example 13 | Example 14 | Example 15 | Example 16 |
|---|---|---|---|---|---|---|
| tan$\delta_{180}$ | 0.011 | 0.011 | 0.011 | 0.011 | 0.011 | 0.011 |
| Storage stability (0° C.) | No crystallization in two weeks | No crystallization in two weeks | No crystallization in two weeks | No crystallization in two weeks | No crystallization in two weeks | No crystallization in two weeks |

TABLE 7

|  |  | Example 17 | Example 18 | Example 19 | Example 20 | Example 21 | Example 22 |
|---|---|---|---|---|---|---|---|
| Liquid crystal composition [mass %] | LC-A |  |  |  |  |  |  |
|  | LC-B |  |  |  |  |  |  |
|  | LC-C |  |  |  |  |  |  |
|  | LC-1 |  |  |  |  |  |  |
|  | LC-2 |  |  |  |  |  |  |
|  | LC-3 | 99.7 | 99.8 | 99.8 | 99.8 | 99.75 | 99.75 |
|  | LC-4 |  |  |  |  |  |  |
| Additive [mass %] | XX-1 |  |  | 0.2 |  |  |  |
|  | XX-2 |  |  |  | 0.2 | 0.2 |  |
|  | XX-3 | 0.3 | 0.15 |  |  |  | 0.2 |
|  | YY-1 |  |  |  |  | 0.05 | 0.05 |
|  | YY-2 |  | 0.05 |  |  |  |  |
| Total [mass %] |  | 100 | 100 | 100 | 100 | 100 | 100 |
| T$_{ni}$[° C.] |  | 131 | 132 | 132 | 132 | 131 | 131 |
| $\Delta$n |  | 0.401 | 0.402 | 0.402 | 0.402 | 0.401 | 0.401 |
| $\gamma_1$[mPa · s] |  | 552 | 549 | 550 | 551 | 552 | 549 |
| V$_{th}$[V] |  | 1.76 | 1.76 | 1.76 | 1.76 | 1.76 | 1.76 |
| $\Delta\epsilon_r$ |  | 1.07 | 1.07 | 1.07 | 1.07 | 1.07 | 1.07 |
| tan$\delta_{180}$ |  | 0.014 | 0.014 | 0.014 | 0.014 | 0.014 | 0.014 |
| Storage stability (0° C.) |  | No crystallization in two weeks | No crystallization in two weeks | No crystallization in two weeks | No crystallization in two weeks | No crystallization in two weeks | No crystallization in two weeks |

TABLE 8

|  |  | Example 23 | Example 24 | Example 25 | Example 26 | Example 27 | Example 28 |
|---|---|---|---|---|---|---|---|
| Liquid crystal composition [mass %] | LC-A |  |  |  |  |  |  |
|  | LC-B |  |  |  |  |  |  |
|  | LC-C |  |  |  |  |  |  |
|  | LC-1 |  |  |  |  |  |  |
|  | LC-2 |  |  |  |  |  |  |
|  | LC-3 |  |  |  |  |  |  |
|  | LC-4 | 99.7 | 99.8 | 99.8 | 99.8 | 99.75 | 99.75 |
| Additive [mass %] | XX-1 |  |  | 0.2 |  |  |  |
|  | XX-2 |  |  |  | 0.2 | 0.2 |  |
|  | XX-3 | 0.3 | 0.15 |  |  |  | 0.2 |
|  | YY-1 |  |  |  |  | 0.05 | 0.05 |
|  | YY-2 |  | 0.05 |  |  |  |  |
| Total [mass %] |  | 100 | 100 | 100 | 100 | 100 | 100 |
| T$_{ni}$[° C.] |  | 186 | 187 | 187 | 187 | 186 | 186 |
| $\Delta$n |  | 0.450 | 0.451 | 0.451 | 0.451 | 0.450 | 0.450 |
| $\gamma_1$[mPa · s] |  | 1341 | 1340 | 1347 | 1341 | 1353 | 1341 |
| V$_{th}$[V] |  | 1.76 | 1.76 | 1.76 | 1.76 | 1.76 | 1.76 |
| $\Delta\epsilon_r$ |  | 1.10 | 1.10 | 1.10 | 1.10 | 1.10 | 1.10 |
| tan$\delta_{180}$ |  | 0.014 | 0.014 | 0.014 | 0.014 | 0.014 | 0.014 |
| Storage stability (0° C.) |  | No crystallization in two weeks | No crystallization in two weeks | No crystallization in two weeks | No crystallization in two weeks | No crystallization in two weeks | No crystallization in two weeks |

Examples 1 to 4 showed that a liquid crystal composition using a compound represented by the general formula (i) was a liquid crystal composition with a high T$_{ni}$, a high $\Delta$n, a low V$_{th}$, a high $\Delta\epsilon_r$, a low tan $\delta_{iso}$, and high storage stability at low temperatures.

In particular, Examples 2 and 4 showed particularly high $\Delta$n and $\Delta\epsilon_r$.

On the other hand, Comparative Examples 1 to 3 showed that a liquid crystal composition not using a compound represented by the general formula (i) had low storage stability at low temperatures, a very high V$_{th}$, or a low $\Delta\epsilon_r$.

Furthermore, even when a hindered phenol antioxidant or a hindered amine light stabilizer was used in combination, Examples 5 to 28 showed a high T$_{ni}$, a high $\Delta$n, a low V$_{th}$, a high $\Delta\epsilon_r$, a low tan $\delta_{iso}$, and high storage stability at low temperatures

Examples 29 to 42

Furthermore, LC-5 and LC-6 shown in Table 9 were prepared. Liquid crystal compositions described in Tables 10 to 12 were prepared from LC-5 and LC-6, hindered phenol antioxidants (XX-1) to (XX-3), and hindered amine light stabilizers (YY-1) and (YY-2), and their physical properties were measured, and the storage stability test was performed. The same effects as in Examples 1 to 28 were confirmed. Tables 9 to 12 show the results.

TABLE 9

|  | LC-5 | LC-8 |
|---|---|---|
| 4-Ph3-T-Ph-Ph-NCS |  |  |
| 3-Ph3-T-Ph-Ph3-NCS |  |  |
| 4-Ph3-T-Ph-Ph3-NCS | 5 |  |
| 5-Ph3-T-Ph-Ph3-NCS |  | 8.5 |
| 3-Cy-T-Ph-Ph3-NCS | 8 | 12 |
| 4-Cy-T-Ph-Ph3-NCS |  | 12 |
| 3-Cy-T-Ph-T-Ph3-NCS | 8 | 5 |
| 4-Cy-T-Ph-T-Ph3-NCS |  | 5 |
| 5-Cy-T-Ph-T-Ph3-NCS |  |  |
| 5-Cy-Ph-NCS |  |  |
| 7-Ph-Ph1-NCS |  |  |
| 4-Ph-T-Pc1-NCS |  |  |
| 40-Ph2-T-Ph-NCS |  |  |
| 50-Ph2-T-Ph-NCS |  |  |
| 5-Ph-T-Ph1-NCS |  |  |
| 40-Ph-T-Ph1-NCS |  |  |
| 3-Ph-T-Ph3-NCS | 9 | 12 |
| 5-Ph-T-Ph3-NCS | 10 | 5.5 |
| 2-Cy-Ph-Ph3-NCS |  | 20 |
| 4-Cy-Ph-Ph3-NCS |  | 20 |
| 4-Cy-Ph-T-Ph1-NCS |  |  |
| 5-Cy-Ph-T-Ph1-NCS |  |  |
| CF30-Ph-Ph-Ph3-NCS |  |  |
| 4-Ph-Ph-T-Ph3-NCS |  |  |
| 5-Ph-Ph-T-Ph3-NCS |  |  |
| 5-Ph-Ph5-T-Ph1-NCS |  |  |
| 3-Tet3-T-Ph-T-Ph1-NCS | 5 |  |
| 3-Ph-T-Ph1-Ph-CN | 12 |  |
| 3-Ph-T-Ph1-T-Ph-2 |  |  |
| 3-Ph-T-Ph1-T-Ph-3 |  |  |
| 3-Ph-T-Ph1-T-Ph-5 |  |  |
| 3-Ph-T-Pm1-T-Ph-2 |  |  |
| 4-Ph-T-Pm1-T-Ph-3 |  |  |
| 4-Ph3-T-Pm2-T-Ph-S1 |  |  |
| 4-Ph3-T-Pm1-T-Ph-S1 | 7 |  |
| 3-Tet3-T-Ph-T-Ph-2 | 5 |  |
| 3-Tet3-T-Ph-T-Ph-4 | 8 |  |
| 2-Ph3-T-Ph-Az-Ph-2 | 5 |  |
| 3-Ph3-T-Ph-Az-Ph-2 | 8 |  |
| 3-Tet3-T-Ph-Az-Ph-2 | 5 |  |
| 3-Tet3-T-Ph-Az-Ph-4 | 5 |  |
| 3-Cy-COO-Ph-T-Ph-5 |  |  |
| 2-Ph3-T-Ph-Ph-3 |  |  |
| 2-Ph3-T-Ph-Ph-4 |  |  |
| 3-Ph3-T-Ph-Ph-2 |  |  |
| 3-Ph3-T-Ph-Ph-4 |  |  |
| 4-Ph3-T-Ph-Ph-3 |  |  |
| Total (mass %) | 100 | 100 |

TABLE 10

|  |  | Example 29 | Example 30 |
|---|---|---|---|
| Liquid crystal composition [mass %] | LC-5 | 100 |  |
|  | LC-6 |  | 100 |
| Additive [mass %] | XX-1 |  |  |
|  | XX-2 |  |  |
|  | XX-3 |  |  |
|  | YY-1 |  |  |
|  | YY-2 |  |  |
| Total [mass %] |  | 100 | 100 |
| $T_{ni}$ [° C.] |  | 187 | 161 |
| Δn |  | 0.451 | 0.359 |
| $γ_1$ [mPa · s] |  | 1340 | 452 |
| $V_{th}$ [V] |  | 2.45 | 1.82 |
| $Δε_r$ |  | 1.10 | 1.02 |
| $tanδ_{iso}$ |  | 0.014 | 0.010 |
| Storage stability (0° C.) |  | No crystallization in two weeks | No crystallization in two weeks |

TABLE 11

|  |  | Example 31 | Example 32 | Example 33 | Example 34 | Example 35 | Example 36 |
|---|---|---|---|---|---|---|---|
| Liquid crystal composition [mass %] | LC-5 | 99.7 | 99.8 | 99.8 | 99.8 | 99.75 | 99.75 |
|  | LC-6 |  |  |  |  |  |  |
| Additive [mass %] | XX-1 |  |  |  | 0.2 |  |  |
|  | XX-2 |  |  |  |  | 0.2 | 0.2 |
|  | XX-3 | 0.3 | 0.15 |  |  |  | 0.2 |
|  | YY-1 |  |  |  |  | 0.05 | 0.05 |
|  | YY-2 |  | 0.05 |  |  |  |  |
| Total [mass %] |  | 100 | 100 | 100 | 100 | 100 | 100 |
| $T_{ni}$ [° C.] |  | 186 | 187 | 187 | 187 | 186 | 186 |
| Δn |  | 0.450 | 0.451 | 0.451 | 0.451 | 0.450 | 0.450 |
| $γ_1$ [mPa · s] |  | 1341 | 1340 | 1347 | 1341 | 1353 | 1341 |
| $V_{th}$ [V] |  | 2.45 | 2.45 | 2.45 | 2.45 | 2.45 | 2.45 |
| $Δε_r$ |  | 1.10 | 1.10 | 1.10 | 1.10 | 1.10 | 1.10 |
| $tanδ_{180}$ |  | 0.014 | 0.014 | 0.014 | 0.014 | 0.014 | 0.014 |
| Storage stability (0° C.) |  | No crystallization in two weeks | No crystallization in two weeks | No crystallization in two weeks | No crystallization in two weeks | No crystallization in two weeks | No crystallization in two weeks |

TABLE 12

|  |  | Example 37 | Example 38 | Example 39 | Example 40 | Example 41 | Example 42 |
|---|---|---|---|---|---|---|---|
| Liquid crystal composition [mass %] | LC-5 |  |  |  |  |  |  |
|  | LC-6 | 99.7 | 99.8 | 99.8 | 99.8 | 99.75 | 99.75 |
| Additive [mass %] | XX-1 |  |  | 0.2 |  |  |  |
|  | XX-2 |  |  |  | 0.2 | 0.2 |  |
|  | XX-3 | 0.3 | 0.15 |  |  |  | 0.2 |
|  | YY-1 |  |  |  |  | 0.05 | 0.05 |
|  | YY-2 |  | 0.05 |  |  |  |  |
| Total [mass %] |  | 100 | 100 | 100 | 100 | 100 | 100 |
| $T_{ni}[°C.]$ |  | 160 | 161 | 161 | 161 | 160 | 160 |
| Δn |  | 0.358 | 0.359 | 0.359 | 0.359 | 0.358 | 0.358 |
| $\gamma_1[mPa \cdot s]$ |  | 452 | 452 | 452 | 452 | 452 | 452 |
| $V_{th}[V]$ |  | 1.82 | 1.82 | 1.82 | 1.82 | 1.82 | 1.82 |
| $\Delta\varepsilon_r$ |  | 1.02 | 1.02 | 1.02 | 1.02 | 1.02 | 1.02 |
| $tan\delta_{180}$ |  | 0.010 | 0.010 | 0.010 | 0.010 | 0.010 | 0.010 |
| Storage stability (0° C.) |  | No crystallization in two weeks | No crystallization in two weeks | No crystallization in two weeks | No crystallization in two weeks | No crystallization in two weeks | No crystallization in two weeks |

(Synthesis of Compound Represented by General Formula (i))

(Example 29) Production of Compound Represented by Formula (I-1)

[Chem. 210]

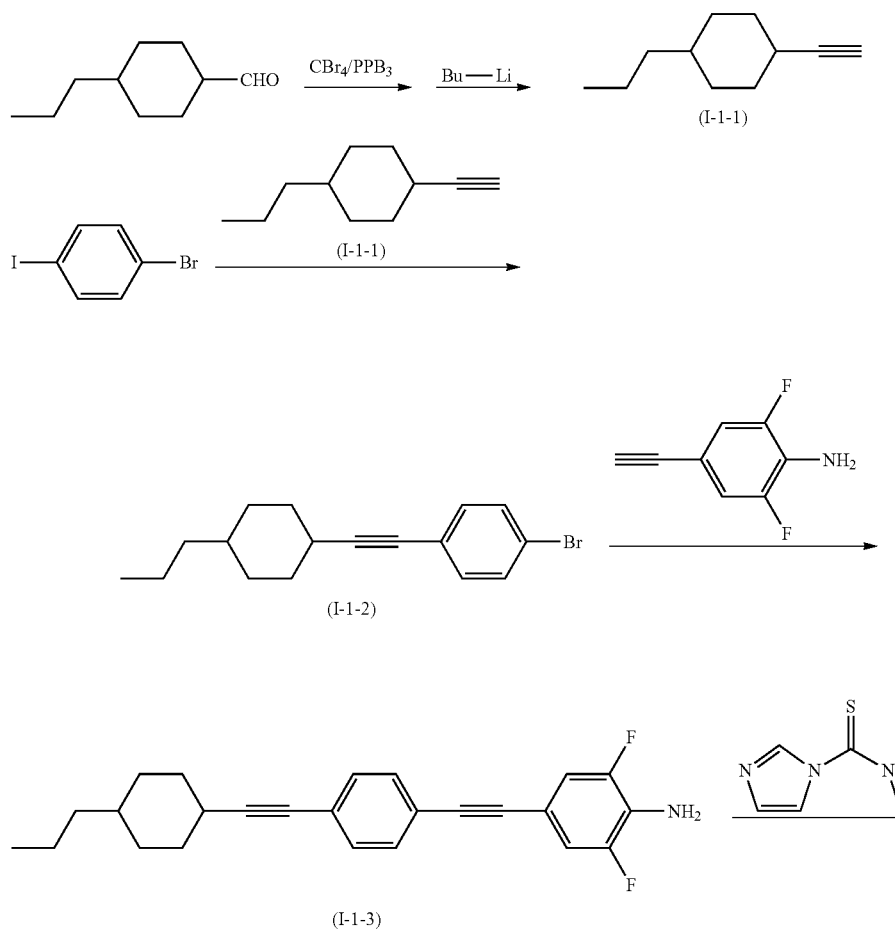

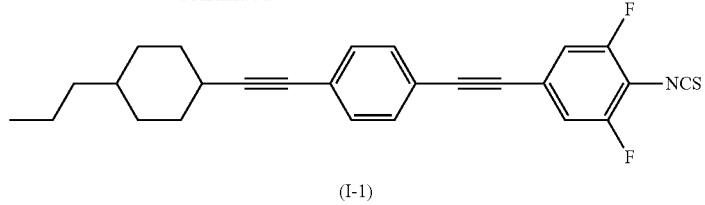

(I-1)

In a nitrogen atmosphere, 30 g of triphenylphosphine and 200 mL of dichloromethane in a reaction vessel were cooled to 0° C. 50 mL of a dichloromethane solution of 15 g of 4-propylcyclohexylaldehyde and 33 g of carbon tetrabromide was added dropwise thereto. After completion of the reaction, the precipitate was filtered off, and the solution was concentrated. 100 mL of tetrahydrofuran (THF) was added to the concentrate, which was then cooled to −60° C. While maintaining the temperature at −60° C., 50 mL of a n-butyllithium hexane solution (1.6 M) was slowly added dropwise thereto. The dropwise addition was followed by stirring at −60° C. for 2 hours. After completion of the reaction, the product was post-treated with water and 10% by mass hydrochloric acid, was subjected to extraction with hexane, and was concentrated. The concentrate was purified by silica gel column chromatography (hexane) to produce 10 g of a compound represented by the formula (I-1-1).

Next, in a nitrogen atmosphere, 20.0 g of 1-bromo-4-iodobenzene, 0.5 g of copper (I) iodide, 0.9 g of bis(triphenylphosphine) palladium (II) dichloride, 50 mL of triethylamine, and 100 mL of THF were added to a reaction vessel. While stirring at room temperature, a solution of 10 g of a compound represented by the formula (I-1-1) dissolved in 50 mL of THF was added dropwise thereto and stirred at room temperature for 1 hour. 10% by mass hydrochloric acid was poured into the reaction liquid, which was then subjected to extraction with toluene. The organic layer was post-treated with saline and was then purified by silica gel column chromatography (toluene). Furthermore, recrystallization (toluene/hexane=1/2) was performed to produce 12 g of a compound represented by the formula (I-1-2).

Next, in a nitrogen atmosphere, 12 g of a compound represented by the formula (I-1-2), 0.2 g of copper (I) iodide, 0.7 g of tetrakis(triphenylphosphine) palladium, 30 mL of triethylamine, and 50 mL of N,N-dimethylformamide were added to a reaction vessel. While heating at 80° C., a solution of 6.5 g of 4-amino-3,5-difluorophenylacetylene in 20 mL of N,N-dimethylformamide was added dropwise thereto and stirred at 80° C. for 2 hours. The reaction liquid was post-treated with 10% by mass hydrochloric acid and was then subjected to extraction with ethyl acetate. The organic layer was washed with saturated saline and was then purified by silica gel column chromatography (dichloromethane). Furthermore, recrystallization (toluene/hexane=1/3) was performed to produce 13 g of a compound represented by the formula (I-1-3).

13 g of a compound represented by the formula (I-1-3), 40 ml of dichloromethane, and 7.5 g of 1,1-thiocarbonyldiimidazole in a reaction vessel were stirred at room temperature. After completion of the reaction, the organic layer was washed with saturated saline and was then purified by silica gel column chromatography (dichloromethane). Furthermore, recrystallization (toluene/hexane=1/1) was performed to produce 6.5 g of a compound represented by the formula (I-1).

Cr, 113 N, 227 Iso

MS (EI): m/z=419

(Example 30) Production of Compound Represented by Formula (I-2)

[Chem. 211]

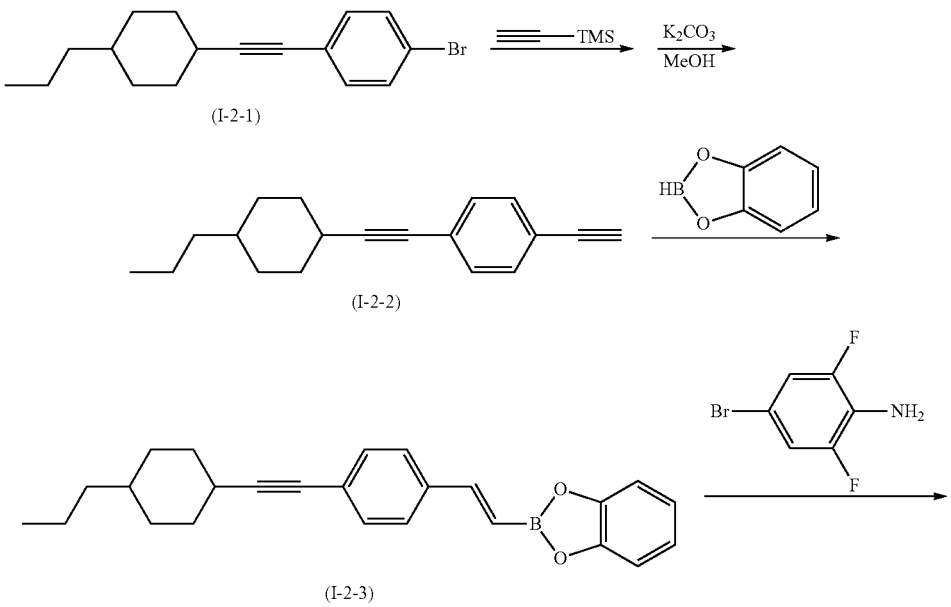

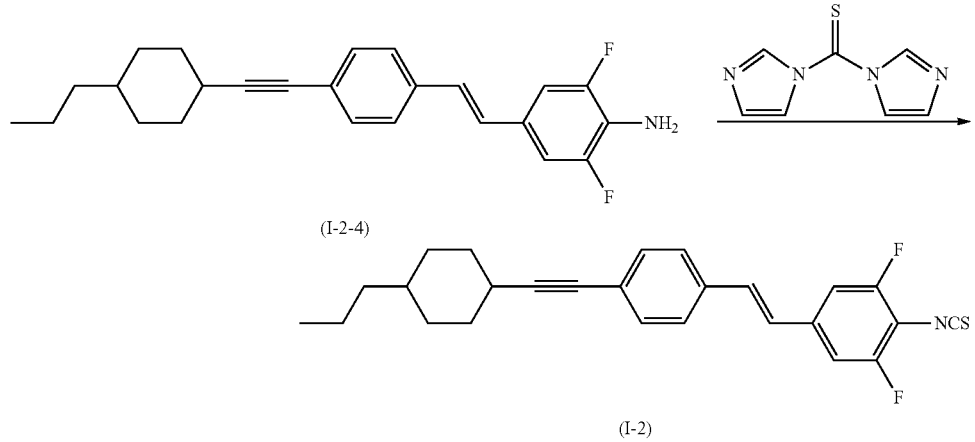

In a nitrogen atmosphere, 10.0 g of a compound represented by the formula (I-2-1), 0.2 g of copper (I) iodide, 0.7 g of bis(triphenylphosphine)dichloropalladium, 20 mL of triethylamine, and 40 mL of THF were added to a reaction vessel. While heating at 60° C., a solution of 4.5 g of trimethylsilylacetylene in 10 mL of THF was added dropwise thereto and stirred at 60° C. for 2 hours. After cooling, the reaction liquid was post-treated with 100 mL of a saturated aqueous ammonium chloride solution and was then subjected to extraction with toluene. The organic layer was washed with saturated saline and was then purified by silica gel column chromatography (toluene). Furthermore, recrystallization (toluene/hexane=1/2) was performed to produce a target compound.

Next, in a nitrogen atmosphere, the compound and 3 g of potassium carbonate in a reaction vessel were dissolved in 100 ml of methanol and were allowed to react at 40° C. for 2 hours. The reaction liquid was subjected to extraction with toluene, and the organic layer was washed with saturated saline and was then purified by silica gel column chromatography (toluene) to produce 6.8 g of a compound represented by the formula (I-2-2).

In a nitrogen atmosphere, 6.8 g of a compound represented by the formula (I-2-2), 5 g of catecholborane, 0.5 g of bis(triphenylphosphine) palladium (II) dichloride, and 60 mL of THF in a reaction vessel were allowed to react by heating under reflux for 3 hours. After completion of the reaction, the product was post-treated with water and was then subjected to extraction with ethyl acetate. The organic layer was concentrated to produce 10.0 g of a compound represented by the formula (I-2-3).

Next, in a nitrogen atmosphere, 10.0 g of a compound represented by the formula (I-2-3), 6.5 g of 4-bromo-2,6-difluoroaniline, 340 mg of tetrakis(triphenylphosphine) palladium, 8.5 g of potassium carbonate, 75 mL of tetrahydrofuran, and 10 mL of water were added to the reaction vessel, and the reaction vessel was heated to 70° C. After completion of the reaction, the reaction liquid was post-treated with 100 mL of a saturated aqueous ammonium chloride solution and was then subjected to extraction with ethyl acetate. The organic layer was washed with saturated saline and was then purified by silica gel column chromatography (dichloromethane). Furthermore, recrystallization (toluene) was performed to produce 7.2 g of a compound represented by the formula (I-2-4).

Next, in a nitrogen atmosphere, 7.2 g of a compound represented by the formula (I-2-4), 50 ml of dichloromethane, and 6 g of 1,1-thiocarbonyldiimidazole in a reaction vessel were heated under reflux for 6 hours. After completion of the reaction, the organic layer was washed with saturated saline and was then purified by silica gel column chromatography (dichloromethane). Furthermore, recrystallization (toluene) was performed to produce 4.5 g of a compound represented by the formula (I-2).

MS (EI): m/z=421

(Example 31) Production of Compound Represented by Formula (I-3)

[Chem. 212]

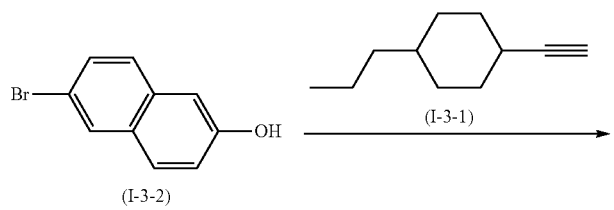

-continued

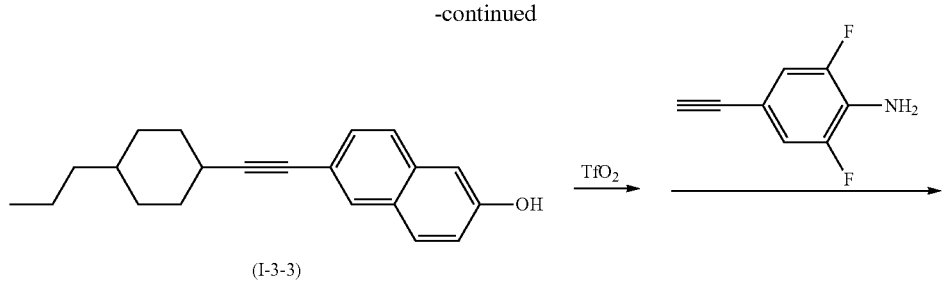

(I-3-3)

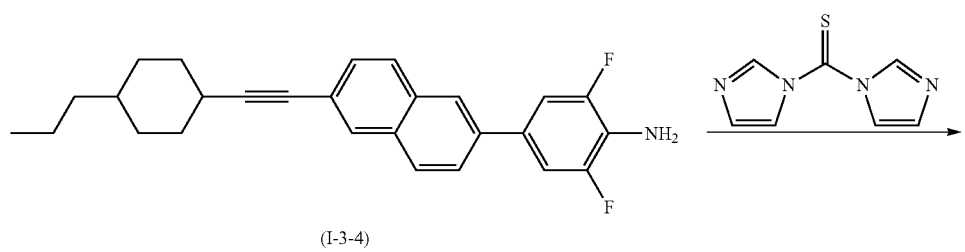

(I-3-4)

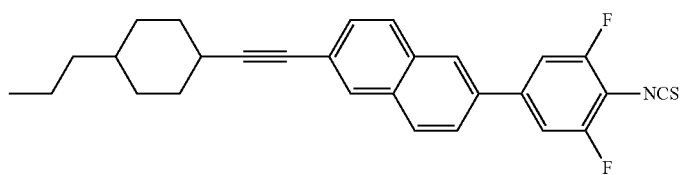

(I-3)

In a nitrogen atmosphere, 22 g of a compound represented by the formula (I-3-2), 1.0 g of copper (I) iodide, 3 g of tetrakis(triphenylphosphine) palladium, 20 mL of triethylamine, and 100 mL of N,N-dimethylformamide were added to a reaction vessel. While heating at 80° C., a solution of 15 g of a compound represented by the formula (I-3-1) in 20 mL of N,N-dimethylformamide was added dropwise thereto and stirred at 80° C. for 2 hours. After completion of the reaction, the reaction liquid was cooled, was post-treated with 10% by mass hydrochloric acid, and was then subjected to extraction with ethyl acetate. The organic layer was washed with saturated saline and was then purified by silica gel column chromatography (dichloromethane/ethyl acetate=2/1). Furthermore, recrystallization (toluene/hexane=2/1) was performed to produce 24 g of a compound represented by the formula (i-3-3).

Next, in a nitrogen atmosphere, 24 g of a compound represented by the formula (I-3-3), 10 g of pyridine, and 150 mL of dichloromethane in a reaction vessel were cooled to 0° C. to 10° C. Then, 34 g of trifluoromethanesulfonic anhydride was slowly added dropwise thereto. After completion of the dropwise addition, the reaction was performed at room temperature for 2 hours. After completion of the reaction, the product was post-treated with 10% by mass hydrochloric acid and was washed with saturated saline, and the organic layer was concentrated.

Next, the concentrate was transferred to a reaction vessel, and 0.8 g of copper (I) iodide, 2.5 g of tetrakis(triphenylphosphine) palladium, 20 mL of triethylamine, and 100 mL of N,N-dimethylformamide were added to the concentrate in a nitrogen atmosphere. While heating the reactor at 80° C., a solution of 12 g of 4-amino-3,5-difluorophenylacetylene in 20 mL of N,N-dimethylformamide was added dropwise thereto and stirred at 80° C. for 2 hours. After completion of the reaction, the reaction liquid was cooled, was post-treated with 10% by mass hydrochloric acid, and was then subjected to extraction with ethyl acetate. The organic layer was washed with saturated saline and was then purified by silica gel column chromatography (dichloromethane/ethyl acetate=1/1). Furthermore, recrystallization (toluene) was performed to produce 26 g of a compound represented by the formula (I-3-4).

Next, in a nitrogen atmosphere, 26 g of a compound represented by the formula (I-3-4), 100 ml of dichloromethane, and 13 g of 1,1-thiocarbonyldiimidazole in a reaction vessel were stirred at room temperature. After completion of the reaction, the organic layer was washed with saturated saline and was then purified by silica gel column chromatography (dichloromethane). Furthermore, recrystallization (toluene/hexane=2/1) was performed to produce 21 g of a compound represented by the formula (I-3).

MS (EI): m/z=445

(Example 32) Production of Compound Represented by Formula (I-4)

[Chem. 213]

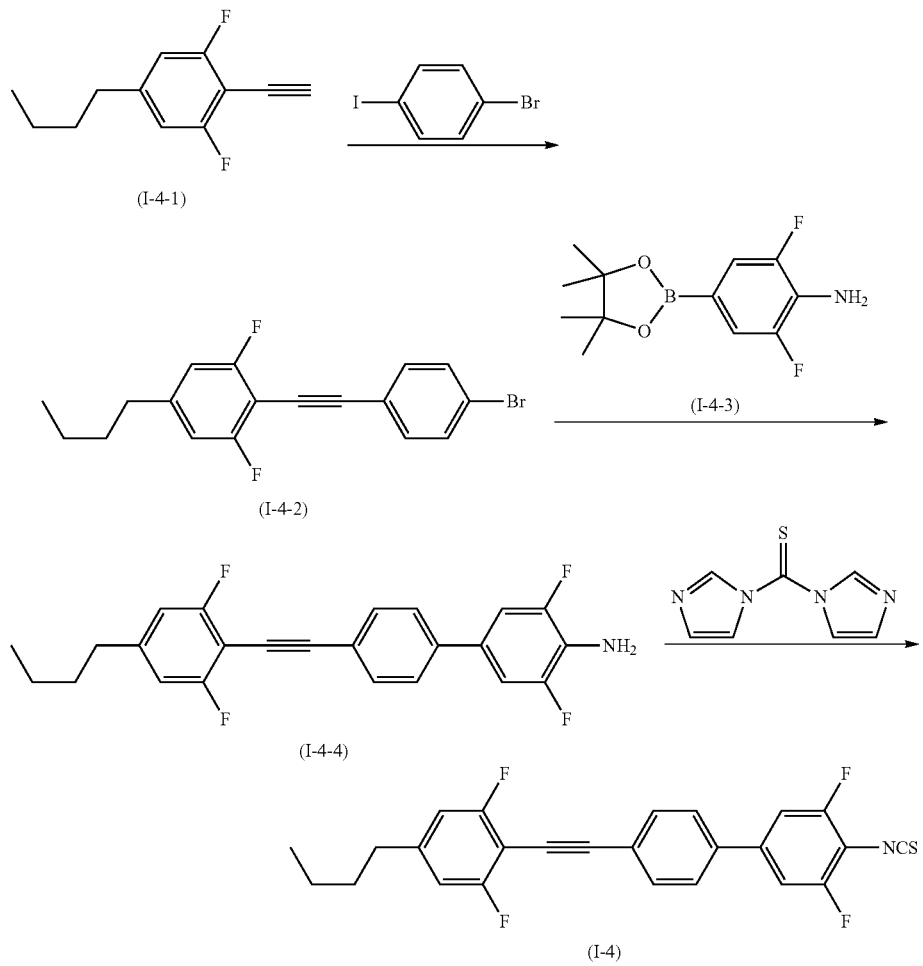

In a nitrogen atmosphere, 28 g of 1-bromo-4-iodobenzene, 1.0 g of copper (I) iodide, 3 g of tetrakis(triphenylphosphine) palladium, 20 mL of triethylamine, and 200 mL of THF were added to a reaction vessel. A solution of 19 g of a compound represented by the formula (I-4-1) in 100 mL of THF was added dropwise thereto at room temperature and was stirred at room temperature for another 4 hours. After completion of the reaction, the reaction liquid was post-treated with 10% by mass hydrochloric acid and was then subjected to extraction with ethyl acetate. The organic layer was washed with saturated saline and was then purified by silica gel column chromatography (dichloromethane). Furthermore, recrystallization (toluene/hexane=1/4) was performed to produce 32 g of a compound represented by the formula (i-4-2).

Next, in a nitrogen atmosphere, 32 g of a compound represented by the formula (I-4-2), 24 g of a compound represented by the formula (I-4-3), 1 g of tetrakis(triphenylphosphine) palladium, 18 g of potassium carbonate, 150 mL of tetrahydrofuran, and 20 mL of water were added to the reaction vessel, and the reaction vessel was heated to 70° C. After completion of the reaction, the reaction liquid was post-treated with 100 mL of a saturated aqueous ammonium chloride solution and was then subjected to extraction with ethyl acetate. The organic layer was washed with saturated saline and was then purified by silica gel column chromatography (dichloromethane/ethyl acetate=1/1). Furthermore, recrystallization (toluene/hexane=2/1) was performed to produce 28 g of a compound represented by the formula (i-4-4).

Next, in a nitrogen atmosphere, 28 g of a compound represented by the formula (I-4-4), 150 ml of dichloromethane, and 15 g of 1,1-thiocarbonyldiimidazole in a reaction vessel were heated under reflux for 6 hours. After completion of the reaction, the organic layer was washed with saturated saline and was then purified by silica gel column chromatography (dichloromethane). Furthermore, recrystallization (toluene) was performed to produce 23 g of a compound represented by the formula (I-4).

Cr, 91 SmA 145 N, 203 Iso

MS (EI): m/z=439

(Example 33) Production of Compound Represented by Formula (I-5)

[Chem. 214]

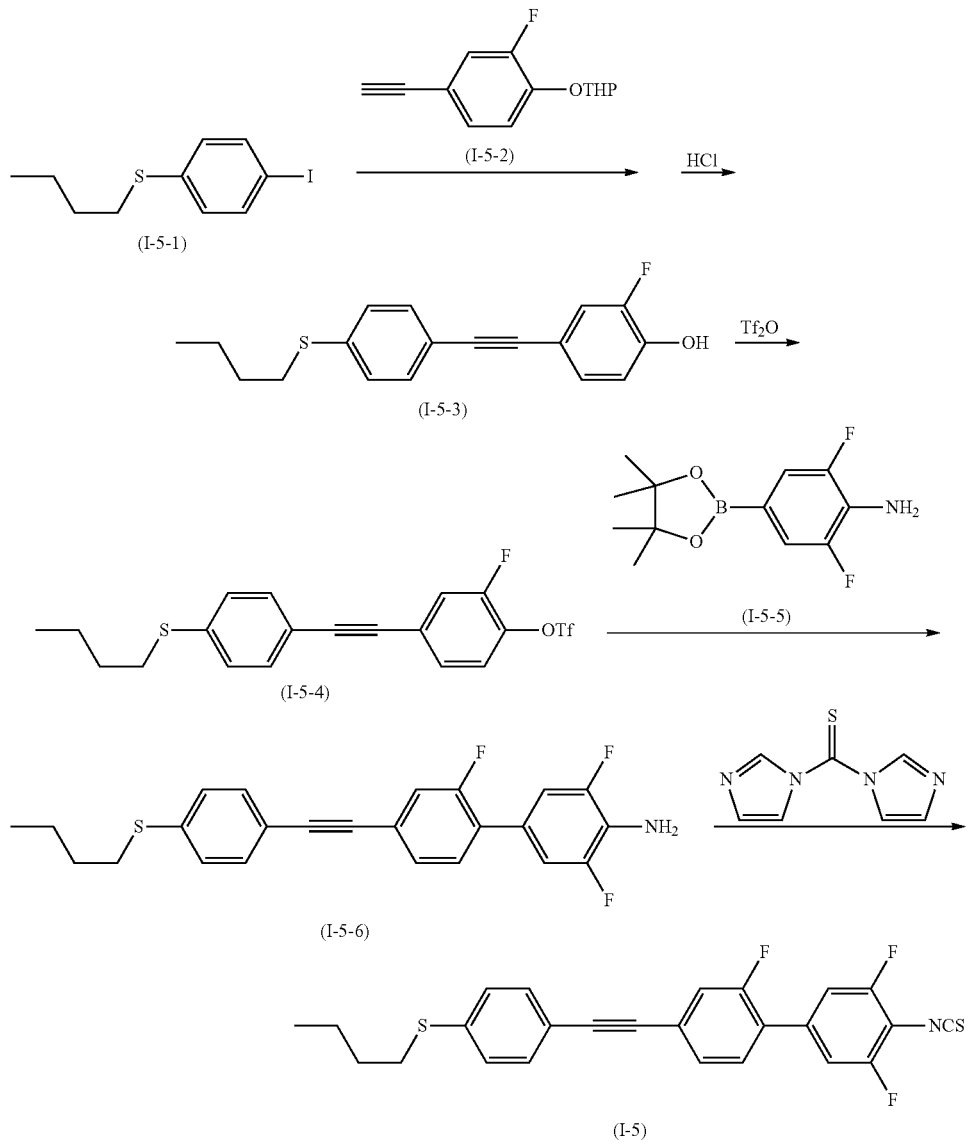

In a nitrogen atmosphere, 29 g of a compound represented by the formula (I-5-1), 1.0 g of copper (I) iodide, 3 g of tetrakis(triphenylphosphine) palladium, 20 mL of triethylamine, and 150 mL of N,N-dimethylformamide were added to a reaction vessel. While heating the reaction vessel at 80° C., a solution of 23 g of a compound represented by the formula (I-5-2) in 50 mL of N,N-dimethylformamide was added dropwise to the reaction vessel and was stirred at 80° C. for 2 hours. After completion of the reaction, the reaction liquid was cooled, was post-treated with 10% by mass hydrochloric acid, and was then subjected to extraction with ethyl acetate. The organic layer was washed with saturated saline and was then purified by silica gel column chromatography (dichloromethane/ethyl acetate=2/1). Furthermore, recrystallization (ethanol) was performed to produce 26 g of a compound represented by the formula (i-5-3).

In a nitrogen atmosphere, 26 g of a compound represented by the formula (I-5-3), 12 g of pyridine, and 150 mL of dichloromethane in a reaction vessel were then cooled to 0° C. to 10° C. Then, 30 g of trifluoromethanesulfonic anhydride was slowly added dropwise thereto. After completion of the dropwise addition, the reaction was performed at room temperature for 2 hours. After completion of the reaction, the product was post-treated with 10% by mass hydrochloric acid and was washed with saturated saline, and the organic layer was concentrated.

Next, a concentrate containing a compound represented by the formula (i-5-4) was transferred to a reaction vessel, 26.0 g of a compound represented by the formula (i-5-5), 1 g of tetrakis(triphenyiphosphine) palladium, 18 g of potassium carbonate, 150 mL of tetrahydrofuran, and 20 mL of water were added to the reaction vessel in a nitrogen atmosphere, and the reaction vessel was heated to 70° C. After completion of the reaction, the reaction liquid was post-treated with a saturated aqueous ammonium chloride solution and was then subjected to extraction with ethyl acetate. The organic layer was washed with saturated saline and was then purified by silica gel column chromatography (dichloromethane/ethyl acetate=1/1). Furthermore, recrystallization (toluene/hexane=3/1) was performed to produce 24 g of a compound represented by the formula (i-5-6).

Next, in a nitrogen atmosphere, 24 g of a compound represented by the formula (i-5-6), 150 ml of dichloromethane, and 12 g of 1,1-thiocarbonyldiimidazole in a reaction vessel were heated under reflux for 6 hours. After completion of the reaction, the organic layer was washed with saturated saline and was then purified by silica gel column chromatography (dichloromethane). Furthermore, recrystallization (toluene) was performed to produce 23 g of a compound represented by the formula (i-5).

MS (EI): m/z=453

(Example 34) Production of Compound Represented by Formula (I-6)

[Chem. 215]

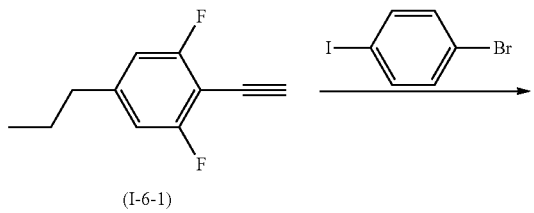

(I-6-1)

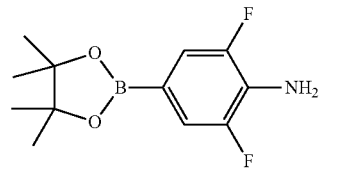

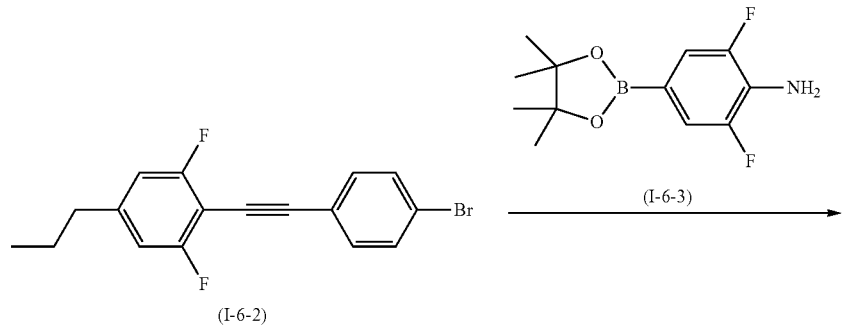

(I-6-2)

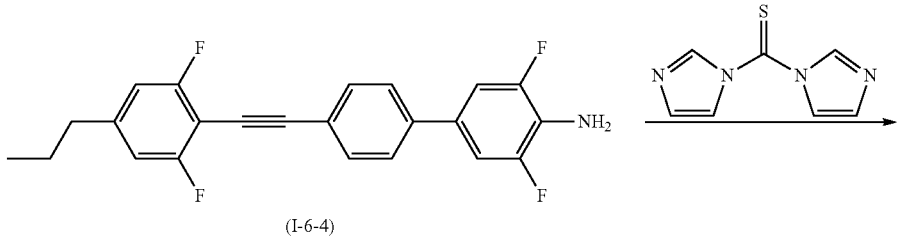

(I-6-4)

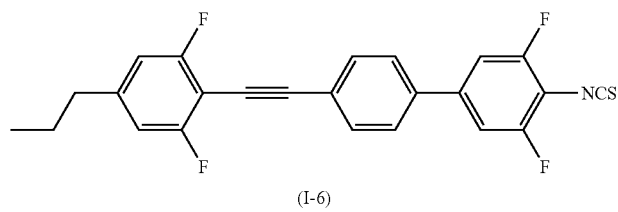

(I-6)

20 g of a compound represented by the formula (I-6) was produced in the same manner as in Example 32 except that 17.6 g of a compound represented by the formula (I-6-1) was used instead of 19 g of a compound represented by the formula (i-4-1) in Example 32.

MS (EI): m/z=425

(Example 35) Production of Compound Represented by Formula (I-7)
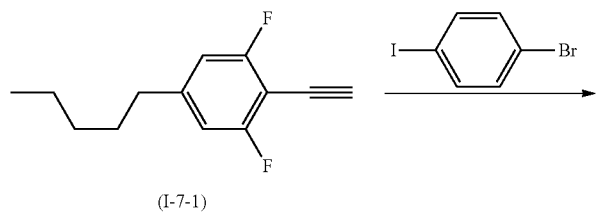
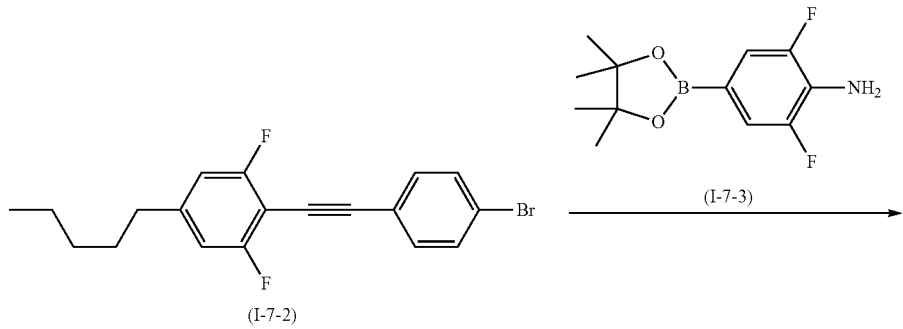
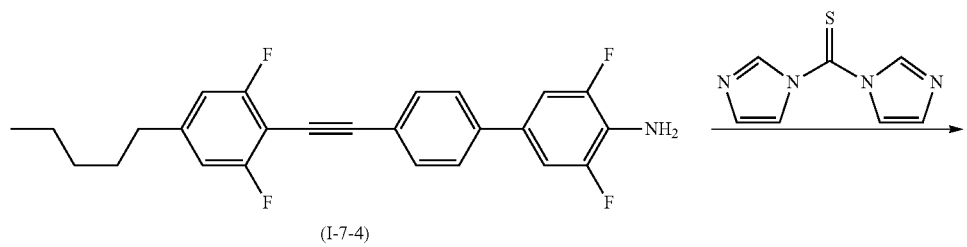
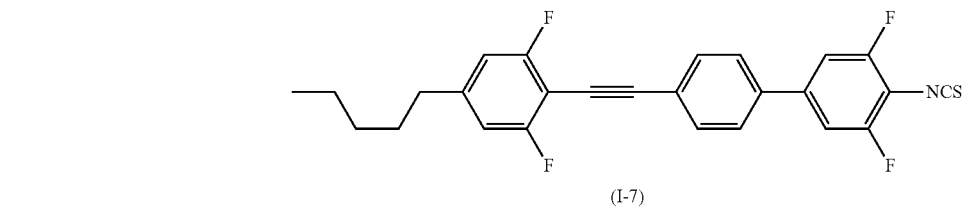
23 g of a compound represented by the formula (I-7) was produced in the same manner as in Example 32 except that 20.5 g of a compound represented by the formula (I-7-1) was used instead of 19 g of the compound represented by the formula (i-4-1) in Example 32.
MS (EI): m/z=453
(Example 36) Production of Compound Represented by Formula (I-8)
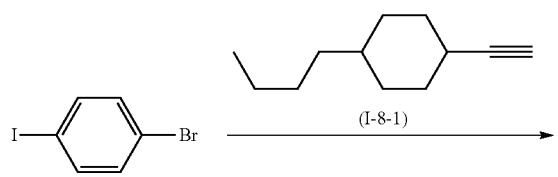

-continued
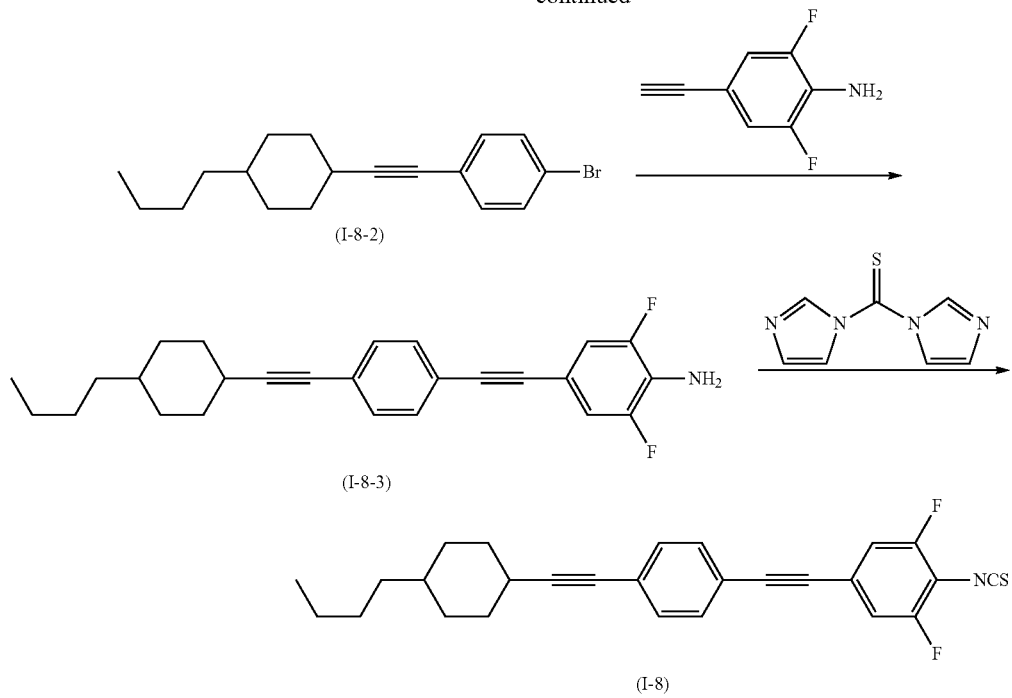
(I-8-2)
(I-8-3)
(I-8)
7 g of a compound represented by the formula (I-8) was produced in the same manner as in Example 29 except that 11 g of a compound represented by the formula (I-8-1) was used instead of 10 g of the compound represented by the formula (I-1-1) in Example 29.
MS (EI): m/z=433
(Example 37) Production of Compound Represented by Formula (I-9)
[Chem. 218]
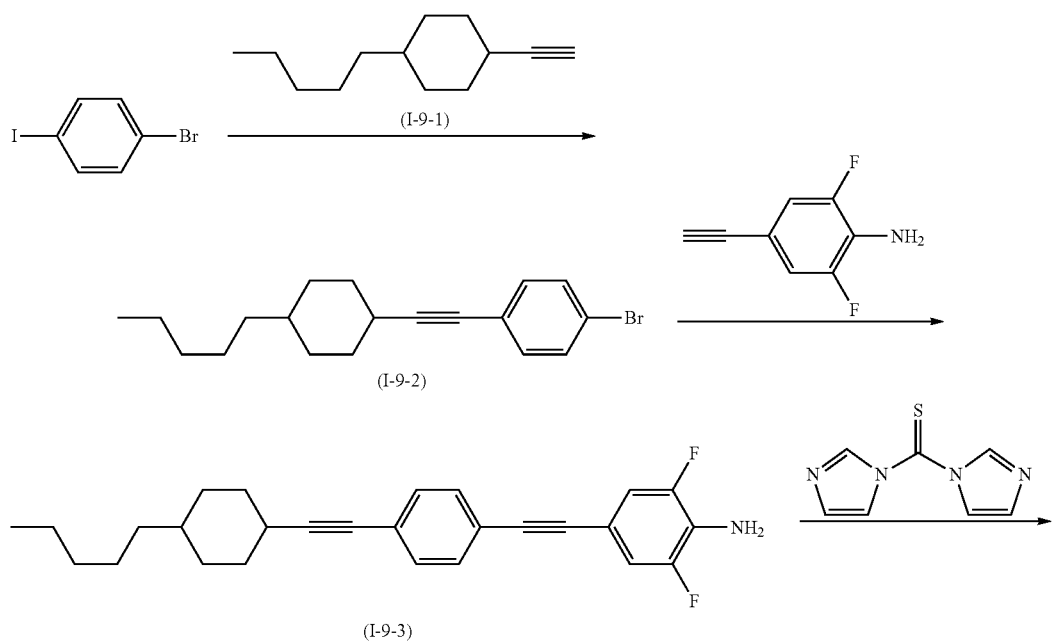
(I-9-1)
(I-9-2)
(I-9-3)

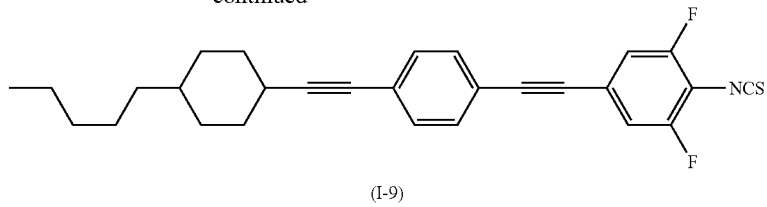

(I-9)

9 g of a compound represented by the formula (I-9) was produced in the same manner as in Example 29 except that 12 g of a compound represented by the formula (I-9-1) was used instead of 10 g of the compound represented by the formula (I-1-1) in Example 29.

MS (EI): m/z=447

(Example 38) Production of Compound Represented by Formula (I-10)

[Chem. 219]

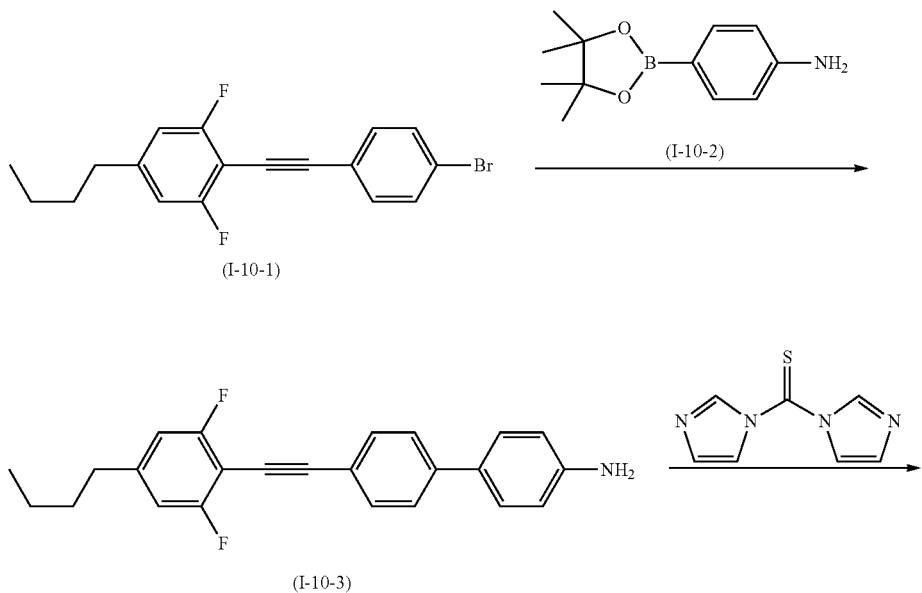

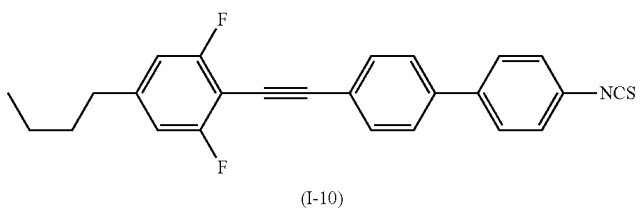

(I-10)

23 g of a compound represented by the formula (I-10) was produced in the same manner as in Example 32 except that 21 g of a compound represented by the formula (I-10-2) was used instead of 24 g of the compound represented by the formula (I-4-3) in Example 32.

Cr, 102 SmA 206 N, 261 Iso

MS (EI): m/z=403

(Example 39) Production of Compound Represented by Formula (I-11)

[Chem. 220]

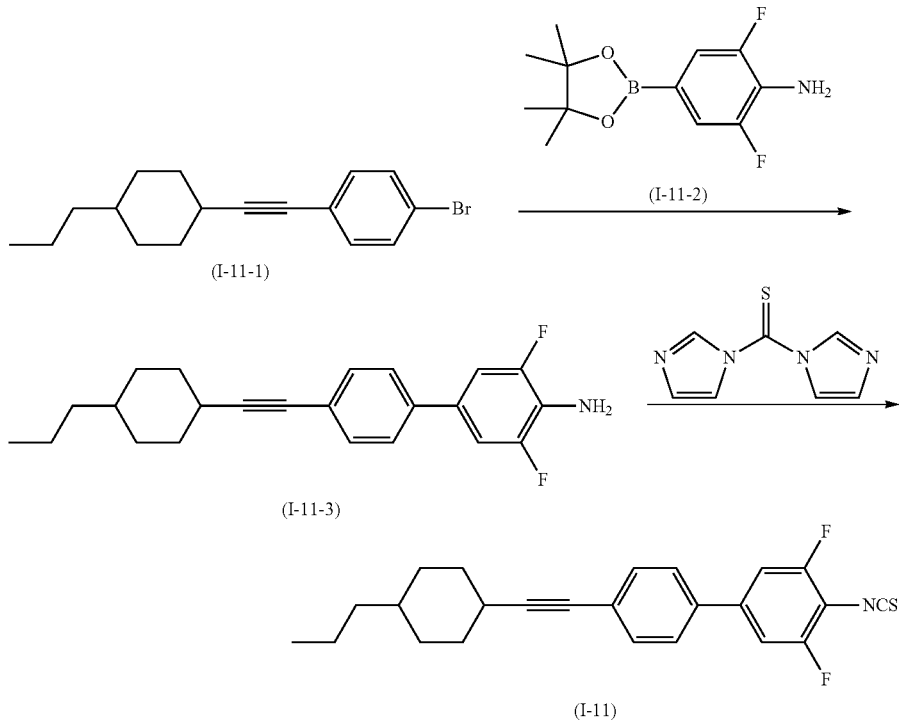

In a nitrogen atmosphere, 30 g of a compound represented by the formula (I-11-1), 26 g of a compound represented by the formula (I-11-2), 1 mg of tetrakis(triphenylphosphine) palladium, 20 g of potassium carbonate, 150 mL of tetrahydrofuran, and 20 mL of water were added to the reaction vessel, and the reaction vessel was heated to 70° C. After completion of the reaction, the reaction liquid was post-treated with a saturated aqueous ammonium chloride solution and was then subjected to extraction with ethyl acetate. The organic layer was washed with saturated saline and was then purified by silica gel column chromatography (dichloromethane/ethyl acetate=2/1). Furthermore, recrystallization (toluene/hexane=1/2) was performed to produce 29 g of a compound represented by the formula (I-11-3).

29 g of a compound represented by the formula (I-11-3), 150 ml of dichloromethane, and 17 g of 1,1-thiocarbonyl-diimidazole in a reaction vessel were heated under reflux for 6 hours. After completion of the reaction, the organic layer was washed with saturated saline and was then purified by silica gel column chromatography (dichloromethane). Furthermore, recrystallization (toluene) was performed to produce 22 g of a compound represented by the formula (I-11).

Cr, 77 N, 210 Iso

MS (EI): m/z=395

(Example 40) Production of Compound Represented by Formula (I-12)

[Chem. 221]

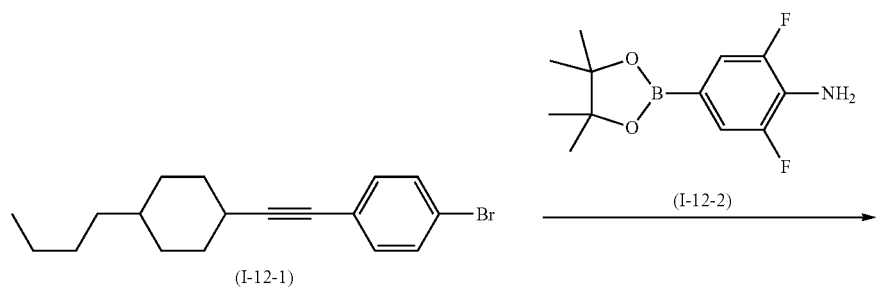

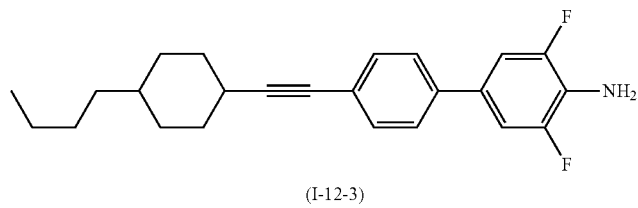 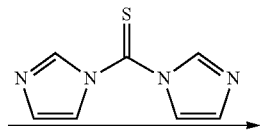

(I-12-3)

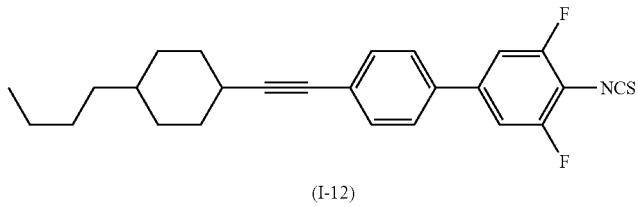

(I-12)

21 g of a compound represented by the formula (I-12) was produced in the same manner as in Example 39 except that 32 g of a compound represented by the formula (I-12-1) was used instead of 30 g of the compound represented by the formula (I-11-1) in Example 39.

MS (EI): m/z=409

INDUSTRIAL APPLICABILITY

A compound and a liquid crystal composition according to the present invention can be utilized in a liquid crystal display element, a sensor, a liquid crystal lens, optical communication equipment, and an antenna.

REFERENCE SIGNS LIST 1 antenna unit
2 vehicle
3 case
4 control board
5 top cover
6 slot array portion
7 patch array portion
8 slot
9 patch
10 antenna main body
11 antenna assembly
12 power supply portion
12a power supply line
13 first substrate
14 second substrate
15 third substrate
16 liquid crystal layer
17 first dielectric layer
20 sealed region
21, 23, 24 seal wall
22 buffer layer
P conductor
Q disk

The invention claimed is:

1. A liquid crystal composition comprising a compound represented by the general formula (i):

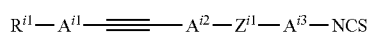

(i)

wherein $R^{i1}$ denotes a hydrogen atom, a halogen atom, or an alkyl group with 1 to 20 carbon atoms,
at least one —$CH_2$— group in the alkyl group is each independently optionally substituted with —O—, —S—, —CO—, and/or —CS—,
at least one —$CH_2$—$CH_2$— group in the alkyl group is each independently optionally substituted with —CO—O—, —O—CO—, —CO—S—, —S—CO—, —CO—NH—, —NH—CO—, and/or —CH=CH—,
at least one —$CH_2$—$CH_2$—$CH_2$— group in the alkyl group is each independently optionally substituted with —O—CO—O—, and
at least one hydrogen atom in the alkyl group is each independently optionally substituted with a halogen atom,
provided that oxygen atoms are not directly bonded to each other,
$A^{i1}$ denotes a 1,4-cyclohexylene group, wherein at least one —$CH_2$— group in the nonadjacent —$CH_2$— groups in this group are optionally substituted with —O— and/or —S—,
$A^{i2}$, and $A^{i3}$ each independently denote a group selected from the group consisting of the groups (a), (b), (c), and (d):
(a) a 1,4-cyclohexylene group, wherein at least one —$CH_2$— group in the nonadjacent —$CH_2$— groups in this group are optionally substituted with —O— and/or —S—,
(b) a 1,4-phenylene group, wherein at least one —CH= group in the nonadjacent —CH= groups in this group are optionally substituted with —N=,
(c) a 1,4-cyclohexenylene group, a bicyclo[2.2.2]octane-1,4-diyl group, a naphthalene-2,6-diyl group, a naphthalene-1,4-diyl group, a 1,2,3,4-tetrahydronaphthalene-2,6-diyl group, a 5,6,7,8-tetrahydronaphthalene-1,4-diyl group, a decahydronaphthalene-2,6-diyl group, an anthracene-2,6-diyl group, an anthracene-1,4-diyl group, an anthracene-9,10-diyl group, a phenanthrene-2,7-diyl group, wherein at least one —CH= group in the nonadjacent —CH= groups in the naphthalene-2,6-diyl group, the naphthalene-1,4-diyl group, the 1,2,3,4-tetrahydronaphthalene-2,6-diyl group, the 5,6,7,8-tetrahydronaphthalene-1,4-diyl group, the anthracene-2,6-diyl group, the anthracene-1,4-diyl group, the anthracene-9,10-diyl group, or the phenanthrene-2,7-diyl group are optionally substituted with —N=, and (d) a thiophene-2,5-diyl group, a benzothiophene-2,5-diyl group, a benzothiophene-2,6-diyl group, a dibenzothiophene-3,7-diyl group, a dibenzothiophene-2,6-diyl group, a thieno[3,2-b]thiophene-2,5-diyl group, wherein at least one —CH= group in the nonadjacent —CH= groups in this group are optionally substituted with —N=, at least one hydrogen atom in $A^{i1}$, $A^{i2}$, and $A^{i3}$ is each independently optionally substituted with a substituent $S^{i1}$, the substituent $S^{i1}$ denotes any one of a fluorine atom, a chlorine atom, a bromine atom, an iodine atom, a pentafluorosulfanyl group, a nitro group, a cyano group, an isocyano group, an amino group, a hydroxy group, a mercapto group, a methylamino group, a dimethylamino group, a diethylamino group, a diisopropylamino group, a trimethylsilyl group, a dimethylsilyl group, a thioisocyano group, and an alkyl group with 1 to 20 carbon atoms, at least one —CH$_2$— group in the alkyl group is each independently optionally substituted with —O—, —S—, and/or —CO—, at least one —CH$_2$—CH$_2$— group in the alkyl group is each independently optionally substituted with —CH=CH—, —CF=CF—, —C≡C—, —CO—O—, —O—CO—, —CO—S—, —S—CO—, —CO—NH—, and/or —NH—CO—, at least one —CH$_2$—CH$_2$—CH$_2$— group in the alkyl group is each independently optionally substituted with —O—CO—O—, and at least one hydrogen atom in the alkyl group is each independently optionally substituted with a halogen atom, provided that oxygen atoms are not directly bonded to each other, a plurality of substituents $S^{i1}$, if present, may be the same or different, $Z^{i1}$ denotes an alkylene group with 1 to 20 carbon atoms, at least one —CH$_2$— group in the alkylene group is each independently optionally substituted with —O—, —CF$_2$—, and/or —CO—, and at least one —CH$_2$—CH$_2$— group in the alkylene group is each independently optionally substituted with —CH$_2$—CH(CH$_3$)—, —CH(CH$_3$)—CH$_2$—, —CH=CH—, —CF=CF—, —CH=C(CH$_3$)—, —C(CH$_3$)=CH—, —CH=N—, —N=CH—, —N=N—, —C≡C—, —CO—O—, and/or —O—CO—, provided that oxygen atoms are not directly bonded to each other.

2. The liquid crystal composition according to claim 1, wherein the compound represented by the general formula (i) is selected from the group consisting of compounds represented by the general formulae (i-1) and (i-2):

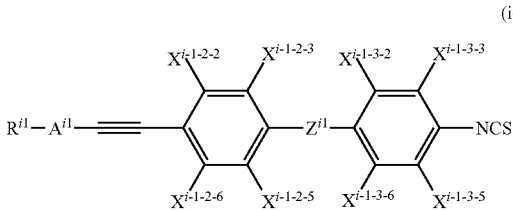

(i-1)

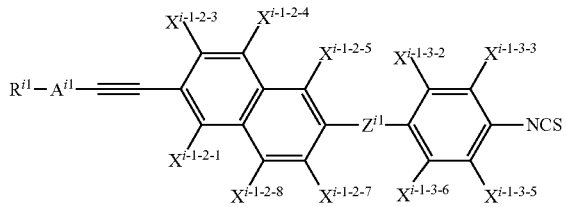

(i-2)

wherein $R^{i1}$, $A^{i1}$, and $Z^{i1}$ have the same meaning as $R^{i1}$, $A^{i1}$, and $Z^{i1}$, respectively, in the general formula (i), $X^{i-1-2-1}$, $X^{i-1-2-2}$, $X^{i-1-2-3}$, $X^{i-1-2-4}$, $X^{i-1-2-5}$, $X^{i-1-2-6}$, $X^{i-1-2-7}$, $X^{i-1-2-8}$, $X^{i-1-3-2}$, $X^{i-1-3-3}$, $X^{i-1-3-5}$, and $X^{i-1-3-6}$ each independently denote a hydrogen atom or a substituent $S^{i1}$, and the substituent $S^{i1}$ has the same meaning as the substituent $S^{i1}$ in the general formula (i).

3. The liquid crystal composition according to claim 1, further comprising a compound represented by the general formula (ii):

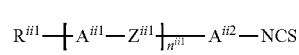

(ii)

wherein $R^{ii1}$ each independently denotes an alkyl group with 1 to 20 carbon atoms, at least one —CH$_2$— group in the alkyl group is each independently optionally substituted with —O—, —S—, —CO—, and/or —CS—, at least one —CH$_2$—CH$_2$— group in the alkyl group is each independently optionally substituted with —CH=CH—, —CO—O—, —O—CO—, —CO—S—, —S—CO—, —CO—NH—, —NH—CO—, —CH=CH—, —CF=CF—, and/or —C≡C—, at least one —CH$_2$—CH$_2$—CH$_2$— group in the alkyl group is each independently optionally substituted with —O—CO—O—, and at least one hydrogen atom in the alkyl group is each independently optionally substituted with a halogen atom, provided that oxygen atoms are not directly bonded to each other, $A^{ii1}$ and $A^{ii2}$ each independently denote a group selected from the group consisting of the groups (a), (b), (c), and (d):

(a) a 1,4-cyclohexylene group, wherein one —CH$_2$— or two or more nonadjacent —CH$_2$— groups in this group are optionally substituted with —O— and/or —S—, (b) a 1,4-phenylene group, wherein one —CH= or two or more nonadjacent —CH= groups in this group are optionally substituted with —N=, (c) a 1,4-cyclohexenylene group, a bicyclo[2.2.2]octane-1,4-diyl group, a naphthalene-2,6-diyl group, a naphthalene-1,4-diyl group, a 1,2,3,4-tetrahydronaphthalene-2,6-diyl group, a 5,6,7,8-tetrahydronaphthalene-1,4-diyl group, a decahydronaphthalene-2,6-diyl group, an anthracene-2,6-diyl group, an anthracene-1,4-diyl group, an anthracene-9,10-diyl group, a phenanthrene-2,7-diyl group, wherein at least one —CH= group in the nonadjacent —CH= groups in the naphthalene-2,6-diyl group, the naphthalene-1,4-diyl group, the 1,2,3,4-tetrahydronaphthalene-2,6-diyl group, the 5,6,7,8- tetrahydronaphthalene-1,4-diyl group, the anthracene-2,6-diyl group, the anthracene-1,4-diyl group, the anthracene-9,10-diyl group, or the phenanthrene-2,7-diyl group are optionally substituted with —N═, and (d) a thiophene-2,5-diyl group, a benzothiophene-2,5-diyl group, a benzothiophene-2,6-diyl group, a dibenzothiophene-3,7-diyl group, a dibenzothiophene-2,6-diyl group, a thieno[3,2-b]thiophene-2,5-diyl group, wherein at least one —CH═ group in the nonadjacent —CH═ groups in this group are optionally substituted with —N═, at least one hydrogen atoms in $A^{ii1}$ and $A^{ii2}$ is each independently optionally substituted with a substituent $S^{ii1}$, the substituent $S^{ii1}$ denotes any one of a halogen atom, a pentafluorosulfanyl group, a nitro group, a cyano group, an isocyano group, an amino group, a hydroxy group, a mercapto group, a methylamino group, a dimethylamino group, a diethylamino group, a diisopropylamino group, a trimethylsilyl group, a dimethylsilyl group, a thioisocyano group, and an alkyl group with 1 to 20 carbon atoms, at least one —CH$_2$— group in the alkyl group is each independently optionally substituted with —O—, —S—, —CO—, and/or —CS—, at least one —CH$_2$—CH$_2$— group in the alkyl group is each independently optionally substituted with —CO—O—, —O—CO—, —CO—S—, —S—CO—, —CO—NH—, —NH—CO—, —CH═CH—, —CF═CF—, and/or —C≡C—, at least one —CH$_2$—CH$_2$—CH$_2$— group in the alkyl group is each independently optionally substituted with —O—CO—O—, and at least one hydrogen atom in the alkyl group is each independently optionally substituted with a halogen atom, provided that oxygen atoms are not directly bonded to each other, a plurality of substituents $S^{ii1}$, if present, may be the same or different, $Z^{ii1}$ denotes any one of a single bond and an alkylene group with 1 to 20 carbon atoms, at least one —CH$_2$— group in the alkylene group is each independently optionally substituted with —O—, at least one —CH$_2$—CH$_2$— group in the alkylene group is each independently optionally substituted with —CH$_2$—CH(CH$_3$)—, —CH(CH$_3$)—CH$_2$—, —CH═CH—, —CF═CF—, —CH═C(CH$_3$)—, —C(CH$_3$)═CH—, —CH═N—, —N═CH—, —N═N—, —C≡C—, —CO—O—, and/or —O—CO—, and at least one —CH$_2$—CH$_2$—CH$_2$— group in the alkylene group is each independently optionally substituted with —O—CO—O—, provided that oxygen atoms are not directly bonded to each other, $n^{ii1}$ denotes an integer of 1 to 4, and a plurality of $A^{ii1}$, if present, may be the same or different, and a plurality of $Z^{ii1}$, if present, may be the same or different, provided that a compound represented by the general formula (i) is excluded.

4. The liquid crystal composition according to claim 3, wherein the compound represented by the general formula (ii) is selected from the group consisting of compounds represented by the general formulae (ii-1) to (ii-6):

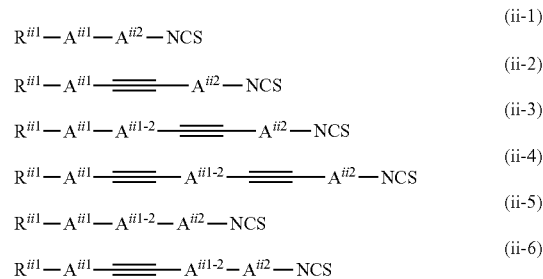

wherein $R^{ii1}$, $A^{ii1}$, and $A^{ii2}$ have the same meaning as $R^{ii1}$, $A^{ii1}$, and $A^{ii2}$, respectively, in the general formula (ii), and $A^{ii1-2}$ in the general formulae (ii-3) to (ii-6) is defined in the same way as $A^{ii1}$ in the general formula (ii).

5. The liquid crystal composition according to claim 1, further comprising a compound represented by the general formula (vi):

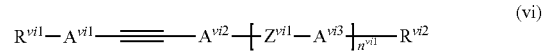

wherein $R^{vi1}$ denotes a hydrogen atom or an alkyl group with 1 to 20 carbon atoms, at least one —CH$_2$— group in the alkyl group is each independently optionally substituted with —O—, —S—, —CO—, and/or —CS—, at least one —CH$_2$—CH$_2$— group in the alkyl group is each independently optionally substituted with —CO—O—, —O—CO—, —CO—S—, —S—CO—, —CO—NH—, —NH—CO—, —CH═CH—, —CF═CF—, and/or —C≡C—, at least one —CH$_2$—CH$_2$—CH$_2$— group in the alkyl group is each independently optionally substituted with —O—CO—O—, and at least one hydrogen atom in the alkyl group is each independently optionally substituted with a halogen atom, provided that oxygen atoms are not directly bonded to each other, $R^{vi2}$ denotes any one of a hydrogen atom, a fluorine atom, a chlorine atom, a bromine atom, an iodine atom, a pentafluorosulfanyl group, a nitro group, a cyano group, an isocyano group, an amino group, a hydroxy group, a mercapto group, a methylamino group, a dimethylamino group, a diethylamino group, a diisopropylamino group, a trimethylsilyl group, a dimethylsilyl group, and an alkyl group with 1 to 20 carbon atoms, at least one —CH$_2$— group in the alkyl group is each independently optionally substituted with —O—, —S—, —CO—, and/or —CS—, at least one —CH$_2$—CH$_2$— group in the alkyl group is each independently optionally substituted with —CO—O—, —O—CO—, —CO—S—, —S—CO—, —CO—NH—, —NH—CO—, —CH═CH—, —CF═CF—, and/or —C≡C—, at least one —CH$_2$—CH$_2$—CH$_2$— groups in the alkyl group is each independently optionally substituted with —O—CO—O—, and at least one hydrogen atom in the alkyl group is each independently optionally substituted with a halogen atom, provided that oxygen atoms are not directly bonded to each other, $A^{vi1}$, $A^{vi2}$, and $A^{vi3}$ each independently denote any one of a hydrocarbon ring with 3 to 16 carbon atoms and a heterocycle with 3 to 16 carbon atoms, at least one hydrogen atom in $A^{vi1}$, $A^{vi2}$, and $A^{vi3}$ is each independently optionally substituted with a substituent $S^{vi1}$, the substituent $S^{vi1}$ denotes any one of a fluorine atom, a chlorine atom, a bromine atom, an iodine atom, a pentafluorosulfanyl group, a nitro group, a cyano group, an isocyano group, an amino group, a hydroxy group, a mercapto group, a methylamino group, a dimethylamino group, a diethylamino group, a diisopropylamino group, a trimethylsilyl group, a dimethylsilyl group, a thioisocyano group, and an alkyl group with 1 to 20 carbon atoms, at least one —CH$_2$— group in the alkyl group is each independently optionally substituted with —O—, —S—, and/or —CO—, at least one —CH$_2$—CH$_2$— group in the alkyl group is each independently optionally substituted with —CH═CH—, —CF═CF—, —C≡C—, —CO—O—, —O—CO—, —CO—S—, —S—CO—, —CO—NH—, and/or —NH—CO—, at least one —CH$_2$—CH$_2$—CH$_2$— group in the alkyl group is optionally substituted with —O—CO—O—, and at least one hydrogen atom in the alkyl group is each independently optionally substituted with a halogen atom, provided that oxygen atoms are not directly bonded to each other, a plurality of substituents $S^{vi1}$, if present, may be the same or different, $Z^{vi1}$ each independently denotes any one of a single bond and an alkylene group with 1 to 20 carbon atoms, at least one —CH$_2$— group in the alkylene group is each independently optionally substituted with —O—, —CF$_2$—, and/or —CO—, and at least one —CH$_2$—CH$_2$— group in the alkylene group is each independently optionally substituted with —CH$_2$—CH(CH$_3$)—, —CH(CH$_3$)—CH$_2$—, —CH═CH—, —CF═CF—, —CH═C(CH$_3$)—, —C(CH$_3$)═CH—, —CH═N—, —N═CH—, —N═N—, —C≡C—, —CO—O—, and/or —O—CO—, and at least one —CH$_2$—CH$_2$—CH$_2$— group in the alkyl group is each independently optionally substituted with —O—CO—O—, provided that oxygen atoms are not directly bonded to each other, $n^{vi1}$ denotes an integer of 1 to 3, and a plurality of $A^{vi1}$, if present, may be the same or different, and a plurality of $Z^{vi1}$ if present, may be the same or different.

6. The liquid crystal composition according to claim 1, further comprising a compound represented by the general formula (vii):

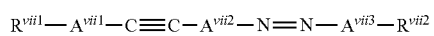
(vii)

wherein $R^{vii1}$ and $R^{vii2}$ each independently denote a halogen atom, a cyano group, or an alkyl group with 1 to 20 carbon atoms, at least one —CH$_2$— group in the alkyl group is each independently optionally substituted with —O—, —S—, —CO—, and/or —CS—, at least one —CH$_2$—CH$_2$— group in the alkyl group is each independently optionally substituted with —CO—O—, —O—CO—, —CO—S—, —S—CO—, —CO—NH—, —NH—CO—, —CH═CH—, —CF═CF—, and/or —C≡C—, at least one —CH$_2$—CH$_2$—CH$_2$— group in the alkyl group is each independently optionally substituted with —O—CO—O—, and at least one hydrogen atom in the alkyl group is each independently optionally substituted with a halogen atom, provided that oxygen atoms are not directly bonded to each other, $A^{vii1}$, $A^{vii2}$, and $A^{vii3}$ each independently denote a group selected from the group consisting of the groups (a), (b), and (c):

(a) a 1,4-cyclohexylene group, wherein at least one —CH$_2$— group in the nonadjacent —CH$_2$— groups in this group are optionally substituted with —O—, (b) a 1,4-phenylene group, wherein at least one —CH═ group in the nonadjacent —CH═ groups in this group are optionally substituted with —N═, and (c) a naphthalene-1,4-diyl group, a naphthalene-2,6-diyl group, a 1,2,3,4-tetrahydronaphthalene-2,6-diyl group, or a decahydronaphthalene-2,6-diyl group, wherein at least one —CH═ group in the nonadjacent —CH═ groups in the naphthalene-1,4-diyl group, the naphthalene-2,6-diyl group, or the 1,2,3,4-tetrahydronaphthalene-2,6-diyl group are optionally substituted with —N═, and at least one hydrogen atom in the groups (a), (b), and (c) is each independently optionally substituted with a halogen atom, a cyano group, or an alkyl group with 1 to 6 carbon atoms.

7. The liquid crystal composition according to claim 1, further comprising a compound represented by the general formula (v):

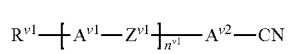
(v)

wherein $R^{v1}$ denotes an alkyl group with 1 to 20 carbon atoms, at least one —CH$_2$— group in the alkyl group is each independently optionally substituted with —O—, —S—, —CO—, and/or —CS—, at least one —CH$_2$—CH$_2$— group in the alkyl group is each independently optionally substituted with —CH═CH—, —CO—O—, —O—CO—, and/or —C≡C—, and at least one hydrogen atom in the alkyl group is each independently optionally substituted with a halogen atom, provided that oxygen atoms are not directly bonded to each other, $A^{v1}$ and $A^{v2}$ each independently denote a group selected from the group consisting of the groups (a), (b), (c), and (d):

(a) a 1,4-cyclohexylene group, wherein at least one —$CH_2$— group in the nonadjacent —$CH_2$— groups in this group are optionally substituted with —O— and/or —S—,
(b) a 1,4-phenylene group, wherein at least one —CH= group in the nonadjacent —CH= groups in this group are optionally substituted with —N=,
(c) a naphthalene-2,6-diyl group, a 1,2,3,4-tetrahydronaphthalene-2,6-diyl group, or a decahydronaphthalene-2,6-diyl group, wherein at least one —CH= group in the nonadjacent —CH= groups in the naphthalene-2,6-diyl group or the 1,2,3,4-tetrahydronaphthalene-2,6-diyl group are optionally substituted with —N=, and
(d) a thiophene-2,5-diyl group, a benzothiophene-2,5-diyl group, a benzothiophene-2,6-diyl group, a dibenzothiophene-3,7-diyl group, a dibenzothiophene-2,6-diyl group, a thieno[3,2-b]thiophene-2,5-diyl group, wherein at least one —CH= group in the nonadjacent —CH= groups in this group are optionally substituted with —N=, at least one hydrogen atom in $A^{v1}$ and $A^{v2}$ is each independently optionally substituted with a substituent $S^{v1}$, the substituent $S^{v1}$ denotes any one of a halogen atom, a cyano group, and an alkyl group with 1 to 6 carbon atoms, at least one —$CH_2$— group in the alkyl group is each independently optionally substituted with —O—, —S—, —CO—, and/or —CS—, and at least one hydrogen atom in the alkyl group is each independently optionally substituted with a halogen atom, provided that oxygen atoms are not directly bonded to each other, a plurality of substituents $S^{v1}$, if present, may be the same or different, $Z^{v1}$ denotes any one of a single bond, —C≡C—, —CH=CH—, and —CF=CF—, at least one $Z^{v1}$ denotes —C≡C—, $n^{v1}$ denotes an integer of 1 to 2, and a plurality of $A^{v1}$, if present, may be the same or different, and a plurality of $Z^{v1}$, if present, may be the same or different.

8. The liquid crystal composition according to claim 1, comprising a compound represented by the general formulae (np-1) to (np-3):

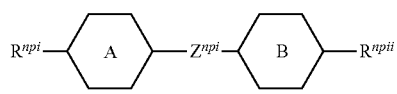
(np-1)

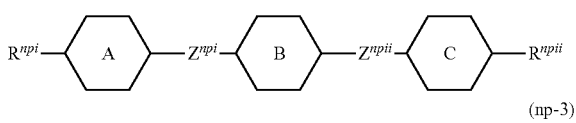
(np-2)

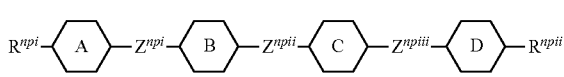
(np-3)

wherein $R^{npi}$ and $R^{npii}$ each independently denote any one of an alkyl group with 1 to 20 carbon atoms and a halogen atom, at least one —$CH_2$— groups in the alkyl group is each independently optionally substituted with —O—, —S—, —CO—, and/or —CS—, at least one —$CH_2$—$CH_2$— group in the alkyl group is each independently optionally substituted with —CO—O—, —O—CO—, —CO—S—, —S—CO—, —CO—NH—, —NH—CO—, —CH=CH—, —CF=CH—, —CH=CF—, —CF=CF—, and/or —C≡C—, at least one —$CH_2$—$CH_2$—$CH_2$— group in the alkyl group is each independently optionally substituted with —O—CO—O—, and at least one hydrogen atom in the alkyl group is each independently optionally substituted with a halogen atom, provided that oxygen atoms are not directly bonded to each other, rings A, B, C, and D each independently denote a group selected from the group consisting of the groups (a), (b), (c), and (d):

(a) a 1,4-cyclohexylene group, wherein at least one —$CH_2$— group in the nonadjacent —$CH_2$— groups in this group are optionally substituted with —O—,
(b) a 1,4-phenylene group, wherein at least one —CH= group in the nonadjacent —CH= groups in this group are optionally substituted with —N=,
(c) a naphthalene-2,6-diyl group, a 1,2,3,4-tetrahydronaphthalene-2,6-diyl group, or a decahydronaphthalene-2,6-diyl group, wherein at least one —CH= group in the nonadjacent —CH= groups in the naphthalene-2,6-diyl group or the 1,2,3,4-tetrahydronaphthalene-2,6-diyl group are optionally substituted with —N=, and
(d) a 1,4-cyclohexenylene group, a 1,3-dioxane-trans-2,5-diyl group, a pyrimidine-2,5-diyl group, or a pyridine-2,5-diyl group, at least one hydrogen atom in the rings A, B, C, and D is each independently optionally substituted with a substituent $S^{npi1}$, the substituent $S^{npi1}$ denotes any one of a halogen atom, a cyano group, and an alkyl group with 1 to 20 carbon atoms, at least one —$CH_2$— group in the alkyl group is each independently optionally substituted with —O—, —S—, —CO—, and/or —CS—, at least one —$CH_2$—$CH_2$— group in the alkyl group is each independently optionally substituted with —CO—O—, —O—CO—, —CO—S—, —S—CO—, —CO—NH—, —NH—CO—, —CH=CH—, —CF=CF—, and/or —C≡C—, at least one —$CH_2$—$CH_2$—$CH_2$— group in the alkyl group is each independently optionally substituted with —O—CO—O—, and at least one hydrogen atom in the alkyl group is each independently optionally substituted with a halogen atom, provided that oxygen atoms are not directly bonded to each other, a plurality of substituents $S^{npi1}$, if present, may be the same or different, $Z^{npi}$, $Z^{npii}$, and $Z^{npiii}$ each independently denote any one of a single bond and an alkylene group with 1 to 20 carbon atoms, at least one —$CH_2$— group in the alkylene group is each independently optionally substituted with —O—, at least one —$CH_2$—$CH_2$— group in the alkylene group is each independently optionally substituted with —CH₂—CH(CH₃)—, —CH(CH₃)—CH₂—, —CH=CH—, —CF=CF—, —CH=C(CH₃)—, —C(CH₃)=CH—, —CH=N—, —N=CH—, —N=N—, —C≡C—, —CO—O—, and/or —O—CO—, and at least one —CH₂—CH₂—CH₂— group in the alkyl group is each independently optionally substituted with —O—CO—O—, provided that oxygen atoms are not directly bonded to each other.

9. The liquid crystal composition according to claim 1, wherein Δn at 25° C. and at 589 nm is 0.30 or more.

10. A liquid crystal display element comprising the liquid crystal composition according to claim 1.

11. The liquid crystal display element according to claim 10, wherein the liquid crystal display element is driven by an active matrix system or a passive matrix system.

12. A liquid crystal display element that reversibly switches permittivity by reversibly changing an orientation direction of liquid crystal molecules of the liquid crystal composition according to claim 1.

13. A sensor comprising the liquid crystal composition according to claim 1.

14. A liquid crystal lens comprising the liquid crystal composition according to claim 1.

15. Optical communication equipment comprising the liquid crystal composition according to claim 1.

16. An antenna comprising the liquid crystal composition according to claim 1.

17. The antenna according to claim 16, comprising:
a first substrate with a plurality of slots;
a second substrate facing the first substrate and having a power supply portion;
a first dielectric layer between the first substrate and the second substrate;
a plurality of patch electrodes arranged corresponding to the plurality of slots;
a third substrate on which the patch electrodes are provided; and
a liquid crystal layer between the first substrate and the third substrate,
wherein the liquid crystal layer contains the liquid crystal composition.

18. A compound represented by the general formula (i):

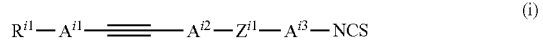

(i)

wherein $R^{i1}$ denotes a hydrogen atom, a halogen atom, or an alkyl group with 1 to 20 carbon atoms, at least one —CH₂— group in the alkyl group is each independently optionally substituted with —O—, —S—, —CO—, and/or —CS—, at least one —CH₂—CH₂— group in the alkyl group is each independently optionally substituted with —CO—O—, —O—CO—, —CO—S—, —S—CO—, —CO—NH—, —NH—CO—, and/or —CH=CH—, at least one —CH₂—CH₂—CH₂— group in the alkyl group is each independently optionally substituted with —O—CO—O—, and at least one hydrogen atom in the alkyl group is each independently optionally substituted with a halogen atom, provided that oxygen atoms are not directly bonded to each other, $A^{i1}$ denotes a 1,4-cyclohexylene group, wherein at least one —CH₂— group in the nonadjacent —CH₂— groups in this group are optionally substituted with —O— and/or —S—, $A^{i2}$, and $A^{i3}$ each independently denote a group selected from the group consisting of the groups (a), (b), (c), and (d):

(a) a 1,4-cyclohexylene group, wherein at least one —CH₂— group in the nonadjacent —CH₂— groups in this group are optionally substituted with —O— and/or —S—, (b) a 1,4-phenylene group, wherein at least one —CH= group in the nonadjacent —CH= groups in this group are optionally substituted with —N=, (c) a 1,4-cyclohexenylene group, a bicyclo[2.2.2]octane-1,4-diyl group, a naphthalene-2,6-diyl group, a naphthalene-1,4-diyl group, a 1,2,3,4-tetrahydronaphthalene-2,6-diyl group, a 5,6,7,8-tetrahydronaphthalene-1,4-diyl group, a decahydronaphthalene-2,6-diyl group, an anthracene-2,6-diyl group, an anthracene-1,4-diyl group, an anthracene-9,10-diyl group, a phenanthrene-2,7-diyl group, wherein at least one —CH= group in the nonadjacent —CH= groups in the naphthalene-2,6-diyl group, the naphthalene-1,4-diyl group, the 1,2,3,4-tetrahydronaphthalene-2,6-diyl group, the 5,6,7,8-tetrahydronaphthalene-1,4-diyl group, the anthracene-2,6-diyl group, the anthracene-1,4-diyl group, the anthracene-9,10-diyl group, or the phenanthrene-2,7-diyl group are optionally substituted with —N=, and (d) a thiophene-2,5-diyl group, a benzothiophene-2,5-diyl group, a benzothiophene-2,6-diyl group, a dibenzothiophene-3,7-diyl group, a dibenzothiophene-2,6-diyl group, a thieno[3,2-b]thiophene-2,5-diyl group, wherein at least one —CH= group in the nonadjacent —CH= groups in this group are optionally substituted with —N=, at least one of hydrogen atoms in $A^{i1}$, $A^{i2}$, and $A^{i3}$ is each independently optionally substituted with a substituent $S^{i1}$, the substituent $S^{i1}$ denotes any one of a fluorine atom, a chlorine atom, a bromine atom, an iodine atom, a pentafluorosulfanyl group, a nitro group, a cyano group, an isocyano group, an amino group, a hydroxy group, a mercapto group, a methylamino group, a dimethylamino group, a diethylamino group, a diisopropylamino group, a trimethylsilyl group, a dimethylsilyl group, a thioisocyano group, and an alkyl group with 1 to 20 carbon atoms, at least one —CH₂— group in the alkyl group is each independently optionally substituted with —O—, —S—, and/or —CO—, at least one —CH₂—CH₂— group in the alkyl group is each independently optionally substituted with —CH=CH—, —CF=CF—, —C≡C—, —CO—O—, —O—CO—, —CO—S—, —S—CO—, —CO—NH—, and/or —NH—CO—, at least one —CH₂—CH₂—CH₂— group in the alkyl group is each independently optionally substituted with —O—CO—O—, and at least one hydrogen atom in the alkyl group is each independently optionally substituted with a halogen atom, provided that oxygen atoms are not directly bonded to each other, a plurality of substituents $S^{i1}$, if present, may be the same or different, $Z^{i1}$ denotes an alkylene group with 1 to 20 carbon atoms, at least one —CH$_2$— group in the alkylene group is each independently optionally substituted with —O—, —CF$_2$—, and/or —CO—, and at least one —CH$_2$—CH$_2$— group in the alkylene group is each independently optionally substituted with —CH$_2$—CH(CH$_3$)—, —CH(CH$_3$)—CH$_2$—, —CH═CH—, —CF═CF—, —CH═C(CH$_3$)—, —C(CH$_3$)═CH—, —CH═N—, —N═CH—, —N═N—, —C≡C—, —CO—O—, and/or —O—CO—, provided that oxygen atoms are not directly bonded to each other.

19. The compound according to claim 18, wherein $Z^{i1}$ denotes a group represented by formula ($Z^{i1}$-2) or ($Z^{i1}$-4),

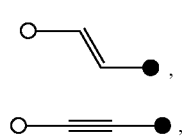

($Z^{i1}$-2)

($Z^{i1}$-4)

wherein a white dot represents a bonding arm to $A^{i2}$, and a black dot represents a bond to $A^{i3}$.

20. The compound according to claim 18, wherein $A^{i3}$ denotes a group selected from the groups represented by formulae ($A^{i3}$-SP-1) to ($A^{i3}$-SP-3):

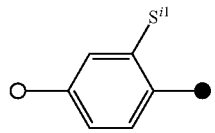

($A^{i3}$-SP-1)

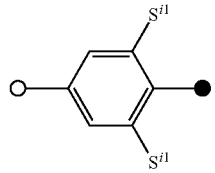

($A^{i3}$-SP-2)

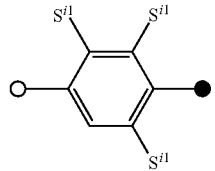

($A^{i3}$-SP-3)

wherein a white dot represents a bond to $Z^{i1}$, and a black dot represents a bond to an isothiocyanate group (—NCS).

* * * * *